(12) United States Patent
De Rutte et al.

(10) Patent No.: US 12,503,723 B1
(45) Date of Patent: Dec. 23, 2025

(54) NANOSCALE REACTION CHAMBERS AND METHODS OF USING THE SAME

(71) Applicant: Partillion Bioscience Corporation, Los Angeles, CA (US)

(72) Inventors: Joseph De Rutte, Los Angeles, CA (US); Sheldon Zhu, South Pasadena, CA (US); Wei-Ying Kuo, Los Angeles, CA (US)

(73) Assignee: Partillion Bioscience Corporation, Los Angeles, CA (US)

( * ) Notice: Subject to any disclaimer, the term of this patent is extended or adjusted under 35 U.S.C. 154(b) by 0 days.

(21) Appl. No.: 19/090,251

(22) Filed: Mar. 25, 2025

Related U.S. Application Data

(63) Continuation of application No. 18/555,450, filed as application No. PCT/US2022/024589 on Apr. 13, 2022.

(60) Provisional application No. 63/174,847, filed on Apr. 14, 2021.

(51) Int. Cl.
*C12Q 1/6806* (2018.01)
*C12Q 1/6869* (2018.01)
*C12Q 1/6876* (2018.01)

(52) U.S. Cl.
CPC ......... *C12Q 1/6806* (2013.01); *C12Q 1/6869* (2013.01); *C12Q 1/6876* (2013.01)

(58) Field of Classification Search
None
See application file for complete search history.

(56) References Cited

U.S. PATENT DOCUMENTS

| | | | |
|---|---|---|---|
| 5,583,162 | A | 12/1996 | Li et al. |
| 6,190,702 | B1 | 2/2001 | Takada et al. |
| 6,391,288 | B1 | 5/2002 | Miyazawa et al. |
| 6,806,058 | B2 | 10/2004 | Jesperson et al. |
| 7,129,091 | B2 | 10/2006 | Ismagilov et al. |
| 7,522,280 | B2 | 4/2009 | Kang et al. |
| 7,622,280 | B2 | 11/2009 | Holliger et al. |
| 7,901,939 | B2 | 3/2011 | Ismagliov et al. |
| 8,658,430 | B2 | 2/2014 | Miller et al. |
| 8,889,083 | B2 | 11/2014 | Ismagilov et al. |
| 9,007,433 | B2 | 4/2015 | Ozcan et al. |
| 9,029,085 | B2 | 5/2015 | Agresti et al. |
| 9,057,702 | B2 | 6/2015 | Ozcan et al. |
| 9,816,133 | B2 | 11/2017 | Baroud et al. |
| 10,105,703 | B2 | 10/2018 | Ismagilov et al. |
| 10,118,174 | B2 | 11/2018 | Ismagilov et al. |

(Continued)

FOREIGN PATENT DOCUMENTS

| CA | 3005385 A1 | 11/2019 |
|---|---|---|
| CN | 105764490 A | 7/2016 |

(Continued)

OTHER PUBLICATIONS

Amini, Hamed et al. Engineering Fluid Flow Using Sequenced Microstructures. Nature Communications vol. 4,1: 1826, pp. 1-8 (2013).

(Continued)

*Primary Examiner* — Brian R Gordon
(74) *Attorney, Agent, or Firm* — Wilson Sonsini Goodrich & Rosati

(57) ABSTRACT

Provided are nanoscale reaction chambers and methods of using the nanoscale reaction chambers for biological assays.

20 Claims, 49 Drawing Sheets

(56) References Cited

U.S. PATENT DOCUMENTS

| | | |
|---|---|---|
| 10,144,911 B2 | 12/2018 | Di Carlo et al. |
| 10,151,429 B2 | 12/2018 | Weitz et al. |
| 10,221,437 B2 | 3/2019 | Weitz et al. |
| 10,562,028 B2 | 2/2020 | Ismagilov et al. |
| 10,668,471 B2 | 6/2020 | Ismagilov et al. |
| 10,683,524 B2 | 6/2020 | Weitz et al. |
| 11,060,541 B2 | 7/2021 | Di Carlo et al. |
| 11,104,961 B2 | 8/2021 | Fontanez et al. |
| 11,278,881 B2 | 3/2022 | Di Carlo et al. |
| 11,512,337 B2 | 11/2022 | Fontanez et al. |
| 11,590,489 B2 | 2/2023 | Di Carlo et al. |
| 11,773,452 B2 | 10/2023 | Fontanez et al. |
| 11,827,936 B2 | 11/2023 | Fontanez et al. |
| 11,845,983 B1* | 12/2023 | Belhocine ............ C12Q 1/6806 |
| 11,851,700 B1* | 12/2023 | Bava ................. C12Q 1/6806 |
| 11,866,782 B2 | 1/2024 | Kiani |
| 11,976,325 B2 | 5/2024 | Meltzer |
| 12,233,407 B2 | 2/2025 | Di Carlo et al. |
| 12,239,973 B2 | 3/2025 | Di Carlo et al. |
| 2005/0079510 A1 | 4/2005 | Berka et al. |
| 2006/0154067 A1 | 7/2006 | Cooper et al. |
| 2007/0105972 A1 | 5/2007 | Doyle et al. |
| 2008/0213593 A1 | 9/2008 | Bala Subramaniam et al. |
| 2010/0099048 A1 | 4/2010 | Thomas et al. |
| 2011/0033547 A1 | 2/2011 | Kjems et al. |
| 2011/0091512 A1 | 4/2011 | Li |
| 2011/0106220 A1 | 5/2011 | DeGiorgio et al. |
| 2011/0112603 A1 | 5/2011 | DeGiorgio et al. |
| 2012/0326104 A1 | 12/2012 | Kwon et al. |
| 2013/0157351 A1 | 6/2013 | Ozcan et al. |
| 2014/0127290 A1 | 5/2014 | He et al. |
| 2014/0127305 A1 | 5/2014 | Ortac et al. |
| 2014/0155295 A1 | 6/2014 | Hindson et al. |
| 2014/0178252 A1 | 6/2014 | Hatch et al. |
| 2014/0230909 A1 | 8/2014 | Di et al. |
| 2014/0342373 A1 | 11/2014 | Viovy et al. |
| 2015/0225777 A1 | 8/2015 | Hindson et al. |
| 2015/0298091 A1 | 10/2015 | Weitz et al. |
| 2015/0299784 A1 | 10/2015 | Fan et al. |
| 2016/0158755 A1 | 6/2016 | Jeon et al. |
| 2016/0231324 A1 | 8/2016 | Zhao et al. |
| 2016/0244742 A1 | 8/2016 | Linnarsson et al. |
| 2016/0289740 A1 | 10/2016 | Fu et al. |
| 2016/0289769 A1* | 10/2016 | Schwartz ......... G01N 33/54346 |
| 2017/0009274 A1 | 1/2017 | Abate et al. |
| 2017/0175174 A1 | 6/2017 | Chiu et al. |
| 2017/0368224 A1 | 12/2017 | Griffin et al. |
| 2018/0179590 A1 | 6/2018 | Belgrader et al. |
| 2018/0266452 A1 | 9/2018 | Di Carlo et al. |
| 2019/0009274 A1 | 1/2019 | Novak et al. |
| 2019/0381497 A1 | 12/2019 | Di Carlo et al. |
| 2020/0261879 A1 | 8/2020 | Abate et al. |
| 2021/0214721 A1 | 7/2021 | Fontanez et al. |
| 2021/0214763 A1 | 7/2021 | Fontanez et al. |
| 2021/0214769 A1 | 7/2021 | Fontanez et al. |
| 2021/0214792 A1 | 7/2021 | Fontanez et al. |
| 2021/0214802 A1 | 7/2021 | Fontanez et al. |
| 2021/0215591 A1 | 7/2021 | Fontanez et al. |
| 2021/0268465 A1 | 9/2021 | Di Carlo et al. |
| 2021/0292490 A1 | 9/2021 | Di Carlo et al. |
| 2021/0332432 A1 | 10/2021 | Kiani |
| 2021/0340596 A1 | 11/2021 | Meltzer et al. |
| 2021/0354121 A1 | 11/2021 | Di Carlo et al. |
| 2021/0381064 A1 | 12/2021 | Fontanez et al. |
| 2021/0395821 A1* | 12/2021 | Habib ................. C12N 5/0623 |
| 2021/0403649 A1 | 12/2021 | Sheikhi et al. |
| 2022/0017892 A1 | 1/2022 | Meltzer et al. |
| 2022/0033897 A1* | 2/2022 | Zhou ................... C12Q 1/6874 |
| 2022/0090056 A1* | 3/2022 | Xu ....................... C12Q 1/6806 |
| 2022/0135966 A1 | 5/2022 | Meltzer |
| 2022/0233413 A1 | 7/2022 | Di Carlo et al. |
| 2022/0235416 A1 | 7/2022 | Fontanez et al. |
| 2022/0267761 A1 | 8/2022 | Fontanez et al. |
| 2022/0372233 A1 | 11/2022 | Xue et al. |
| 2022/0372470 A1 | 11/2022 | Fontanez et al. |
| 2022/0372567 A1 | 11/2022 | Meltzer et al. |
| 2022/0380856 A1 | 12/2022 | Meltzer |
| 2022/0403472 A1 | 12/2022 | Fontanez et al. |
| 2023/0002807 A1 | 1/2023 | Godfrey et al. |
| 2023/0008992 A1 | 1/2023 | Kiani et al. |
| 2023/0018158 A1 | 1/2023 | Kugler et al. |
| 2023/0019117 A1 | 1/2023 | Kiani et al. |
| 2023/0141825 A1 | 5/2023 | Fontanez et al. |
| 2023/0151357 A1* | 5/2023 | Lebofsky ........... C12N 15/1065 435/6.11 |
| 2023/0173449 A1 | 6/2023 | De Rutte et al. |
| 2023/0173479 A1 | 6/2023 | Di Carlo et al. |
| 2023/0383332 A1* | 11/2023 | Lebofsky ............. C12Q 1/6869 |
| 2023/0420078 A1 | 12/2023 | Fontanez |
| 2024/0043940 A1 | 2/2024 | Fontanez et al. |
| 2024/0117423 A1 | 4/2024 | Meltzer |
| 2024/0132958 A1 | 4/2024 | Kiani |
| 2024/0203531 A1 | 6/2024 | Agam et al. |
| 2024/0254658 A1* | 8/2024 | Bell ....................... C40B 30/04 |
| 2024/0279648 A1 | 8/2024 | Meltzer |
| 2025/0161932 A1 | 5/2025 | Di Carlo et al. |
| 2025/0264477 A1 | 8/2025 | De Rutte et al. |
| 2025/0325975 A1 | 10/2025 | Di Carlo et al. |

FOREIGN PATENT DOCUMENTS

| | | |
|---|---|---|
| EP | 3585364 A1 | 1/2020 |
| EP | 3838268 A1 | 6/2021 |
| KR | 20140063888 A | 5/2014 |
| WO | WO-2004103351 A1 | 12/2004 |
| WO | WO-2010042943 A1 | 4/2010 |
| WO | WO-2012116014 A1 | 8/2012 |
| WO | WO-2013049404 A2 | 4/2013 |
| WO | WO-2014146025 A1 | 9/2014 |
| WO | WO-2015164212 A1 | 10/2015 |
| WO | WO-2015200541 A1 | 12/2015 |
| WO | WO-2016018678 A1 | 2/2016 |
| WO | WO-2015164212 A9 | 10/2016 |
| WO | WO-2017059367 A1 | 4/2017 |
| WO | WO-2017087693 A2 | 5/2017 |
| WO | WO-2018140966 A1 | 8/2018 |
| WO | WO-2018156935 A1 | 8/2018 |
| WO | WO-2019113457 A1 | 6/2019 |
| WO | WO-2020037214 A1 | 2/2020 |
| WO | WO-2020069298 A1 | 4/2020 |
| WO | WO-2020146031 A1 | 7/2020 |
| WO | WO-2020227321 A1 | 11/2020 |
| WO | WO-2021146166 A1 | 7/2021 |
| WO | WO-2021146168 A1 | 7/2021 |
| WO | WO-2021146183 A1 | 7/2021 |
| WO | WO-2021146184 A1 | 7/2021 |
| WO | WO-2021146187 A1 | 7/2021 |
| WO | WO-2021155057 A1 | 8/2021 |
| WO | WO-2021188500 A1 | 9/2021 |
| WO | WO-2021262312 A2 | 12/2021 |
| WO | WO-2022015970 A1 | 1/2022 |
| WO | WO-2022031857 A2 | 2/2022 |
| WO | WO-2021262312 A3 | 3/2022 |
| WO | WO-2022031857 A3 | 4/2022 |
| WO | WO-2022098726 A1 | 5/2022 |
| WO | WO-2022098736 A1 | 5/2022 |
| WO | WO-2022159896 A2 | 7/2022 |
| WO | WO-2022221391 A1 | 10/2022 |
| WO | WO-2022245825 A1 | 11/2022 |
| WO | WO-2022245826 A1 | 11/2022 |
| WO | WO-2022245827 A1 | 11/2022 |
| WO | WO-2022245830 A1 | 11/2022 |
| WO | WO-2022245868 A1 | 11/2022 |
| WO | WO-2022251445 A1 | 12/2022 |
| WO | WO-2023278537 A2 | 1/2023 |
| WO | WO-2023283408 A1 | 1/2023 |
| WO | WO-2023287957 A1 | 1/2023 |
| WO | WO-2023287980 A1 | 1/2023 |
| WO | WO-2023250418 A2 | 12/2023 |

(56) References Cited

FOREIGN PATENT DOCUMENTS

| WO | WO-2024077114 A1 | 4/2024 |
|---|---|---|
| WO | WO-2024137573 A1 | 6/2024 |

OTHER PUBLICATIONS

Bong, Ki Wan et al. Lock Release Lithography for 3D and Composite Microparticles. Lab on a Chip vol. 9,7: pp. 863-866 (2009).
Boyd, Darryl A et al. Design and Fabrication of Uniquely Shaped Thiol-ene Microfibers Using a Two-stage Hydrodynamic Focusing Design. Lab on a Chip vol. 13, 15: pp. 3105-3110 (2013).
Cao, Jiaojie, et al., Controlling sol-gel polymerization to create bowl-shaped polysilsesquioxane particles with a kippah structure. Polymer 54(10):2493-2497 (2013).
Chang, Lei, et al., Single molecule enzyme-linked immunosorbent assays: theoretical considerations. Journal of Immunological Methods 378(1-2):102-115 (2012).
De Rutte, Joseph, et al., Massively parallel encapsulation of single cells with structured microparticles and secretion-based flow sorting. BioRxiv https://www.biorxiv.org/content/10.1101/2020.03.09.984245v2 (2020).
De Rutte, Joseph, et al., Scalable High-Throughput Production of Modular Microgels for In Situ Assembly of Microporous Tissue Scaffolds. Advanced Functional Materials :1-10 (2019).
Dendukuri, Dhananjay et al. Continuous-Flow Lithography for High-Throughput Microparticle Synthesis. Nature Materials vol. 5,5: 365-369 (2006).
Dendukuri, Dhananjay et al. Stop-flow Lithography in a Microfluidic Device. Lab on a Chip vol. 7,7: pp. 818-828 (2007).
Dendukuri, Dhananjay, et al., Synthesis and Self-assembly of Amphiphilic Polymeric Microparticles. Langmuir 23(8):4669-4674 (2007).
Destgeer, Ghulam, et al., Fabrication of 3D Concentric Amphiphilic Microparticles to Form Uniform Nanoliter Reaction Volumes for Amplified Affinity Assays. Lab Chip 20:3503-3514 (2020).
Di Carlo Laboratory Microfluidic Biotechnology. UCLA Software, uFlow, A computer-aided design (CAD) tool for the rational design of inertial flows. Accessed May 28, 2024. pg. 1. Retrieved from Internet URL: https://www.biomicrofluidics.com/software.
Dimova, Rumiana et al., Lipid membranes in contact with aqueous phases of polymer solutions, Soft Matter 8:6409-6415 (2012).
Ding et al., Sensitive and predictable separation of microfluidic droplets by size using in-line passive filter. Biomicrofluidics 11(1):014114 (2017).
Duncanson, Wynter J, et al., Microfluidic Synthesis of Advanced Microparticles for Encapsulation and Controlled Release. Lab on a Chip 12(12):2135-2145 (2012).
Edd, Jon F, et al., Controlled Encapsulation of Single Cells Into Monodisperse Picoliter Drops. Lab Chip 8(8):1262-1264 (2008).
Fan, H Christina et al. Expression profiling. Combinatorial labeling of single cells for gene expression cytometry. Science 347(6222): 1258367, 1-10 (2015).
Forciniti, D., et al., Influence of polymer molecular weight and temperature on phase composition in aqueous two-phase systems. Fluid Phase Equilibria 61(3):243-262 (1991).
Furukawa, Yuki, et al., Nano- and microsized cubic gel particles from cyclodextrin metal-organic frameworks. Angewandte Chemie 51(42):10566-10569 (2012).
Hackler, Amber L., et al., Off-DNA DNA-Encoded Library Affinity Screening. ACS Combinatorial Science 22(1):25-34 (2019).
Hassanzadeh-Barforoushi, Amin, et al., Static droplet array for culturing single live adherent cells in an isolated chemical microenvironment. Lab on a Chip 18(15):2156-2166 (2018).
Hindson, Benjamin J et al. High-throughput Droplet Digital PCR System for Absolute Quantitation of DNA Copy Number. Analytical Chemistry vol. 83,22: pp. 8604-8610 (2011).
Hu et al.: Microfluidic fabrication of shape-tunable alginate microgels: Effect of size and impact velocity. Carbohydrate Polymers. 120:38-45 (2015).
Hu, Yuandu, et al., Fabrication of shape controllable Janus alginate/pNIPAAm microgels via microfluidics technique and off-chip ionic cross-linking. Langmuir 31(6):1885-1891 (2015).
Huang, Fujian, et al., Two-Photon Lithographic Patterning of DNA-Coated Single-Microparticle Surfaces. Nano Letters 19(1):618-625 (2019).
Kang, Chi-Chih. et al. Single cell-resolution western blotting. Nature Protocols 11(8):1508-1530 (2016).
Kawata, Satoshi, et al., Finer Features for Functional Microdevices. Nature 412(6848):697-698 (2001).
Kc, Pawan, et al., Development and Comparison of Two Immunodisaggregation Based Bioassays for Cell Secretome Analysis. Theranostics 8(2):328-340 (2018).
Kim, Ju Hyeon, et al., Droplet Microfluidics for Producing Functional Microparticles. Langmuir 30(6):1473-1488 (2014).
Kim, Shin-Hyun, et al., Amphiphilic crescent-moon-shaped microparticles formed by selective adsorption of colloids. Journal of the American Chemical Society 133(14):5516-5524 (2011).
Klein, Allon M, et al., Droplet Barcoding for Single-cell Transcriptomics Applied to Embryonic Stem Cells. Cell 161(5):1187-1201 (2015).
Komnatnyy, Vitaly V., Bead-based screening in chemical biology and drug discovery. Chemical Communications 54(50):6759-6771 (2018).
Koyanagi, Keisuke, et al., Sol-Gel Coexisting Phase of Polymer Microgels Triggers Spontaneous Buckling. Langmuir 35(6):2283-2288 (2019).
Liu, Qian, et al., Self-orienting hydrogel micro-buckets as novel cell carriers. Angewandte Chemie 131(2):557-561 (2019).
Long, M Scott, et al., Dynamic microcompartmentation in synthetic cells. Proceedings of the National Academy of Sciences of the United States of America 102(17):5920-5925 (2005).
Ma, Shaohua, et al., Fabrication of microgel particles with complex shape via selective polymerization of aqueous two-phase systems. Small 8(15):2356-2360 (2012).
Macosko, Evan Z et al. Highly Parallel Genome-wide Expression Profiling of Individual Cells Using Nanoliter Droplets. Cell 161(5):1202-1214 (2015).
Mazutis et al., Single-cell analysis and sorting using droplet-based microfluidics, Nat. Protoc., 8(5):870-891, 2013.
Min, Nam Gi, et al., Microfluidic Production of Uniform Microcarriers with Multicompartments through Phase Separation in Emulsion Drops. Chemistry of Materials 28(5):1430-1438 (2016).
Mitra, R D, et al., In Situ Localized Amplification and Contact Replication of Many Individual DNA Molecules. Nucleic Acids Research 27(24):1-6 (1999).
Munoz et al.: Advances in the production and handling of encoded microparticles. Lab Chip. 14:2212 (2014).
Na, Xiang-Ming, et al., Biodegradable Microcapsules Prepared by Self-Healing of Porous Microspheres. ACS Macro Letters 1(6):697-700 (2012).
Novak et al.: Single-Cell Multiplex Gene Detection and Sequencing with Microfluidically Generated Agarose Emulsions. Angewandte Chemie International Edition. 50(2):390-395 (2011).
Novak, Richard, et al., Single-Cell Multiplex Gene Detection and Sequencing with Microfluidically Generated Agarose Emulsions. Angewandte Chemie 50(2): 390-395 (2011).
Nunes, Janine K et al. Fabricating Shaped Microfibers With Inertial Microfluidics. Advanced materials vol. 26,22: pp. 3712-3717 (2014).
Ozawa, Tatsuhiko, et al., Amplification and analysis of cDNA generated from a single cell by 5'-RACE: application to isolation of antibody heavy and light chain variable gene sequences from single B cells. BioTechniques 40(4):469-478 (2006).
Park, Wook, et al., Free-Floating Amphiphilic Picoliter Droplet Carriers for Multiplexed Liquid Loading in a Microfluidic Channel. Microfluidic Nanofluid 13(3):511-518 (2012).
Paulsen, Kevin et al. Optofluidic Fabrication for 3D-Shaped Particles. Nature Communications vol. 6:6976, pp. 1-9 (2015).
Peng, Feifei, et al., A droplet-based microfluidics route to temperature-responsive colloidal molecules. The Journal of Physical Chemistry 123(43):9260-9271 (2019).
Peterson et al.: Supplementary Information for: Multiplexed Quantification of Proteins and Transcripts in Single Cells. Nature Biotechnology. 35(10):936-939 (2017).

(56) References Cited

OTHER PUBLICATIONS

Plesa, Calin, et al., Multiplexed Gene Synthesis in Emulsions for Exploring Protein Functional Landscapes. Science 359(6373):343-347 (2018).
Price, Alexander K., et al., hvSABR: Photochemical Dose-Response Bead Screening in Droplets. Analytical Chemistry 88(5):2904-2911 (2016).
Sacanna, S., et al., Lock and key colloids. Nature 464(7288):575-578 (2010).
Schmidt, John J, et al., Hydrogels Used for Cell-Based Drug Delivery. Journal of Biomedical Materials Research Part A 87(4):1113-1122 (2008).
Shah, Rhutesh K., et al., Janus Supraparticles by Induced Phase Separation of Nanoparticles in Droplets. Advanced Materials 21(19):1949-1953 (2009).
Sheikhi, Amir, et al., Microengineered Emulsion-to-Powder Technology for the High-Fidelity Preservation of Molecular, Colloidal, and Bulk Properties of Hydrogel Suspensions. ACS Applied Polymer Materials 1(8):1935-1941 (2019).
Shi, Guixin, et al., Isolation of rare tumor cells from blood cells with buoyant immuno-microbubbles. PLoS One 8(3):e58017 (2013).
Snyder, Steven M., et al., Phase compositions, viscosities, and densities for aqueous two-phase systems composed of polyethylene glycol and various salts at 25 .degree.C. Journal of Chemical & Engineering Data 37(2):268-274 (1992).
Son, Kyung Jin, et al., Microfluidic Compartments with Sensing Microbeads for Dynamic Monitoring of Cytokine and Exosome Release from Single Cells. Analyst 141:679-688 (2016).
Tan, Wei-Heong, et al., Monodisperse Alginate Hydrogel Microbeads for Cell Encapsulation. Advanced Materials 19(18):2696-2701 (2007).
Tees, D.F., et al., A microcantilever device to assess the effect of force on the lifetime of selectin-carbohydrate bonds. Biophysical Journal 80(2):668-682 (2001).
Thangawng, Abel L et al. A Simple Sheath-flow Microfluidic Device for Micro/nanomanufacturing: Fabrication of Hydrodynamically Shaped Polymer Fibers. Lab on a Chip vol. 9,21: pp. 3126-3130 (2009).
Tseng, Derek, et al., Lensfree microscopy on a cellphone. Lab on a Chip 10(14):1787-1792 (2010).
Uspal, William E et al. Engineering Particle Trajectories in Microfluidic Flows Using Particle Shape. Nature Communications vol. 4: 2666, pp. 1-9 (2013).
Van Zee, Mark, et al. High-throughput selection of microalgae based on biomass accumulation rates in production environments using PicoShell Particles. bioRxiv (2021) (preprint published online Feb. 4, 2021).
Vis, Mark, et al., Donnan Potentials in Aqueous Phase-Separated Polymer Mixtures. Langmuir 30(20):5755-5762 (2014).
Wan, Jiandi, et al., Microfluidic-Based Synthesis of Hydrogel Particles for Cell Microencapsulation and Cell-Based Drug Delivery. Polymers 4(2):1084-1108 (2012).
Wang, Baoguo, et al., Fabrication of Monodisperse Toroidal Particles by Polymer Solidification in Microfluidics. Chemphyschem 10(4):641-645 (2009).
Wang, Jianmei, et al., Droplet Microfluidics for the Production of Microparticles and Nanoparticles. Micromachines 8(22):1-23 (2017).
Wang, Wei, et al., Hole-shell microparticles from controllably evolved double emulsions. Angewandte Chemie 52(31):8084-8087 (2013).
Wong, Ada Hang-Heng, et al., Drug screening of cancer cell lines and human primary tumors using droplet microfluidics. Scientific Reports 7(1):9109 (2017).
Wu, Chueh-Yu, et al. Monodisperse drops templated by 3D-structured microparticles. Science Advances 6.45:eabb9023 (2020).
Wu, Chueh-Yu et al. Rapid Software-Based Design and Optical Transient Liquid Molding of Microparticles. Advanced Materials vol. 27,48: 7970-7978 (2015).
Wu, Jie, et al., Recent Studies of Pickering Emulsions: Particles Make the Difference. Small 12(34):4633-4648 (2016).
Xu, Liyi, et al., Virtual Microfluidics for Digital Quantification and Single-cell Sequencing. Nature Methods 13(9):759-762 (2016).
Yanagisawa, Miho, et al., Multiple patterns of polymer gels in microspheres due to the interplay among phase separation, wetting, and gelation. Proceedings of the National Academy of Sciences of the United States of America 111(45):15894-15899 (2014).
Yeredla, Nitish, et al., Aqueous Two Phase System Assisted Self-Assembled PLGA Microparticles. Scientific Reports 6:1-8 (2016).
Yin, Weisi, et al., Encapsulation and Sustained Release From Biodegradable Microcapsules Made by Emulsification/freeze Drying and Spray/freeze Drying. 336(1):155-161 (2009).
Yuan, Hao, et al., Phase-Separation-Induced Formation of Janus Droplets Based on Aqueous Two-Phase Systems. Macromolecular Chemistry and Physics 218(2):1-8 (2016).
Zhang et al.: Synthesis of shape-controlled particles based on synergistic effect of geometry confinement, double emulsion template, and polymeriation quenching. Microfluid Nanoflued. 12:33-39 (2012).
Zhang, Hong, et al., Microfluidic Production of Biopolymer Microcapsules with Controlled Morphology. Journal of the American Chemical Society 128(37):12205-12210 (2006).
Zhang, Xunan, et al., Hierarchical drug release of pH-sensitive liposomes encapsulating aqueous two phase system. European Journal of Pharmaceutics and Biopharmaceutics 127:177-182 (2018).
Zilionis et al., Single-cell barcoding and sequencing using droplet microfluidics. Nat Protoc. 12(1):44-73 (2017).
Lee, Soah et al. Effects of the poly (ethylene glycol) hydrogel crosslinking mechanism on protein release. Biomaterials Science 4(3):405-411 (2016).
Mazutis, Linas, et al., Single-cell Analysis and Sorting Using Droplet-based Microfluidics. Nature protocols 8(5):870-891 (2013).
Pregibon, D.C.: Enabling Technologies for Multiplexed Biomolecule Analysis and Cell Sorting. Massachusetts Institute of Technology. Department of Chemical Engineering. 1-122 (May 23, 2008).
Dressman, Devin. et al. Transforming single DNA molecules into fluorescent magnetic particles for detection and enumeration of genetic variations. Proceedings of the National Academy of Sciences 100(15):8817-8822 (2003).
EP22788841.9 European Exam Report dated Sep. 11, 2025.
EP24200492.7 First Examination Report.

* cited by examiner

| | 20X Objective | | | | | 10X Objective | | | | |
|---|---|---|---|---|---|---|---|---|---|---|
| | Setting 1 | Setting 2 | Setting 3 | Setting 4 | Setting 5 | Setting 6 | Setting 7 | Setting 8 | Setting 9 | Setting 10 |
| Power (mW) | 2.701 | 4.755 | 8.588 | 11.73 | 15.96 | 5.631 | 9.527 | 13.58 | 18.44 | 34.36 |
| Intensity (mW/cm²) | 203.79 | 358.77 | 647.98 | 885.04 | 1204.20 | 86.04 | 145.56 | 207.49 | 281.74 | 524.98 |

|  | 20X Objective | | | | 10X Objective | | |
| --- | --- | --- | --- | --- | --- | --- | --- |
|  | Setting 1 | Setting 2 | Setting 3 | Setting 4 | Setting 5 | Setting 6 | Setting 7 |
| Power (mW) | 0.51 | 1.37 | 2.00 | 4.11 | 0.45 | 1.17 | 6.95 |
| Intensity (mW/cm$^2$) | 38.48 | 103.37 | 150.90 | 310.10 | 6.88 | 17.88 | 106.19 |

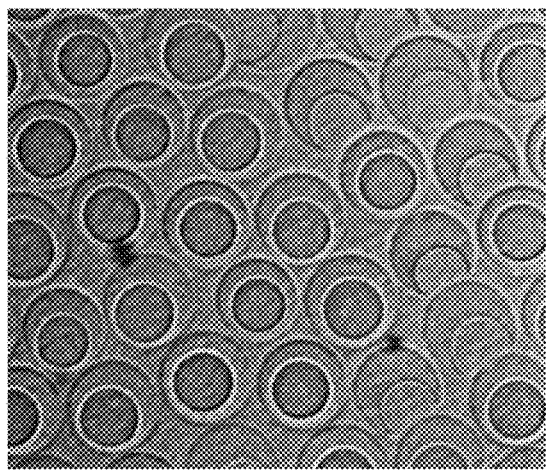 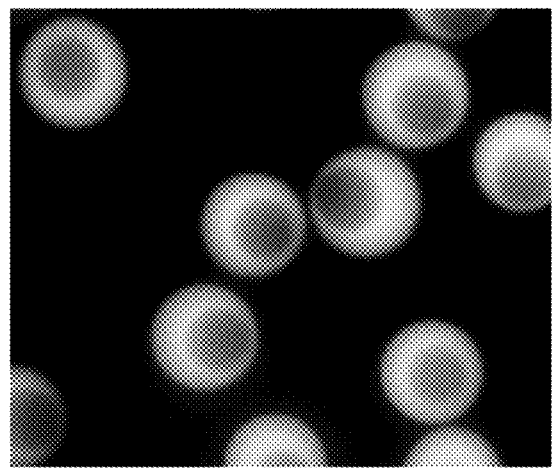
FIG. 3A                               FIG. 3B

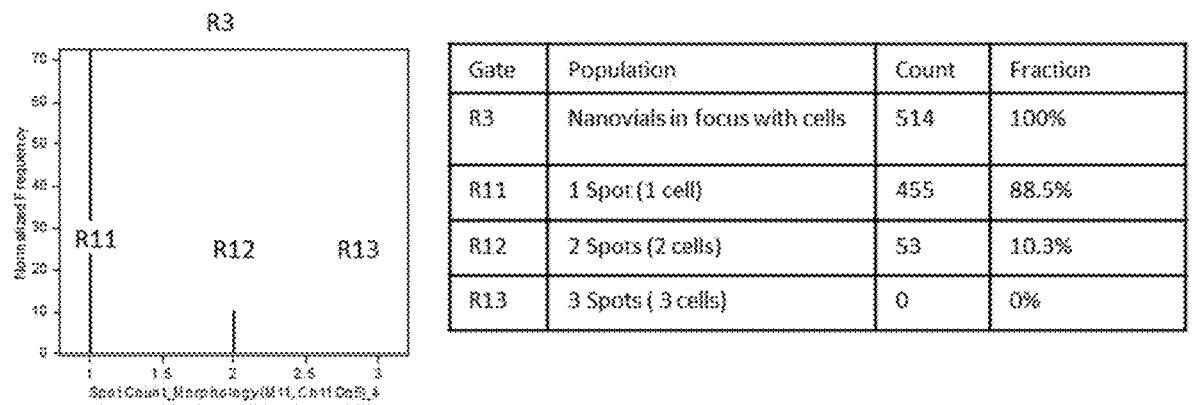
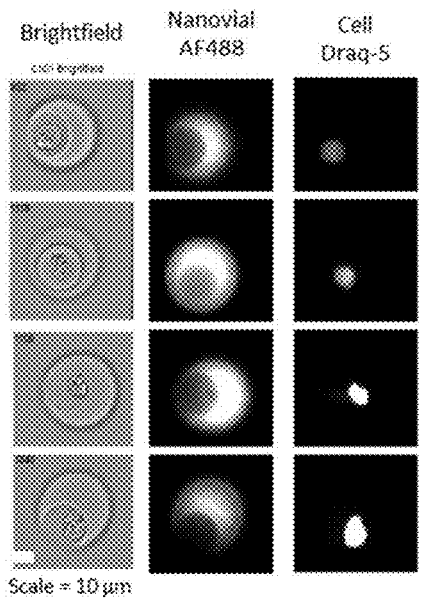
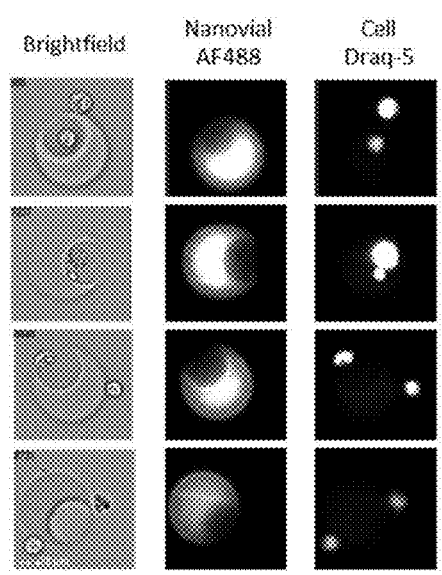
FIG. 20A

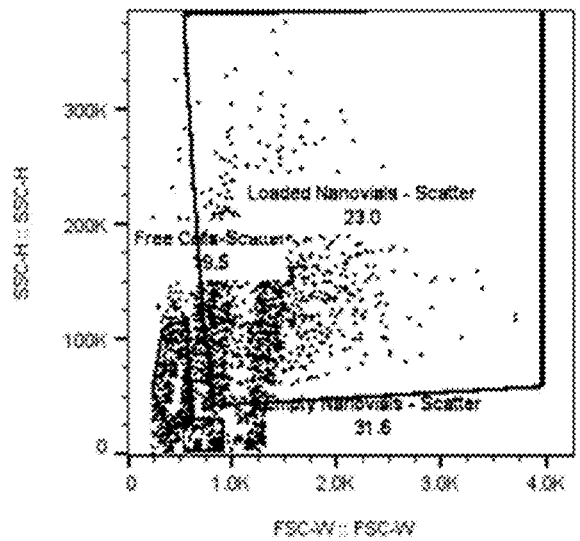
FIG. 26A
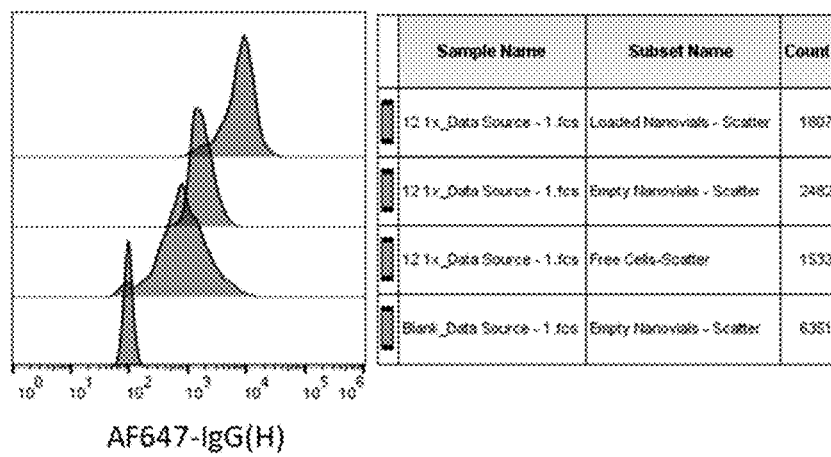
FIG. 26B
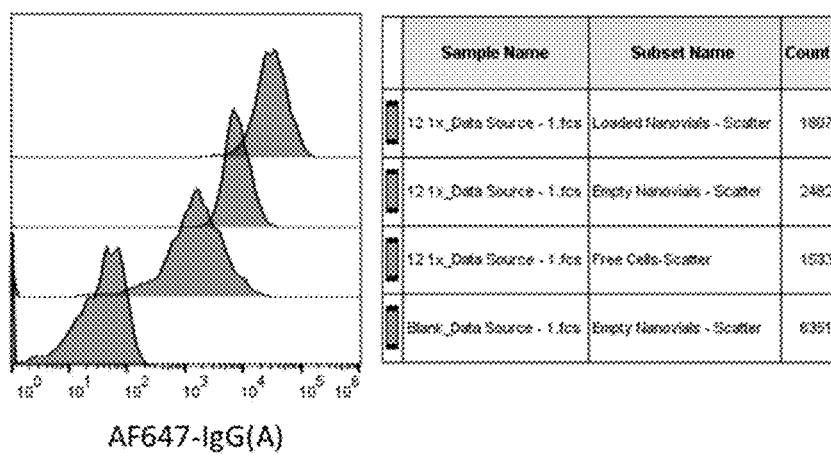

35 Micron Nanovials Injected in Chromium Chip G

60 Micron Nanovials Injected in Chromium Chip G

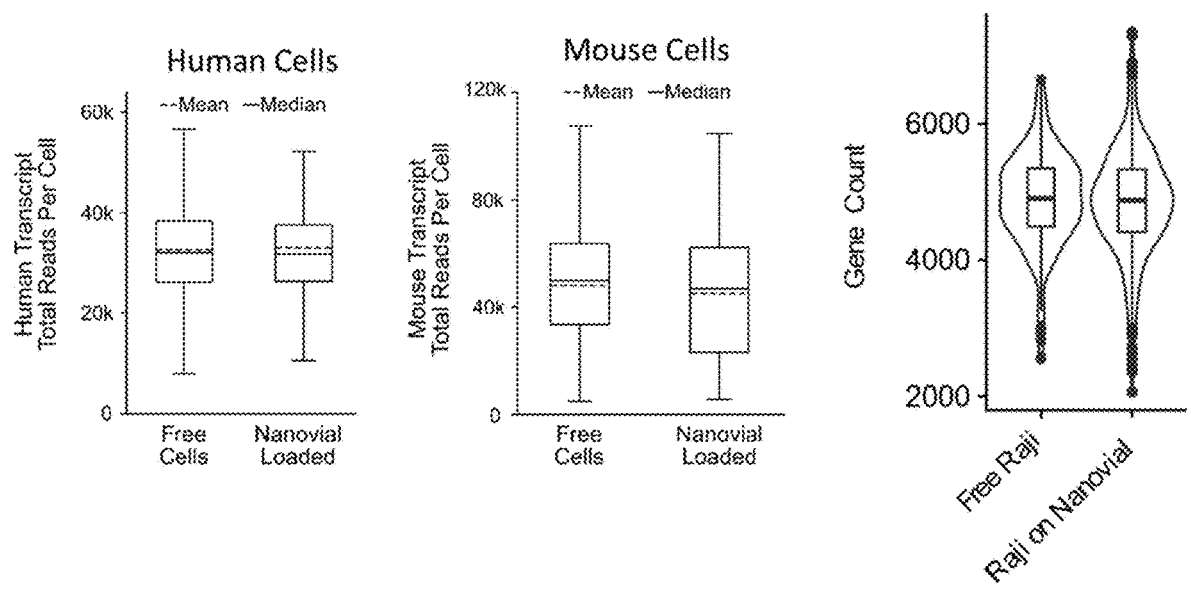
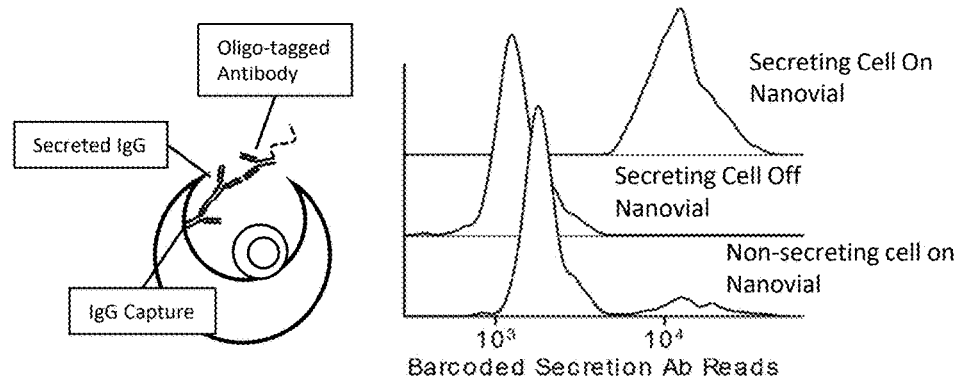
FIG. 29B

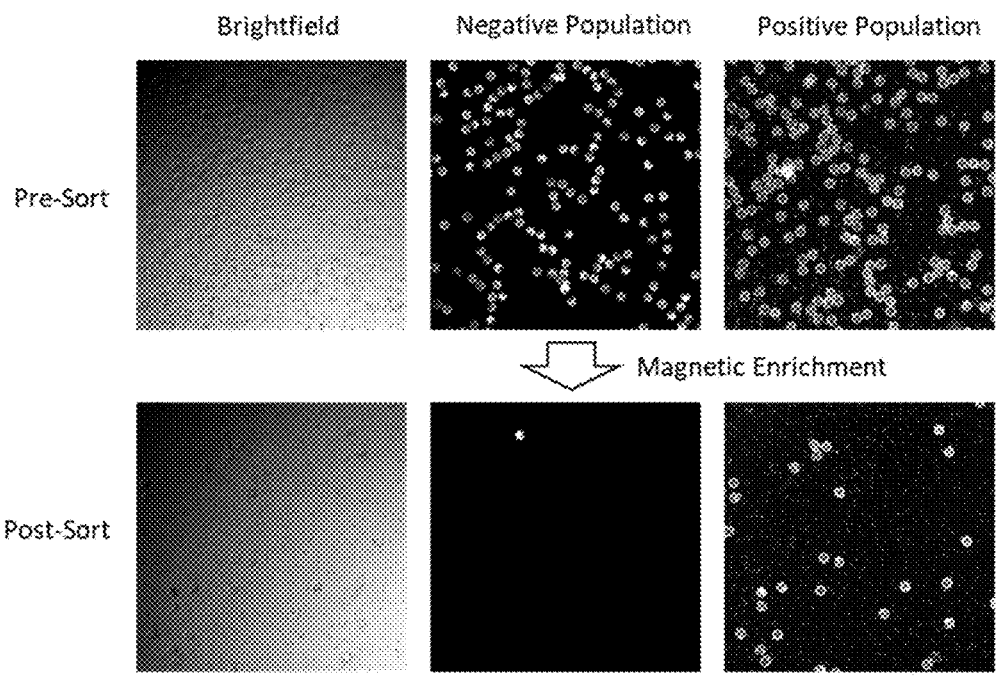
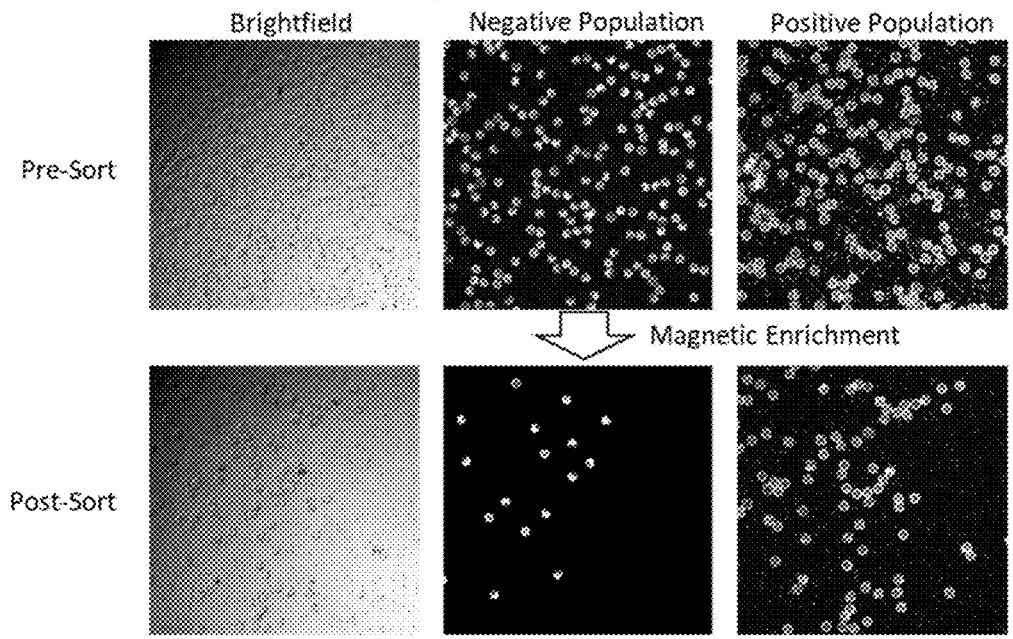
FIG. 31

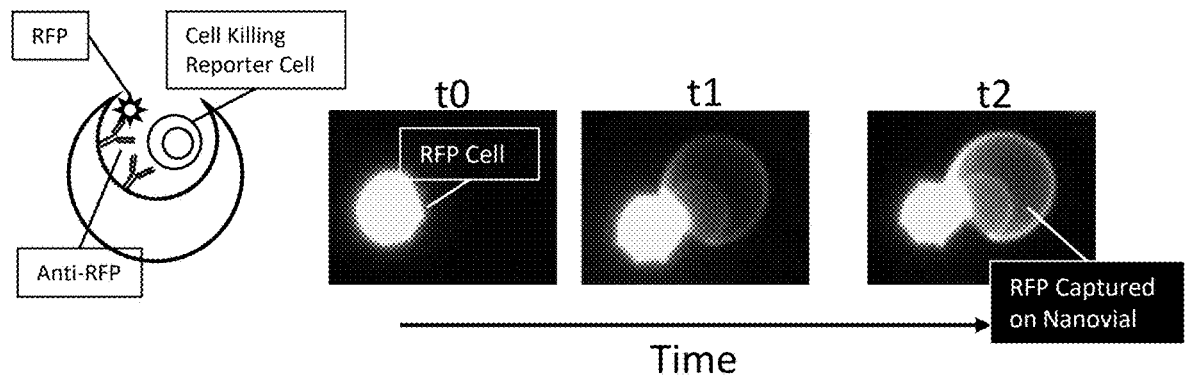
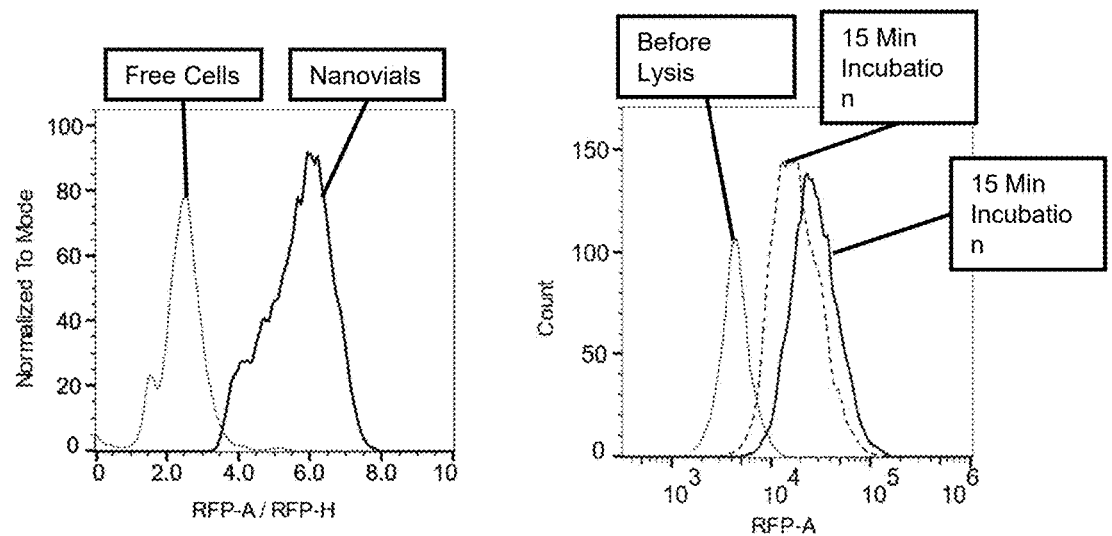
FIG. 34

NANOSCALE REACTION CHAMBERS AND METHODS OF USING THE SAME

CROSS-REFERENCE

This application is a continuation of U.S. patent application Ser. No. 18/555,450, filed Oct. 13, 2023, which is a U.S. National Phase of International Application No. PCT/US2022/024589, filed Apr. 13, 2022, which claims the benefit of U.S. Provisional Patent Application No. 63/174,847, filed on Apr. 14, 2021, the entirety of which is hereby incorporated by reference herein.

BACKGROUND

Current standard assay formats probe cell populations and gather data. During the processing of probing and gathering data, for example, going between assay and or instrument, cell-specific information may be lost due to the pooling of cells in between steps. Therefore, there is a need of an assay platform that is capable of probing and gathering data of cell populations yet retaining cell-specific information that may be associated with the gathered data.

SUMMARY

There is an unmet need for assays that can link functional single-cell based assay information with genomic, transcriptomic, and/or proteomic single-cell based assay information. This disclosure meets this unmet need by providing nanoscale reaction chambers (e.g., nanovials) in which cell-specific assays are conducted while maintaining cell-specific information throughout the course of the assay. The nanovial reaction chambers of the present disclosure are unique in that the resulting outcome of the assay (e.g., functional assay) performed in the nanovial may, after completion of data analysis, be correlated back to genomic, transcriptomic, and/or proteomic analysis of the single-cellular constituents of the assay, thereby providing a highly targeted multidimensional analysis.

In an aspect, a method of identifying an antibody or fragment thereof that binds to an antigen of interest is provided, the method comprising (e.g., performing one or more of the following): (a) providing or obtaining a nanovial comprising a cavity formed therein and an affinity agent immobilized thereto; (b) loading an antibody-producing cell into the cavity of the nanovial; (c) incubating the nanovial such that one or more antibody or fragment thereof is secreted from the antibody-producing cell and binds to the affinity agent; (d) adding a detection agent to the cavity of the nanovial such that the detection agent binds to the one or more antibody or fragment thereof; (e) detecting one or more signals related to binding of the detection agent to the one or more antibody or fragment thereof; (f) performing a sequencing assay on nucleic acids derived from the antibody-producing cell, thereby generating a sequence of the one or more antibody or fragment thereof; (g) associating the sequence of the one or more antibody or fragment thereof with the one or more signals related to the binding of the detection agent to the one or more antibody or fragment thereof; and (h) identifying the one or more antibody or fragment thereof that binds to the antigen of interest based on the associating of (g). In some cases, the method further comprises, prior to (f), sorting the nanovial based on the one or more signals related to binding of the detection agent to the antibody. In some cases, the cavity of the nanovial further comprises one or more cell capture agents immobilized thereto. In some cases, the one or more cell capture agents comprises an antibody or fragment thereof that binds to a protein expressed on a surface of the antibody-producing cell. In some cases, the one or more cell capture agents binds to a label present on a surface of the antibody-producing cell. In some cases, the label is streptavidin or biotin. In some cases, the one or more cell capture agents is an antigen to which the antibody-producing cell can bind. In some cases, the affinity agent is an antibody capture moiety. In some cases, the antibody capture moiety is selected from the group consisting of: an anti-IgG antibody or fragment thereof, an anti-Fc antibody or fragment thereof, Protein A, and Protein G. In some cases, the affinity agent is the antigen of interest. In some cases, the affinity agent is an antigen-presenting cell expressing the antigen of interest on a surface thereof. In some cases, the detection agent is the antigen of interest. In some cases, the detection agent is an antibody or fragment thereof. In some cases, the detection agent is directly or indirectly labeled with a detectable label. In some cases, the detectable label is selected from the group consisting of a fluorescent label, a protein affinity tag, an oligonucleotide tag, and a magnetic particle. In some cases, the detectable label is a fluorescent label. In some cases, the detecting of (e) comprises determining an amount of detection agent bound to the one or more antibody or fragment thereof. In some cases, the amount of detection agent bound to the one or more antibody or fragment thereof corresponds to a level of fluorescence. In some cases, the method further comprises, prior to (f), sorting the nanovial based on a level of fluorescence above a background level. In some cases, the sorting comprises performing a flow-based sorting method. In some cases, the flow-based sorting method is fluorescence-activated cell sorting (FACS). In some cases, the detectable label is an oligonucleotide tag. In some cases, the method further comprises sequencing the oligonucleotide tag. In some cases, the detecting of (e) comprises counting the number of oligonucleotide tags bound to the one or more antibody or fragment thereof. In some cases, the method further comprises, prior to (f), lysing the antibody-producing cell. In some cases, the method further comprises, after the lysing, reverse transcribing mRNA released from the antibody-producing cell to generate cDNA. In some cases, the method further comprises sequencing the cDNA. In some cases, the sequencing assay comprises single cell RNA sequencing. In some cases, the method further comprises, prior to (c), encapsulating the nanovial within a droplet. In some cases, the cavity of the nanovial comprises an opening to the surface of the nanovial. In some cases, the method further comprises, prior to (c), adding one or more blocking particles to block or reduce a size of the opening. In some cases, the method further comprises, prior to (d), washing the nanovial. In some cases, the method is configured to identify one or more antibody or fragment thereof having a desired dissociation constant ($K_D$) for the antigen of interest. In some cases, the one or more antibody or fragment thereof has a desired $K_D$ for the antigen of interest of less than about 1 µM, less than about 100 nM, less than about 10 nM, or less than about 1 nM. In some cases, the method further comprises adding the detection agent to a plurality of nanovials at one or more different concentrations. In some cases, the one or more different concentrations are within 1 order of magnitude of the desired $K_D$. In some cases, the method is configured to identify one or more antibody or fragment thereof having a desired specificity for the antigen of interest. In some cases, the method further comprises adding a plurality of different detection agents to a plurality of nanovials, wherein in at least one of the different detection agents have a detectable label. In some cases, the method further comprises identifying one or more antibody or fragment thereof that specifically binds to one of the different detection agents based on a measurement of the detectable label. In some cases, the detection agent is the antigen of interest.

In another aspect, a method of identifying one or more antibody or fragment thereof that modulates a signaling pathway of interest is provided, the method comprising (e.g., performing one or more of the following): (a) providing or obtaining a nanovial comprising a cavity formed therein; (b) loading an antibody-producing cell and an antigen-producing cell into the cavity of the nanovial; (c) incubating the nanovial such that one or more antibody or fragment thereof is secreted from the antibody-producing cell and modulates the signaling pathway of interest in the antigen-producing cell; (d) detecting one or more signals related to the modulation of the signaling pathway of interest; (e) performing a sequencing assay on nucleic acids derived from the antibody-producing cell, thereby generating a sequence of the one or more antibody or fragment thereof; (f) associating the sequence of the one or more antibody or fragment thereof with the one or more signals related to the modulation of the signaling pathway of interest; and (g) identifying the one or more antibody or fragment thereof that modulates the signaling pathway of interest based on the associating of (f). In some cases, the method further comprises, prior to (e), sorting the nanovial based on the one or more signals related to the modulation of the signaling pathway of interest. In some cases, the modulation of the signaling pathway of interest comprises activation of the signaling pathway of interest. In some cases, the modulation of the signaling pathway of interest comprises inhibition of the signaling pathway of interest. In some cases, the one or more antibody or fragment thereof binds to an antigen on the surface of the antigen-producing cell, thereby modulating the signaling pathway of interest. In some cases, the one or more antibody or fragment thereof interferes with binding of a ligand to an antigen on the surface of the antigen-producing cell, thereby modulating the signaling pathway of interest. In some cases, the cavity of the nanovial further comprises one or more cell capture agents immobilized thereto. In some cases, the one or more cell capture agents comprises an antibody or fragment thereof that binds to a protein expressed on a surface of the antibody-producing cell, the antigen-producing cell, or both. In some cases, the one or more cell capture agents binds to a label present on a surface of the antibody-producing cell, the antigen-producing cell, or both. In some cases, the one or more cell capture agents is an antigen to which the antibody-producing cell, the antigen-producing cell, or both can bind. In some cases, the antigen-producing cell is engineered to express one or more detectable labels upon modulation of the signaling pathway of interest. In some cases, the one or more detectable labels comprises a fluorescent reporter protein. In some cases, the detecting of (d) comprises detecting a level of fluorescence in the nanovial, wherein the level of fluorescence corresponds to modulation of the signaling pathway of interest. In some cases, the method further comprises, prior to (e), sorting the nanovial based on a level of fluorescence above a background level. In some cases, the sorting comprises performing a flow-based sorting method. In some cases, the flow-based sorting method is fluorescence-activated cell sorting (FACS). In some cases, the detecting of (d) comprises detecting a change in one or more mRNA levels in the antigen-producing cell. In some cases, the detecting comprises performing single cell RNA sequencing on nucleic acids derived from the antigen-producing cell. In some cases, the associating of (f) comprises linking mRNA levels in the antigen-producing cell to nucleic acid sequence information from the antibody-producing cell based on a shared oligonucleotide barcode. In some cases, the shared oligonucleotide barcode comprises one or more unique oligonucleotide tags associated with the nanovial. In some cases, the method further comprises, prior to (e), lysing the antibody-producing cell and the antigen-producing cell. In some cases, the method further comprises, after the lysing, reverse transcribing mRNA released from the antibody-producing cell to generate cDNA. In some cases, the method further comprises sequencing the cDNA. In some cases, the sequencing assay comprises single cell RNA sequencing. In some cases, the method further comprises, prior to (c), encapsulating the nanovial within a droplet. In some cases, the cavity of the nanovial comprises an opening to the surface of the nanovial. In some cases, the method further comprises, prior to (c), adding one or more blocking particles to block or reduce a size of the opening. In some cases, the method further comprises, prior to (d), washing the nanovial. In some cases, the antibody-producing cell is selected from the group consisting of: a B cell, a plasmablast, a plasma cell, a hybridoma, and an engineered producer cell. In some cases, the nanovial comprises a single antibody-producing cell. In some cases, the method further comprises, performing the method on a plurality of nanovials, each of the nanovials comprising an individual antibody-producing cell within the cavity of the nanovial. In some cases, the plurality of nanovials comprises at least 20,000 nanovials, at least 100,000 nanovials, or at least 500,000 nanovials. In some cases, each individual antibody-producing cell produces a different antibody. In some cases, the nanovial comprises a cross-linked hydrogel. In some cases, the cross-linked hydrogel is a PEG-based cross-linked hydrogel. In some cases, the cavity of the nanovial comprises an aqueous fluid disposed therein. In some cases, the nanovial is suspended in an oil phase. In some cases, the cavity of the nanovial has a volume from about 100 fL to about 10 nL. In some cases, the cavity of the nanovial has a length dimension from about 5 μm to about 250 μm.

In yet another aspect, a method of linking functional single cell information with genomic, transcriptomic, and/or proteomic single cell information is provided, the method comprising: (a) performing a functional assay on a single cell located in the cavity of a nanovial, wherein the functional assay is associated with a first barcode or a first label; (b) performing a genomic, transcriptomic, and/or proteomic assay on the single cell in the nanovial, wherein the genomic, transcriptomic, and/or proteomic assay is associated with a second barcode or a second label; and (c) linking functional single cell information with genomic, transcriptomic, and/or proteomic single cell information by associating the first barcode or first label with the second barcode or second label. In some cases, the method further comprises, prior to (b), sorting the nanovial based on a signal generated by the functional assay. In some cases, the functional assay is an antibody secretion screening assay. In some cases, the functional assay is an antibody affinity assay. In some cases, the functional assay is an antibody specificity assay. In some cases, the genomic assay is a single cell RNA sequencing assay. In some cases, the nanovial is associated with a unique oligonucleotide tag. In some cases, the unique oligonucleotide tag comprises a poly-dT capture region. In some cases, the first barcode or first label comprises an oligonucleotide with a poly-A-region.

In yet another aspect, a method of preventing biological agents from diffusing out of the cavity of a nanovial is provided, the method comprising: (a) providing or obtaining a nanovial comprising a cavity formed therein, the cavity comprising an opening to the surface of the nanovial, and one more biological agents disposed within the cavity; and (b) adding a blocking particle such that the blocking particle interacts with the opening of the cavity and substantially blocks or reduces a size of the opening of the cavity, thereby inhibiting the biological agents from diffusing out of the cavity when the nanovials are disposed in a fluid. In some cases, a maximum diameter of the blocking particle is larger than a diameter of the opening of the cavity. In some cases, the blocking particle is in contact with the opening of the cavity. In some cases, the blocking particle surrounds the opening of the cavity. In some cases, the blocking particle is sized to maintain greater than 50% of a volume of the cavity after (b). In some cases, the blocking particle has an average diameter from about 20 micrometers to about 50 micrometers. In some cases, the blocking particle is spherical or substantially spherical in shape. In some cases, the blocking particle comprises a polymer hydrogel. In some cases, the polymer hydrogel is polyethylene glycol (PEG). In some cases, the blocking particle is coated with one or more affinity agents. In some cases, the one or more affinity agents comprise an antibody capture moiety. In some cases, the antibody capture moiety is selected from the group consisting of: an anti-IgG antibody or a fragment thereof, an anti-Fc antibody or fragment thereof, Protein A, and Protein G. In some cases, the one or more affinity agents comprises an antigen. In some cases, the one or more affinity agents comprises a nucleic acid. In some cases, the nucleic acid is an oligonucleotide tag or oligonucleotide barcode. In some cases, the nanovial and/or blocking particle comprises a mesh-like structure. In some cases, the mesh-like structure comprises an average pore size. In some cases, the average pore size is sized such that biological agents having a desired size are retained within the cavity and biological agents having a size smaller than the desired size are capable of diffusing through the mesh-like structure. In some cases, the average pore size is sized to allow transport of fluids and reagents into the cavity of the nanovial. In some cases, the fluids and reagents are selected from the group consisting of: staining agents, surfactants, detergents, lysis buffers, drugs, cytokines, chemokines, media, conditioned media, and buffers. In some cases, (b) comprises adding a plurality of blocking particles such that the plurality of blocking particles interacts with the opening of the cavity and substantially block or reduce the size of the opening of the cavity. In some cases, each of the plurality of blocking particles has an average diameter from about 2 micrometers to about 20 micrometers. In some cases, each of the plurality of blocking particles has a density greater than that of saline at room temperature. In some cases, a number of blocking particles to nanovials is greater than 100:1. In some cases, the plurality of blocking particles is comprised of a polymer selected from the group consisting of: PEG, polystyrene, poly-methylmethacrylate, glass, and metal.

In another aspect, a method of enriching for nanovials comprising one or more cells, one or more beads, or both is provided, the method comprising: (a) providing or obtaining a mixture comprising: a plurality of nanovials, each comprising at least one cell, at least one bead, or both, disposed within a cavity of the nanovial; and (i) a plurality of free-floating cells, free-floating beads, or both; (ii) a plurality of empty nanovials; or (iii) both (i) and (ii); (b) suspending the mixture in a solution; (c) adjusting a density of the solution such that the plurality of nanovials comprising at least one cell, at least one bead, or both, disposed within a cavity of the nanovial separate from the plurality of free-floating cells, free-floating beads, or both of (i), the plurality of empty nanovials of (ii), or both (i) and (ii); and (d) collecting the plurality of nanovials comprising at least one cell, at least one bead, or both, disposed within a cavity of the nanovial. In some cases, (c) comprises adjusting the density of the solution such that the plurality of nanovials comprising at least one cell, at least one bead, or both, disposed within a cavity of the nanovial have a greater density than the density of the solution. In some cases, (c) comprises adjusting the density of the solution such that the plurality of nanovials comprising at least one cell, at least one bead, or both, disposed within a cavity of the nanovial have a lower density than the density of the solution. In some cases, the method further comprises, performing (a)-(d) one or more times to further enrich for the plurality of nanovials comprising at least one cell, at least one bead, or both, disposed within a cavity of the nanovial. In some cases, the density of the solution is different for each round of (a)-(d). In some cases, the method further comprises, prior to (a), removing the plurality of free-floating cells, free-floating beads, or both of (i) or the plurality of empty nanovials of (ii).

In yet another aspect, a method of identifying a drug or compound that modulates a signaling pathway in a cell of interest is provided, the method comprising (e.g., performing one or more of the following): (a) providing or obtaining a nanovial comprising a cavity formed therein, the cavity comprising (i) a drug or a compound; and (ii) a barcode or a label associated with the drug or the compound; (b) loading a cell of interest into the cavity of the nanovial; (c) exposing the nanovial to a stimulus to release the drug or the compound into a fluid volume within the nanovial cavity such that the drug or the compound interacts with the cell of interest; (d) incubating the nanovial such that the drug or the compound modulates the signaling pathway of interest in the cell of interest; (e) detecting one or more signals related to the modulation of the signaling pathway in the cell of interest; (f) associating the barcode or the label with the one or more signals related to the modulation of the signaling pathway of interest; and (g) identifying the drug or the compound that modulates the signaling pathway of interest based on the associating of (f). In some cases, the method further comprises, prior to (f), sorting the nanovial based on the one or more signals related to the modulation of the signaling pathway of interest. In some cases, the modulation of the signaling pathway of interest comprises activation of the signaling pathway of interest. In some cases, the modulation of the signaling pathway of interest comprises inhibition of the signaling pathway of interest. In some cases, the cavity of the nanovial further comprises one or more cell capture agents immobilized thereto. In some cases, the one or more cell capture agents comprises an antibody or fragment thereof that binds to a protein expressed on a surface of the cell of interest. In some cases, the one or more cell capture agents binds to a label present on a surface of the cell of interest. In some cases, the cell of interest is engineered to express one or more detectable labels upon modulation of the signaling pathway of interest. In some cases, the one or more detectable labels comprises a fluorescent reporter protein. In some cases, the detecting of (e) comprises detecting a level of fluorescence in the nanovial, wherein the level of fluorescence corresponds to modulation of the signaling pathway of interest. In some cases, the method further comprises, prior to (f), sorting the nanovial based on a level of fluorescence above a background level. In some cases, the sorting comprises performing a flow-based sorting method. In some cases, the flow-based sorting method is fluorescence-activated cell sorting (FACS). In some cases, the detecting of (e) comprises detecting a change in one or more mRNA levels in the cell of interest. In some cases, the detecting comprises performing single cell RNA sequencing on nucleic acids derived from the cell of interest. In some cases, the associating of (f) comprises linking mRNA levels in the cell of interest to the drug or the compound based on a shared oligonucleotide barcode. In some cases, the shared oligonucleotide barcode comprises one or more unique oligonucleotide sequences associated with the barcode associated with the drug or the compound. In some cases, the method further comprises, prior to (e), lysing the cell of interest. In some cases, the method further comprises, after the lysing, reverse transcribing mRNA released from the cell of interest to generate cDNA. In some cases, the method further comprises sequencing the cDNA. In some cases, the sequencing assay comprises single cell RNA sequencing. In some cases, the method further comprises, prior to (c), encapsulating the nanovial within a droplet.

In yet another aspect, a method of identifying a functional chimeric antigen receptor (CAR) or T cell receptor (TCR) to an antigen of interest is provided, the method comprising (e.g., performing one or more of the following): (a) providing or obtaining a nanovial comprising a cavity formed therein and an affinity agent immobilized thereto; (b) loading a CAR- or TCR-expressing cell into the cavity of the nanovial; (c) incubating the nanovial such that one or more cytokines is secreted from the CAR- or TCR-expressing cell and binds to the affinity agent; (d) adding a detection agent to the cavity of the nanovial such that the detection agent binds to the one or more cytokines; (e) detecting one or more signals related to binding of the detection agent to the one or more cytokines; (f) performing a sequencing assay on nucleic acids derived from the CAR- or TCR-expressing cell, thereby generating a sequence of the CAR or TCR; (g) associating the sequence of the CAR or TCR with the one or more signals related to the binding of the detection agent to the one or more cytokines; and (h) identifying the CAR- or TCR—that functionally interacts with the antigen of interest based on the associating of (g). In some cases, the method further comprises, prior to (f), sorting the nanovial based on the one or more signals related to binding of the detection agent to the one or more cytokines. In some cases, the cavity of the nanovial further comprises one or more cell capture agents immobilized thereto. In some cases, the one or more cell capture agents comprise an antibody or fragment thereof that binds to a protein expressed on a surface of the CAR- or TCR-expressing cell. In some cases, the one or more cell capture agents binds to a label present on a surface of the CAR- or TCR-expressing cell. In some cases, the label is streptavidin or biotin. In some cases, the one or more cell capture agents is an antigen or MHC-presented antigen to which the CAR- or TCR-expressing cell can bind. In some cases, the one or more cell capture agents is an antigen-presenting cell expressing the antigen of interest or presenting antigen in an MHC complex on the surface thereof. In some cases, the affinity agent is an antibody capture moiety. In some cases, the antibody capture moiety is one or more selected from the group consisting of: anti-IL2, anti-TNF-alpha, and anti-IFN-gamma. In some cases, the detection agent is a secondary antibody or antibody fragment specific to the one or more cytokines. In some cases, the detection agent is directly or indirectly labeled with a detectable label. In some cases, the detectable label is selected from the group consisting of a fluorescent label, an oligonucleotide tag, and a magnetic particle. In some cases, the detectable label is a fluorescent label. In some cases, the detecting of (e) comprises determining an amount of detection agent bound to the one or more cytokines. In some cases, the amount of detection agent bound to the one or more antibodies corresponds to a level of fluorescence. In some cases, the method further comprises, prior to (f), sorting the nanovial based on a level of fluorescence above a background level. In some cases, the sorting comprises performing a flow-based sorting method. In some cases, the flow-based sorting method is fluorescence-activated cell sorting (FACS). In some cases, the detectable label is an oligonucleotide tag. In some cases, the method further comprises sequencing the oligonucleotide tag. In some cases, the detecting of (e) comprises counting the number of oligonucleotide tags bound to the one or more cytokines. In some cases, the method further comprises, prior to (f), lysing the CAR- or TCR-expressing cell. In some cases, the method further comprises, after the lysing, reverse transcribing mRNA released from the CAR- or TCR-expressing cell to generate cDNA. In some cases, the method further comprises sequencing the cDNA. In some cases, the sequencing assay comprises single cell RNA sequencing. In some cases, the method further comprises, prior to (c), encapsulating the nanovial within a droplet. In some cases, the cavity of the nanovial comprises an opening to the surface of the nanovial. In some cases, the method further comprises, prior to (c), adding one or more blocking particles to block or reduce a size of the opening. In some cases, the method further comprises, prior to (d), washing the nanovial.

In another aspect, a nanovial is provided having a size, a shape, a surface chemistry, a density, or any combination thereof, configured to be compatible with and used in a plurality of different types of instruments designed to analyze particles and/or cells. In some cases, the plurality of different types of instruments designed to analyze particles and/or cells is selected from the group consisting of flow cytometers, fluorescence activated cell sorters, imaging flow cytometers, image activated cell sorters, Coulter counters, particle counters, microfluidic droplet generators, microwell arrays, microfluidic chips with microvalves, microfluidic SlipChips, optofluidic microdevices, microfluidic droplet generators, and microfluidic channels. In some cases, the size of the nanovial is less than about 100 µm in diameter and comprises capped reactive functional groups. In some cases, the size of the nanovial is less than about 60 µm in diameter. In some cases, the nanovial is configured to be flowed through glass capillaries, cuvettes, and/or microfluidic channels. In some cases, the nanovial is configured to be analyzed by optical, electrical, and/or magnetic excitation. In some cases, the size of the nanovial, surface chemistry, and or buoyancy is such that the nanovial can be rapidly flowed through an instrument without clogging or without substantial clogging. In some cases, the nanovial can be flowed through an instrument at greater than 10 cm/sec, or greater than 1 m/sec, without clogging or without substantial clogging. In some cases, the nanovial is configured to be flowed through a channel having a diameter of greater than 90 µm. In some cases, the nanovial is configured to be used with a first instrument designed to analyze particles and/or cells and subsequently a second instrument designed to analyze particles and/or cells. In some cases, the nanovial is configured to be sorted by a fluorescence activated cell sorter, image activated cell sorter, or optofluidic microdevice and subsequently introduced into a microfluidic droplet generator.

In yet another aspect, a method of detecting cell killing function of a chimeric antigen receptor (CAR)-T cell or T cell receptor (TCR)-expressing T cell in response to binding an antigen of interest is provided, the method comprising: (a) providing or obtaining a nanovial comprising a cavity formed therein and an affinity agent immobilized thereto; (b) loading a CAR- or TCR-expressing T cell into the cavity of the nanovial; (c) contacting the CAR- or TCR-expressing T cell with a target cell producing the antigen of interest; (d) capturing, on the nanovial, one or more cell killing markers released from the target cell upon lysis or permeabilization of the target cell; and (e) detecting the one or more cell killing markers directly or with a detection agent to obtain a cell killing signal. In some cases, the method further comprises: (f) performing a sequencing assay on nucleic acids derived from the CAR- or TCR-expressing cell, thereby generating a sequence of the CAR or TCR; (g) associating the sequence of the CAR or TCR with the one or more cell killing signals; and (h) identifying the CAR or TCR that functionally interacts with the antigen of interest based on the associating of (g). In some cases, the method further comprises, after (e), sorting the nanovial based on the one or more cell killing signals. In some cases, the cavity of the nanovial further comprises one or more cell capture agents immobilized thereto. In some cases, the one or more cell capture agents comprise an antibody or fragment thereof that binds to a protein expressed on a surface of the CAR- or TCR-expressing cell. In some cases, the one or more cell capture agents binds to a label present on a surface of the CAR- or TCR-expressing cell. In some cases, the label is streptavidin or biotin. In some cases, the one or more cell capture agents is an antigen or MHC-presented antigen to which the CAR- or TCR-expressing cell can bind. In some cases, the one or more cell capture agents is an antigen-presenting cell expressing the antigen of interest or presenting antigen in an MHC complex on the surface thereof. In some cases, the affinity agent is an antibody capture moiety. In some cases, the antibody capture moiety has affinity to a fluorescent protein. In some cases, the detection agent is an antibody or oligonucleotide with affinity to an intracellular biomolecule from the target cell. In some cases, the detection agent is directly or indirectly labeled with a detectable label. In some cases, the detectable label is selected from the group consisting of a fluorescent label, an oligonucleotide tag, and a magnetic particle. In some cases, the detectable label is a fluorescent label. In some cases, the detecting of (e) comprises determining an amount of detection agent bound to the one or more cell killing markers. In some cases, the amount of detection agent bound to the one or more cell killing markers corresponds to a level of fluorescence. In some cases, the method further comprises, following (e), sorting the nanovial based on a level of fluorescence above a background level. In some cases, the sorting comprises performing a flow-based sorting method. In some cases, the flow-based sorting method is fluorescence-activated cell sorting (FACS). In some cases, the detectable label is an oligonucleotide tag. In some cases, the method further comprises, sequencing the oligonucleotide tag. In some cases, the detecting of (e) comprises counting the number of oligonucleotide tags bound to the one or more cell killing markers. In some cases, the method further comprises following (e), lysing the CAR- or TCR-expressing cell. In some cases, the method further comprises, after the lysing, reverse transcribing mRNA released from the CAR- or TCR-expressing cell to generate cDNA. In some cases, the method further comprises sequencing the cDNA. In some cases, the sequencing assay comprises single-cell RNA sequencing. In some cases, the method further comprises, prior to (d), encapsulating the nanovial within a droplet. In some cases, the cavity of the nanovial comprises an opening to the surface of the nanovial. In some cases, the method further comprises, prior to (d), adding one or more blocking particles to block or reduce a size of the opening. In some cases, the method further comprises, prior to (e), washing the nanovial.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIGS. 3A and 3B depict biotinylated nanovials labeled with fluorescent streptavidin, according to various aspects of the disclosure.

FIGS. 20A-20D depict a non-limiting example of analysis of nanovials utilizing imaging flow cytometry, such as the ImageStreamX® MKII Imaging Flow Cytometer, according to various aspects of the disclosure.

FIGS. 26A and 26B depict a non-limiting example of IgG signal of cell loaded nanovials, free cells, and empty nanovials relative to blank nanovials after performing single-cell secretion assay, according to various aspects of the disclosure.

FIGS. 29A and 29B depict a non-limiting example of experimental data demonstrating the recovery of human and mouse transcripts of cells loaded on nanovials, comparison of transcripts and genes recovered for cells loaded on nanovials or in suspension, and recovery and linking of feature barcodes attached to nanovials by both streptavidin labeling and antibody labeling to single-cell transcripts using the 10× Chromium single cell sequencing platform, according to various aspects of the disclosure.

FIG. 31 depicts a non-limiting example of brightfield and fluorescence images of nanovials with captured IgG being selectively enriched through magnetic separation, according to various aspects of the disclosure.

FIG. 34 depicts a non-limiting example of experimental results of a cell killing assay, showing capture of red fluorescent protein (RFP) on nanovials from lysed cells and observation of captured RFP fluorescence on nanovials by flow cytometric analysis, according to various aspects of the disclosure.

DETAILED DESCRIPTION

Provided herein are methods and systems for linking functional single cell properties (e.g., secretions) with genomic, proteomic, and/or transcriptomic properties of cells, using nanovials as the carriers of information. Further provided herein are methods and systems for improving the specificity and/or sensitivity of assays performed in nanovials. Additionally provided herein are methods and systems for enriching nanovials, packaging and storing of nanovials. Additionally provided herein are integrated systems and software for nanovial analysis and sorting.

Methods

Figure 6A:
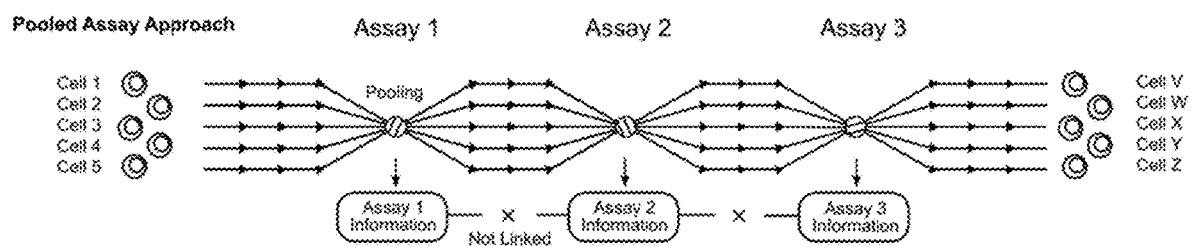
FIGS. 6A and 6B depict a schematic of linked assays using the nanovial platform in comparison to pooled assays.
Figure 6B:
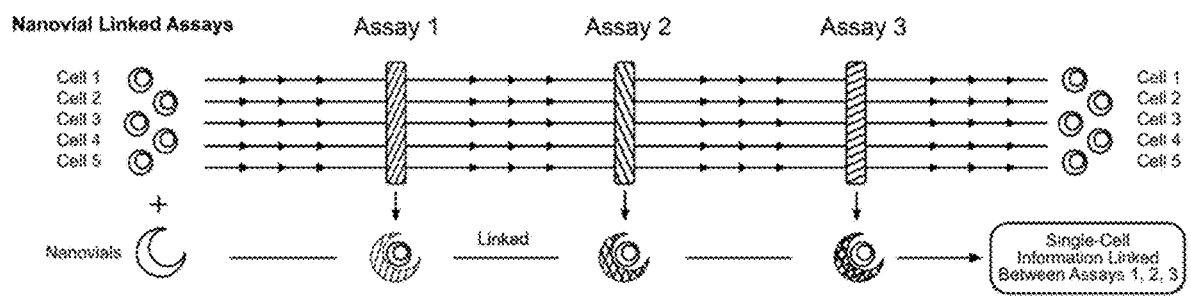
Figure 7A:
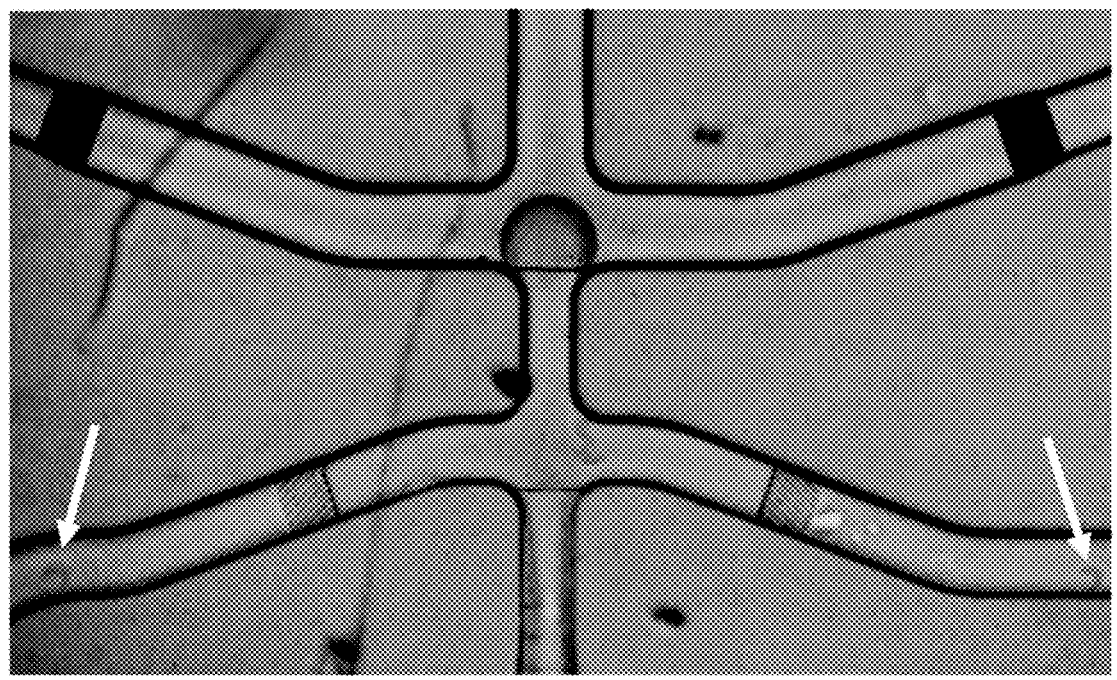
FIGS. 7A-7D depict 40-micron nanovials loaded in droplets for single-cell sequencing using 10× Genomics Chromium Next GEM chip G.
Figure 7B:
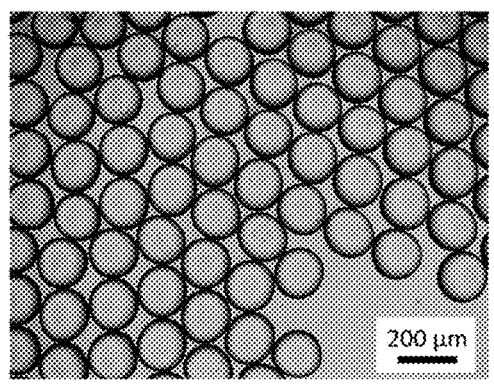
Figure 7C:
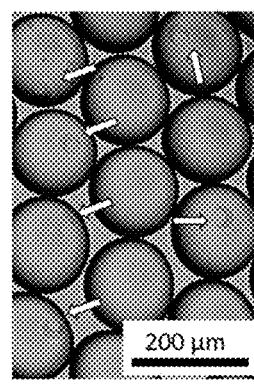
Figure 7D:
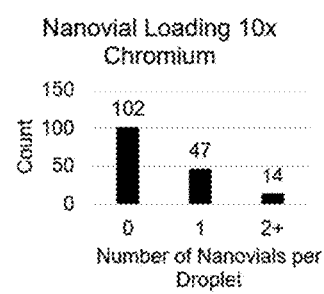

The disclosure herein provides methods of performing assays (e.g., single cell-based assays) in nanovials (e.g., in the cavity of nanovials). In some aspects, the disclosure provides methods for linking information, such as for linking functional information with transcriptomic, genomic, and/or proteomic single cell information. FIGS. 6A and 6B demonstrates differences between a method of performing a pooled assay (FIG. 6A), and a method of performing a nanovial linked assay (FIG. 6B). During a pooled assay (FIG. 6A), cell specific information may be lost due to the pooling of cells in between assays and/or when cell populations are transferred between instruments. Advantageously, using the nanovial system (e.g., as provided herein), information can be stored directly on the nanovials associated with the cell being probed and the information may be retained throughout multiple processes enabling direct linkage between information (e.g., linking functional information (e.g., secretion), and sequence (e.g., transcriptomic) information). As depicted in FIG. 6B, information obtained from first assay (Assay 1) may be linked with information obtained from second assay (Assay 2), which in turn may be linked with information obtained from a third assay (Assay 3). In a non-limiting example, a linked nanovial assay may comprise a screening assay to probe the e.g., affinity and/or specificity of secreted antibodies produced from a single cell of interest located in or on a nanovial (e.g., in the cavity of a nanovial). The resulting assay information (e.g., affinity, specificity, or any combination thereof) from the single-cell of interest may be linked to genomic, transcriptomic, and/or proteomic information of the single-cell of interest contained in the nanovial (e.g., such as by analyzing mRNA of the single-cell of interest to determine a unique sequence of secreted and highly functional antibodies).

In various aspects, the method comprises performing a first assay on a (e.g., single or individual) cell located in or on a nanovial (e.g., in the cavity of a nanovial) to generate first assay information. In some cases, the first assay is a functional cell-based assay as described herein (e.g., antibody secretion assay). The functional cell-based assay may comprise any functional cell-based assay, including any functional cell-based assay described herein. In some embodiments, the functional cell-based assay is an antibody secretion screening assay. In some embodiments, the functional cell-based assay is an antibody affinity assay. In some embodiments, the functional cell-based assay is an antibody specificity assay. In some embodiments, the functional cell-based assay is an (e.g., DNA) encoded library screening assay. In some embodiments, the functional cell-based assay is a T cell secretion phenotype assay. In some cases, the functional cell-based assay is associated with a first barcode or a first label. In various aspects, the method further comprises performing a second assay on the (e.g., single or individual) cell in or on the nanovial (e.g., within in the cavity of the nanovial) to generate second assay information. In some cases, the second assay may be cell surface marker staining, a viability assay, an intracellular staining assay, and/or a growth assay. The second assay may be a genomic, transcriptomic, and/or proteomic assay (e.g., single-cell sequencing). In some cases, the genomic assay may comprise a single cell RNA sequencing assay. The second assay may be associated with a second barcode or a second label. In various aspects, the method further comprises linking the functional single-cell information with genomic, transcriptomic, and/or proteomic single-cell information by associating the first barcode or first label with the second barcode or second label.

The nanovial may comprise various types of barcodes or labels to independently address and link information between different analysis modalities. Generally, the first barcode or first label (associated with the first assay, e.g., a functional cell-based assay) and the second barcode or second label (associated with the second assay, e.g., a genomic, transcriptomic, and/or proteomic assay) are distinguishable such that the first barcode or label can be distinguished from the second barcode or label. Examples of different types of barcodes or labels that can be used for the first barcode or label and the second barcode or label are provided throughout. In one embodiment, the first barcode or first label comprises an oligonucleotide with a poly-A-region.

Additionally, each nanovial may further comprise a unique nanovial-associated barcode or label such that each individual nanovial may be distinguished from other nanovials. Non-limiting examples of nanovial barcodes or labels that are suitable include: unique nucleic acid or oligonucleotide barcodes, unique peptide barcodes, optical barcodes (e.g., dyes, fluorophores), unique scatter signatures observable by, e.g., flow cytometry forward and side scatter, isotope or mass barcodes (e.g., readable by CyTOF or mass cytometry). In a non-limiting embodiment, the nanovial is associated with a unique oligonucleotide barcode, label, or tag. In some cases, the unique oligonucleotide barcode, label, or tag comprises a poly-dT capture region (e.g., for capturing a poly-A region, e.g., on the first barcode or first label and/or from mRNA released from cells).

Additionally or alternatively, nanovials may comprise unique shapes and/or sizes which can be recognized through image cytometry or image-activated cell sorting approaches. Nanovials may also be tagged or barcoded following imaging by using an optical source to fluorescently bleach or activate fluorophores embedded within the nanovial. Notably, in order to transfer and link information between two or more analysis modes, specific barcodes or labels of one type can be linked to specific barcodes or labels of another type. For example, nanovials with oligonucleotide barcodes comprising a first nucleotide sequence (e.g., GACTTCC) may, in addition, comprise a specific level of fluorophore intensity (e.g., AlexaFluor 488 with intensity 1000-fold above background). In the same example, another nanovial with oligonucleotide barcodes comprising a second distinguishable nucleotide sequence (GCTAACC) may, in addition, comprise a different level of fluorophore intensity (e.g., AlexaFluor 488 at 100-fold background intensity). Any combination of barcode or label types (e.g., as provided herein) can be used in the methods provided herein (e.g., to link information). In some embodiments, two or more barcodes or labels can be linked (e.g., 3, 4, 5, 6, 7, 8, 9, 10, or more barcodes or labels).

In another embodiment, the first assay information (e.g., functional single-cell based assay information) may be linked to the second assay information (e.g., genomic, transcriptomic, and/or proteomic single-cell based assay information) through the use of Index Sorting using fluorescence-activated cell sorting (FACS) or other single-cell analysis and dispensing technologies (e.g., using commercial instruments from Namocell, Nodexus, Nanocellect, etc.). In this embodiment, nanovials containing cells therein may be analyzed and sorted based on a fluorescent signal on the cell and/or nanovial that is associated with a secreted or released product from the cell. The sort may be performed based on a sort gate on various parameters (e.g., fluorescence intensity peak height, fluorescence intensity width, fluorescence intensity area, fluorescence color, scatter intensity peak height, scatter intensity width, scatter intensity area, and the like). In some cases, single nanovials within a sort gate may be sorted to separate wells of a plate (e.g., 96 well or 384 well plate) using a flow cytometer (e.g., BD FACS Aria II, III, Sony SH800, or other index sorting compatible FACS system). The sort-based information (e.g., fluorescence intensity associated with a nanovial) may be linked to a particular well in the plate that it was sorted to and can then be linked to downstream information obtained from subsequent genomic, transcriptomic, and/or proteomic assays.

In a non-limiting example, the second assay (e.g., genomic, transcriptomic, and/or proteomic assay) involves sequencing (e.g., nucleic acids present in the cell of interest). When an oligonucleotide barcode or label is used, the methods may further involve sequencing the oligonucleotide barcode or label. Any known sequencing technique may be suitable to use in the methods provided herein. For example, sequencing may involve Sanger sequencing, next-generation sequencing, third generation sequencing (e.g., long read sequencing), single-cell sequencing (e.g., single-cell mRNA sequencing), and the like.

In some embodiments, the methods further comprise, prior to the second assay (e.g., the genomic, transcriptomic, and/or proteomic assay), sorting the nanovial based on a signal generated by the first assay (e.g., a functional assay).

In a non-limiting embodiment, the nanovial is sorted using a FACS-based sorting technique or any other particle, cell, or droplet sorting technique.

In the above embodiments, data from a single nanovial/single-cell may be linked in a single data structure that includes these linked data sets as rows or entries linked to the same single nanovial or single-cell identifier.

Single-Cell Secretion Assays

Provided herein are single-cell secretion assays that can be used in the nanovial system. The nanovials can act as a substrate, in which, e.g., released products from a cell of interest are associated with the nanovial as part of the assay, in a similar manner to traditional workflows performed in multi-well plates. For example, in a typical workflow, a target cell, target molecule, or capture molecule may be immobilized on the nanovial surface. Then, a cell of interest may be adhered to the nanovial surface (including the target cell or molecule immobilized thereon). The cell of interest may secrete or release a biological product or molecule over an incubation time period that is evaluated with the nanovial assay. A readout signal of the assay (e.g., fluorescence, oligonucleotide encoded, magnetic, or any combination thereof) may then be obtained on or within the nanovial or on or within a target cell bound to the nanovial and correlated to the function of the biological product from the cell of interest. Wash steps may be performed between assay steps. A plurality of such nanovials with a number of cells of interest with different biological products can be analyzed and/or sorted with the platform based on functional information of the biological product.

In some embodiments, provided herein is a method for identifying an antibody or fragment thereof that binds to an antigen of interest. In some cases, the method comprises one or more of the following steps: (a) providing or obtaining a nanovial comprising a cavity formed therein and an affinity agent immobilized thereto; (b) loading an antibody-producing cell into the cavity of the nanovial; (c) incubating the nanovial such that one or more antibody or fragment thereof is secreted from the antibody-producing cell and binds to the affinity agent; (d) adding a detection agent to the cavity of the nanovial such that the detection agent binds to the one or more antibody or fragment thereof; (e) detecting one or more signals related to binding of the detection agent to the one or more antibody or fragment thereof; (f) performing a sequencing assay on nucleic acids derived from the antibody-producing cell, thereby generating a sequence of the one or more antibody or fragment thereof; (g) associating the sequence of the one or more antibody or fragment thereof with the one or more signals related to the binding of the detection agent to the one or more antibody or fragment thereof; and (h) identifying the one or more antibody, or fragment thereof that binds to the antigen of interest based on the associating of step (g). It should be understood that the steps provided above do not necessarily need to be performed in the exact order that they appear. The steps provided above may be performed in any order, and may be altered to meet the needs of the user. It should also be understood that not all steps provided above are required or need be performed by a single user. For example, in one embodiment, any of steps (a)-(e) may be performed by a first user, and any one of steps (f)-(h) may be performed by a second, different user. For example, the method may involve obtaining a nanovial after step (e) has been performed (e.g., by a different user) and performing steps (f)-(h).

In some embodiments, the methods providing or obtaining a nanovial comprising a cavity formed therein. The nanovial may be any nanovial described herein. In some cases, the nanovial is empty (e.g., does not include antibody-producing cells). In other cases, the nanovial comprises an antibody-producing cell (e.g., a single or individual cell). In some cases, the nanovial may comprise more than one antibody-producing cell (e.g., 2, 3, 4, 5, 6, 7, 8, 9, 10, or more cells).

In some cases, the cavity of the nanovial is coated with or has an affinity agent immobilized thereon. The affinity agent may be immobilized to the surface of the nanovial cavity and/or may be within the porous matrix of the nanovial. In some cases, the nanovial obtained or provided is not coated with affinity agent and the method involves coating the nanovial with the affinity agent.

In some embodiments, the affinity agent is an antibody capture moiety (e.g., for binding to and capturing antibodies secreted by the antibody-producing cell). In some cases, the antibody capture moiety is selected from the group consisting of an anti-Fc antibody or fragment thereof, Protein A, Protein G, and any combination thereof. In some cases, the antibody capture moiety is not specific for a particular type of antibody such that all or substantially all antibodies secreted by the antibody-producing cell may bind to the antibody capture moiety. In other embodiments, the affinity agent is the antigen of interest. In such cases, antibodies secreted from the antibody-producing cell that are capable of binding to the antigen of interest are captured on the nanovial. In another embodiment, the affinity agent is an antigen-presenting cell, wherein the antigen of interest is expressed or presented on the surface of the antigen-presenting cell. In such cases, antibodies secreted from the antibody-producing cell that are capable of binding to the antigen of interest are captured on the antigen-presenting cell (e.g., contained within the cavity of the nanovial).

In some embodiments, the method further comprises loading an antibody-producing cell into the cavity of the nanovial. In other embodiments, the method involves obtaining or providing a nanovial with the antibody-producing cell already loaded into the cavity. The antibody-producing cell can be any cell that produces antibodies. In some cases, the antibody-producing cell can be a B cell, a plasmablast, a plasma cell, a hybridoma, a genetically modified producer cell, or any combination thereof. In some cases, the cavity of the nanovial comprises one or more cell capture agents immobilized thereto. The one or more cell capture agents may be immobilized to the surface of the nanovial cavity and/or may be within the porous matrix of the nanovial. In some cases, the nanovial obtained or provided is not coated with the cell capture agent and the method involves coating the nanovial with the cell capturing agent.

In some embodiments, the one or more cell capture agents comprises an antibody or fragment thereof that binds to a protein expressed on a surface of the antibody-producing cell. In some embodiments, the one or more cell capture agents binds to a label present on a surface of the antibody-producing cell. For example, the cell capture agent may be biotin and the antibody-producing cell may be coated or labeled with streptavidin. In another non-limiting example, the cell capture agent may be streptavidin and the antibody-producing cell may be coated or labeled with biotin. In some embodiments, the one or more cell capture agents is an antigen to which the antibody-producing cell can bind (e.g., through the B-cell receptor). In some embodiments, the one or more cell capture agents comprise single-stranded DNA (ssDNA) and the antibody-producing cell may be coated or labeled with complementary ssDNA that hybridizes with the cell capture agent.

In various aspects, the methods further comprise incubating the nanovial such that one or more antibody or fragment thereof is secreted from the antibody-producing cell and binds to the affinity agent. Any suitable conditions for incubating the nanovial may be used, including any temperature, time, buffer, or media conditions, and the like. Generally, the incubating involves incubating under conditions such that the antibody-producing cell remains viable for a period of time sufficient to produce and secrete antibodies into the cavity of the nanovial. In some cases, prior to incubating, the nanovial may be encapsulated (e.g., in a droplet or emulsion), such that the contents of the nanovial cannot or substantially cannot diffuse out of the cavity of the nanovial. In other cases, one or more blocking particles may be added to block or reduce a size of the cavity opening of the nanovial (e.g., as described herein).

In various aspects, the methods further comprise adding a detection agent to the cavity of the nanovial such that the detection agent binds to the one or more antibody or fragment thereof. In some embodiments, the detection agent is the antigen of interest. In some embodiments, the detection agent is an antibody or fragment thereof. In some embodiments, the detection agent is directly or indirectly (e.g., using a secondary detection agent comprising a detectable label that binds to the primary detection agent) labeled with a detectable label. The detectable label may be selected from the group consisting of: a fluorescent label, a protein affinity tag, an oligonucleotide tag, a magnetic particle, and any combination thereof. In a particular aspect, the detectable label is a fluorescent label (e.g., fluorescent dye, fluorophore, etc.).

In various aspects, the methods further comprise detecting one or more signals related to binding of the detection agent to the one or more antibody or fragment thereof. In some cases, the detecting comprises determining an amount of detection agent bound to the one or more antibody or fragment thereof. In one aspect, the detection agent comprises a fluorescence label and the method comprises detecting a level of fluorescence, wherein the amount of detection agent bound to the one or more antibody or fragment thereof is correlated with the level of fluorescence. In another aspect, the detection agent comprises an oligonucleotide label. In this example, the method may further comprise sequencing the oligonucleotide label. In some cases, the detecting comprises counting the number of oligonucleotide tags bound to the one or more antibody or fragment thereof.

In some embodiments, the methods further comprise sorting the nanovial based on the one or more signals related to binding of the detection agent to the antibody. In some cases, the methods comprise sorting the nanovial based on a level of fluorescence (e.g., above a background level). The sorting may be any method of sorting typically used to sort particles, droplets, and/or cells based on a fluorescence signal. In a non-limiting example, the sorting is a flow-based sorting method (e.g., FACS). In some cases, when the detection agent includes a magnetic particle label, the samples are sorted using magnetic force or magnetic activated cell sorting (e.g., MACS).

In various aspects, the methods further comprise performing a sequencing assay on nucleic acids derived from the antibody-producing cell, thereby generating a sequence of the one or more antibody or fragment thereof. In some cases, the methods involve obtaining or having obtained a sorted nanovial or a plurality of sorted nanovials (e.g., after any of the above methods have been performed) and performing a sequencing assay on nucleic acids derived from the antibody-producing cell (e.g., as described herein). The methods may further comprise obtaining or having obtained data or a data output related to any of the above methods (e.g., secretion assay data) such that the data can be associated with the downstream sequencing data. Any known sequencing technique may be suitable to use in the methods provided herein. For example, sequencing may involve Sanger sequencing, next-generation sequencing, third generation sequencing (e.g., long read sequencing), single-cell sequencing (e.g., single-cell mRNA sequencing), and the like.

In one aspect, the method comprises, prior to sequencing, lysing the antibody-producing cell). In another aspect, the method comprises, prior to sequencing, obtaining or having obtained a lysate of an antibody-producing cell (e.g., after the secretion assay has been performed and the nanovial has been sorted based on one or more signals associated with the secretion assay). In some instances, the method further comprises reverse transcribing mRNA released from the antibody-producing cell to generate cDNA, and then sequencing the cDNA.

In various aspects, the methods may further involve washing the nanovial. Any suitable wash method may be used, including any suitable wash solution or buffer.

In some embodiments, the methods involve performing any of the above methods on a plurality of nanovials, each nanovial comprising an antibody-producing cell. In some instances, each nanovial comprises an antibody-producing cell (e.g., a single antibody-producing cell) that produces different antibodies. In such methods, a plurality of nanovials can be screened for antibodies that target the antigen of interest. The plurality of nanovials may include, without limitation, at least 20,000, at least 30,000, at least 40,000, at least 50,000, at least 60,000, at least 70,000, at least 80,000, at least 90,000, at least 100,000, or more nanovials.

In various aspects, the methods further comprise associating the sequence of the one or more antibody or fragment thereof with the one or more signals related to the binding of the detection agent to the one or more antibody or fragment thereof. The associating may involve associating one or more barcodes or labels associated with the first assay (e.g., secretion assay) with one or more barcodes or labels associated with the second assay (e.g., sequencing assay). The methods may further comprise identifying the one or more antibody or fragment thereof that binds to the antigen of interest based on the associating.

Antibody Affinity Assay

Figure 8:
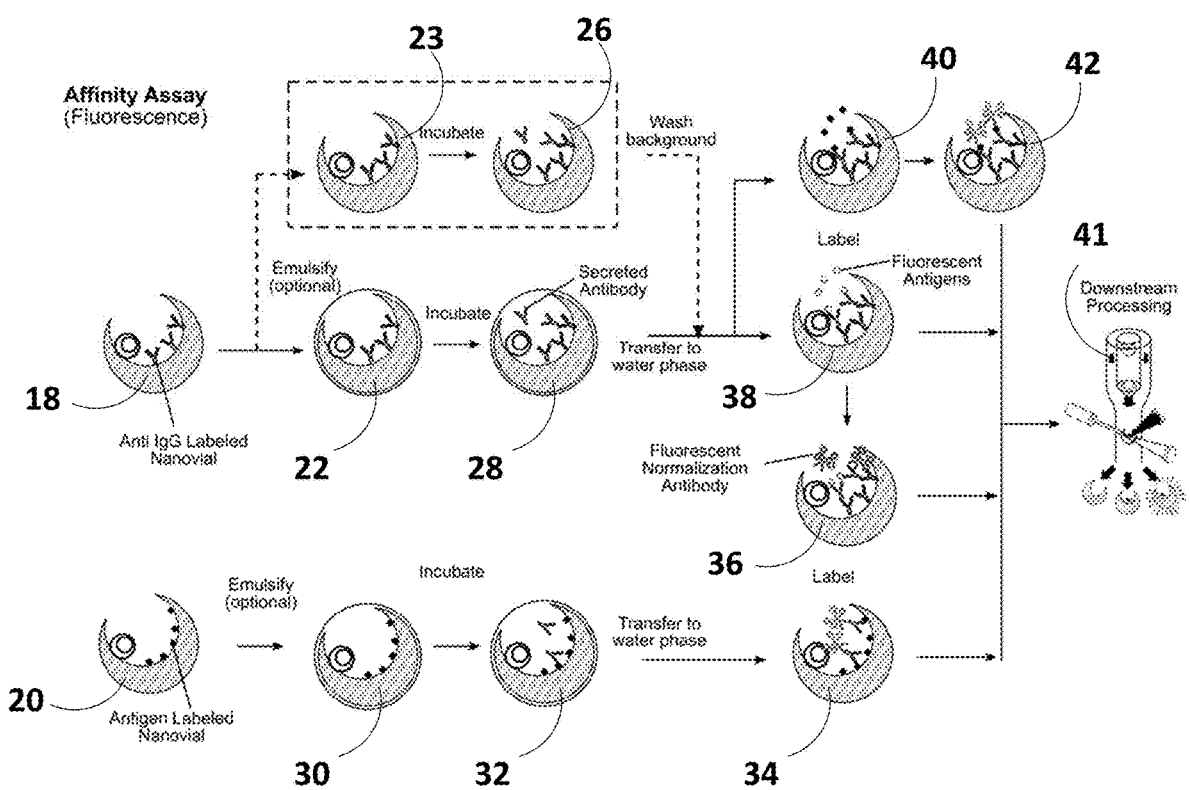
FIG. 8 depicts a non-limiting example of a single cell antibody affinity assay workflow using fluorescent readout, according to various aspects of the disclosure.
Figure 9:
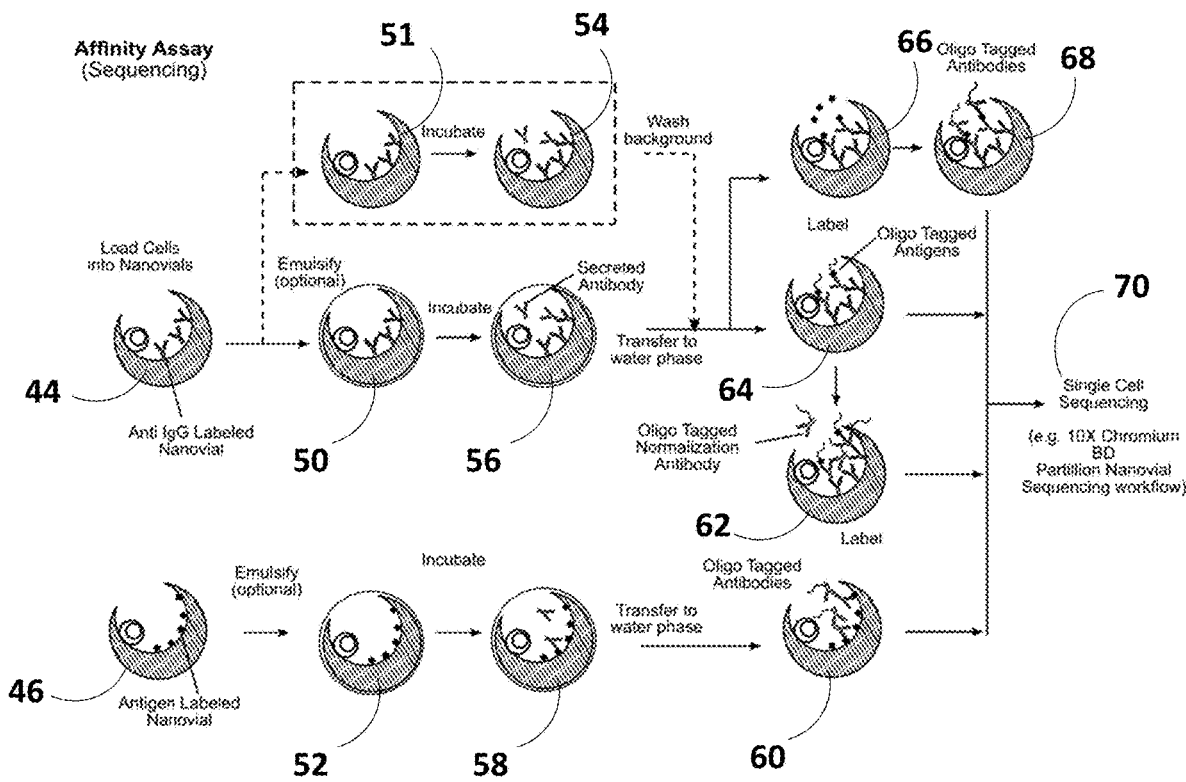
FIG. 9 depicts a non-limiting example of a single cell antibody affinity assay workflow using barcoded antibodies and single cell sequencing, according to various aspects of the disclosure.

In some embodiments, the method provided herein may comprise analyzing the binding affinity of an antibody secreted from an antibody secreting cell (e.g., a B cell, plasmablast, plasma cell, hybridoma, a genetically modified producer cell, or any combination thereof) and characterizing the single-cell nucleotide sequence information associated with this binding affinity, for example, as depicted in FIG. 8 and FIG. 9. In some aspects, the method may comprise providing or obtaining (or having obtained) a nanovial comprising a cavity formed therein. In some instances, the nanovial may comprise an opening to the surface of the nanovial. The nanovial may be any nanovial described herein. In some cases, the nanovial is empty (e.g., does not include antibody-producing cells). In other cases, the nanovial comprises an antibody-producing cell (e.g., a single or individual cell). In some cases, the nanovial may comprise more than one antibody-producing cell (e.g., 2, 3, 4, 5, 6, 7, 8, 9, 10, or more cells).

In some cases, the cavity of the nanovial is coated with or has an affinity agent immobilized thereon. The affinity agent may be immobilized to the surface of the nanovial cavity and/or may be within the porous matrix of the nanovial. In some cases, the nanovial obtained or provided is not coated with affinity agent and the method involves coating the nanovial with the affinity agent.

In some embodiments, the affinity agent is an antibody capture moiety (e.g., for binding to and capturing antibodies secreted by the antibody-producing cell) (18, 44). In some cases, the antibody capture moiety is selected from the group consisting of an anti-IgG antibody or fragment thereof, an anti-Fc antibody or fragment thereof, Protein A, Protein G, and any combination thereof. In some cases, the antibody capture moiety is not specific for a particular type of antibody such that all or substantially all antibodies secreted by the antibody-producing cell may bind to the antibody capture moiety. In other embodiments, the affinity agent is the antigen of interest (20, 46). In such cases, antibodies secreted from the antibody-producing cell that are capable of binding to the antigen of interest are captured on the nanovial.

In some embodiments, the method further comprises loading an antibody-producing cell into the cavity of the nanovial. In other embodiments, the method involves obtaining or providing a nanovial with the antibody-producing cell already loaded into the cavity. The antibody-producing cell can be any cell that produces antibodies. In some cases, the antibody-producing cell can be a B cell, a plasmablast, a plasma cell, a hybridoma, a genetically modified producer cell, or any combination thereof. In some cases, the cavity of the nanovial comprises one or more cell capture agents immobilized thereto. The one or more cell capture agents may be immobilized to the surface of the nanovial cavity and/or may be within the porous matrix of the nanovial. In some cases, the nanovial obtained or provided is not coated with the cell capture agent and the method involves coating the nanovial with the cell capture agent.

In some embodiments, the one or more cell capture agents comprises an antibody or fragment thereof that binds to a protein expressed on a surface of the antibody-producing cell. In some embodiments, the one or more cell capture agents binds to a label present on a surface of the antibody-producing cell. For example, the cell capture agent may be biotin and the antibody-producing cell may be coated or labeled with streptavidin. In another non-limiting example, the cell capture agent may be streptavidin and the antibody-producing cell may be coated or labeled with biotin. In some embodiments, the one or more cell capture agents is an antigen to which the antibody-producing cell can bind. In some embodiments, the one or more cell capture agents comprise ssDNA and the antibody-producing cell may be coated or labeled with complementary ssDNA that hybridizes with the cell capture agent.

Optionally, the method may further comprise encapsulating the nanovial or blocking the opening of the nanovial cavity. In some embodiments, the methods may involve adding one or more blocking particles to block or reduce a size of the opening of the nanovial cavity (e.g., FIG. 17 (120, 122)). In some instances, the nanovial(s) used in the affinity assay method may be emulsified in oil (22, 30, 50, 52). In some cases, the nanovial(s) may be encapsulated within a droplet. In some cases, the nanovial may comprise a cavity with a small opening 118. Alternatively, the nanovial may not be encapsulated (23, 51).

In various aspects, the method may further comprise incubating the nanovial such that one or more antibody or fragment thereof is secreted from the antibody producing cell and binds to the affinity agent (26, 28, 32, 54, 56, 58).

Any suitable conditions for incubating the nanovial may be used, including any temperature, time, media buffer conditions, and the like. Generally, the incubating involves incubating under conditions such that the antibody-producing cell remains viable for a period of time sufficient to produce and secrete antibodies into the cavity of the nanovial. In some cases, incubating may comprise incubating the antibody producing cell for a period of time. In some instances, the period of time may comprise at least 30 minutes (e.g., at least 45 minutes, at least 1 hour, at least 1.5 hours, at least 2 hours, etc.). In some cases, the period of time may comprise at most 24 hours.

In various aspects, the method may further comprise transferring the emulsified nanovial(s) to a water phase, thereby removing the emulsified oil coating. In some cases, the water phase nanovials may then be washed prior to adding a detection agent to the cavity of the nanovial. In other embodiments in which blocking particles are used, the method may further comprise removing excess blocking particles by washing, straining, physical breakage, chemical breakage, buoyancy, magnetic force, or any combination thereof.

In various aspects, the methods further comprise adding a detection agent to the cavity of the nanovial such that the detection agent binds to the one or more antibody or fragment thereof. In some cases, the detection agent may comprise an antibody or fragment thereof (34, 62, 60, 68, 42). In some instances, the detection agent may comprise the antigen of interest (40, 38, 64, 66). In some cases, the detection agent may be directly or indirectly labeled with a detectable label. The detectable label may comprise a fluorescent label (34, 36, 38, 42), a protein affinity tag, an oligonucleotide tag (60, 62, 64, 68), a magnetic particle, or any combination thereof.

In various aspects, the method may comprise adding the detection agent to a plurality of nanovials at one or more different concentrations. The one or more different concentrations may be within 1 order of magnitude of a desired dissociation constant ($K_D$) for the antigen of interest. The desired $K_D$ may be less than about 1 µM, less than about 100 nM, less than about 10 nM, or less than about 1 nM.

In various aspects, the methods further comprise detecting one or more signals related to binding of the detection agent to the one or more antibody or fragment thereof. In some cases, the detecting comprises determining an amount of detection agent bound to the one or more antibody or fragment thereof. In one aspect, the detection agent comprises a fluorescence label and the method comprises detecting a level of fluorescence 41, wherein the amount of detection agent bound to the one or more antibody or fragment thereof is correlated with the level of fluorescence. In another aspect, the detection agent comprises an oligonucleotide label. In this example, the method may further comprise sequencing the oligonucleotide label. In some cases, the detecting comprises counting the number of oligonucleotide tags bound to the one or more antibody or fragment thereof 70.

In some embodiments, the methods further comprise sorting the nanovial based on the one or more signals related to binding of the detection agent to the antibody 41. In some cases, the methods comprise sorting the nanovial based on a level of fluorescence (e.g., above a background level) or within a gate of fluorescence intensity 41. The sorting may be any method of sorting typically used to sort particles, droplets, and/or cells based on a fluorescence signal. In a non-limiting example, the sorting is a flow-based sorting method (e.g., FACS). In some cases, when the detection agent includes a magnetic particle label, the samples are sorted using magnetic force or magnetic activated cell sorting (e.g., MACS).

In various aspects, the methods further comprise performing a sequencing assay on nucleic acids derived from the antibody-producing cell, thereby generating a sequence of the one or more antibody or fragment thereof 70. In some cases, the methods involve obtaining or having obtained a sorted nanovial or a plurality of sorted nanovials (e.g., after any of the above methods have been performed) and performing a sequencing assay on nucleic acids derived from the antibody-producing cell (e.g., as described herein). The methods may further comprise obtaining or having obtained data or a data output related to any of the above methods (e.g., secretion assay data) such that the data can be associated with the downstream sequencing data. Any known sequencing technique may be suitable to use in the methods provided herein. For example, sequencing may involve Sanger sequencing, next-generation sequencing, third generation sequencing (e.g., long read sequencing), single-cell sequencing (e.g., single-cell mRNA sequencing), and the like.

In one aspect, the method comprises, prior to sequencing, lysing the antibody-producing cell). In another aspect, the method comprises, prior to sequencing, obtaining or having obtained a lysate of an antibody-producing cell (e.g., after the secretion assay has been performed and the nanovial has been sorted based on one or more signals associated with the secretion assay). In some instances, the method further comprises reverse transcribing mRNA released from the antibody-producing cell to generate cDNA, and then sequencing the cDNA.

In various aspects, the methods may further involve washing the nanovial. Any suitable wash method may be used, including any suitable wash solution or buffer.

In some embodiments, the methods involve performing any of the above methods on a plurality of nanovials, each nanovial comprising an antibody-producing cell. In some instances, each nanovial comprises an antibody-producing cell (e.g., a single antibody-producing cell) that produces different antibodies. In such methods, a plurality of nanovials can be screened for antibodies that target the antigen of interest. The plurality of nanovials may include, without limitation, at least 20,000, at least 30,000, at least 40,000, at least 50,000, at least 60,000, at least 70,000, at least 80,000, at least 90,000, at least 100,000, or more nanovials.

In various aspects, the methods further comprise associating the sequence of the one or more antibody or fragment thereof with the one or more signals related to the binding of the detection agent to the one or more antibody or fragment thereof. The associating may involve associating one or more barcodes or labels associated with the first assay (e.g., secretion assay) with one or more barcodes or labels associated with the second assay (e.g., sequencing assay). The methods may further comprise identifying the one or more antibody or fragment thereof that binds to the antigen of interest based on the associating.

In various aspects, the methods provided herein are suitable for screening and identifying antibodies with a desired affinity for the antigen of interest. The methods provided herein may be used to screen and identify antibodies having a $K_D$ for the antigen of interest of less than about 1 µM, less than about 100 nM, less than about 10 nM, or less than about 1 nM.

FIG. 8 depicts a non-limiting example of an antibody affinity assay workflow, as provided herein. In this example, the nanovial is loaded with cells and coated with affinity agents, such as antibodies against IgG 18, or the antigen or interest 20. The nanovials are optionally emulsified 22, 30 to seal them and reduce cross-talk. Nanovials are then incubated and secreted antibodies are captured on the nanovial surface 26, 28, 32. Emulsified nanovials are transferred back into a water phase and background is washed. Samples are then incubated with an antigen of interest 40 to identify high versus low affinity antibodies and then labeled with fluorescently tagged antibodies that are specific to the antigen 42. Samples are then analyzed and or sorted using flow cytometry, FACS, or other single cell fluorescence readout instruments 41. In another embodiment, the nanovials with captured secreted antibodies are incubated with fluorescently tagged antigens 38. In both approaches, fluorescently tagged antibodies against IgG may be used to normalize the secreted antibody amount 36. In another embodiment, the nanovials are directly labeled with antigen of interest 20. Secreted antibodies are captured based on the relative affinity to bound antigen and labeled with fluorescently tagged antibodies, such as against IgG 34. Samples are analyzed or sorted using flow cytometry, FACS, or other single cell fluorescence analysis and sorting instrument 41.

FIG. 9 depicts another non-limiting example of an antibody affinity assay workflow, as provided herein. In this example, the nanovial is loaded with cells and coated with affinity agents such as antibodies against IgG 44 or the antigen of interest 46. The nanovials are optionally emulsified to seal them and reduce cross-talk 50, 52. Nanovials are then incubated and secreted antibodies are captured on the nanovial surface through binding to affinity agents, such as antibodies against IgG 54, 56 or the antigen of interest 58. Emulsified nanovials are transferred back into a water phase and background is washed. Samples are then incubated with an antigen of interest to identify high versus low affinity antibodies 66 and then labeled with oligonucleotide tagged antibodies that are specific to the antigen 68. Samples are then sequenced 70 e.g., using a single cell sequencing platform, to measure relative affinity of antibodies produced by different cells as well as the mRNA expression profiles and antibody sequence information. In another embodiment, the nanovials which capture secreted antibodies are incubated with oligonucleotide tagged antigens 64. The samples may then be sequenced to identify antibody secreting cell mRNA expression profiles including antibody sequence information and affinity information based on counting the oligonucleotide sequence on the tagged antigen, with linked information provided by single-cell sequencing barcodes 70. In both approaches, oligonucleotide tagged antibodies against IgG may be used to normalize the secreted antibody amount 62. In another embodiment, the nanovials are directly labeled with the antigen of interest 46. Secreted antibodies are captured based on the relative affinity and labeled with oligonucleotide tagged antibodies against the secreted antibodies 60. Single cell sequencing 70 with this workflow may use an oligonucleotide barcode associated with the nanovial, or nanovial label (NL). The NL may be located on the nanovial or a separate bead in fluid communication with the nanovial and cells therein. The separate bead may be an oligonucleotide conjugated bead used as part of a single-cell RNA-sequencing system (e.g., GEM bead or Rhapsody bead). The oligonucleotide barcode that comprises the NL may further comprise an oligo-dT sequence (dT) to capture mRNA from the antibody producing cell and oligonucleotide tags on antigens or antibodies through poly A regions. Reverse transcription is performed to convert the mRNA from the antibody producing cell and oligonucleotide tags on antigens and antibodies to cDNA contiguously linked to the NL and optionally other oligonucleotide sequences including a universal sequence and unique molecular index sequence. cDNA is amplified and sequenced using e.g., next generation sequencing. In this way, the same NL code present in the amplified cDNA is used to link antibody sequence from the antibody producing cell to secretion and affinity signal from the oligonucleotide tagged antigens and antibodies. In this workflow, antibody binding and affinity can be assayed and linked to the antibody sequences (e.g., heavy and light chain) of antibody-secreting cells by searching for the number of sequencing reads of the oligonucleotide tag barcodes that also are connected to the same NL barcode. In some embodiments, selecting antibody sequences with affinity above a threshold comprises identifying NL barcode-containing reads containing oligonucleotide tagged antigen barcode sequences above a threshold level or number of reads, or threshold fraction of oligonucleotide tagged antibody barcode sequence reads and then identifying antibody sequences (e.g., VH and VL) associated with the same NL barcode reads.

Antibody Specificity Assay

Figure 10:
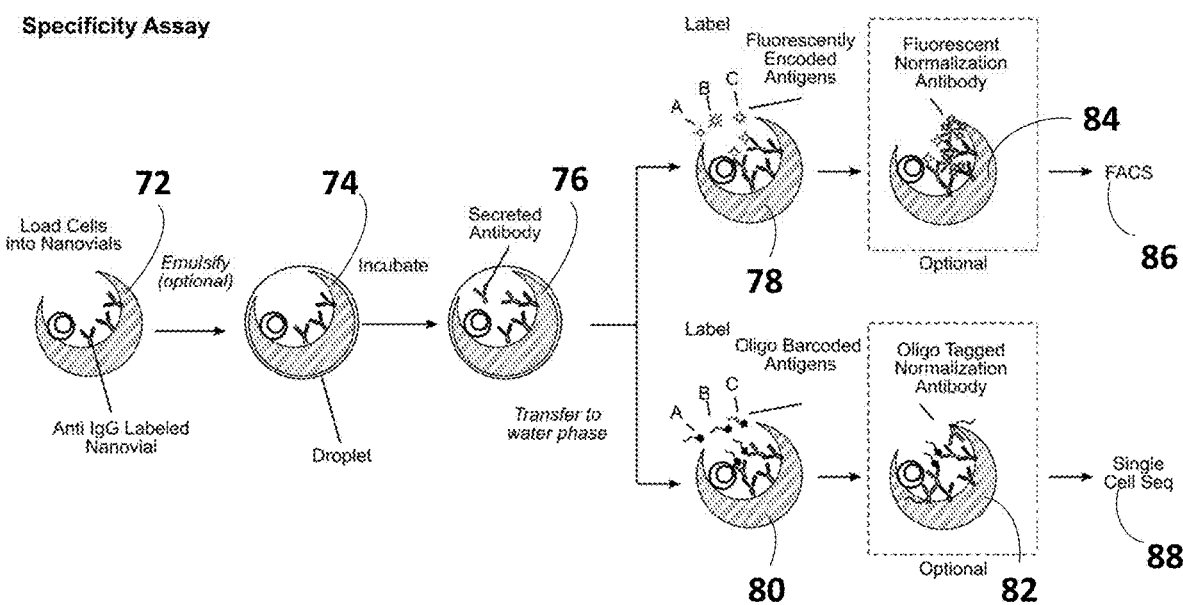
FIG. 10 depicts a non-limiting example of a single cell antibody specificity assay workflow using FACS and/or sequencing approaches, according to various aspects of the disclosure.

In some embodiments, the method provided herein may comprise identifying one or more antibodies or fragments thereof secreted from an antibody producing cell (e.g., a B cell, plasmablast, plasma cell, a hybridoma, a genetically modified producer cell or any combination thereof) having a desired specificity for the antigen of interest and characterizing the sequence information of this antibody associated with this desired specificity, as seen in FIG. 10.

In some aspects, the method may comprise providing or obtaining (or having obtained) a nanovial comprising a cavity formed therein. In some instances, the nanovial may comprise an opening to the surface of the nanovial. The nanovial may be any nanovial described herein. In some cases, the nanovial is empty (e.g., does not include antibody-producing cells). In other cases, the nanovial comprises an antibody-producing cell (e.g., a single or individual cell). In some cases, the nanovial may comprise more than one antibody-producing cell (e.g., 2, 3, 4, 5, 6, 7, 8, 9, 10, or more cells).

In some cases, the cavity of the nanovial is coated with or has an affinity agent immobilized thereon. The affinity agent may be immobilized to the surface of the nanovial cavity and/or may be within the porous matrix of the nanovial. In some cases, the nanovial obtained or provided is not coated with affinity agent and the method involves coating the nanovial with the affinity agent.

In some embodiments, the affinity agent is an antibody capture moiety (e.g., for binding to and capturing antibodies secreted by the antibody-producing cell) (72). In some cases, the antibody capture moiety is selected from the group consisting of an anti-IgG antibody or fragment thereof, an anti-Fc antibody or fragment thereof, Protein A, Protein G, and any combination thereof. In some cases, the antibody capture moiety is not specific for a particular type of antibody such that all or substantially all antibodies secreted by the antibody-producing cell may bind to the antibody capture moiety.

In some embodiments, the method further comprises loading an antibody-producing cell into the cavity of the nanovial. In other embodiments, the method involves obtaining or providing a nanovial with the antibody-producing cell already loaded into the cavity. The antibody-producing cell can be any cell that produces antibodies. In some cases, the antibody-producing cell can be a B cell, a plasmablast, a plasma cell, a hybridoma, a genetically modified producer cell, or any combination thereof. In some cases, the cavity of the nanovial comprises one or more cell capture agents immobilized thereto. The one or more cell capture agents may be immobilized to the surface of the nanovial cavity and/or may be within the porous matrix of the nanovial. In some cases, the nanovial obtained or provided is not coated with the cell capture agent and the method involves coating the nanovial with the cell capture agent.

In some embodiments, the one or more cell capture agents comprises an antibody or fragment thereof that binds to a protein expressed on a surface of the antibody-producing cell. In some embodiments, the one or more cell capture agents binds to a label present on a surface of the antibody-producing cell. For example, the cell capture agent may be biotin and the antibody-producing cell may be coated or labeled with streptavidin. In another non-limiting example, the cell capture agent may be streptavidin and the antibody-producing cell may be coated or labeled with biotin. In some embodiments, the one or more cell capture agents is an antigen to which the antibody-producing cell can bind. In some embodiments, the one or more cell capture agents comprise ssDNA and the antibody-producing cell may be coated or labeled with complementary ssDNA that hybridizes with the cell capture agent.

Optionally, the method may further comprise encapsulating the nanovial or blocking the opening of the nanovial cavity. In some embodiments, the methods may involve adding one or more blocking particles to block or reduce a size of the opening of the nanovial cavity (e.g., FIG. 17 (120, 122)). In some instances, the nanovial(s) used in the assay method may be emulsified in oil (74). In some cases, the nanovial(s) may be encapsulated within a droplet. In some cases, the nanovial may comprise a cavity with a small opening 118. Alternatively, the nanovial may not be encapsulated.

In various aspects, the method may further comprise incubating the nanovial such that one or more antibody or fragment thereof is secreted from the antibody producing cell and binds to the affinity agent (76). Any suitable conditions for incubating the nanovial may be used, including any temperature, time, media, buffer conditions, and the like. Generally, the incubating involves incubating under conditions such that the antibody-producing cell remains viable for a period of time sufficient to produce and secrete antibodies into the cavity of the nanovial. In some cases, incubating may comprise incubating the antibody producing cell for a period of time. In some instances, the period of time may comprise at least 30 minutes (e.g., at least 45 minutes, at least 1 hour, at least 1.5 hours, at least 2 hours, etc.). In some cases, the period of time may comprise at most 24 hours.

In various aspects, the method may further comprise transferring the emulsified nanovial(s) to a water phase, thereby removing the emulsified oil coating. In some cases, the water phase nanovials may then be washed prior to adding a detection agent to the cavity of the nanovial. In other embodiments in which blocking particles are used, the method may further comprise removing excess blocking particles by washing, straining, physical breakage, chemical breakage, buoyancy, magnetic force, or any combination of the previous.

In various aspects, the methods further comprise adding a detection agent to the cavity of the nanovial such that the detection agent binds to the one or more antibody or fragment thereof. In some cases, the method comprises adding a plurality of different detection agents to the nanovial (78, 80). In some cases, the method comprises identifying one or more antibodies or fragments thereof that specifically binds to one of the different detection agents. In some cases, the detection agent may comprise a plurality of labeled antigens 78 wherein a subset of the plurality of antigens may bind with a high degree of specificity to the epitope of the secreted antibody from the antibody producing cell. In some cases, the detection agent may be directly or indirectly labeled with a detectable label. The detectable label may comprise a fluorescent label (78), a protein affinity tag, an oligonucleotide tag (80), a magnetic particle, or any combination thereof. In some cases, normalization antibodies may be used to account for potential differences in secreted or bound antibody on the nanovial. In some embodiments, the normalization antibodies may comprise a fluorescent label 84. Alternatively, the normalization antibodies may comprise an oligonucleotide barcode label 82.

In various aspects, the methods further comprise detecting one or more signals related to binding of the detection agent to the one or more antibody or fragment thereof. In some cases, the detecting comprises determining an amount of detection agent bound to the one or more antibody or fragment thereof. In one aspect, the detection agent comprises a fluorescence label and the method comprises detecting a level of fluorescence 86, wherein the amount of detection agent bound to the one or more antibody or fragment thereof is correlated with the level of fluorescence. In another aspect, the detection agent comprises an oligonucleotide label. In this example, the method may further comprise sequencing the oligonucleotide label 88. In some cases, the detecting comprises counting the number of oligonucleotide tags bound to the one or more antibody or fragment thereof.

In some embodiments, the methods further comprise sorting the nanovial based on the one or more signals related to binding of the plurality of detection agents to the antibody 86. In some cases, the methods comprise sorting the nanovial based on a level of fluorescence (e.g., above a background level) in one or more fluorescence channels 86. The sorting may be any method of sorting typically used to sort particles, droplets, and/or cells based on a fluorescence signal. In a non-limiting example, the sorting is a flow-based sorting method (e.g., FACS). In some cases, when the detection agent includes a magnetic particle label, the samples are sorted using magnetic force or magnetic activated cell sorting (e.g., MACS).

In various aspects, the methods further comprise performing a sequencing assay on nucleic acids derived from the antibody-producing cell, thereby generating a sequence of the one or more antibody or fragment thereof 88. In some cases, the methods involve obtaining or having obtained a sorted nanovial or a plurality of sorted nanovials (e.g., after any of the above methods have been performed) and performing a sequencing assay on nucleic acids derived from the antibody-producing cell (e.g., as described herein). The methods may further comprise obtaining or having obtained data or a data output related to any of the above methods (e.g., secretion assay data) such that the data can be associated with the downstream sequencing data. Any known sequencing technique may be suitable to use in the methods provided herein. For example, sequencing may involve Sanger sequencing, next-generation sequencing, third generation sequencing (e.g., long read sequencing), single-cell sequencing (e.g., single-cell mRNA sequencing), and the like.

In one aspect, the method comprises, prior to sequencing, lysing the antibody-producing cell). In another aspect, the method comprises, prior to sequencing, obtaining or having obtained a lysate of an antibody-producing cell (e.g., after the secretion assay has been performed and the nanovial has been sorted based on one or more signals associated with the secretion assay). In some instances, the method further comprises reverse transcribing mRNA released from the antibody-producing cell to generate cDNA, and then sequencing the cDNA.

In various aspects, the methods may further involve washing the nanovial. Any suitable wash method may be used, including any suitable wash solution or buffer.

In some embodiments, the methods involve performing any of the above methods on a plurality of nanovials, each nanovial comprising an antibody-producing cell. In some instances, each nanovial comprises an antibody-producing cell (e.g., a single antibody-producing cell) that produces different antibodies. In such methods, a plurality of nanovials can be screened for antibodies that target the antigen of interest. The plurality of nanovials may include, without limitation, at least 20,000, at least 30,000, at least 40,000, at least 50,000, at least 60,000, at least 70,000, at least 80,000, at least 90,000, at least 100,000, or more nanovials.

In various aspects, the methods further comprise associating the sequence of the one or more antibody or fragment thereof with the one or more signals related to the binding of the detection agent to the one or more antibody or fragment thereof. The associating may involve associating one or more barcodes or labels associated with the first assay (e.g., secretion assay) with one or more barcodes or labels associated with the second assay (e.g., sequencing assay). The methods may further comprise identifying the one or more antibody or fragment thereof that binds to the one or more antigens of interest based on the associating.

FIG. 10 depicts a non-limiting example of an antibody specificity assay workflow, as provided herein. In this example, nanovials are loaded with cells and coated with affinity agents such as antibodies against IgG 72. Nanovials are optionally emulsified to reduce cross-talk and increase signal 74. Nanovials with cells therein are then incubated and secreted antibodies are captured on the nanovial surface 76. If nanovials were optionally emulsified, then they are de-emulsified. Nanovials are then washed. In one embodiment, the nanovials and associated cells and captured antibodies are incubated with multiple antigens that are fluorescently encoded 78. Optionally, a fluorescent antibody, such as against IgG is used to normalize the measured signal against the total amount of captured secretions 84. Samples are then read out and/or sorted using flow cytometry or FACS. FACS is used to isolate antibody secreting cells secreting antibodies binding to the one of more fluorescently-encoded antigens based on a gate in one or more fluorescence channels 86. In another embodiment, nanovials are instead incubated with multiple antigens that are encoded with unique oligonucleotide barcodes 80. Optionally, a separate oligonucleotide tagged antibody, such as against IgG is used for normalization 82. Samples are then analyzed using various single cell sequencing approaches to link secreted antibody sequence with the antigen binding counts of unique oligonucleotide barcodes 88. This workflow makes use of an oligonucleotide barcode associated with the nanovial, or nanovial label (NL). The NL may be located on the nanovial or a separate bead in fluid communication with the nanovial and cells therein. The separate bead may be an oligonucleotide conjugated bead used as part of a single-cell RNA-sequencing system (e.g., GEM bead or Rhapsody bead). The oligonucleotide barcode that comprises the NL, may further comprise an oligo-dT sequence (dT) to capture mRNA from the antibody producing cell and oligonucleotide tags on antigens and optionally antibodies through poly A regions. Reverse transcription is performed to convert the mRNA from the antibody producing cell and oligonucleotide tags on antigens and optionally antibodies to cDNA contiguously linked to the NL and optionally other oligonucleotide sequences including a universal sequence and unique molecular index sequence. cDNA is amplified and sequenced using e.g., next generation sequencing. In this way, the same NL code present in the amplified cDNA is used to link antibody sequence from the antibody producing cell to specificity and secretion signals from the oligonucleotide tagged antigens and antibodies. In this workflow, antibody specificity can be assayed and linked to the antibody sequences (e.g., heavy and light chain) of antibody-secreting cells by looking for the number of sequencing reads of the oligonucleotide barcodes associated with the different antigens that also are connected to the same NL barcode. In some embodiments, selecting antibody sequences with specificity above a threshold comprises identifying NL barcode-containing reads containing oligonucleotide tagged antigen barcode sequences of one type above a threshold level or number of reads while another type is below a threshold number of reads, or reads normalized to antibody barcode sequence reads above a threshold fraction of reads while another type is below a threshold fraction of reads, and then identifying antibody sequences (e.g., VH and VL) associated with the same NL barcode reads. In some embodiments, selecting antibody sequences with specificity above a threshold comprises identifying NL barcode-containing reads containing oligonucleotide tagged antigen barcode sequences of one type above a threshold level or number of reads while another type is also above a threshold number of reads, or reads normalized to antibody barcode sequence reads above a threshold fraction of reads for one type while another type is also above a threshold fraction of reads and then identifying antibody sequences (e.g., VH and VL) associated with the same NL barcode reads.

Antigen Producing Cell Assay

Figure 11:
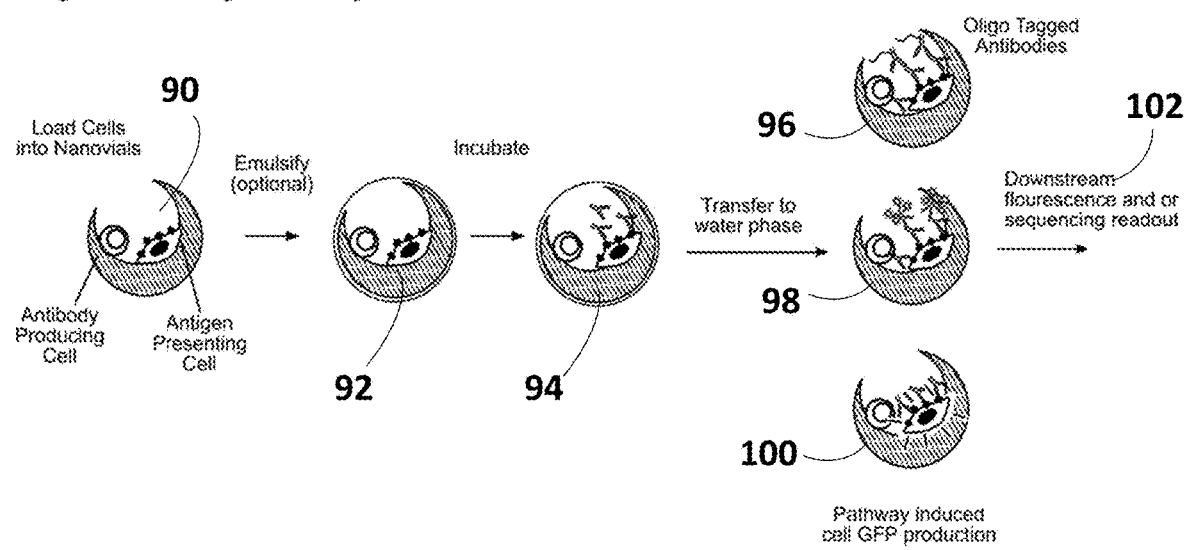
FIG. 11 depicts a non-limiting example of an antigen-presenting cell assay workflow, according to various aspects of the disclosure.

In some embodiments, the method provided herein may comprise identifying one or more antibodies or fragments thereof secreted from an antibody producing cell (e.g., a B cell, plasmablast, plasma cell, a hybridoma, a genetically modified producer cell, or any combination thereof) having a desired affinity for an antigen expressed or presented on the surface of an antigen-presenting or antigen-producing cell for example, as depicted in FIG. 11.

In some aspects, the method may comprise providing or obtaining (or having obtained) a nanovial comprising a cavity formed therein. In some instances, the nanovial may comprise an opening to the surface of the nanovial. The nanovial may be any nanovial described herein. In some cases, the nanovial is empty (e.g., does not include antibody-producing cells). In other cases, the nanovial comprises an antibody-producing cell (e.g., a single or individual cell). In some cases, the nanovial may comprise more than one antibody-producing cell (e.g., 2, 3, 4, 5, 6, 7, 8, 9, 10, or more cells).

In some cases, the cavity of the nanovial has an antigen-presenting cell immobilized thereon 90. The antigen-presenting cell may be immobilized to the surface of the nanovial cavity. In some cases, the nanovial obtained or provided does not have an antigen-presenting cell immobilized thereon and the method involves attaching or immobilizing an antigen-presenting cell to the surface of the nanovial cavity. In some embodiments, the antigen-presenting cell may be immobilized to the cavity of the nanovial before loading the antibody-producing cell. In other embodiments, the antibody-producing cell may be loaded into the cavity of the nanovial prior to immobilizing the antigen-presenting cell to the cavity of the nanovial. The antigen-presenting cell may be loaded into the cavity of the nanovial at a concentration such that, on average, at least one antigen-presenting cell is loaded into the cavity of the nanovial (e.g., at least one, at least two, at least three, at least four, at least five, or more).

The surface of the nanovial may be coated with cell capture moieties that capture and immobilize the antigen-presenting cell to the surface of the nanovial. For example, the surface of the nanovial may be coated with antibodies or fragments thereof that interact with proteins expressed on the surface of the antigen-presenting cell, or the nanovial may be coated with cell adhesion peptides (e.g., RGD), or the nanovial may be coated with extracellular matrix proteins.

The antigen-presenting cell is generally selected such that it produces, presents or expresses the antigen of interest on the surface of the antigen-presenting cell. In some cases, the antigen-presenting cell is a living cell. In other cases, the antigen-presenting cell is a dead cell (e.g., a fixed cell). The antigen-presenting cell can be a prokaryotic cell or a eukaryotic cell. The antigen-presenting cell can be a bacterial cell, a yeast cell, a fungal cell, an insect cell, a mammalian cell. Antigen-presenting cells can be engineered (e.g., recombinantly) such that they express the antigen of interest on the surface of the cell at higher levels than normal to maximize signal.

In some embodiments, the method further comprises loading an antibody-producing cell into the cavity of the nanovial. In other embodiments, the method involves obtaining or providing a nanovial with the antibody-producing cell already loaded into the cavity. In some embodiments, the method involves obtaining or providing a nanovial with the antigen-presenting cell already loaded into the cavity prior to loading of the antibody-producing cell. In other embodiments, the method involves obtaining or providing an empty nanovial and the antigen-presenting cell and antibody-producing cell are loaded into the cavity of the nanovial in any order. The antibody-producing cell can be any cell that produces antibodies. In some cases, the antibody-producing cell can be a B cell, a plasmablast, a plasma cell, a hybridoma, a genetically modified producer cell, or any combination thereof. In some cases, the cavity of the nanovial comprises one or more cell capture agents immobilized thereto. The one or more cell capture agents may be immobilized to the surface of the nanovial cavity and/or may be within the porous matrix of the nanovial. In some cases, the nanovial obtained or provided is not coated with the cell capture agent and the method involves coating the nanovial with the cell capturing agent.

In some embodiments, the one or more cell capture agents comprises an antibody or fragment thereof that binds to a protein expressed on a surface of the antibody-producing cell. In some embodiments, the one or more cell capture agents binds to a label present on a surface of the antibody-producing cell. For example, the cell capture agent may be biotin and the antibody-producing cell may be coated or labeled with streptavidin. In another non-limiting example, the cell capture agent may be streptavidin and the antibody-producing cell may be coated or labeled with biotin. In some embodiments, the one or more cell capture agents is an antigen to which the antibody-producing cell can bind. In some embodiments, the one or more cell capture agents comprise ssDNA and the antibody-producing cell may be coated or labeled with complementary ssDNA that hybridizes with the cell capture agent.

Optionally, the method may further comprise encapsulating the nanovial or blocking the opening of the nanovial cavity. In some embodiments, the methods may involve adding one or more blocking particles to block or reduce a size of the opening of the nanovial cavity (e.g., FIG. 17 (120, 122)). In some instances, the nanovial(s) may be emulsified in oil (92). In some cases, the nanovial(s) may be encapsulated within a droplet (92). In some cases, the nanovial may comprise a cavity with a small opening 118. Alternatively, the nanovial may not be encapsulated.

In various aspects, the method may further comprise incubating the nanovial such that one or more antibody or fragment thereof is secreted from the antibody producing cell and binds to the antigen of interest (e.g., expressed on the surface of the antigen-presenting cell) (94). Any suitable conditions for incubating the nanovial may be used, including any temperature, time, media or buffer conditions, and the like. Generally, the incubating involves incubating under conditions such that the antibody-producing cell remains viable for a period of time sufficient to produce and secrete antibodies into the cavity of the nanovial. In some cases, incubating may comprise incubating the antibody producing cell for a period of time. In some instances, the period of time may comprise at least 30 minutes (e.g., at least 45 minutes, at least 1 hour, at least 1.5 hours, at least 2 hours, at least 2.5 hour, at least 3 hours, etc.). In some cases, the period of time may comprise greater than 3 hours (e.g., greater than 3 hours, greater than 5 hours, greater than 10 hours, greater than 15 hours, greater than 20 hours, or more). In some cases, the period of time is at most 24 hours.

In various aspects, the method may further comprise transferring the emulsified nanovial(s) to a water phase, thereby removing the emulsified oil coating. In some cases, the water phase nanovials may then be washed prior to adding a detection agent to the cavity of the nanovial. In other embodiments in which blocking particles are used, the method may further comprise removing excess blocking particles by washing, straining, physical breakage, chemical breakage, buoyancy, magnetic force, or any combination of thereof.

In various aspects, the methods further comprise adding a detection agent to the cavity of the nanovial such that the detection agent binds to the one or more antibody or fragment thereof (e.g., bound to the antigen of interest, e.g., on the surface of the antigen-presenting cell). In some cases, the detection agent may comprise an antibody or fragment thereof (96, 98). For example, the detection agent may be a secondary antibody specific to the secreted antibody (e.g., anti-mouse H & L or anti-mouse Fc for mouse B cells or other antibody-secreting cells). In some cases, the detection agent may be directly or indirectly labeled with a detectable label. The detectable label may comprise a fluorescent label (98), a protein affinity tag, an oligonucleotide tag (96), a magnetic particle, or any combination thereof.

In various aspects, the methods further comprise detecting one or more signals related to binding of the detection agent to the one or more antibody or fragment thereof. In some cases, the detecting comprises determining an amount of detection agent bound to the one or more antibody or fragment thereof. In one aspect, the detection agent comprises a fluorescence label 98 and the method comprises detecting a level of fluorescence 102, wherein the amount of detection agent bound to the one or more antibody or fragment thereof is correlated with the level of fluorescence.

In another aspect, the detection agent comprises an oligonucleotide label 96. In this example, the method may further comprise sequencing the oligonucleotide label 102. In some cases, the detecting comprises counting the number of oligonucleotide tags bound to the one or more antibody or fragment thereof.

In some embodiments, the methods further comprise sorting the nanovial based on the one or more signals related to binding of the detection agent to the antibody or fragment thereof 102. In some cases, the methods comprise sorting the nanovial based on a level of fluorescence (e.g., above a background level) or within a gate based on fluorescence intensity 102. The sorting may be any method of sorting typically used to sort particles, droplets, and/or cells based on a fluorescence signal. In a non-limiting example, the sorting is a flow-based sorting method (e.g., FACS). For example, the antibody secreting cell of interest and secreted antibody bound to the antigen-presenting cell can be sorted using FACS or MACS prior to downstream sequencing (e.g., of the B cell receptor (paired VH and VL sequences)). Using a threshold on fluorescence intensity for the secondary antibody fluorophore (98), nanovials (and associated antibody-secreting cells of interest) can be sorted (102) and selected for antibody secreting cells that specifically produce and secrete antibodies specific to the antigen on the antigen-producing cell.

In various aspects, the methods further comprise performing a sequencing assay on nucleic acids derived from the antibody-producing cell, thereby generating a sequence of the one or more antibody or fragment thereof 102. In some cases, the methods involve obtaining or having obtained a sorted nanovial or a plurality of sorted nanovials (e.g., after any of the above methods have been performed) and performing a sequencing assay on nucleic acids derived from the antibody-producing cell (e.g., as described herein). The methods may further comprise obtaining or having obtained data or a data output related to any of the above methods (e.g., secretion assay data) such that the data can be associated with the downstream sequencing data. Any known sequencing technique may be suitable to use in the methods provided herein. For example, sequencing may involve Sanger sequencing, next-generation sequencing, third generation sequencing (e.g., long read sequencing), single-cell sequencing (e.g., single-cell mRNA sequencing), and the like.

In one aspect, the method comprises, prior to sequencing, lysing the antibody-producing cell). In another aspect, the method comprises, prior to sequencing, obtaining or having obtained a lysate of an antibody-producing cell (e.g., after the secretion assay has been performed and the nanovial has been sorted based on one or more signals associated with the secretion assay). In some instances, the method further comprises reverse transcribing mRNA released from the antibody-producing cell to generate cDNA, and then sequencing the cDNA.

In various aspects, the methods may further involve washing the nanovial. Any suitable wash method may be used, including any suitable wash solution or buffer.

In various aspects, the methods further comprise associating the sequence of the one or more antibody or fragment thereof with the one or more signals related to the binding of the detection agent to the one or more antibody or fragment thereof. The associating may involve associating one or more barcodes or labels associated with the first assay (e.g., secretion assay) with one or more barcodes or labels associated with the second assay (e.g., sequencing assay). The methods may further comprise identifying the one or more antibody or fragment thereof that binds to the antigen of interest based on the associating. For example, if labeled with barcoded oligonucleotides (96), the nanovial (and associated cells) can be introduced into a single-cell RNA-sequencing workflow (e.g., 10× Genomics Chromium). This workflow makes use of an oligonucleotide barcode associated with the nanovial, or nanovial label (NL). For example, the NL can be associated with a biotin functionalized nanovial through the use of oligonucleotide barcodes conjugated to streptavidin (e.g., TotalSeq™-C0971, Product #405271). The NL may be located on the nanovial or a separate bead in fluid communication with the nanovial and cells therein. The separate bead may be an oligonucleotide conjugated bead used as part of a single-cell RNA-sequencing system (e.g., dissolvable GEM Bead or Rhapsody Bead). The oligonucleotide barcode that comprises the NL, may further comprise an oligo-dT sequence (dT) to capture mRNA from the antibody producing cell, antigen presenting or producing cell and oligonucleotide tag on antibodies through poly A regions. Reverse transcription is performed to convert the mRNA from the antibody producing cell, antigen producing cell and oligonucleotide tags on antibodies to cDNA contiguously linked to the NL and optionally other oligonucleotide sequences including a universal sequence and unique molecular index sequence. cDNA is amplified and sequenced using e.g., next generation sequencing. In this way, the same NL code present in the amplified cDNA is used to link antibody sequence cDNA from the antibody producing cell, antigen expression level on the antigen producing cell, to secretion and affinity signal from the oligonucleotide tagged antibodies. In this workflow, antibody binding can be assayed and linked to the antibody sequences (e.g., heavy and light chain) of antibody-secreting cells by looking for the number of sequencing reads of the oligonucleotide barcode that also are connected to the same NL barcode. In some embodiments, selecting antibody sequences with affinity above a threshold comprises identifying NL barcode-containing reads containing oligonucleotide tagged antibody barcode sequences above a threshold level or number of reads, or oligonucleotide tagged antibody barcode sequences above a threshold fraction of reads normalized to antigen cDNA reads, and then identifying antibody sequences (e.g., VH and VL) associated with the same NL barcode reads.

In some embodiments, the methods involve performing any of the above methods on a plurality of nanovials, each nanovial comprising an antibody-producing cell and an antigen-presenting cell. In some instances, each nanovial comprises an antibody-producing cell (e.g., a single antibody-producing cell) that produces different antibodies. In such methods, a plurality of nanovials can be screened for antibodies that target the antigen of interest. The plurality of nanovials may include, without limitation, at least 20,000, at least 30,000, at least 40,000, at least 50,000, at least 60,000, at least 70,000, at least 80,000, at least 90,000, at least 100,000, or more nanovials.

FIG. 11 depicts a non-limiting example of an antigen-presenting cell assay workflow as described herein. In this example, an antibody-producing cell or antibody-secreting cell and antigen presenting cell(s) are both loaded into a nanovial 90. Nanovials are optionally emulsified to reduce cross-talk between samples and enhance signal 92. Samples of nanovials are incubated to allow producing cells to secrete antibodies 94. Antibodies specific to the antigen of interest bind to the antigen presenting cell(s) 94. The nanovial is then transferred back to a water phase and washed. Antibodies bound to the antigen presenting cells are then labeled with secondary antibodies (e.g., fluorescently labeled 98 and/or containing an oligonucleotide barcode 96) and then analyzed and/or sorted using downstream fluorescence and/or sequencing readout 102. In another embodiment, the antibodies may induce production of a fluorescent protein (e.g., green fluorescent protein (GFP)) in the antigen presenting cell upon binding to antigen which can be used to readout the function of the secreted antibody and sort the antibody secreting cell based on the function of the antibody 100.

Antibody Modulated Signaling Pathway Assay

Figure 12A:
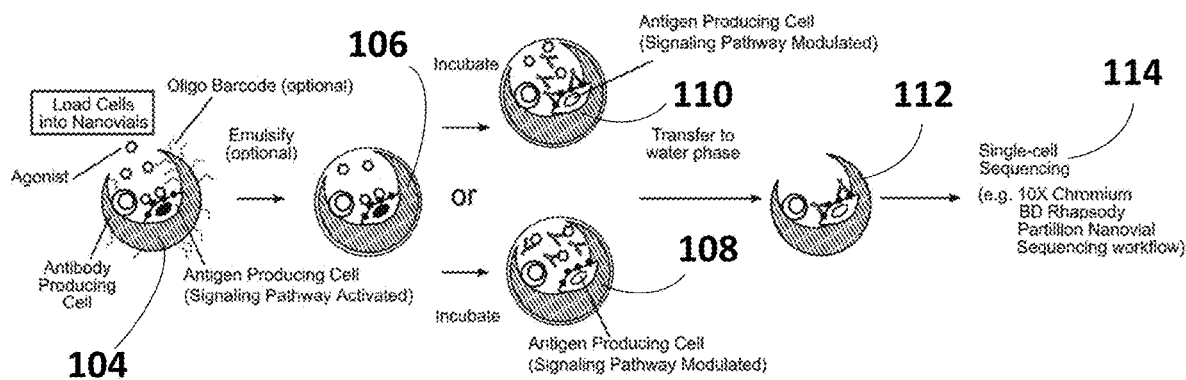
FIG. 12A depicts a non-limiting example of an assay workflow for screening biologics that modulate signaling pathways, according to various embodiments of the disclosure.

In some embodiments, the methods provided herein may comprise identifying one or more antibodies or fragment thereof that modulates a signaling pathway of interest, for example, as depicted in FIG. 12A. In some aspects, the method may comprise providing or obtaining (or having obtained) a nanovial comprising a cavity formed therein. In some instances, the nanovial may comprise an opening to the surface of the nanovial. The nanovial may be any nanovial described herein. In some cases, the nanovial is empty (e.g., does not include antibody-producing cells). In other cases, the nanovial comprises an antibody-producing cell (e.g., a single or individual cell). In some cases, the nanovial may comprise more than one antibody-producing cell (e.g., 2, 3, 4, 5, 6, 7, 8, 9, 10, or more cells).

In some cases, the cavity of the nanovial has an antigen-presenting or antigen-producing cell immobilized thereon 104. The antigen-presenting cell may be immobilized to the surface of the nanovial cavity. In some cases, the nanovial obtained or provided does not have an antigen-presenting cell immobilized thereon and the method involves attaching or immobilizing an antigen-presenting cell to the surface of the nanovial cavity. In some embodiments, the antigen-presenting cell may be immobilized to the cavity of the nanovial before loading the antibody-producing cell. In other embodiments, the antibody-producing cell may be loaded into the cavity of the nanovial prior to immobilizing the antigen-presenting cell to the cavity of the nanovial. The antigen-presenting cell may be loaded into the cavity of the nanovial at a concentration such that, on average, at least one antigen-presenting cell is loaded into the cavity of the nanovial (e.g., at least one, at least two, at least three, at least four, at least five, or more).

The surface of the nanovial may be coated with cell capture moieties that capture and immobilize the antigen-presenting cell to the surface of the nanovial. For example, the surface of the nanovial may be coated with antibodies or fragments thereof that interact with proteins expressed on the surface of the antigen-presenting cell, or the nanovial may be coated with cell adhesion peptides (e.g., RGD), or the nanovial may be coated with extracellular matrix proteins.

The antigen-presenting cell is generally selected such that it produces, presents or expresses the antigen of interest on the surface of the antigen-presenting cell. Generally, in these embodiments, the antigen-presenting cell is a living cell (such that modulation of signaling pathways can be assessed). The antigen-presenting cell can be a prokaryotic cell or a eukaryotic cell. The antigen-presenting cell can be a bacterial cell, a yeast cell, a fungal cell, an insect cell, a mammalian cell. Antigen-presenting cells can be engineered (e.g., recombinantly) such that they express the antigen of interest on the surface of the cell at higher levels than normal to maximize signal.

In some cases, the antigen-producing cell is engineered to express one or more detectable labels upon modulation of the signaling pathway of interest. For example, the antigen-presenting cells may be genetically engineered to express a fluorescent reporter protein (e.g., GFP, EGFP, RFP, a fluorescent reporter protein that is sensitive to intracellular calcium concentrations (e.g., GCaMP (or GCaMP co-expressed with a fluorescent protein (e.g., mCherry) for ratiometric measurements of calcium concentration).

In some embodiments, the method further comprises loading an antibody-producing cell into the cavity of the nanovial. In other embodiments, the method involves obtaining or providing a nanovial with the antibody-producing cell already loaded into the cavity. In some embodiments, the method involves obtaining or providing a nanovial with the antigen-presenting cell already loaded into the cavity prior to loading of the antibody-producing cell. In other embodiments, the method involves obtaining or providing an empty nanovial and the antigen-presenting cell and antibody-producing cell are loaded into the cavity of the nanovial in any order. The antibody-producing cell can be any cell that produces antibodies. In some cases, the antibody-producing cell can be a B cell, a plasmablast, a plasma cell, a hybridoma, a genetically modified producer cell or any combination thereof. In some cases, the cavity of the nanovial comprises one or more cell capture agents immobilized thereto. The one or more cell capture agents may be immobilized to the surface of the nanovial cavity and/or may be within the porous matrix of the nanovial. In some cases, the nanovial obtained or provided is not coated with the cell capture agent and the method involves coating the nanovial with the cell capture agent.

In some embodiments, the one or more cell capture agents comprises an antibody or fragment thereof that binds to a protein expressed on a surface of the antibody-producing cell. In some embodiments, the one or more cell capture agents binds to a label present on a surface of the antibody-producing cell. For example, the cell capture agent may be biotin and the antibody-producing cell may be coated or labeled with streptavidin. In another non-limiting example, the cell capture agent may be streptavidin and the antibody-producing cell may be coated or labeled with biotin. In some embodiments, the one or more cell capture agents is an antigen to which the antibody-producing cell can bind. In some embodiments, the one or more cell capture agents comprise ssDNA and the antibody-producing cell may be coated or labeled with complementary ssDNA that hybridizes with the cell capture agent.

Optionally, the method may further comprise encapsulating the nanovial or blocking the opening of the nanovial cavity. In some embodiments, the methods may involve adding one or more blocking particles to block or reduce a size of the opening of the nanovial cavity (e.g., FIG. 17 (120, 122)). In some instances, the nanovial(s) may be emulsified in oil (106). In some cases, the nanovial(s) may be encapsulated within a droplet (106). In some cases, the nanovial may comprise a cavity with a small opening 118. Alternatively, the nanovial may not be encapsulated.

In various aspects, the method may further comprise incubating the nanovial such that one or more antibody or fragment thereof is secreted from the antibody-producing cell and modulates the signaling pathway of interest in the antigen-producing cell (108, 110). In some instances, the modulation of the signaling pathway of interest comprises activation of the signaling pathway of interest. In other instances, the modulation of the signaling pathway of interest comprises inhibition of the signaling pathway of interest. In some embodiments, the one or more antibody or fragment thereof binds to an antigen on the surface of the antigen-producing cell, thereby modulating the signaling pathway of interest (110). In other embodiments, the one or more antibody or fragment thereof interferes with binding of a ligand to an antigen on the surface of the antigen-producing cell, thereby modulating the signaling pathway of interest 108. The ligand may be, e.g., an agonist separately introduced into the cavity of the nanovial, and the antibody or fragment thereof may inhibit or block the ligand (e.g., by directly binding to the ligand, or by binding to the antigen on the antigen-producing cell thereby preventing binding of the ligand to the antigen) from modulating the signaling pathway of interest 108.

Any suitable conditions for incubating the nanovial may be used, including any temperature, time, media, buffer conditions, and the like. Incubating may involve use of media or buffer conditions containing a suitable amount of ligand or agonist that interacts with antigen on the antigen-producing cells. Generally, the incubating involves incubating under conditions such that the antibody-producing cell remains viable for a period of time sufficient to produce and secrete antibodies into the cavity of the nanovial. In some cases, incubating may comprise incubating the antibody producing cell for a period of time. In some instances, the period of time may comprise at least 30 minutes (e.g., at least 45 minutes, at least 1 hour, at least 1.5 hours, at least 2 hours, at least 2.5 hour, at least 3 hours, etc.). In some cases, the period of time may comprise greater than 3 hours (e.g., greater than 3 hours, greater than 5 hours, greater than 10 hours, greater than 15 hours, greater than 20 hours, or more). In some cases, the period of time is at most 24 hours.

In various aspects, the method may further comprise transferring the emulsified nanovial(s) to a water phase, thereby removing the emulsified oil coating. In some cases, the water phase nanovials may then be washed prior to adding a detection agent to the cavity of the nanovial. In other embodiments in which blocking particles are used, the method may further comprise removing excess blocking particles by washing, straining, physical breakage, chemical breakage, buoyancy, magnetic force, or any combination thereof.

In various aspects, the methods further comprise detecting one or more signals related to the modulation of the signaling pathway of interest. In some embodiments, the methods comprise detecting a level of fluorescence in the nanovial, wherein the level of fluorescence corresponds to modulation of the signaling pathway of interest. For example, the activity of the antibody or fragment thereof on the downstream signaling pathway may be assessed by the production of fluorescent protein (e.g., green fluorescent protein, cyan fluorescent protein, red fluorescent protein, etc.) in the antigen-producing cell (also called a reporter cell) or the fluorescence levels of the calcium concentration-dependent fluorescent reporter protein in the reporter cell. In some embodiments, the methods comprise detecting a change in one or more mRNA levels in the antigen-producing cell. In some embodiments, the detecting comprises performing single cell RNA sequencing on nucleic acids derived from the antigen-producing cell.

In some embodiments, the methods further comprise sorting the nanovial based on the one or more signals related to the modulation of the signaling pathway of interest. In some cases, the methods comprise sorting the nanovial based on a level of fluorescence (e.g., above a background level) or within a gate of fluorescence intensity. The sorting may be any method of sorting typically used to sort particles, droplets, and/or cells based on a fluorescence signal. In a non-limiting example, the sorting is a flow-based sorting method (e.g., FACS). For example, nanovials containing antigen-producing cells with specific fluorescence levels (e.g., above or below a cut-off) or ratios of fluorescence levels can be sorted using FACS.

In various aspects, the methods further comprise performing a sequencing assay on nucleic acids derived from the antibody-producing cell, thereby generating a sequence of the one or more antibody or fragment thereof 114. In some cases, the methods involve obtaining or having obtained a sorted nanovial or a plurality of sorted nanovials (e.g., after any of the above methods have been performed) and performing a sequencing assay on nucleic acids derived from the antibody-producing cell (e.g., as described herein). The methods may further comprise obtaining or having obtained data or a data output related to any of the above methods (e.g., secretion assay data) such that the data can be associated with the downstream sequencing data. Any known sequencing technique may be suitable to use in the methods provided herein. For example, sequencing may involve Sanger sequencing, next-generation sequencing, third generation sequencing (e.g., long read sequencing), single-cell sequencing (e.g., single-cell mRNA sequencing), and the like. In one particular embodiment, antibody secreting cells (e.g. B cells) that have been sorted (e.g., based on one or more signals related to modulation of the signaling pathway) may be analyzed (e.g., by sequencing) to identify an antibody sequence (e.g., paired heavy and light chain sequences) that modulate the particular signaling pathway through cell surface binding, or interaction with the agonist or ligand as discussed herein.

In one aspect, the method comprises, prior to sequencing, lysing the antibody-producing cell and/or antigen producing cell. In another aspect, the method comprises, prior to sequencing, obtaining or having obtained a lysate of an antibody-producing cell (e.g., after the secretion assay has been performed and the nanovial has been sorted based on one or more signals associated with the secretion assay). In some instances, the method further comprises reverse transcribing mRNA released from the antibody-producing cell to generate cDNA, and then sequencing the cDNA.

In various aspects, the methods may further involve washing the nanovial. Any suitable wash method may be used, including any suitable wash solution or buffer.

In various aspects, the methods further comprise associating the sequence of the one or more antibody or fragment thereof with the one or more signals related to the modulation of the signaling pathway of interest. In some embodiments, the associating comprises linking mRNA levels in the antibody-producing cell to nucleic acid sequence information from the antibody-producing cell based on a shared oligonucleotide barcode. The methods may further comprise identifying the one or more antibody or fragment thereof that modulates the signaling pathway of interest based on the associating. The shared oligonucleotide barcode may comprise one or more unique oligonucleotide tags associated with the nanovial (104).

In some embodiments, multiple signaling pathways may be interrogated (e.g., by any method provided herein) in a single assay by using antigen-producing cells that are genetically modified with multiple separate fluorescent reporter proteins, or a plurality of different antigen-producing cells each with a separate fluorescent reporter specific to a different signaling pathway. In this embodiment, different transcription factors or promoter regions associated with different signaling pathways may be incorporated upstream of the genes coding for each of the fluorescent proteins. Non-limiting examples of signaling pathways that can be interrogated with these methods include: Akt/PKB signaling pathway, AMPK signaling pathway, cAMP-dependent pathway, Eph/ephrin signaling pathway, Hedgehog signaling pathway, Hippo signaling pathway, Insulin signal transduction pathway, JAK-STAT signaling pathway, MAPK/ERK signaling pathway, mTOR signaling pathway, Nodal signaling pathway, Notch signaling pathway or engineered synNotch signaling pathways, PI3K/AKT/mTOR signaling pathway, TGF beta signaling pathway, TLR signaling pathway, VEGF signaling pathway, Wnt signaling pathway, among others. When multiple signaling pathways are interrogated, the nanovials and associated cells can be sorted using standard multi-color FACS to identify, for example, antibodies that activate one particular signaling pathway while not activating another signaling pathway, or antibodies that activate one or more signaling pathways while not activating another one or more signaling pathways (e.g., high fluorescence for fluorescent protein 1, low fluorescence for fluorescent protein 2, etc.). Antigen-producing cells of interest can also be engineered to overexpress an antigen of interest on the cell surface to facilitate this embodiment and focus the screening method on antibodies that interact with the particular overexpressed cell surface antigen.

In some embodiments, the methods involve performing any of the above methods on a plurality of nanovials, each nanovial comprising an antibody-producing cell and an antigen-producing cell. In some instances, each nanovial comprises an antibody-producing cell (e.g., a single antibody-producing cell) that produces different antibodies. In such methods, a plurality of nanovials can be screened for antibodies that target the antigen of interest. The plurality of nanovials may include, without limitation, at least 20,000, at least 30,000, at least 40,000, at least 50,000, at least 60,000, at least 70,000, at least 80,000, at least 90,000, at least 100,000, or more nanovials.

Figure 12B:
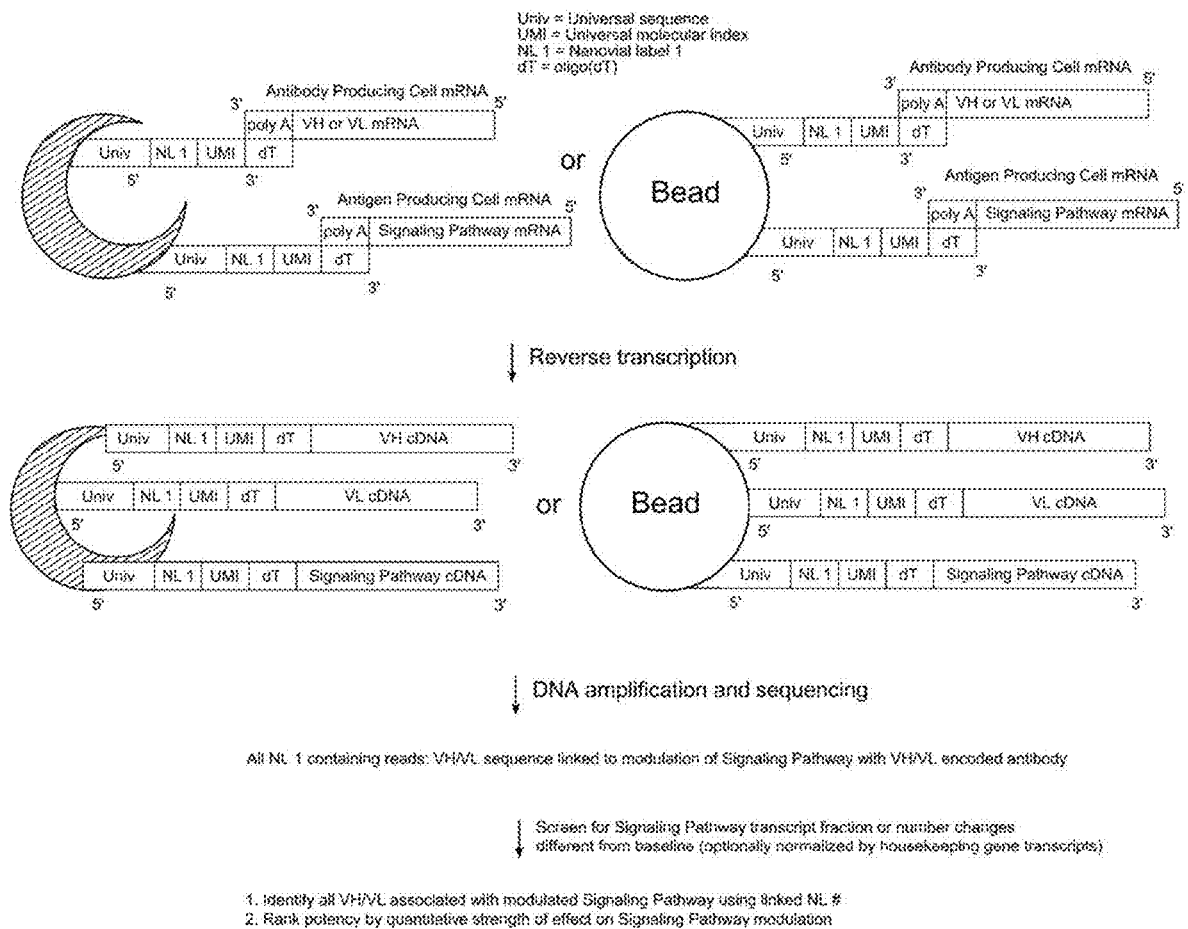
FIG. 12B depicts non-limiting examples of oligonucleotide barcodes which can be used in an assay for screening biologics that modulate signaling pathways, according to various aspects of the disclosure.

FIG. 12A depicts a non-limiting example of an antibody modulated signaling pathway assay workflow, as described herein. Antigen producing cells and antibody producing cells are seeded into nanovials which optionally may contain oligonucleotide barcode molecules 104. Nanovials with loaded cells are introduced into media with an agonist molecule that normally interacts with antigen of the antigen producing cell 104. Secreted antibodies may bind to antigens on the surface of the antigen producing cell 110 or bind to an agonist that normally binds to antigen on the antigen producing cell to prevent binding of the agonist 108. Both processes may modulate signaling pathways within the antigen producing cell. Single-cell sequencing can be used downstream to measure variation in expression of genes in the signaling pathway in the antigen producing cell 114. This information of signaling pathway gene expression changes may be linked to the antibody secreting cell antibody sequence (e.g., heavy and light chain sequence information) using an oligonucleotide barcode that includes a nanovial label (NL) or single-cell label that is unique for each nanovial or droplet containing a nanovial (e.g., FIG. 12B). The NL label may be located on the nanovial or a separate bead in communication with the nanovial and cells therein. The separate bead may be and oligonucleotide conjugated bead used as part of a single-cell RNA-sequencing system. The oligonucleotide barcode that comprises the NL, may further comprise an oligo-dT sequence (dT) to capture mRNA from the antibody producing cell and antigen producing cell through poly A tails. Reverse transcription is performed to convert the mRNA from the antibody producing cell and antigen producing cell to cDNA contiguously linked to the NL and optionally other oligonucleotide sequences including a universal sequence and unique molecular index sequence. cDNA is amplified and sequenced using e.g., next generation sequencing. In this way, the same nanovial label code present in the amplified cDNA is used to link antibody sequence from the antibody producing cell to functional changes in gene expression in the antigen producing cell in a single workflow. Downstream analysis of sequencing files can be used to rank potency of different antibody sequences on the degree of modulation of signaling pathways in antigen producing cells (FIG. 12B).

T Cell Secretion Phenotype Assay

Provided herein are methods for identifying a functional chimeric antigen receptor (CAR) or T cell receptor (TCR) to an antigen of interest.

In some aspects, the method may comprise providing or obtaining (or having obtained) a nanovial comprising a cavity formed therein. In some instances, the nanovial may comprise an opening to the surface of the nanovial. The nanovial may be any nanovial described herein. In some cases, the nanovial is empty (e.g., does not include a CAR- or TCR-expressing cell). In other cases, the nanovial comprises a CAR- or TCR-expressing cell (e.g., a single or individual cell). In some cases, the nanovial may comprise more than one CAR- or TCR-expressing cell (e.g., 2, 3, 4, 5, 6, 7, 8, 9, 10, or more cells).

In some cases, the cavity of the nanovial is coated with or has an affinity agent immobilized thereon. The affinity agent may be immobilized to the surface of the nanovial cavity and/or may be within the porous matrix of the nanovial. In some cases, the nanovial obtained or provided is not coated with affinity agent and the method involves coating the nanovial with the affinity agent.

In some embodiments, the affinity agent is a cytokine capture moiety (e.g., for binding to and capturing cytokines secreted by the CAR- or TCR-expressing cell). In some cases, the cytokine capture moiety is an anti-cytokine antibody, for example, an anti-IL2 antibody, an anti-TNF-alpha antibody, or an anti-IFN-gamma antibody. In some cases, the affinity agent is an aptamer or a non-specific capture surface for proteins, e.g., poly-lysine, extracellular matrix proteins, etc.

In various aspects, the method further comprises loading a CAR- or TCR-expressing cell into the cavity of the nanovial. In other embodiments, the method involves obtaining or providing a nanovial with the CAR- or TCR-expressing cell already loaded into the cavity. In some cases, the CAR- or TCR-expressing cell is a T cell. In some cases, the cavity of the nanovial comprises one or more cell capture agents immobilized thereto. The one or more cell capture agents may be immobilized to the surface of the nanovial cavity and/or may be within the porous matrix of the nanovial. In some cases, the nanovial obtained or provided is not coated with the cell capture agent and the method involves coating the nanovial with the cell capture agent.

In some embodiments, the one or more cell capture agents comprises an antibody or fragment thereof that binds to a protein expressed on a surface of the CAR- or TCR-expressing cell and/or antigen-presenting cell. In some embodiments, the one or more cell capture agents can include an anti-CD45 antibody, an anti-CD4 antibody, an anti-CD8 antibody, an anti-CD3/anti-CD28 antibody, or any combination thereof. In some embodiments, the one or more cell capture agents is an antigen or MHC-presented antigen to which the CAR- or TCR-expressing cell can bind. In some embodiments, the one or more cell capture agents is an antigen-presenting cell expressing the antigen of interest or presenting antigen in an MHC complex on the surface thereof. In some embodiments, the one or more cell capture agents binds to a label present on a surface of the CAR- or TCR-expressing cell. For example, the cell capture agent may be biotin and the CAR- or TCR-expressing cell may be coated or labeled with streptavidin. In another non-limiting example, the cell capture agent may be streptavidin and the CAR- or TCR-expressing cell may be coated or labeled with biotin. In some embodiments, the one or more cell capture agents is an antibody or fragment thereof that binds to a protein expressed on a surface of the antigen presenting cell. In some embodiments, the one or more cell capture agents binds to a label present on a surface of the antigen presenting cell. For example, the cell capture agent may be biotin and the antigen presenting cell may be coated or labeled with streptavidin. In another non-limiting example, the cell capture agent may be streptavidin and the antigen presenting cell may be coated or labeled with biotin. In another non-limiting example, the nanovial may be coated with cell adhesion peptides (e.g., RGD), or the nanovial may be coated with extracellular matrix proteins that the antigen presenting cell may bind to. In some embodiments, the one or more cell capture agents comprise ssDNA and the antigen presenting cell may be coated or labeled with complementary ssDNA that hybridizes with the cell capture agent.

Optionally, the method may further comprise encapsulating the nanovial or blocking the opening of the nanovial cavity. In some embodiments, the methods may involve adding one or more blocking particles to block or reduce a size of the opening of the nanovial cavity (e.g., FIG. 17 (120, 122)). In some instances, the nanovial(s) used in the affinity assay method may be emulsified in oil. In some cases, the nanovial(s) may be encapsulated within a droplet. In some cases, the nanovial may comprise a cavity with a small opening 118. Alternatively, the nanovial may not be encapsulated.

In various aspects, the method may further comprise incubating the nanovial such that one or more cytokines is secreted from the CAR- or TCR-expressing cell and binds to the affinity agent. Any suitable conditions for incubating the nanovial may be used, including any temperature, time, media, buffer conditions, and the like. Generally, the incubating involves incubating under conditions such that the CAR- or TCR-expressing cell remains viable for a period of time sufficient to produce and secrete cytokines into the cavity of the nanovial. In some cases, incubating may comprise incubating the CAR- or TCR-expressing cell for a period of time. In some instances, the period of time may comprise at least 30 minutes (e.g., at least 45 minutes, at least 1 hour, at least 1.5 hours, at least 2 hours, at least 4 hours, at least 6 hours, etc.). In some cases, the period of time may comprise at most 24 hours.

In various aspects, the method may further comprise transferring the emulsified nanovial(s) to a water phase, thereby removing the emulsified oil coating. In some cases, the water phase nanovials may then be washed prior to adding a detection agent to the cavity of the nanovial. In other embodiments using blocking particles, the method may further comprise removing excess blocking particles by washing, straining, physical breakage, chemical breakage, buoyancy, magnetic force, or any combination thereof.

In various aspects, the methods further comprise adding a detection agent to the cavity of the nanovial such that the detection agent binds to the one or more cytokines. In some cases, the detection agent may comprise an antibody or fragment thereof specific to the one or more cytokines. In some cases, the detection agent may be directly or indirectly labeled with a detectable label. The detectable label may comprise a fluorescent label, a protein affinity tag, an oligonucleotide tag, a magnetic particle, or any combination thereof.

In various aspects, the methods further comprise detecting one or more signals related to binding of the detection agent to the one or more cytokines. In some cases, the detecting comprises determining an amount of detection agent bound to the one or more cytokines. In one aspect, the detection agent comprises a fluorescence label and the method comprises detecting a level of fluorescence, wherein the amount of detection agent bound to the one or more cytokine is correlated with the level of fluorescence. In another aspect, the detection agent comprises an oligonucleotide label. In this example, the method may further comprise sequencing the oligonucleotide label. In some cases, the detecting comprises counting the number of oligonucleotide tags bound to the one or more cytokine.

In some embodiments, the methods further comprise sorting the nanovial based on the one or more signals related to binding of the detection agent to the one or more cytokine. In some cases, the methods comprise sorting the nanovial based on a level of fluorescence (e.g., above a background level) or fluorescence intensity within a gate. The sorting may be any method of sorting typically used to sort particles, droplets, and/or cells based on a fluorescence signal. In a non-limiting example, the sorting is a flow-based sorting method (e.g., FACS). In some cases, when the detection agent includes a magnetic particle label, the samples are sorted using magnetic force or magnetic activated cell sorting (e.g., MACS).

In various aspects, the methods further comprise performing a sequencing assay on nucleic acids derived from the CAR- or TCR-expressing cell, thereby generating a sequence of the CAR or TCR. In some cases, the methods involve obtaining or having obtained a sorted nanovial or a plurality of sorted nanovials (e.g., after any of the above methods have been performed) and performing a sequencing assay on nucleic acids derived from the CAR- or TCR-expressing cell (e.g., as described herein). The methods may further comprise obtaining or having obtained data or a data output related to any of the above methods such that the data can be associated with the downstream sequencing data. Any known sequencing technique may be suitable to use in the methods provided herein. For example, sequencing may involve Sanger sequencing, next-generation sequencing, third generation sequencing (e.g., long read sequencing), single-cell sequencing (e.g., single-cell mRNA sequencing), and the like.

In one aspect, the method comprises, prior to sequencing, lysing the CAR- or TCR-expressing cell. In another aspect, the method comprises, prior to sequencing, obtaining or having obtained a lysate of a CAR- or TCR-expressing cell (e.g., after the nanovial has been sorted based on one or more signals associated with the cytokine secretion assay). In some instances, the method further comprises reverse transcribing mRNA released from the CAR- or TCR-expressing cell to generate cDNA, and then sequencing the cDNA.

In various aspects, the methods may further involve washing the nanovial. Any suitable wash method may be used, including any suitable wash solution or buffer.

In various aspects, the methods further comprise associating the sequence of the CAR or TCR with the one or more signals related to the binding of the detection agent to the one or more cytokines. The associating may involve associating one or more barcodes or labels associated with the first assay (cytokine secretion assay) with one or more barcodes or labels associated with the second assay (e.g., sequencing assay). In some embodiments, the associating comprises linking the CAR or TCR sequence from the CAR and TCR-expressing cell to the count of sequences of the one or more oligonucleotide labels associated with the detection agent based on a shared oligonucleotide barcode. The shared oligonucleotide barcode may comprise one or more unique oligonucleotide tags associated with the nanovial. The methods may further comprise identifying the CAR- or TCR—that functionally interacts with the antigen of interest based on the associating.

In some embodiments, the methods involve performing any of the above methods on a plurality of nanovials, each nanovial comprising a CAR- or TCR-expressing cell. In some instances, each nanovial comprises a CAR- or TCR-expressing cell, each producing a different CAR or TCR. In such methods, a plurality of nanovials can be screened to identify functional CARs or TCRs to an antigen of interest. In other instances, each nanovial comprises an antigen-presenting or antigen-producing cell, each expressing a different antigen, and a CAR- or TCR-expressing cell producing the same CAR or TCR. In such methods, the plurality of nanovials can be screened to identify antigens (antigen sequences) functionally targeted by the CAR or TCR. The plurality of nanovials may include, without limitation, at least 20,000, at least 30,000, at least 40,000, at least 50,000, at least 60,000, at least 70,000, at least 80,000, at least 90,000, at least 100,000, or more nanovials.

Drug or Compound Modulating a Signaling Pathway Assay

Figure 19A:
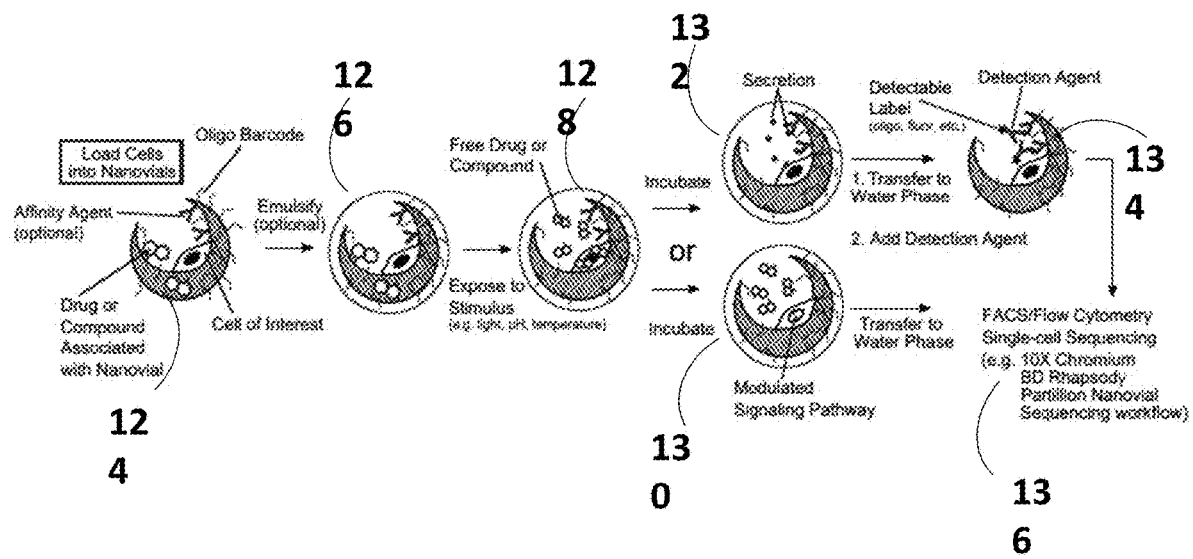
FIGS. 19A and 19B depict a non-limiting example of a screening assay workflow using DNA encoded libraries, according to various aspects of the disclosure.

Provided herein are methods for identifying a drug or compound that modulates a signaling pathway in a cell of interest, for example, as depicted in FIG. 19A. In some embodiments, methods of using nanovials for discovery of drugs that modulate a target signaling pathway or expression level of a target protein in a target cell of interest are disclosed herein.

In some aspects, the method may comprise providing or obtaining (or having obtained) a nanovial comprising a cavity formed therein. In some instances, the nanovial may comprise an opening to the surface of the nanovial. The nanovial may be any nanovial described herein. In some instances, the cavity of the nanovial comprises (i) a drug or a compound; and (ii) a barcode or a label associated with the drug or the compound. The drug or compound may include: a small molecule, a peptide, a protein, an aptamer, an antibody, a guide RNA, a short hairpin RNA, an siRNA, and the like. In a non-limiting example, the barcode or label associated with the drug or the compound is a unique oligonucleotide barcode comprising a drug barcode sequence, and the drug or compound is associated with the unique oligonucleotide barcode. In such cases, the barcode or label can be determined thereby identifying the drug or compound with which the barcode or label is associated. In some instances, the unique oligonucleotide barcode contains a poly-A region (e.g., a 30-mer poly-A region) to enable capture by poly-T capture regions. In other instances, the unique oligonucleotide barcode contains a poly-T capture region to capture mRNA from the cell of interest. In some aspects, a plurality of nanovials are provided, each nanovial containing a different drug or compound, combination of two or more drugs or compounds, or a unique amount of one or more drugs or compounds, and a unique oligonucleotide barcode (e.g., drug barcode sequence) or label associated with the drug or compound, the combination of two or more drugs or compounds, or the unique amount of one or more drugs or compounds. In some cases, the drug or compound is linked to the nanovial, e.g., by the use of a linker. In some cases, the linker is a photocleavable linker such that when the nanovial is exposed to light (e.g., UV light), the photocleavable linker is cleaved and the drug/compound is released into the cavity of the nanovial. In other cases, the linker is a linker cleavable by temperature, pH, a chemical, and the like. The methods may be used to, e.g., screen a library of drugs/compounds (e.g., a DNA-encoded library).

In various aspects, the methods further comprise loading a cell of interest into the cavity of the nanovial 124. The cell of interest may be immobilized to the surface of the nanovial cavity. In some cases, the nanovial obtained or provided does not have the cell of interest immobilized thereon and the method involves attaching or immobilizing the cell of interest to the surface of the nanovial cavity. The cell of interest may be loaded into the cavity of the nanovial at a concentration such that, on average, at least cell of interest is loaded into the cavity of the nanovial (e.g., at least one, at least two, at least three, at least four, at least five, or more).

The surface of the nanovial may be coated with cell capture moieties that capture and immobilize the cell of interest to the surface of the nanovial. For example, the surface of the nanovial may be coated with antibodies or fragments thereof that interact with proteins expressed on the surface of the cell of interest, or the nanovial may be coated with cell adhesion peptides (e.g., RGD), or the nanovial may be coated with extracellular matrix proteins.

Generally, in these embodiments, the cell of interest is a living cell (such that modulation of signaling pathways can be assessed). The cell of interest can be a prokaryotic cell or a eukaryotic cell. The cell of interest can be a bacterial cell, a yeast cell, a fungal cell, an insect cell, a mammalian cell. In some cases, the cell of interest is engineered to express one or more detectable labels upon modulation of the signaling pathway of interest. For example, the cell of interest may be genetically engineered to express a fluorescent reporter protein (e.g., GFP, EGFP, RFP, a fluorescent reporter protein that is sensitive to intracellular calcium concentrations (e.g., GCaMP (or GCaMP co-expressed with a fluorescent protein (e.g., mCherry) for ratiometric measurements of calcium concentration).

Optionally, the method may further comprise encapsulating the nanovial or blocking the opening of the nanovial cavity. In some embodiments, the methods may involve adding one or more blocking particles to block or reduce a size of the opening of the nanovial cavity (e.g., FIG. 17 (120, 122)). In some instances, the nanovial(s) may be emulsified in oil (126). In some cases, the nanovial(s) may be encapsulated within a droplet (126). In some cases, the nanovial may comprise a cavity with a small opening 118. Alternatively, the nanovial may not be encapsulated.

The methods may further comprise exposing the nanovial to a stimulus to release the drug or the compound into a fluid volume within the nanovial cavity such that the drug or the compound interacts with the cell of interest. The stimulus may be, e.g., a pH change, a temperature change, addition of a chemical, exposure to light (e.g., UV light), and the like. It should be understood that the stimulus used to release the drug or compound into the cavity of the nanovial is selected based on the type of cleavable linker used to attach the drug or compound to the nanovial.

In various aspects, the method may further comprise incubating the nanovial such that the drug or the compound modulates the signaling pathway of interest in the cell of interest (132, 130). In some instances, the modulation of the signaling pathway of interest comprises activation of the signaling pathway of interest. In other instances, the modulation of the signaling pathway of interest comprises inhibition of the signaling pathway of interest.

Any suitable conditions for incubating the nanovial may be used, including any temperature, time, media, buffer conditions, and the like. Generally, the incubating involves incubating under conditions such that the cell of interest remains viable for a period of time sufficient for modulation of a signaling pathway or gene expression changes to occur. In some cases, incubating may comprise incubating the cell of interest for a period of time. In some instances, the period of time may comprise at least 30 minutes (e.g., at least 45 minutes, at least 1 hour, at least 1.5 hours, at least 2 hours, at least 2.5 hour, at least 3 hours, etc.). In some cases, the period of time may comprise greater than 3 hours (e.g., greater than 3 hours, greater than 5 hours, greater than 10 hours, greater than 15 hours, greater than 20 hours, or more). In some cases, the period of time is at most 24 hours.

In various aspects, the method may further comprise transferring the emulsified nanovial(s) to a water phase, thereby removing the emulsified oil coating. In some cases, the water phase nanovials may then be washed prior to adding a detection agent to the cavity of the nanovial. In other embodiments where blocking particles are used, the method may further comprise removing excess blocking particles by washing, straining, physical breakage, chemical breakage, buoyancy, magnetic force, or any combination thereof.

In various aspects, the methods further comprise detecting one or more signals related to the modulation of the signaling pathway of interest. In some embodiments, the methods comprise detecting a level of fluorescence in the nanovial, wherein the level of fluorescence corresponds to modulation of the signaling pathway of interest. For example, the activity of the drug or compound on the downstream signaling pathway may be assessed by the production of fluorescent protein (e.g., green fluorescent protein, cyan fluorescent protein, red fluorescent protein, etc.) in the cell of interest (also called a reporter cell) or the fluorescence levels of the calcium concentration-dependent fluorescent reporter protein in the reporter cell. In some embodiments, the methods comprise detecting a change in one or more mRNA levels in the cell of interest. In some embodiments, the detecting comprises performing single cell RNA sequencing on nucleic acids derived from the cell of interest.

In some embodiments, the methods further comprise sorting the nanovial based on the one or more signals related to the modulation of the signaling pathway of interest. In some cases, the methods comprise sorting the nanovial based on a level of fluorescence (e.g., above a background level) or a fluorescence intensity gate. The sorting may be any method of sorting typically used to sort particles, droplets, and/or cells based on a fluorescence signal. In a non-limiting example, the sorting is a flow-based sorting method (e.g., FACS). For example, nanovials containing cells of interest with specific fluorescence levels (e.g., above or below a cut-off) or ratios of fluorescence levels can be sorted using FACS.

In various aspects, the methods further comprise associating the barcode or the label with the one or more signals related to the modulation of the signaling pathway of interest. In some embodiments, the associating comprises linking mRNA levels in the cell of interest to the drug or the compound based on a shared oligonucleotide barcode.

In some embodiments, the associating comprises identifying sequence information from the unique oligonucleotide barcode associated with the drug or compound and the sequence information for mRNA expressed by the cell of interest and linking this sequence information. In other embodiments, the associating comprises identifying sequence information from the unique oligonucleotide barcode associated with the drug or compound and the fluorescent reporter signal expressed by the cell of interest and linking this information.

In various aspects, the methods may further comprise identifying the drug or the compound that modulates the signaling pathway of interest based on the associating. In one embodiment, the method comprises identifying drugs or compounds with significant effects on mRNA expressed by the cell of interest compared to a control cell or compared to a cell of interest without exposure to a drug or compound.

In various aspects, the methods further comprise performing a sequencing assay on nucleic acids derived from the cell of interest. The methods may further comprise sequencing the oligonucleotide barcode or label associated with the drug or compound. Any known sequencing technique may be suitable to use in the methods provided herein. For example, sequencing may involve Sanger sequencing, next-generation sequencing, third generation sequencing (e.g., long read sequencing), single-cell sequencing (e.g., single-cell mRNA sequencing), and the like.

In one aspect, the method comprises, prior to sequencing, lysing the cell of interest. In another aspect, the method comprises, prior to sequencing, obtaining or having obtained a lysate of the cell of interest (e.g., after the drug or compound has acted on the cell of interest). In some instances, the method further comprises reverse transcribing mRNA released from the cell of interest to generate cDNA, and then sequencing the cDNA.

In various aspects, the methods may further involve washing the nanovial. Any suitable wash method may be used, including any suitable wash solution or buffer.

In some embodiments, the methods involve performing any of the above methods on a plurality of nanovials, each nanovial comprising a different drug or compound associated with a barcode or label. In such methods, a plurality of different drugs or compounds can be screened for activity against the cell of interest. In some embodiments, each nanovial has the same drug or compound at different amounts with a barcode or label associated with the amount. In some embodiments, each nanovial has a combination of two or more drugs with varying amounts that are associated with a barcode or label. The plurality of nanovials may include, without limitation, at least 20,000, at least 30,000, at least 40,000, at least 50,000, at least 60,000, at least 70,000, at least 80,000, at least 90,000, at least 100,000, or more nanovials.

Figure 19B:
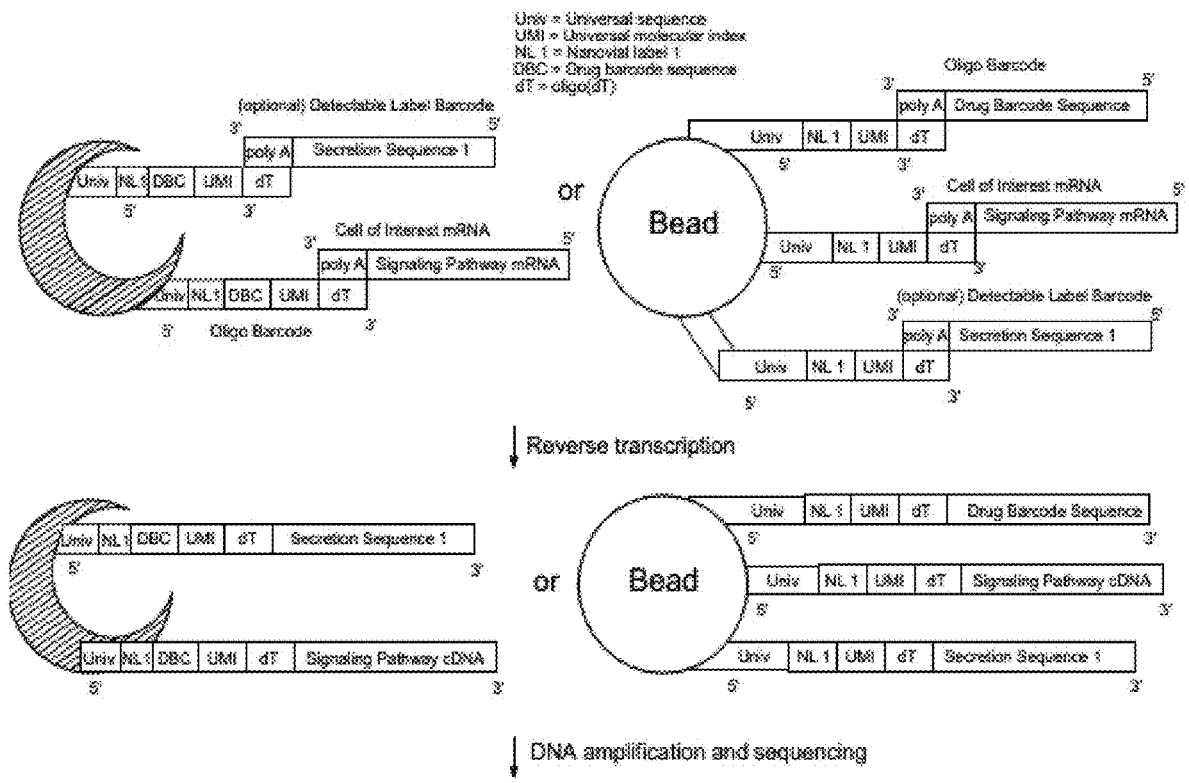

FIG. 19A depicts a non-limiting example of a drug or compound modulated signaling pathway assay workflow, as described herein. Nanovials are provided or obtained comprising a drug or compound with a unique barcode or label associated therewith 124. The drug or compound may be attached to the cavity of the nanovial, e.g., by the use of a cleavable linker (e.g., photocleavable linker) 124. Nanovials may further comprise a nanovial-associated barcode or label (e.g., oligo barcode) 124. A cell of interest may be seeded into the cavity of the nanovial 124. Optionally, the nanovial may be emulsified 126. Nanovials with loaded cells are exposed to a stimulus (e.g., UV light) to cleave the cleavable linker and release the drug or compound into the cavity of the nanovial 128. The nanovial is then incubated under suitable conditions (e.g., sufficient temperature, time, pH, etc.) such that the drug or compound acts on the cell of interest (e.g., to modulate a signaling pathway) and the cell of interest expresses a reporter protein or undergoes mRNA expression changes. The drug or compound may act on the cell of interest such that the signaling pathway is modulated 130. Additionally or alternatively, the drug or compound may act on the cell of interest such that the cell of interest secretes biomolecules into the cavity of the nanovial, which then may be captured on the nanovial with an affinity agent 132. In this embodiment, a detection agent may be added to detect one or more signals associated with binding of the secreted biomolecule to the affinity agent (e.g., as described throughout) 134. The nanovials may then be interrogated using any method provided herein, including flow-based sorting methods or sequencing methods 136. FIG. 19B depicts a non-limiting example of oligonucleotide barcodes that may be used in these embodiments, and the linking of information through sequencing of contiguous cDNA, following reverse transcription to cDNA resulting from captured on oligo (dT) sequences attached to nanovials or beads associated with nanovials. mRNA levels from the cell of interest and the drug or compound may be associated by the unique barcode associated with a drug (drug barcode sequence, DBC) as well as a nanovial label (NL1), that is part of a contiguous sequence in the cDNA produced. Alternatively, mRNA levels from the cell of interest and the drug or compound may be associated through a nanovial label (NL1) present on a bead associated with the nanovial in a compartment, leading to contiguous cDNA containing NL1 and the DBC and NL1 and the signaling pathway cRNA from the cell of interest. Secretions from the cell of interest may also be associated to a drug or compound by linking a unique oligo (secretion sequence) contiguously to the same DBC and/or NL1 sequences.

Buoyancy Enrichment of Nanovials

Figure 5:
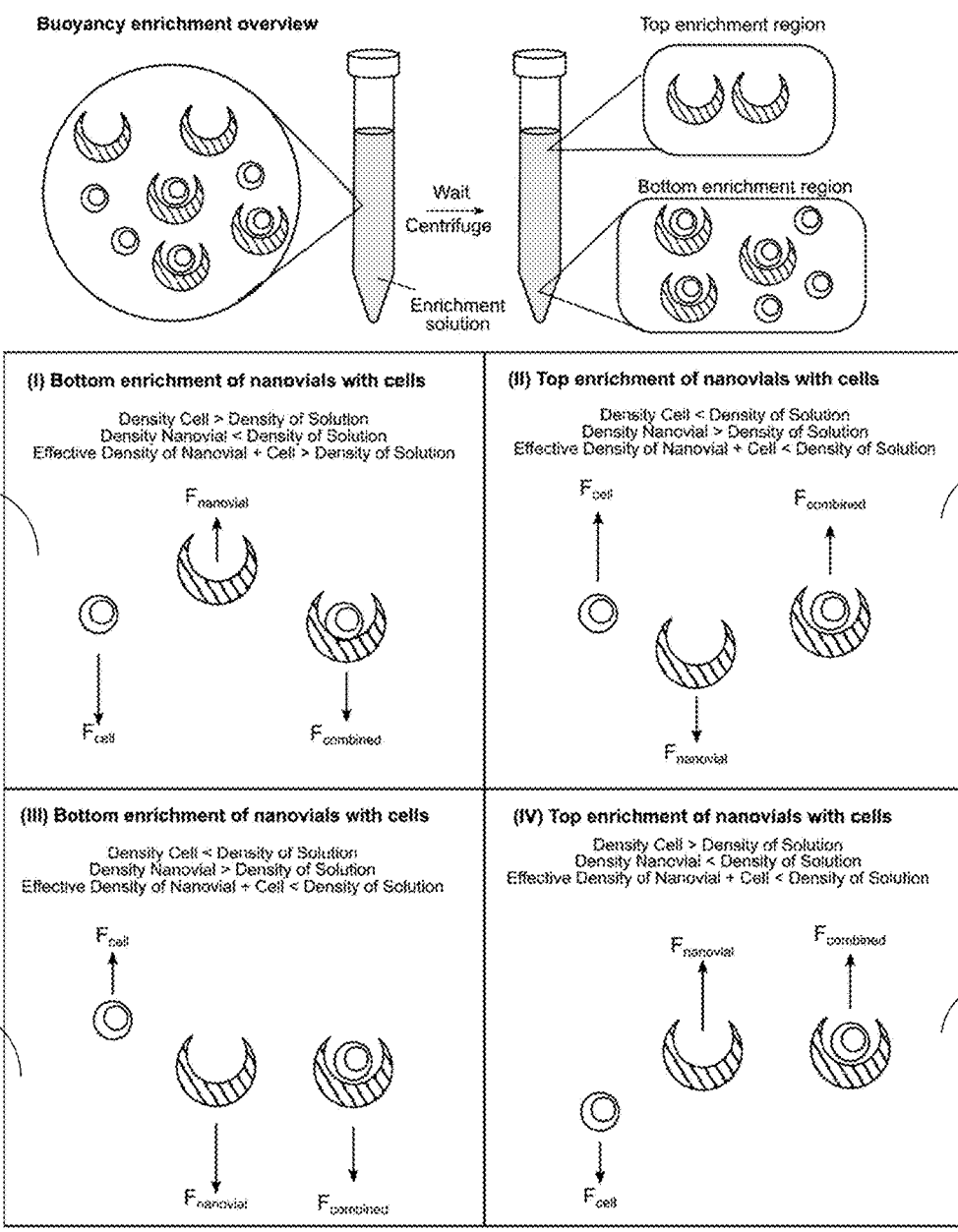
FIG. 5 depicts a schematic of buoyancy enrichment of nanovials with cells from free cells or empty nanovials, according to various aspects of the disclosure.

Provided herein are methods for enriching for nanovials comprising one or more cells, one or more beads, or both, for example, as depicted in FIG. 5. In some cases, the method may comprise one or more of the following steps: (a) providing or obtaining a mixture comprising a plurality of nanovials, each comprising at least one cell, at least one bead, or both, disposed within a cavity of the nanovial; and (i) a plurality of free-floating cells, free-floating beads, or both; (ii) a plurality of empty nanovials; or (iii) both (i) and (ii); (b) suspending the mixture in a solution; (c) adjusting a density of the solution such that the plurality of nanovials comprising at least one cell, at least one bead, or both, disposed within a cavity of the nanovial separate from the plurality of free-floating cells, free-floating beads, or both of (i), the plurality of empty nanovials of (ii), or both (i) and (ii); and (d) collecting the plurality of nanovials comprising at least one cell, at least one bead, or both disposed within a cavity of the nanovial.

In some embodiments, adjusting may comprise adjusting the density of solution such that the plurality of nanovials comprising at least one cell, at least one bead, or both, disposed within a cavity of the nanovial have a greater effective density than the density of the solution 10, 14. In some instances, the density of the solution may be adjusted such that the solution may comprise a density greater than the density of an empty nanovial 10. Alternatively, the density of solution may be adjusted such that the density of the solution may be less than the density of an empty nanovial 14. In some cases, adjusting may comprise adjusting the density of the solution such that the plurality of nanovials comprising at least one cell, at least one bead, or both, disposed within a cavity of the nanovial have a lower effective density than the density of the solution 12, 16. In some instances, the density of the solution may be adjusted such that the solution may comprise a density greater than the density of an empty nanovial 16. Alternatively, the density of solution may be adjusted such that the density of the solution may be less than the density of an empty nanovial 12. In some cases, the method of enriching for nanovials may comprise performing steps (a)-(d) one or more times to further enrich for the plurality of nanovials comprising at least one cell, at least one bead, or both, disposed within a cavity of the nanovial. In some instances, the density of the solution may comprise a different density for each round of steps (a)-(d). In some instances, the method of enriching for nanovials may further comprise prior to step (a), removing the plurality of free-floating cells, free-floating beads, or both of (i) or the plurality of empty nanovials of (ii).

The density of the solution may be adjusted using, e.g., biocompatible water soluble additives such as, but not limited to, Ficoll, Percoll, Optiprep, glycerol, PEG, Dextran, hyaluronic acid, and the like. Additionally or alternatively, the density of the cells may be adjusted, e.g., by adjusting the osmolarity of the solution. For example, use of a hypotonic solution (compared to normal physiological phosphate buffered saline) can swell cells to reduce their density. Additionally or alternatively, the density of the nanovials may be adjusted. For example, the density of the nanovials can be increased by increasing the concentration of PEG used in the precursor solution, increasing crosslinking density through use of lower molecular weight PEG molecules (e.g., 5 kD 4-arm PEG), embedding or attaching higher density microparticles or nanoparticles in the nanovial matrix or on the surface (e.g., $SiO_2$ microparticles/nanoparticles, iron oxide microparticles/nanoparticles, etc.). Likewise, the density of nanovials may be reduced, e.g., by reducing the concentration of PEG precursor solution, increasing the molecular weight of precursor polymers, embedding or attaching lower density micro/nanoparticles, (e.g., glass bubble particles used for buoyancy activated cell sorting). Cells attached to nanovials may also be labeled with particles such as glass, polymer, iron oxide, or metallic particles (e.g., 100 nm-~3 µm in diameter) comprising cell-specific affinity tags to modulate the effective density of nanovials containing cells compared to nanovials without cells. The effective density of nanovials relative to cells may be adjusted by using higher (or lower) density additives that can diffuse into the matrix of the nanovials while they are impermeable to the cell membrane.

FIG. 5 depicts a non-limiting example of buoyancy enrichment of nanovials, as provided herein. FIG. 5 outlines the general principle for enrichment of various cell and nanovial subpopulations utilizing density matching and buoyancy forces. In this example, an enrichment solution of defined molecular weight and density properties is added to a sample of nanovials, cells, and or nanovials with bound cells (top). By tuning the density of the nanovials and enrichment solution relative to the cells, nanovials with cells can be enriched relative to empty nanovials (10, 12). In other embodiments, nanovials with cells are enriched relative to free cells (14, 16). In other embodiments, multiple enrichment steps are performed sequentially to further enrich sub-populations of interest.

Methods for Enhanced Capture of Biomolecules in Nanovial Cavities

In some embodiments, the present disclosure provides a method of preventing biological agents from diffusing out of the cavity of a nanovial. In some cases, the method of preventing biological agents from diffusing out of the cavity of a nanovial may comprise the steps of: (a) providing or obtaining a nanovial comprising a cavity formed therein, the cavity comprising an opening to the surface of the nanovial, and one or more biological agents disposed within the cavity; and (b) adding a blocking particle such that the blocking particle interacts with the opening of the cavity and substantially blocks or reduces a size of the opening of the cavity, thereby preventing the biological agents from diffusing out of the cavity when the nanovials are disposed in fluid. In some cases, the method using blocking particles as described herein may be used as an alternative to an emulsion or encapsulation step, as described throughout.

In some embodiments, the maximum diameter of the blocking particle may comprise a larger diameter than the opening of the cavity of the nanovial. In some instances, the blocking particle may be spherical or substantially spherical in shape. In some embodiments, the blocking particle may be in contact with the opening of the cavity of the nanovial. In some cases, the blocking particle may surround the opening of the cavity of the nanovial. In some instances, the blocking particle may be sized to maintain greater than 50% of a volume of the cavity after step (b).

Blocking particles may have average diameters in the range of about 15 to about 100 micrometers depending on the size of the opening of the nanovial cavity. Blocking particles may have average diameters of at least about 15 µm, at least about 20 µm, at least about 25 µm, at least about 30 µm, at least about 35 µm, at least about 40 µm, at least about 45 µm, at least about 50 µm, at least about 55 µm, at least about 60 µm, at least about 65 µm, at least about 70 µm, at least about 75 µm, at least about 80 µm, at least about 85 µm, at least about 90 µm, at least about 95 µm, or at least about 100 µm. Blocking particles may have average diameters of at most about 15 µm, at most about 20 µm, at most about 25 µm, at most about 30 µm, at most about 35 µm, at most about 40 µm, at most about 45 µm, at most about 50 µm, at most about 55 µm, at most about 60 µm, at most about 65 µm, at most about 70 µm, at most about 75 µm, at most about 80 µm, at most about 85 µm, at most about 90 µm, at most about 95 µm, or at most about 100 µm. Blocking particles may have average diameters of about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm. In a preferred embodiment, blocking particles may comprise an average diameter from about 20 micrometers to about 50 micrometers.

In some embodiments, the blocking particle may comprise a polymer hydrogel. In some cases, the hydrogel may comprise polyethylene glycol (PEG). In some instances, the plurality of blocking particles may be comprised of a polymer selected from the group consisting of: PEG, polystyrene, poly-methylmethacrylate, glass, and metal.

In some embodiments, the blocking particles may have binding moieties for biomolecules released from cells contained within nanovials, e.g., to capture excess molecules and prevent crosstalk to neighboring nanovials. In some instances, the blocking particle may be coated with adhesive molecules that bind to the nanovial. In some instances, the blocking particle may be coated with one or more affinity agents. In some cases, the one or more affinity agents may comprise an antibody capture moiety. In some instances, the antibody capture moiety may be selected from the group consisting of an anti-IgG antibody, an anti-FC antibody or fragment thereof, Protein A, and Protein G. In some cases, the one or more affinity agents may comprise an antigen. In some instances, the one or more affinity agents may comprise a nucleic acid. In some cases, the nucleic acid may comprise an oligonucleotide tag or oligonucleotide barcode, as seen on the Bead in FIG. 12B and FIG. 19B.

In some embodiments, the blocking particle and/or the nanovial may comprise a mesh-like structure 122. In some cases, the mesh-like structure may comprise an average pore size. In some instances, the average pore size may be sized such that biological agents having a desired size are retained within the cavity and biological agents having a size smaller than the desired size are capable of diffusing through the blocking particle and/or nanovial. In some cases, the average pore size may be sized to allow transport of fluids and reagents into the cavity of the nanovial. In some instances, the fluids and reagents may be selected from the group consisting of staining agents, surfactants, detergents, lysis buffers, drugs, cytokines, chemokines, primers, polymerase, media, conditioned media, and buffers. In some cases, the average pore size may be sized to retain oligonucleotides, mRNA, proteins, or genomic DNA.

Figure 17:
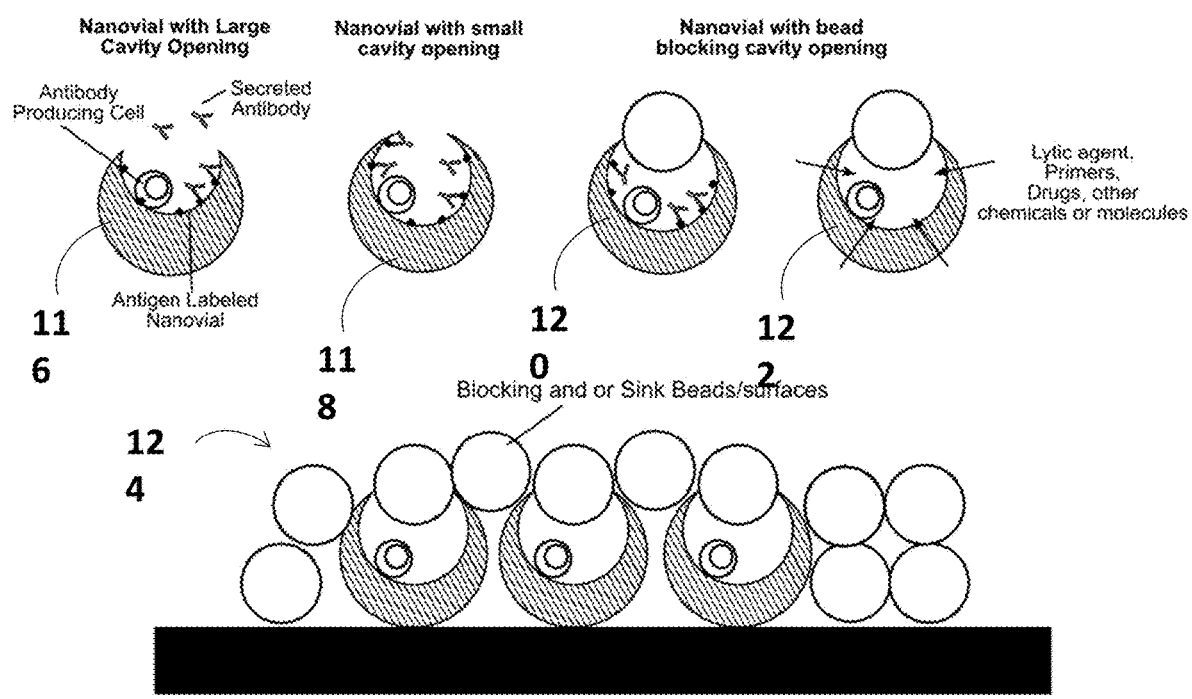
FIG. 17 depicts the use of beads or other blocking particles to reduce leakage or transport of molecules from nanovials, according to various aspects of the disclosure.

In some embodiments, step (b) may comprise adding a plurality of blocking particles 124 such that the plurality of blocking particles may interact with the opening of the cavity and substantially block or reduce the size of the opening of the cavity, as seen in FIG. 17. In some cases, each plurality of blocking particles may comprise an average diameter from about 2 micrometers to about 20 micrometers. In some instances, each of the plurality of blocking particles may comprise a density greater than that of saline at room temperature. In some cases, a number of blocking particles to nanovials may be greater than 100:1.

Methods of Using Nanovials with Numerous Instruments and Microfluidic Devices

In some embodiments, the present disclosure provides a nanovial having a size, a shape, a surface chemistry, and/or a density configured to be compatible with and used in a plurality of different types of instruments designed to analyze particles and/or cells. In some cases, the plurality of different types of instruments designed to analyze particles and/or cells may be selected from the group consisting of: flow cytometers, fluorescence activated cell sorters, imaging flow cytometers, image activated cell sorters, Coulter counters, particle counters, microwell arrays, microfluidic chips with microvalves, microfluidic SlipChips, optofluidic microdevices, microfluidic droplet generators, and microfluidic channels. In some instances, the size of nanovial may be less than about 100 µm in diameter (e.g., less than about 95 µm, less than about 80 µm, less than about 75 µm, less than about 70 µm, less than about 65 µm, or less). In some cases, the nanovial comprises capped reactive functional groups. In some cases, the size of the nanovial may be less than about 60 µm (e.g., less than about 55 µm, less than about 50 µm, less than about 45 µm, less than about 40 µm, or less). In some instances, the nanovial may be configured to be flowed through glass capillaries, cuvettes, and/or microfluidic channels. In some cases, the nanovial may be configured to be analyzed by optical, electrical, and/or magnetic excitation. In some cases, the size, surface chemistry, and/or buoyancy of the nanovial may be such that the nanovial can be rapidly flowed through an instrument without clogging or without substantial clogging. In some instances, the nanovial may be flowed through an instrument at great than 10 cm/sec, or greater than 1 m/sec, without clogging or without substantial clogging. In some cases, the nanovial may be configured to be flowed through a channel having a diameter of greater than 90 µm. In some embodiments, the nanovial is configured to be used with a first instrument designed to analyze particles and/or cells and subsequently a second instrument designed to analyze particles and/or cells. In some embodiments, the nanovial is configured to be sorted by a fluorescence activated cell sorter, image activated cell sorter, or optofluidic microdevice, and subsequently introduced into a microfluidic droplet generator.

Nanovials

Provided herein are nanovials for the use in any of the methods and systems described herein. The term "nanovial" as used herein generally refers to microscale particles with cavities or voids that can be used to hold cells and molecules. The void or cavity interfaces, communicates with, or opens to the outer surface of the nanovial. As explained herein, the void or cavity may be formed as a subtracted void or cavity that takes the shape of a sphere, creating a final nanovial with a crescent-shaped cross-section such as that illustrated in any one of FIG. 5, FIG. 6B, FIG. 8, FIG. 9, FIG. 10, FIG. 11, FIG. 12A, FIG. 12B, FIG. 14A, FIG. 14B, FIG. 15A, FIG. 16A, FIG. 16B, FIG. 16C, FIG. 16D, FIG. 17, or FIG. 19A. The inscribed void or cavity intersects the spherical or elliptical envelope at its surface in order to create a pathway for fluid filling (and also access for cells, beads, and other micro-objects). In one preferred aspect, the void or cavity intersects the spherical or elliptical envelope at a narrow opening (e.g., a low fraction of the actual surface area of the spherical or elliptical envelope of the nanovial). In some embodiments, this fractional area defined by the opening is <33% of the overall spherical/elliptical envelope or surface area of the nanovial, in others <10%, and in further embodiments, the fractional area is <5%. In some embodiments, the surface of the nanovials may be decorated with one or more reactive or binding moieties to associate affinity agents, capture agents, nucleic acids, peptides, proteins, fluorophores, labels, barcodes, particles, cells, and the like. For example, reactive or binding moieties may be formed on the surface of the nanovials within the void or cavity. Binding or reactive moieties may include, by way of example, nucleic acids, peptides, cell adhesion peptides, catalysts, enzymes, antibodies, primers, antigens, aptamers, fluorophores, biotin, or biotin/streptavidin complexes. Orthogonal reactive chemistries known to those skilled in the art may also be used for conjugation of reactive or binding moieties to nanovials. Fabrication of nanovials may follow procedures and use microfluidic device designs described previously, for example shown in WO2020037214A1, the disclosure of which is incorporated herein by reference in its entirety. Nanovials may also be referred to as drop-carrier particles, as disclosed in WO2020037214A1. To manufacture the nanovials, a microfluidic droplet generator device is used to form a monodisperse emulsion in an oil phase whereby the internal dispersed phase comprises an aqueous two-phase system. One part of the aqueous two-phase system is a crosslinkable hydrogel precursor such as poly(ethylene glycol) (PEG) or a derivative thereof. The other part of the aqueous two-phase system is a polymer such as dextran or gelatin. The two phases of the aqueous two-phase system then separates into distinct regions within the formed droplets. Then, one component of the two-phase system (namely, a crosslinkable component) is crosslinked to form the nanovial. FIG. 1 and FIG. 2 shows the phase-separated droplets prior to crosslinking and the formed nanovials after crosslinking with UV light with varying settings of power/intensity and washing for 40 micrometer diameter and 60 micrometer diameter nanovials, respectively. In a preferred embodiment, the aqueous two-phase system includes PEG or a PEG-derivative (e.g., 10 kDa 4-arm PEG-norbomene) which is the crosslinkable component (using a crosslinker) and dextran (e.g., 40 kDa) which is not crosslinked. The microfluidic droplet generator device is used to generate an emulsion of the aqueous two-phase system within an oil phase. The droplet that contains the two aqueous phase components (e.g., PEG and dextran) separate after droplet formation in a phase separation operation. After phase separation, the PEG or PEG-derivative component is crosslinked into a gel. For example, a crosslinker such as diothiothreitol (DTT) in the presence of a photoinitiator (e.g., Irgacure® 2959, LAP, etc.) within the PEG or PEG-derivative component is then subject to light exposure (e.g., UV excitation) to initiate crosslinking. Of course, other crosslinkers such as cysteine containing peptides or other dithiols or multi-arm crosslinkers may also be used. In related embodiments, either the PEG and/or polymer phases can contain a combination of one or both the photoinitiator and crosslinker. Nanovials may be modified to comprise biotin, carboxylic acids, amines, oligonucleotides and other functional groups known in the art for covalent bioconjugation reactions or non-covalent association reactions through the addition of e.g., biotin-PEG-thiol, carboxylic acid-PEG-thiol, amine-PEG-thiol, oligonucleotide-thiol, and the like during the fabrication process. A PEG linked to the functional group may be used to increase the accessibility of the functional group on the nanovial surface. Nanovials can then be conjugated with further chemistry, e.g., through binding of streptavidin to biotin conjugated nanovials. This may aid in visualizing nanovials fluorescently (FIG. 3) and/or to bind affinity agents or cell capture agents as described herein. After crosslinking the nanovials can be washed to remove the oil phase and the dextran phases. In some embodiments, nanovials comprise a cross-linked hydrogel. The cross-linked hydrogel may be a PEG-based cross-linked hydrogel. In some embodiments, the cavity of the nanovial comprises an aqueous fluid disposed therein. In some embodiments, the nanovial is suspended in an oil phase. In some embodiments, the cavity of the nanovial has a volume from about 100 fL to about 10 nL. In some embodiments, the cavity of the nanovial has a length dimension from about 5 μm to about 250 μm. As explained herein, in embodiments making use of nanovials with aqueous solution suspended in an oil phase (e.g., emulsified), the formation of emulsions containing nanovials is achieved by combining a suspension of nanovials in an aqueous phase with oil (and optional surfactant) and mixing (e.g., by vortexing, pipetting, etc.) as shown in WO2020037214A1. Agitation and fluid dynamic shearing from mixing generate the emulsions of decreasing size. After continued agitation, nanovials contained within the droplets act as a size restraint that prevents further shrinking of the droplet. Both pipetting and vortexing may be used to encapsulate nanovials in an oil phase. Using mixing by pipetting and/or vortexing one can achieve uniform emulsions of nanovials along with smaller satellite droplets containing no nanovials. In one embodiment of a uniform nanovial emulsion substantially all of the nanovial-containing drops (e.g., >95%, >99%, or >99.9%) are each associated with a single nanovial. Due to their unique size range, nanovials can easily filtered from the surrounding smaller satellite drops (e.g., background droplets generated during emulsification) using standard filtration techniques.

Systems

In some embodiments, aspects of the disclosure provide systems and software for nanovial analysis and sorting. In some cases, the systems and software may comprise integrated instruments (e.g., flow cytometers, fluorescence activated cell sorters, or any combination thereof) that may analyze and sort nanovials. In some cases, the systems may comprise scanners or readers to read and analyze barcode or QR codes present on vessels or packages of nanovials. In some cases, the barcode or QR code may comprise information relating to the nanovials size, shape, material, density, or any combination thereof. In some instances, the barcode or QR code may provide settings for the integrated instrument (e.g., flow cytometer, fluorescence activated cell sorter, or any combination thereof) to optimize analysis of the nanovials. In some embodiments, the scanner or reader that may read and analyze barcodes or QR codes may comprise a smart phone. In some cases, the smart phone may comprise an app that may be in radiofrequency, Bluetooth, WiFi, or any combination thereof communication with the integrated instrument.

In some embodiments, the integrated instrument may comprise machine readable instructions, or software, contain on a physical or cloud-based memory or server of the integrated instrument. The software may comprise machine readable instructions configured to perform an analysis specific to the nanovial assay obtained from scanning a barcode or QR code previously described herein. In some cases, the software may provide machine executable instructions to perform automatic gating of nanovial events. The software may comprise machine executable instructions to perform automatic gating of nanovials containing cells based on scatter and fluorescence intensity data. The software may analyze and produce graphical interpretations of the nanovial gathered data in the form of histogram and/or dimensionally reduced plots (e.g., visualization of t-distributed stochastic neighbor embedding, ViSNE plots, or any combination thereof).

In some embodiments, the integrated instrument may be connected to the internet or network. In some instances, the software may upload nanovial analysis data to a server in the cloud or may retrieve data from a server in the cloud. In some cases, the software may conduct off-line computations in the cloud (e.g., cloud computing). In some cases, the integrated instrument may connect to a server and update instrument settings on the fly. In some cases, one or more users may upload instrument settings to the cloud that may be accessed over the internet by one or more users conducting analysis of nanovials. In some instances, the network connected integrated instrument may report geo-position or other location based on network information where a barcode or QR code is being scanned and store the information in a de-identified manner on the local or cloud-based server.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used in the specification and claims, the singular forms "a", "an" and "the" include plural references unless the context clearly dictates otherwise. For example, the term "a sample" includes a plurality of samples, including mixtures thereof.

The terms "determining," "measuring," "evaluating," "assessing," "assaying," and "analyzing" are often used interchangeably herein to refer to forms of measurement. The terms include determining if an element is present or not (for example, detection). These terms can include quantitative, qualitative or quantitative and qualitative determinations. Assessing can be relative or absolute. "Detecting the presence of" can include determining the amount of something present in addition to determining whether it is present or absent depending on the context.

The terms "subject," "individual," or "patient" are often used interchangeably herein. A "subject" can be a biological entity containing expressed genetic materials. The biological entity can be a plant, animal, or microorganism, including, for example, bacteria, viruses, fungi, and protozoa. The subject can be tissues, cells and their progeny of a biological entity obtained in vivo or cultured in vitro. The subject can be a mammal. The mammal can be a human. The subject may be diagnosed or suspected of being at high risk for a disease. In some cases, the subject is not necessarily diagnosed or suspected of being at high risk for the disease.

The term "antibody" is used herein describes various immunoglobulin classes that are naturally occurring as well as engineered immunoglobulins or immunoglobulin fragments, such as bi-specific antibodies, BiTE antibodies, DARTs, Fab fragments, minibodies, nanobodies, multivalent nanobodies, half-life extended nanobodies, scFv, heavy chain antibody, affibody, and the like. The term "antibody" refers to immunoglobulins and engineered immunoglobulins from humans, mice, llama, rabbits, goats, rats, chicken, monkey, donkey, and the like, as well as from humanized mice or other species.

The term "ex vivo" is used to describe an event that takes place outside of a subject's body. An ex vivo assay is not performed on a subject. Rather, it is performed upon a sample separate from a subject. An example of an ex vivo assay performed on a sample is an "in vitro" assay.

The term "in vitro" is used to describe an event that takes places contained in a container for holding laboratory reagent such that it is separated from the biological source from which the material is obtained. In vitro assays can encompass cell-based assays in which living or dead cells are employed. In vitro assays can also encompass a cell-free assay in which no intact cells are employed.

As used herein, the term "about" a number refers to that number plus or minus 10% of that number. The term "about" a range refers to that range minus 10% of its lowest value and plus 10% of its greatest value.

Use of absolute or sequential terms, for example, "will," "will not," "shall," "shall not," "must," "must not," "first," "initially," "next," "subsequently," "before," "after," "lastly," and "finally," are not meant to limit scope of the present embodiments disclosed herein but as exemplary.

Any systems, methods, software, compositions, and platforms described herein are modular and not limited to sequential steps. Accordingly, terms such as "first" and "second" do not necessarily imply priority, order of importance, or order of acts.

The section headings used herein are for organizational purposes only and are not to be construed as limiting the subject matter described.

Numbered Embodiments

The following embodiments recite nonlimiting permutations of combinations of features disclosed herein. Other permutations of combinations of features are also contemplated. In particular, each of these numbered embodiments is contemplated as depending from or relating to every previous or subsequent numbered embodiment, independent of their order as listed.

Embodiment 1: A method of identifying an antibody or fragment thereof that binds to an antigen of interest, the method comprising: (a) providing or obtaining a nanovial comprising a cavity formed therein and an affinity agent immobilized thereto; (b) loading an antibody-producing cell into the cavity of the nanovial; (c) incubating the nanovial such that one or more antibody or fragment thereof is secreted from the antibody-producing cell and binds to the affinity agent; (d) adding a detection agent to the cavity of the nanovial such that the detection agent binds to the one or more antibody or fragment thereof; (e) detecting one or more signals related to binding of the detection agent to the one or more antibody or fragment thereof; (f) performing a sequencing assay on nucleic acids derived from the antibody-producing cell, thereby generating a sequence of the one or more antibody or fragment thereof; (g) associating the sequence of the one or more antibody or fragment thereof with the one or more signals related to the binding of the detection agent to the one or more antibody or fragment thereof; and (h) identifying the one or more antibody or fragment thereof that binds to the antigen of interest based on the associating of (g).

Embodiment 2: The method of embodiment 1, further comprising, prior to (f), sorting the nanovial based on the one or more signals related to binding of the detection agent to the antibody.

Embodiment 3: The method of embodiment 1 or 2, wherein the cavity of the nanovial further comprises one or more cell capture agents immobilized thereto.

Embodiment 4: The method of embodiment 3, wherein the one or more cell capture agents comprises an antibody or fragment thereof that binds to a protein expressed on a surface of the antibody-producing cell.

Embodiment 5: The method of embodiment 3, wherein the one or more cell capture agents binds to a label present on a surface of the antibody-producing cell.

Embodiment 6: The method of embodiment 5, wherein the label is streptavidin or biotin.

Embodiment 7: The method of embodiment 3, wherein the one or more cell capture agents is an antigen to which the antibody-producing cell can bind.

Embodiment 8: The method of any one of embodiments 1-7, wherein the affinity agent is an antibody capture moiety.

Embodiment 9: The method of embodiment 8, wherein the antibody capture moiety is selected from the group consisting of: an anti-IgG antibody or fragment thereof, anti-Fc antibody or fragment thereof, Protein A, and Protein G.

Embodiment 10: The method of any one of embodiments 1-7, wherein the affinity agent is the antigen of interest.

Embodiment 11: The method of any one of embodiments 1-10, wherein the affinity agent is an antigen-presenting cell expressing the antigen of interest on a surface thereof.

Embodiment 12: The method of any one of embodiments 1-11, wherein the detection agent is the antigen of interest.

Embodiment 13: The method of any one of embodiments 1-12, wherein the detection agent is an antibody or fragment thereof.

Embodiment 14: The method of any one of embodiments 1-13, wherein the detection agent is directly or indirectly labeled with a detectable label.

Embodiment 15: The method of embodiment 14, wherein the detectable label is selected from the group consisting of: a fluorescent label, a protein affinity tag, an oligonucleotide tag, and a magnetic particle.

Embodiment 16: The method of embodiment 15, wherein the detectable label is a fluorescent label.

Embodiment 17: The method of embodiment 16, wherein the detecting of (e) comprises determining an amount of detection agent bound to the one or more antibody or fragment thereof.

Embodiment 18: The method of embodiment 17, wherein the amount of detection agent bound to the one or more antibody or fragment thereof corresponds to a level of fluorescence.

Embodiment 19: The method of any one of embodiments 16-18, further comprising, prior to (f), sorting the nanovial based on a level of fluorescence above a background level.

Embodiment 20: The method of embodiment 19, wherein the sorting comprises performing a flow-based sorting method.

Embodiment 21: The method of embodiment 20, wherein the flow-based sorting method is fluorescence-activated cell sorting (FACS).

Embodiment 22: The method of embodiment 15, wherein the detectable label is an oligonucleotide tag.

Embodiment 23: The method of embodiment 22, further comprising, sequencing the oligonucleotide tag.

Embodiment 24: The method of embodiment 23, wherein the detecting of (e) comprises counting the number of oligonucleotide tags bound to the one or more antibody or fragment thereof.

Embodiment 25: The method of any one of embodiments 1-24, further comprising, prior to (f), lysing the antibody-producing cell.

Embodiment 26: The method of embodiment 25, further comprising, after the lysing, reverse transcribing mRNA released from the antibody-producing cell to generate cDNA.

Embodiment 27: The method of embodiment 26, further comprising, sequencing the CDNA.

Embodiment 28: The method of any one of embodiments 1-27, wherein the sequencing assay comprises single cell RNA sequencing.

Embodiment 29: The method of any one of embodiments 1-28, further comprising, prior to (c), encapsulating the nanovial within a droplet.

Embodiment 30: The method of any one of embodiments 1-28, wherein the cavity of the nanovial comprises an opening to the surface of the nanovial.

Embodiment 31: The method of embodiment 30, further comprising, prior to (c), adding one or more blocking particles to block or reduce a size of the opening.

Embodiment 32: The method of any one of embodiments 1-31, further comprising, prior to (d), washing the nanovial.

Embodiment 33: The method of any one of embodiments 1-32, wherein the method is configured to identify one or more antibody or fragment thereof having a desired dissociation constant ($K_D$) for the antigen of interest.

Embodiment 34: The method of embodiment 33, wherein the one or more antibody or fragment thereof has a desired $K_D$ for the antigen of interest of less than about 1 µM, less than about 100 nM, less than about 10 nM, or less than about 1 nM.

Embodiment 35: The method of embodiment 33 or 34, further comprising: adding the detection agent to a plurality of nanovials at one or more different concentrations.

Embodiment 36: The method of embodiment 35, wherein the one or more different concentrations are within 1 order of magnitude of the desired $K_D$.

Embodiment 37: The method of any one of embodiments 1-32, wherein the method is configured to identify one or more antibody or fragment thereof having a desired specificity for the antigen of interest.

Embodiment 38: The method of embodiment 37, further comprising adding a plurality of different detection agents to a plurality of nanovials, wherein in at least one of the different detection agents have a detectable label.

Embodiment 39: The method of embodiment 38, further comprising identifying one or more antibody or fragment thereof that specifically binds to one of the different detection agents based on a measurement of the detectable label.

Embodiment 40: The method of any one of embodiments 33-39, wherein the detection agent is the antigen of interest.

Embodiment 41: A method of identifying one or more antibody or fragment thereof that modulates a signaling pathway of interest, the method comprising: (a) providing or obtaining a nanovial comprising a cavity formed therein; (b) loading an antibody-producing cell and an antigen-producing cell into the cavity of the nanovial; (c) incubating the nanovial such that one or more antibody or fragment thereof is secreted from the antibody-producing cell and modulates the signaling pathway of interest in the antigen-producing cell; (d) detecting one or more signals related to the modulation of the signaling pathway of interest; (e) performing a sequencing assay on nucleic acids derived from the antibody-producing cell, thereby generating a sequence of the one or more antibody or fragment thereof; (f) associating the sequence of the one or more antibody or fragment thereof with the one or more signals related to the modulation of the signaling pathway of interest; and (g) identifying the one or more antibody or fragment thereof that modulates the signaling pathway of interest based on the associating of (f).

Embodiment 42: The method of embodiment 41, further comprising, prior to (e), sorting the nanovial based on the one or more signals related to the modulation of the signaling pathway of interest.

Embodiment 43: The method of embodiment 41 or 42, wherein the modulation of the signaling pathway of interest comprises activation of the signaling pathway of interest.

Embodiment 44: The method of embodiment 41 or 42, wherein the modulation of the signaling pathway of interest comprises inhibition of the signaling pathway of interest.

Embodiment 45: The method of any one of embodiments 41-44, wherein the one or more antibody or fragment thereof binds to an antigen on the surface of the antigen-producing cell, thereby modulating the signaling pathway of interest.

Embodiment 46: The method of any one of embodiments 41-44, wherein the one or more antibody or fragment thereof interferes with binding of a ligand to an antigen on the surface of the antigen-producing cell, thereby modulating the signaling pathway of interest.

Embodiment 47: The method of any one of embodiments 41-46, wherein the cavity of the nanovial further comprises one or more cell capture agents immobilized thereto.

Embodiment 48: The method of embodiment 47, wherein the one or more cell capture agents comprises an antibody or fragment thereof that binds to a protein expressed on a surface of the antibody-producing cell, the antigen-producing cell, or both.

Embodiment 49: The method of embodiment 47, wherein the one or more cell capture agents binds to a label present on a surface of the antibody-producing cell, the antigen-producing cell, or both.

Embodiment 50: The method of embodiment 47, wherein the one or more cell capture agents is an antigen to which the antibody-producing cell, the antigen-producing cell, or both can bind.

Embodiment 51: The method of any one of embodiments 41-50, wherein the antigen-producing cell is engineered to express one or more detectable labels upon modulation of the signaling pathway of interest.

Embodiment 52: The method of embodiment 51, wherein the one or more detectable labels comprises a fluorescent reporter protein.

Embodiment 53: The method of embodiment 52, wherein the detecting of (d) comprises detecting a level of fluorescence in the nanovial, wherein the level of fluorescence corresponds to modulation of the signaling pathway of interest.

Embodiment 54: The method of embodiment 53, further comprising, prior to (e), sorting the nanovial based on a level of fluorescence above a background level.

Embodiment 55: The method of embodiment 54, wherein the sorting comprises performing a flow-based sorting method.

Embodiment 56: The method of embodiment 55, wherein the flow-based sorting method is fluorescence-activated cell sorting (FACS).

Embodiment 57: The method of any one of embodiments 41-56, wherein the detecting of (d) comprises detecting a change in one or more mRNA levels in the antigen-producing cell.

Embodiment 58: The method of embodiment 57, wherein the detecting comprises performing single cell RNA sequencing on nucleic acids derived from the antigen-producing cell.

Embodiment 59: The method of embodiment 58, wherein the associating of (f) comprises linking mRNA levels in the antigen-producing cell to nucleic acid sequence information from the antibody-producing cell based on a shared oligonucleotide barcode.

Embodiment 60: The method of embodiment 59, wherein the shared oligonucleotide barcode comprises one or more unique oligonucleotide tags associated with the nanovial.

Embodiment 61: The method of any one of embodiments 41-60, further comprising, prior to (e), lysing the antibody-producing cell and the antigen-producing cell.

Embodiment 62: The method of embodiment 61, further comprising, after the lysing, reverse transcribing mRNA released from the antibody-producing cell to generate cDNA.

Embodiment 63: The method of embodiment 62, further comprising, sequencing the cDNA.

Embodiment 64: The method of any one of embodiments 41-63, wherein the sequencing assay comprises single cell RNA sequencing.

Embodiment 65: The method of any one of embodiments 41-64, further comprising, prior to (c), encapsulating the nanovial within a droplet.

Embodiment 66: The method of any one of embodiments 41-64, wherein the cavity of the nanovial comprises an opening to the surface of the nanovial.

Embodiment 67: The method of embodiment 66, further comprising, prior to (c), adding one or more blocking particles to block or reduce a size of the opening.

Embodiment 68: The method of any one of embodiments 41-67, further comprising, prior to (d), washing the nanovial.

Embodiment 69: The method of any one of embodiments 1-68, wherein the antibody-producing cell is selected from the group consisting of: a B cell, a plasmablast, a plasma cell, a hybridoma, and an engineered producer cell.

Embodiment 70: The method of any one of embodiments 1-69, wherein the nanovial comprises a single antibody-producing cell.

Embodiment 71: The method of any one of embodiments 1-70, further comprising, performing the method on a plurality of nanovials, each of the nanovials comprising an individual antibody-producing cell within the cavity of the nanovial.

Embodiment 72: The method of embodiment 71, wherein the plurality of nanovials comprises at least 20,000 nanovials, at least 100,000 nanovials, or at least 500,000 nanovials.

Embodiment 73: The method of embodiment 71 or 72, wherein each individual antibody-producing cell produces a different antibody.

Embodiment 74: The method of any one of embodiments 1-73, wherein the nanovial comprises a cross-linked hydrogel.

Embodiment 75: The method of embodiment 74, wherein the cross-linked hydrogel is a PEG-based cross-linked hydrogel.

Embodiment 76: The method of any one of embodiments 1-75, wherein the cavity of the nanovial comprises an aqueous fluid disposed therein.

Embodiment 77: The method of any one of embodiments 1-76, wherein the nanovial is suspended in an oil phase.

Embodiment 78: The method of any one of embodiments 1-77, wherein the cavity of the nanovial has a volume from about 100 fL to about 10 nL.

Embodiment 79: The method of any one of embodiments 1-78, wherein the cavity of the nanovial has a length dimension from about 5 μm to about 250 μm.

Embodiment 80: A method of linking functional single cell information with genomic, transcriptomic, and/or proteomic single cell information, the method comprising: (a) performing a functional assay on a single cell located in the cavity of a nanovial, wherein the functional assay is associated with a first barcode or a first label; (b) performing a genomic, transcriptomic, and/or proteomic assay on the single cell in the nanovial, wherein the genomic, transcriptomic, and/or proteomic assay is associated with a second barcode or a second label; (c) linking functional single cell information with genomic, transcriptomic, and/or proteomic single cell information by associating the first barcode or first label with the second barcode or second label.

Embodiment 81: The method of embodiment 80, further comprising, prior to (b), sorting the nanovial based on a signal generated by the functional assay.

Embodiment 82: The method of embodiment 80 or 81, wherein the functional assay is an antibody secretion screening assay Embodiment 83: The method of embodiment 80 or 81, wherein the functional assay is an antibody affinity assay.

Embodiment 84: The method of embodiment 80 or 81, wherein the functional assay is an antibody specificity assay.

Embodiment 85: The method of embodiment 80 or 81, wherein the genomic assay is a single cell RNA sequencing assay.

Embodiment 86: The method of any one of embodiments 80-85, wherein the nanovial is associated with a unique oligonucleotide tag.

Embodiment 87: The method of embodiment 86, wherein the unique oligonucleotide tag comprises a poly-dT capture region.

Embodiment 88: The method of any one of embodiments 80-87, wherein the first barcode or first label comprises an oligonucleotide with a poly-A-region.

Embodiment 89: A method of preventing biological agents from diffusing out of the cavity of a nanovial, the method comprising: (a) providing or obtaining a nanovial comprising a cavity formed therein, the cavity comprising an opening to the surface of the nanovial, and one more biological agents disposed within the cavity; and (b) adding a blocking particle such that the blocking particle interacts with the opening of the cavity and substantially blocks or reduces a size of the opening of the cavity, thereby inhibiting the biological agents from diffusing out of the cavity when the nanovials are disposed in a fluid.

Embodiment 90: The method of embodiment 89, wherein a maximum diameter of the blocking particle is larger than a diameter of the opening of the cavity.

Embodiment 91: The method of embodiment 89 or 90, wherein the blocking particle is in contact with the opening of the cavity.

Embodiment 92: The method of any one of embodiments 89-91, wherein the blocking particle surrounds the opening of the cavity.

Embodiment 93: The method of any one of embodiments 89-92, wherein the blocking particle is sized to maintain greater than 50% of a volume of the cavity after (b).

Embodiment 94: The method of any one of embodiments 89-93, wherein the blocking particle has an average diameter from about 20 micrometers to about 50 micrometers.

Embodiment 95: The method of any one of embodiments 89-94, wherein the blocking particle is spherical or substantially spherical in shape.

Embodiment 96: The method of any one of embodiments 89-95, wherein the blocking particle comprises a polymer hydrogel.

Embodiment 97: The method of embodiment 96, wherein the polymer hydrogel is polyethylene glycol (PEG).

Embodiment 98: The method of any one of embodiments 89-97, wherein the blocking particle is coated with one or more affinity agents.

Embodiment 99: The method of embodiment 98, wherein the one or more affinity agents comprise an antibody capture moiety.

Embodiment 100: The method of embodiment 99, wherein the antibody capture moiety is selected from the group consisting of: an anti-IgG antibody or a fragment thereof, an anti-Fc antibody or fragment thereof, Protein A, and Protein G.

Embodiment 101: The method of embodiment 99, wherein the one or more affinity agents comprises an antigen.

Embodiment 102: The method of embodiment 99, wherein the one or more affinity agents comprises a nucleic acid.

Embodiment 103: The method of embodiment 102, wherein the nucleic acid is an oligonucleotide tag or oligonucleotide barcode.

Embodiment 104: The method of any one of embodiments 89-103, wherein the nanovial and/or blocking particle comprises a mesh-like structure.

Embodiment 105: The method of embodiment 104, wherein the mesh-like structure comprises an average pore size.

Embodiment 106: The method of embodiment 105, wherein the average pore size is sized such that biological agents having a desired size are retained within the cavity and biological agents having a size smaller than the desired size are capable of diffusing through the mesh-like structure.

Embodiment 107: The method of embodiment 106, wherein the average pore size is sized to allow transport of fluids and reagents into the cavity of the nanovial.

Embodiment 108: The method of embodiment 107, wherein the fluids and reagents are selected from the group consisting of: staining agents, surfactants, detergents, lysis buffers, drugs, cytokines, chemokines, media, conditioned media, and buffers.

Embodiment 109: The method of any one of embodiments 89-108, wherein (b) comprises adding a plurality of blocking particles such that the plurality of blocking particles interact with the opening of the cavity and substantially block or reduce the size of the opening of the cavity.

Embodiment 110: The method of embodiment 109, wherein each of the plurality of blocking particles has an average diameter from about 2 micrometers to about 20 micrometers.

Embodiment 111: The method of embodiment 109 or 110, wherein each of the plurality of blocking particles has a density greater than that of saline at room temperature.

Embodiment 112: The method of any one of embodiments 109-111, wherein a number of blocking particles to nanovials is greater than 100:1.

Embodiment 113: The method of any one of embodiments 109-112, wherein the plurality of blocking particles is comprised of a polymer selected from the group consisting of: PEG, polystyrene, poly-methylmethacrylate, glass, and metal.

Embodiment 114: A method of enriching for nanovials comprising one or more cells, one or more beads, or both, the method comprising: (a) providing or obtaining a mixture comprising: a plurality of nanovials, each comprising at least one cell, at least one bead, or both, disposed within a cavity of the nanovial; and (i) a plurality of free-floating cells, free-floating beads, or both; (ii) a plurality of empty nanovials; or (iii) both (i) and (ii); (b) suspending the mixture in a solution; (c) adjusting a density of the solution such that the plurality of nanovials comprising at least one cell, at least one bead, or both, disposed within a cavity of the nanovial separate from the plurality of free-floating cells, free-floating beads, or both of (i), the plurality of empty nanovials of (ii), or both (i) and (ii); and (d) collecting the plurality of nanovials comprising at least one cell, at least one bead, or both, disposed within a cavity of the nanovial.

Embodiment 115: The method of embodiment 114, wherein (c) comprises adjusting the density of the solution such that the plurality of nanovials comprising at least one cell, at least one bead, or both, disposed within a cavity of the nanovial have a greater density than the density of the solution.

Embodiment 116: The method of embodiment 114, wherein (c) comprises adjusting the density of the solution such that the plurality of nanovials comprising at least one cell, at least one bead, or both, disposed within a cavity of the nanovial have a lower density than the density of the solution.

Embodiment 117: The method of any one of embodiments 114-116, further comprising, performing (a)-(d) one or more times to further enrich for the plurality of nanovials comprising at least one cell, at least one bead, or both, disposed within a cavity of the nanovial.

Embodiment 118: The method of embodiment 117, wherein the density of the solution is different for each round of (a)-(d).

Embodiment 119: The method of any one of embodiments 114-118, further comprising, prior to (a), removing the plurality of free-floating cells, free-floating beads, or both of (i) or the plurality of empty nanovials of (ii).

Embodiment 120: A method of identifying a drug or compound that modulates a signaling pathway in a cell of interest, the method comprising: (a) providing or obtaining a nanovial comprising a cavity formed therein, the cavity comprising (i) a drug or a compound; and (ii) a barcode or a label associated with the drug or the compound; (b) loading a cell of interest into the cavity of the nanovial; (c) exposing the nanovial to a stimulus to release the drug or the compound into a fluid volume within the nanovial cavity such that the drug or the compound interacts with the cell of interest; (d) incubating the nanovial such that the drug or the compound modulates the signaling pathway of interest in the cell of interest; (e) detecting one or more signals related to the modulation of the signaling pathway in the cell of interest; (f) associating the barcode or the label with the one or more signals related to the modulation of the signaling pathway of interest; and (g) identifying the drug or the compound that modulates the signaling pathway of interest based on the associating of (f).

Embodiment 121: The method of embodiment 120, further comprising, prior to (f), sorting the nanovial based on the one or more signals related to the modulation of the signaling pathway of interest.

Embodiment 122: The method of embodiment 120 or 121, wherein the modulation of the signaling pathway of interest comprises activation of the signaling pathway of interest.

Embodiment 123: The method of embodiment 120 or 121, wherein the modulation of the signaling pathway of interest comprises inhibition of the signaling pathway of interest.

Embodiment 124: The method of any one of embodiments 120-123, wherein the cavity of the nanovial further comprises one or more cell capture agents immobilized thereto.

Embodiment 125: The method of embodiment 124, wherein the one or more cell capture agents comprises an antibody or fragment thereof that binds to a protein expressed on a surface of the cell of interest.

Embodiment 126: The method of embodiment 125, wherein the one or more cell capture agents binds to a label present on a surface of the cell of interest.

Embodiment 127: The method of any one of embodiments 120-126, wherein the cell of interest is engineered to express one or more detectable labels upon modulation of the signaling pathway of interest.

Embodiment 128: The method of embodiment 127, wherein the one or more detectable labels comprises a fluorescent reporter protein.

Embodiment 129: The method of embodiment 128, wherein the detecting of (e) comprises detecting a level of fluorescence in the nanovial, wherein the level of fluorescence corresponds to modulation of the signaling pathway of interest.

Embodiment 130: The method of embodiment 129, further comprising, prior to (f), sorting the nanovial based on a level of fluorescence above a background level.

Embodiment 131: The method of embodiment 130, wherein the sorting comprises performing a flow-based sorting method.

Embodiment 132: The method of embodiment 131, wherein the flow-based sorting method is fluorescence-activated cell sorting (FACS).

Embodiment 133: The method of any one of embodiments 120-132, wherein the detecting of (e) comprises detecting a change in one or more mRNA levels in the cell of interest.

Embodiment 134: The method of embodiment 133, wherein the detecting comprises performing single cell RNA sequencing on nucleic acids derived from the cell of interest.

Embodiment 135: The method of embodiment 134, wherein the associating of (f) comprises linking mRNA levels in the cell of interest to the drug or the compound based on a shared oligonucleotide barcode.

Embodiment 136: The method of embodiment 135, wherein the shared oligonucleotide barcode comprises one or more unique oligonucleotide sequences associated with the barcode associated with the drug or the compound.

Embodiment 137: The method of any one of embodiments 120-136, further comprising, prior to (e), lysing the cell of interest.

Embodiment 138: The method of embodiment 137, further comprising, after the lysing, reverse transcribing mRNA released from the cell of interest to generate cDNA.

Embodiment 139: The method of embodiment 138, further comprising, sequencing the cDNA.

Embodiment 140: The method of any one of embodiments 120-139, wherein the sequencing assay comprises single cell RNA sequencing.

Embodiment 141: The method of any one of embodiments 120-140, further comprising, prior to (c), encapsulating the nanovial within a droplet.

Embodiment 142: A method of identifying a functional chimeric antigen receptor (CAR) or T cell receptor (TCR) to an antigen of interest, the method comprising: (a) providing or obtaining a nanovial comprising a cavity formed therein and an affinity agent immobilized thereto; (b) loading a CAR- or TCR-expressing cell into the cavity of the nanovial; (c) incubating the nanovial such that one or more cytokines is secreted from the CAR- or TCR-expressing cell and binds to the affinity agent; (d) adding a detection agent to the cavity of the nanovial such that the detection agent binds to the one or more cytokines; (e) detecting one or more signals related to binding of the detection agent to the one or more cytokines; (f) performing a sequencing assay on nucleic acids derived from the CAR- or TCR-expressing cell, thereby generating a sequence of the CAR or TCR; (g) associating the sequence of the CAR or TCR with the one or more signals related to the binding of the detection agent to the one or more cytokines; and (h) identifying the CAR- or TCR—that functionally interacts with the antigen of interest based on the associating of (g).

Embodiment 143: The method of embodiment 142, further comprising, prior to (f), sorting the nanovial based on the one or more signals related to binding of the detection agent to the one or more cytokines.

Embodiment 144: The method of embodiment 142 or 143, wherein the cavity of the nanovial further comprises one or more cell capture agents immobilized thereto.

Embodiment 145: The method of embodiment 144, wherein the one or more cell capture agents comprise an antibody or fragment thereof that binds to a protein expressed on a surface of the CAR- or TCR-expressing cell.

Embodiment 146: The method of embodiment 144, wherein the one or more cell capture agents binds to a label present on a surface of the CAR- or TCR-expressing cell.

Embodiment 147: The method of embodiment 146, wherein the label is streptavidin or biotin.

Embodiment 148: The method of embodiment 144, wherein the one or more cell capture agents is an antigen or MHC-presented antigen to which the CAR- or TCR-expressing cell can bind.

Embodiment 149: The method of embodiment 144, wherein the one or more cell capture agents is an antigen-presenting cell expressing the antigen of interest or presenting antigen in an MHC complex on the surface thereof.

Embodiment 150: The method of any one of embodiments 142-149, wherein the affinity agent is an antibody capture moiety.

Embodiment 151: The method of embodiment 150, wherein the antibody capture moiety is one or more selected from the group consisting of: anti-IL2, anti-TNF-alpha, and anti-IFN-gamma.

Embodiment 152: The method of any one of embodiments 142-151, wherein the detection agent is a secondary antibody or antibody fragment specific to the one or more cytokines.

Embodiment 153: The method of any one of embodiments 142-152, wherein the detection agent is directly or indirectly labeled with a detectable label.

Embodiment 154: The method of embodiment 153, wherein the detectable label is selected from the group consisting of: a fluorescent label, an oligonucleotide tag, and a magnetic particle.

Embodiment 155: The method of embodiment 154, wherein the detectable label is a fluorescent label.

Embodiment 156: The method of embodiment 155, wherein the detecting of (e) comprises determining an amount of detection agent bound to the one or more cytokines.

Embodiment 157: The method of embodiment 156, wherein the amount of detection agent bound to the one or more cytokines corresponds to a level of fluorescence.

Embodiment 158: The method of any one of embodiments 155-157, further comprising, prior to (f), sorting the nanovial based on a level of fluorescence above a background level.

Embodiment 159: The method of embodiment 158, wherein the sorting comprises performing a flow-based sorting method.

Embodiment 160: The method of embodiment 159, wherein the flow-based sorting method is fluorescence-activated cell sorting (FACS).

Embodiment 161: The method of embodiment 153, wherein the detectable label is an oligonucleotide tag.

Embodiment 162: The method of embodiment 161, further comprising, sequencing the oligonucleotide tag.

Embodiment 163: The method of embodiment 162, wherein the detecting of (e) comprises counting the number of oligonucleotide tags bound to the one or more cytokines.

Embodiment 164: The method of any one of embodiments 142-163, further comprising, prior to (f), lysing the CAR- or TCR-expressing cell.

Embodiment 165: The method of embodiment 164, further comprising, after the lysing, reverse transcribing mRNA released from the CAR- or TCR-expressing cell to generate cDNA.

Embodiment 166: The method of embodiment 165, further comprising, sequencing the CDNA.

Embodiment 167: The method of any one of embodiments 142-166, wherein the sequencing assay comprises single cell RNA sequencing.

Embodiment 168: The method of any one of embodiments 142-167, further comprising, prior to (c), encapsulating the nanovial within a droplet.

Embodiment 169: The method of any one of embodiments 142-167, wherein the cavity of the nanovial comprises an opening to the surface of the nanovial.

Embodiment 170: The method of embodiment 169, further comprising, prior to (c), adding one or more blocking particles to block or reduce a size of the opening.

Embodiment 171: The method of any one of embodiments 142-170, further comprising, prior to (d), washing the nanovial.

Embodiment 172: A nanovial having a size, a shape, a surface chemistry, a density, or any combination thereof, configured to be compatible with and used in a plurality of different types of instruments designed to analyze particles and/or cells.

Embodiment 173: The nanovial of embodiment 172, wherein the plurality of different types of instruments designed to analyze particles and/or cells is selected from the group consisting of: flow cytometers, fluorescence activated cell sorters, imaging flow cytometers, image activated cell sorters, Coulter counters, particle counters, microfluidic droplet generators, microwell arrays, microfluidic chips with microvalves, microfluidic SlipChips, optofluidic microdevices, microfluidic droplet generators, and microfluidic channels.

Embodiment 174: The nanovial of embodiment 172 or 173, wherein the size of the nanovial is less than about 100 μm in diameter and comprises capped reactive functional groups.

Embodiment 175: The nanovial of any one of embodiments 172-174, wherein the size of the nanovial is less than about 60 μm in diameter.

Embodiment 176: The nanovial of any one of embodiments 172-175, wherein the nanovial is configured to be flowed through glass capillaries, cuvettes, and/or microfluidic channels.

Embodiment 177: The nanovial of any one of embodiments 172-176, wherein the nanovial is configured to be analyzed by optical, electrical, and/or magnetic excitation.

Embodiment 178: The nanovial of any one of embodiments 172-177, wherein the size of the nanovial, surface chemistry, and or buoyancy is such that the nanovial can be rapidly flowed through an instrument without clogging or without substantial clogging.

Embodiment 179: The nanovial of embodiment 178, wherein the nanovial can be flowed through an instrument at greater than 10 cm/sec, or greater than 1 m/sec, without clogging or without substantial clogging.

Embodiment 180: The nanovial of any one of embodiments 172-179, wherein the nanovial is configured to be flowed through a channel having a diameter of greater than 90 μm.

Embodiment 181: The nanovial of any one of embodiments 172-173, wherein the nanovial is configured to be used with a first instrument designed to analyze particles and/or cells and subsequently a second instrument designed to analyze particles and/or cells.

Embodiment 182: The nanovial of embodiment 181, wherein the nanovial is configured to be sorted by a fluorescence activated cell sorter, image activated cell sorter, or optofluidic microdevice and subsequently introduced into a microfluidic droplet generator.

Embodiment 183: A method of detecting cell killing function of a chimeric antigen receptor (CAR)-T cell or T cell receptor (TCR)-expressing T cell in response to binding an antigen of interest, the method comprising: (a) providing or obtaining a nanovial comprising a cavity formed therein and an affinity agent immobilized thereto; (b) loading a CAR- or TCR-expressing T cell into the cavity of the nanovial; (c) contacting the CAR- or TCR-expressing T cell with a target cell producing the antigen of interest; (d) capturing, on the nanovial, one or more cell killing markers released from the target cell upon lysis or permeabilization of the target cell; and (e) detecting the one or more cell killing markers directly or with a detection agent to obtain a cell killing signal.

Embodiment 184: The method of embodiment 183, further comprising: (f) performing a sequencing assay on nucleic acids derived from the CAR- or TCR-expressing cell, thereby generating a sequence of the CAR or TCR; (g) associating the sequence of the CAR or TCR with the one or more cell killing signals; and (h) identifying the CAR or TCR that functionally interacts with the antigen of interest based on the associating of (g).

Embodiment 185: The method of embodiment 183, further comprising, after (e), sorting the nanovial based on the one or more cell killing signals.

Embodiment 186: The method of any one of embodiments 183-185, wherein the cavity of the nanovial further comprises one or more cell capture agents immobilized thereto.

Embodiment 187: The method of embodiment 186, wherein the one or more cell capture agents comprise an antibody or fragment thereof that binds to a protein expressed on a surface of the CAR- or TCR-expressing cell.

Embodiment 188: The method of embodiment 186, wherein the one or more cell capture agents binds to a label present on a surface of the CAR- or TCR-expressing cell.

Embodiment 189: The method of embodiment 188, wherein the label is streptavidin or biotin.

Embodiment 190: The method of embodiment 186, wherein the one or more cell capture agents is an antigen or MHC-presented antigen to which the CAR- or TCR-expressing cell can bind.

Embodiment 191: The method of embodiment 186, wherein the one or more cell capture agents is an antigen-presenting cell expressing the antigen of interest or presenting antigen in an MHC complex on the surface thereof.

Embodiment 192: The method of any one of embodiments 183-191, wherein the affinity agent is an antibody capture moiety.

Embodiment 193: The method of embodiment 192, wherein the antibody capture moiety has affinity to a fluorescent protein.

Embodiment 194: The method of any one of embodiments 183-192, wherein the detection agent is an antibody or oligonucleotide with affinity to an intracellular biomolecule from the target cell.

Embodiment 195: The method of any one of embodiments 183-194, wherein the detection agent is directly or indirectly labeled with a detectable label.

Embodiment 196: The method of embodiment 195, wherein the detectable label is selected from the group consisting of: a fluorescent label, an oligonucleotide tag, and a magnetic particle.

Embodiment 197: The method of embodiment 196, wherein the detectable label is a fluorescent label.

Embodiment 198: The method of embodiment 197, wherein the detecting of (e) comprises determining an amount of detection agent bound to the one or more cell killing markers.

Embodiment 199: The method of embodiment 198, wherein the amount of detection agent bound to the one or more cell killing markers corresponds to a level of fluorescence.

Embodiment 200: The method of any one of embodiments 197-199, further comprising, following (e), sorting the nanovial based on a level of fluorescence above a background level.

Embodiment 201: The method of embodiment 200, wherein the sorting comprises performing a flow-based sorting method.

Embodiment 202: The method of embodiment 201, wherein the flow-based sorting method is fluorescence-activated cell sorting (FACS).

Embodiment 203: The method of embodiment 196, wherein the detectable label is an oligonucleotide tag.

Embodiment 204: The method of embodiment 203, further comprising, sequencing the oligonucleotide tag.

Embodiment 205: The method of embodiment 204, wherein the detecting of (e) comprises counting the number of oligonucleotide tags bound to the one or more cell killing markers.

Embodiment 206: The method of any one of embodiments 183-205, further comprising, following (e), lysing the CAR- or TCR-expressing cell.

Embodiment 207: The method of embodiment 206, further comprising, after the lysing, reverse transcribing mRNA released from the CAR- or TCR-expressing cell to generate cDNA.

Embodiment 208: The method of embodiment 207, further comprising, sequencing the CDNA.

Embodiment 209: The method of any one of embodiments 183-208, wherein the sequencing assay comprises single-cell RNA sequencing.

Embodiment 210: The method of any one of embodiments 183-209, further comprising, prior to (d), encapsulating the nanovial within a droplet.

Embodiment 211: The method of any one of embodiments 183-209, wherein the cavity of the nanovial comprises an opening to the surface of the nanovial.

Embodiment 212: The method of embodiment 211, further comprising, prior to (d), adding one or more blocking particles to block or reduce a size of the opening.

Embodiment 213: The method of any one of embodiments 183-212, further comprising, prior to (e), washing the nanovial.

EXAMPLES

The following examples are included for illustrative purposes only and are not intended to limit the scope of the disclosure.

Example 1: Fabrication and Characterization of Nanovials

Nanovials are fabricated using an optofluidic manufacturing setup that includes pumps to drive precursor polymer fluids through a microfluidic chip, and a microscope configured with a UV light source focused onto the microfluidic chip to initiate crosslinking of the precursor polymer fluids. Generally, nanovials are fabricated from precursor polymer fluids comprising a cross linkable PEG solution and a crosslinker solution with dextran or other components that phase separate when mixed with the PEG solution. Optionally, precursor polymer fluids contain other additives to add sensing moieties (e.g., oxygen or pH sensitive fluorophores or dyes), add affinity tags (e.g., biotin, oligonucleotides) or add other chemical or biomolecular functional groups (e.g., peptides, nucleic acids, nucleophiles or electrophiles for chemical conjugation, carboxylic acids, amines, small molecule sensors, etc.). In the case of light-initiated polymerization and crosslinking, a photoinitiator is also included in the precursor polymer fluids. These precursor polymer fluids are co-flowed into a microfluidic chip containing a droplet generator, phase separation is initiated to form at least a cross linkable PEG-rich phase, and then the precursor polymer fluids are polymerized, e.g., with exposure to UV light.

In a non-limiting example, the crosslinkable PEG comprises 4-arm PEG-norbornene and the crosslinker solution comprises dithiothreitol (DTT) crosslinker. In this example, one of the precursor polymer fluids comprises the 4-arm PEG-norbornene, biotin-PEG-thiol, and lithium phenyl-2,4,6-trimethylbenzoylphosphinate (LAP) photoinitiator and another precursor polymer fluid comprises dextran and DTT.

The cross linkable PEG solution is prepared by dissolving the LAP photoinitiator into a 3% w/w stock solution in PBS followed by dissolving the biotin PEG thiol in the LAP stock solution to achieve a concentration of 0.5-10 mg/mL, preferably a concentration of 10 mg/mL, and the 4 arm PEG-norbornene at a concentration of 28.9% w/w. A crosslinker solution is prepared by dissolving dextran and DTT in deionized (DI) water at 15% w/w, and 5% w/w, respectively. The dissolved dextran and DTT solutions are then combined in DI water to achieve an 11% w/w dextran concentration. The DTT concentration is tuned through a range of concentrations to achieve a stoichiometric ratio of thiol to norbornene of 0.8. The free groups are maintained for optimal cross-linking density in the nanovial and for biotin PEG thiol binding. The dextran phase or PEG phase can additionally include adhesion peptides with thiol groups or cysteine amino acids (e.g., RGD, poly-L-lysine) which bind to free norbornene groups. The preparation of these precursor solutions is preferably performed immediately prior to nanovial fabrication, but the precursors can be frozen and stored at −20° C. for a week or more and defrosted for use at a later date. In practice, biotin-PEG-thiol is most soluble at concentrations below 15 mg/mL. The addition of the PEG-norbornene can enhance the solubility, ensuring that the final phase is still homogeneous. Higher concentrations of biotin can be incorporated by conjugating to the nanovials after fabrication.

To prepare for nanovial fabrication, the precursor polymer fluids are pipetted into 1 mL plastic syringes which have been preloaded with Novec™ 7500 to reduce the loss of precursor polymer fluids to dead volume in the syringe and tubing. In an alternative embodiment, glass syringes are used to reduce capacitance in the syringe/tubing system. The syringes are tipped with 25-gauge luer stubs which are coupled to 0.020" inner diameter PEEK tubing. The partitioning oil is then prepared from Novec™ 7500 combined with a surfactant, e.g., Krytox 157 FSH, Krytox 157 FSL, Pico-Surf™, FluoSurf. The concentration of surfactant is between 0.25% to 2% w/w. Mineral oil with 1-5% Span 80 as a surfactant or hexadecane with 1-5% Span 80 as a surfactant may also be used. The oil is loaded into a 10 mL or 20 mL plastic syringe and tipped with a 25-gauge luer stub. The stub is coupled to 0.020" inner diameter Tygon® tubing using 0.020" inner diameter PEEK tubing. The syringes are placed into separate syringe pumps which are set to pump at constant flow rates between 0.1-50 μL/min.

Fabrication of nanovials may follow procedures and use microfluidic device designs described in WO2020037214 A1, which is herein incorporated by reference in its entirety. In one example, prior to inserting the tubing into the chip inlets, the syringes are primed by running the pumps at an increased flow rate (10-100 μL/min) to remove air from the tubing. The tubing is coupled to the chip inlets using PEEK tubing. When initializing the chip, the oil phase is flowed first to prevent the PEG phase and dextran phase from filling the chip and prematurely polymerizing, blocking the chip. After fully priming the chip with oil, the PEG and dextran phases are pumped into the chip to begin droplet generation. The PEG phase flows through two channels and forms a coflow sandwiching the dextran phase in the microfluidic channel. The oil phase partitions the coflow into droplets comprising the PEG and dextran phases. The stability of droplet generation is dependent on the flow rates used. Flow rates may be momentarily increased or decreased to push the flow into a regime of stable droplet generation. Preferably the flow rates are controlled such that droplet generation is below 1200 Hz, less preferably below 2000 Hz. Stable coflow may take up to 30 minutes of continuous runtime to achieve.

Figure 1A:
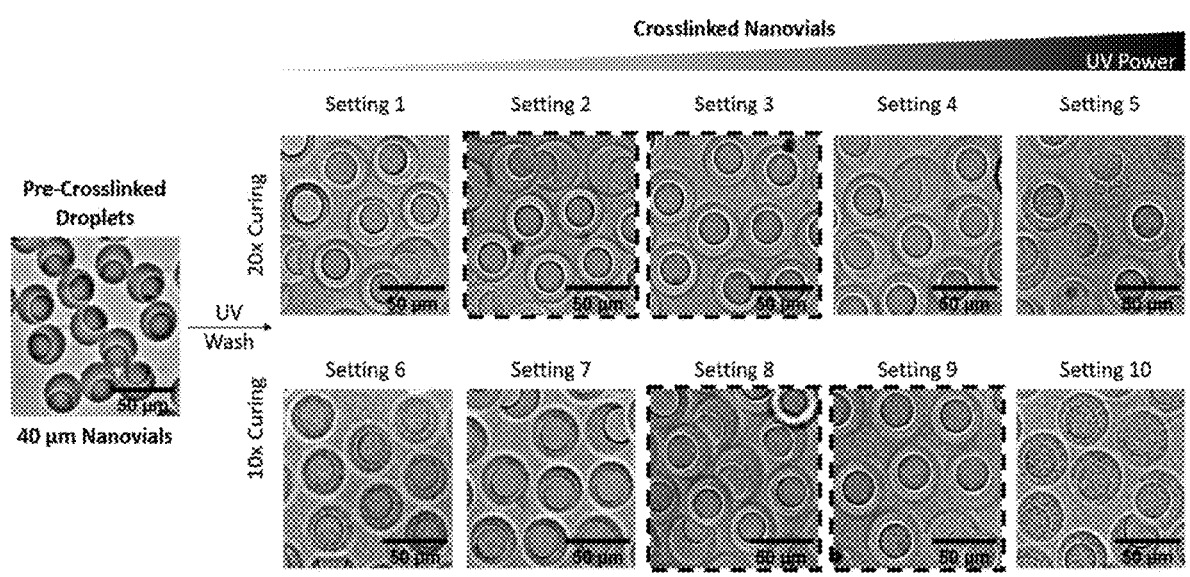
FIGS. 1A-1C depict experimental data demonstrating fabrication and characterization of 40-micron nanovials with varying UV power/intensity settings, according to various aspects of the disclosure.
Figures 1B, 1C:
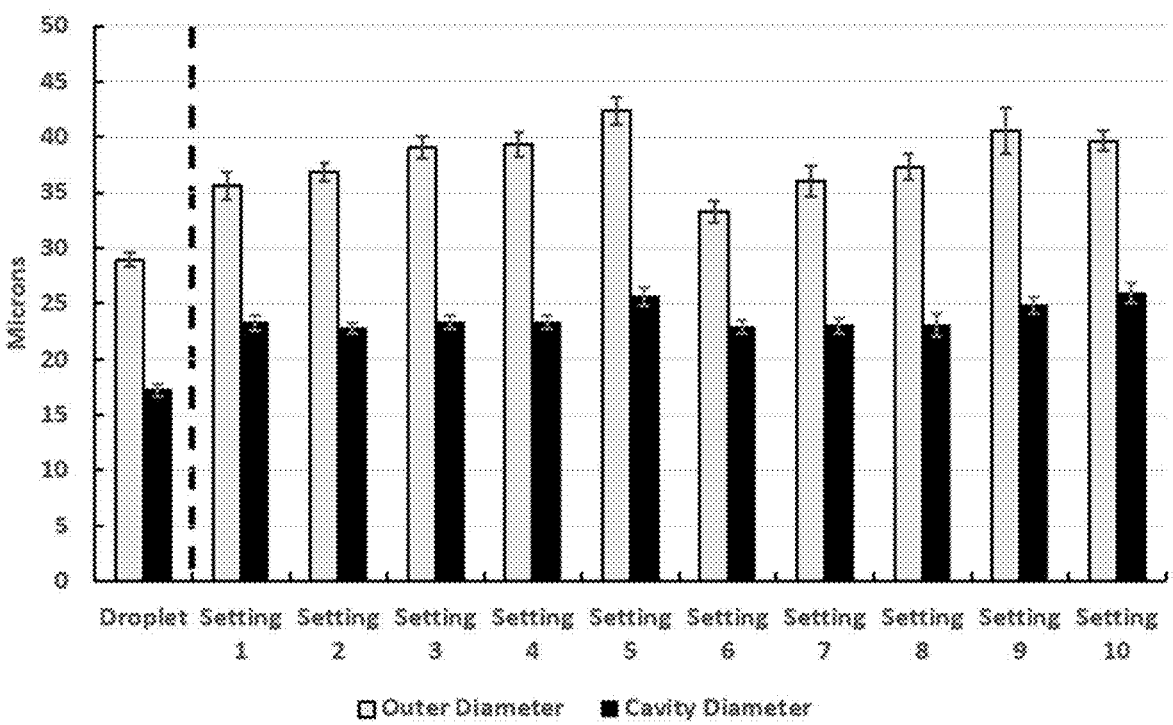
Figure 2A:
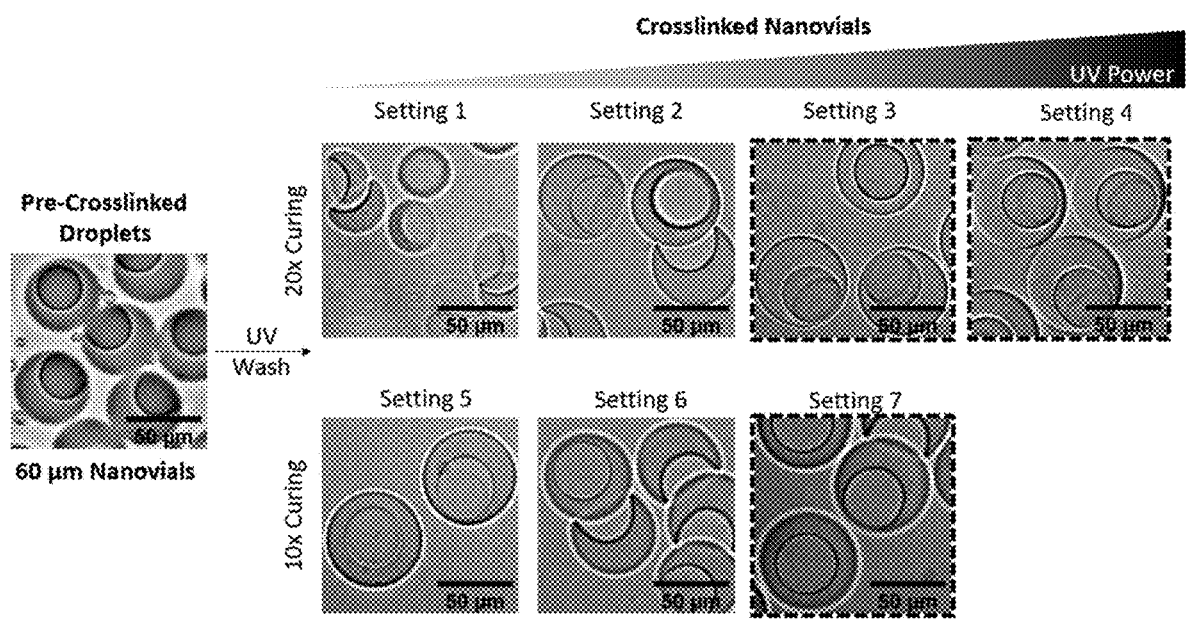
FIGS. 2A-2C depict experimental data demonstrating fabrication and characterization of 60-micron nanovials with varying UV power/intensity settings, according to various aspects of the disclosure.
Figures 2B, 2C:
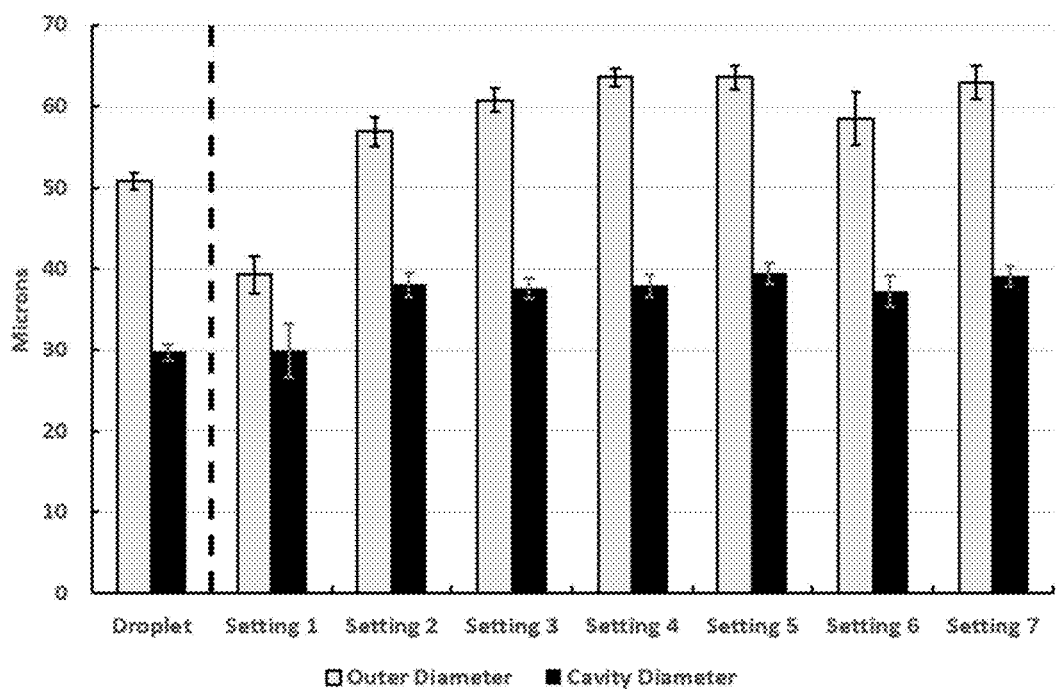
Figure 4A:
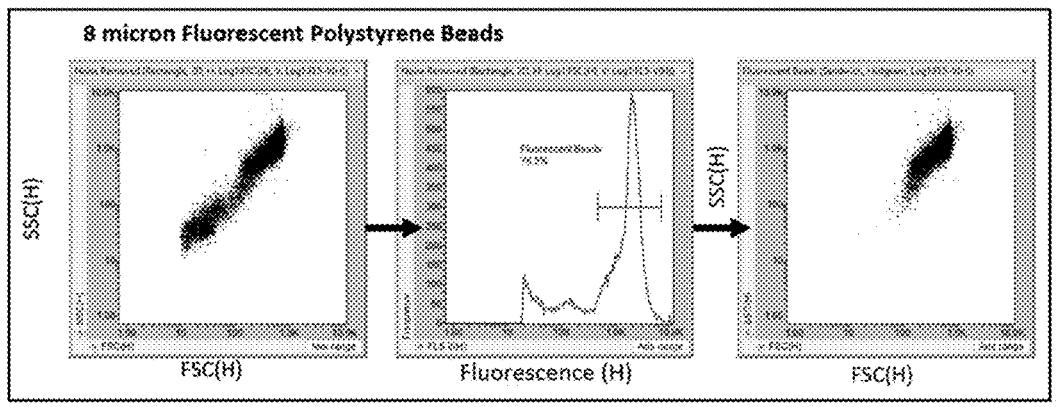
FIGS. 4A-4C depict scatter-based discrimination of nanovials from polystyrene beads, according to various embodiments of the disclosure.
Figure 4B:
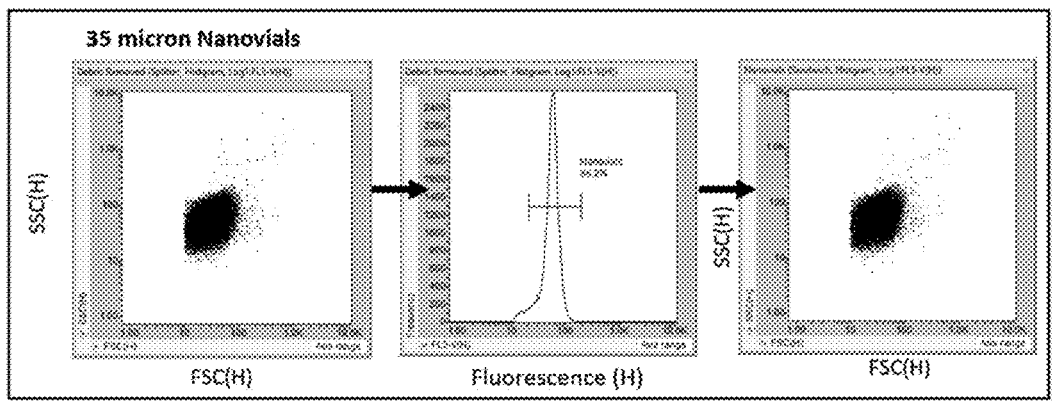
Figure 4C:
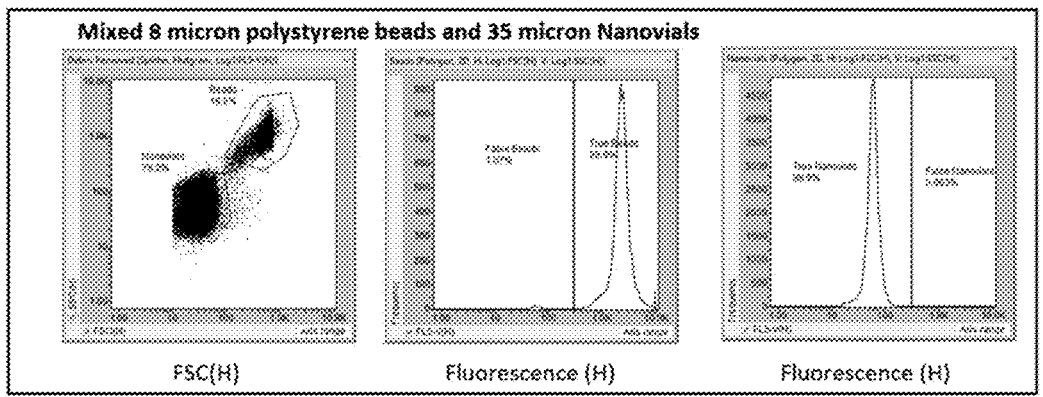

The microfluidic device used for nanovial preparation has a standard flow focusing design. Channels connected to the precursor inlets taper together to form a co-stream which is intersected by two perpendicular channels carrying oil and surfactant. Droplets are generated immediately following this junction and are connected to a deeper channel region downstream. The precursor droplet sizes are adjusted by changing the flow rates of the precursor and oil solutions as well as adjusting the width and height of the droplet generation junction. 28-micron precursor droplets are formed using a device with a channel height of 18 microns, a junction width of 40 microns, a flow rate of 0.5 µL/min for both precursor solutions, and a flow rate of 10 µL/min for the oil and surfactant phase. 50-micron precursor droplets are formed using a device with a channel height of 50 microns, a junction width of 40 microns, a flow rate of 2.25 µL/min for both precursor solutions, and a flow rate of 27 µL/min for the oil and surfactant phase. Upon achieving stability, the droplets travel along the deeper downstream channels which are sized to be greater than 125% of the droplet size. A fluorescent microscope is configured with a collimated UV (365 nm) LED allowing for transmission of UV light through the chip. The downstream region of the chip is configured to have channel widths that match the size of different objective sizes to facilitate even illumination. For the 28-micron precursor droplet, a UV intensity of 400-1000 mW/cm$^2$ and exposure time of 0.5-1 seconds through a 20× objective sufficiently crosslinks the polymer precursors and results in nanovials with an outer diameter of 38 microns and cavity diameter of 24 microns with high uniformity in morphology (CV<5%) (FIGS. 1A-1C). Ideally a sweep of UV conditions is used to determine optimal UV exposure for a given nanovial size. For the 50-micron precursor droplets, a 20× objective with a UV intensity of 100-400 mW/cm$^2$ and exposure time of 0.5-1 seconds sufficiently crosslinks the polymer precursors and result in nanovials with an outer diameter of 60 microns and a cavity diameter of 38 microns with high uniformity in morphology (CV<5%) (FIGS. 2A-2C). After UV exposure the cross-linked particles in oil are collected into a tube and washed following procedures outlined in WO2020037214 A1. To reduce nanovial adhesion to surfaces and flow channels, capillaries, conduits, or microfluidic channels of instruments such as flow cytometers and FACS systems, capping of unreacted functional groups is performed after manufacturing and washing nanovial particles. For example, N-ethylmaleimide is used to cap remaining thiol groups on and within the nanovials to prevent disulfide bond formation between two or more nanovials. To do this, concentrated nanovials are diluted approximately 5× in PBS with 0.05% w/w pluronic F127 and 1.25 mg/mL N-ethylmaleimide and incubated for at least 2 hours at room temperature. The uniformity of particles characterized are determined using microscopes, flow cytometers, cell sorters, and the like. Nanovial morphology is optimized to within a 5% CV uniformity, while nanovial staining attains a uniformity similar to commercially available labeled beads. The precursor ratios are tuned to provide nanovials that are fully open or partially closed. Confirmation and characterization of affinity molecules such as biotin is confirmed with a complementary fluorescent molecule (e.g., streptavidin) using fluorescent microscopy (FIG. 3B) or measured using flow cytometry (FIGS. 4A-4C). Similar uniformity in labeling compared to commercially available fluorescent polystyrene beads (Phosphorex Orange 10 µm, 2227) is observed with flow cytometry (FIGS. 4A-4C).

Following fabrication, nanovials are used in a number of different types of instruments to analyze particles and cells, including, without limitation, flow cytometers, fluorescence activated cell sorters (FACS), imaging flow cytometers, image activated cell sorters, Coulter counters, particle counters, microscopes, microfluidic droplet generators, microwell arrays, microfluidic chips with microvalves, microfluidic SlipChips, optofluidic microdevices, microfluidic channels, and the like, and as described further herein. Preferably, nanovials are sized below ~100 micrometers in diameter, and more preferably below ~60 micrometers in diameter, for use in these systems. Generally, nanovials are flowed through glass capillaries, cuvettes, microfluidic channels, and the like and analyzed through optical, electrical, or magnetic excitation. Channels or capillaries in which nanovials flow are sized to allow the rapid flow of nanovials without clogging. Channel sizes greater than 1.5× of the nanovial size are preferred. For example, for nanovials of 60 micrometers in diameter, channel sizes >90 micrometer in diameter are preferred (e.g., 100 micrometers or 130 micrometers in diameter channels). Nanovials are flowed at high rates through these capillaries and channels, e.g., at >10 cm/sec or >1 m/sec. Excitation of nanovials and potential cells therein is achieved, for example, with a focused laser, focused LED, arc lamp, halogen lamp, light emitted by optical fibers, or other visible light, ultraviolet light, infrared light, or other light source. In some cases, excitation is provided by applying an electric field with electrodes configured to apply an electric field or electric field gradient across the capillary or channel. In some instances, excitation is applied through a magnetic field or magnetic field gradient with permanent magnets or electromagnets in proximity or embedded in the capillary or channel. Signal from the nanovial or cell therein following excitation comprise emitted or scattered light, charge or dielectric properties leading to a dielectric spectrum, impedance spectrum, or capacitance, molecular weight distribution of components, or magnetic properties leading to a change in current in a coil or magnetic sensor or a deflection or motion of the nanovial, for example, motion across fluid streamlines. This signal is used to create an analysis of one or more nanovials. In some cases, the analysis for a nanovial is used to trigger a sort decision. The sort decision is used to direct or deflect a nanovial and potential cell contained therein to a separate channel or container or vessel.

In some cases, nanovials are flowed through microfluidic channels or flow cells for imaging flow cytometry, such as using the ImageStreamX® MKII Imaging Flow Cytometer from Luminex, where more than 10,000 objects are analyzed per experiment. For example, 40 micrometer diameter or 60 micrometer diameter nanovials containing cells are introduced into the ImageStreamX® MKII at a concentration of 1×10$^7$ nanovials/mL. Nanovials and cells are imaged over multiple channels/dyes simultaneously, including brightfield to observe nanovial and cell morphology, AF488 to observe nanovial fluorescence, side scatter to observe granularity, and Draq5 to stain DNA within cells. In this example, fixed Jurkat T cells and hybridoma cells were analyzed. Gating is conducted to select nanovials in focus and nanovials with cells. For example, gating using high gradient RMS to identify focused nanovials, or gating on Aspect ratio/Area graphs. High aspect ratio (0.4-1) and low area corresponds to single nanovials. Nanovials loaded with cells are gated based on high AF488 and high Draq5 signal. Nanovials with cells within the nanovial cavity can also be gated based on a high internalization score, indicating cell fluorescence signal is located internal to the brightfield signal from nanovials. Spot counting of the Draq5 fluorescence images is also used to identify single loaded cells within nanovials, or multiple loaded cells within nanovials, and can be used to gate for single or two, three, multiple, or any number of cells within nanovials (FIG. 20A). Other fluorescence Cell-Tracker, viability dyes, cell surface stains, or nucleic acid stains can be used to also count cells in nanovials during imaging cytometry. Nucleic acid stains are preferred since the separation between cell nuclei is larger and easily discerned. Because of the non-spherical structure of the nanovial, the fluorescence centroid of the nanovial is also used to determine nanovials imaged in particular orientations. Gating can be performed to only analyze nanovials in particular orientations to improve analysis uniformity.

Figure 20B:
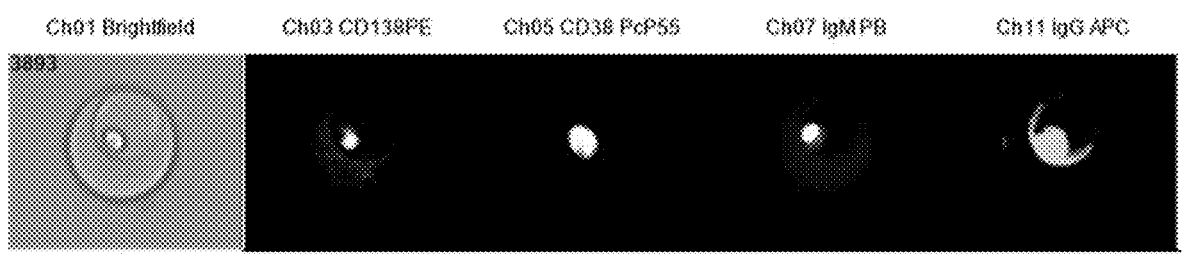
Figure 20C:
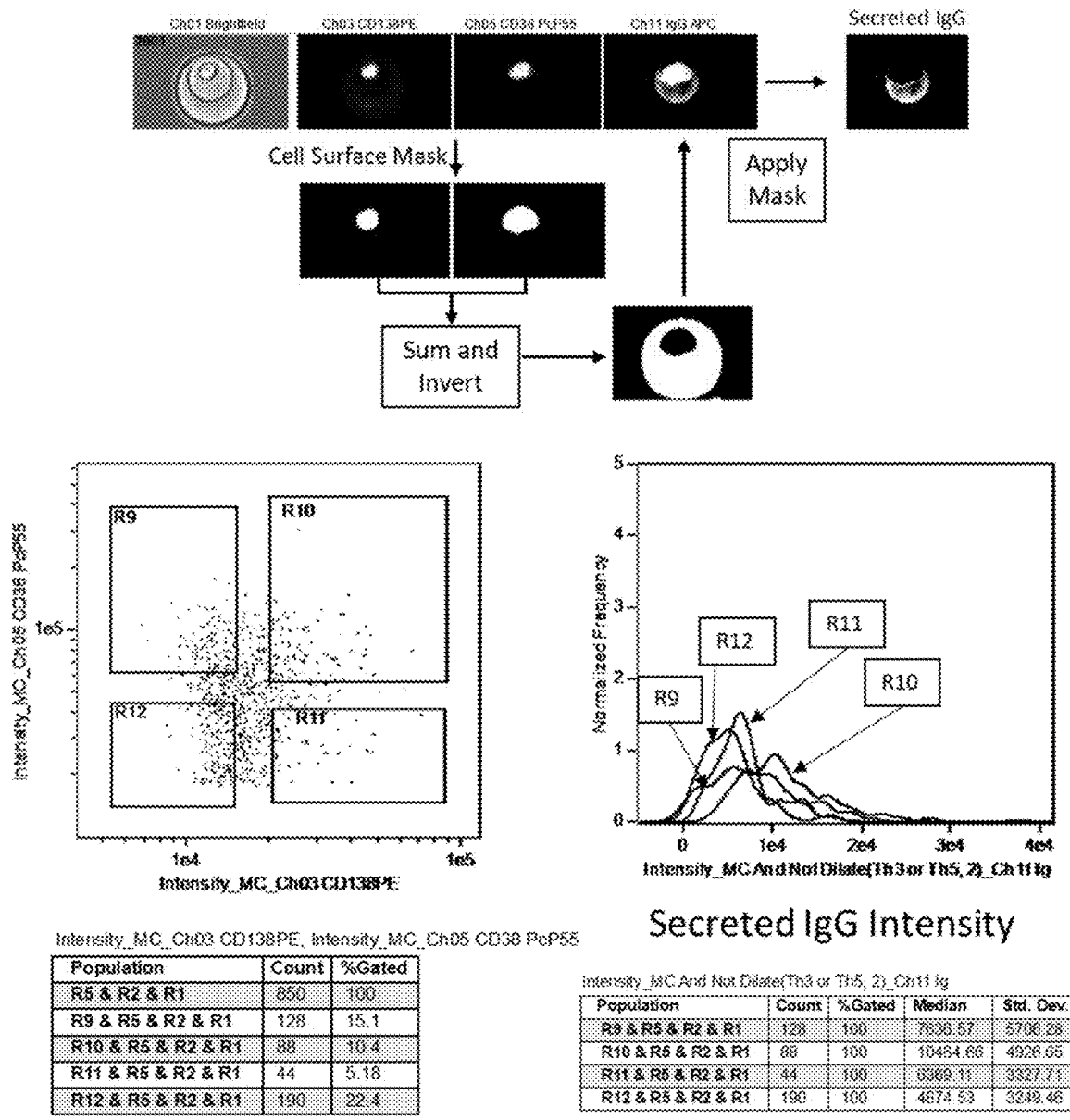
Figure 20D:
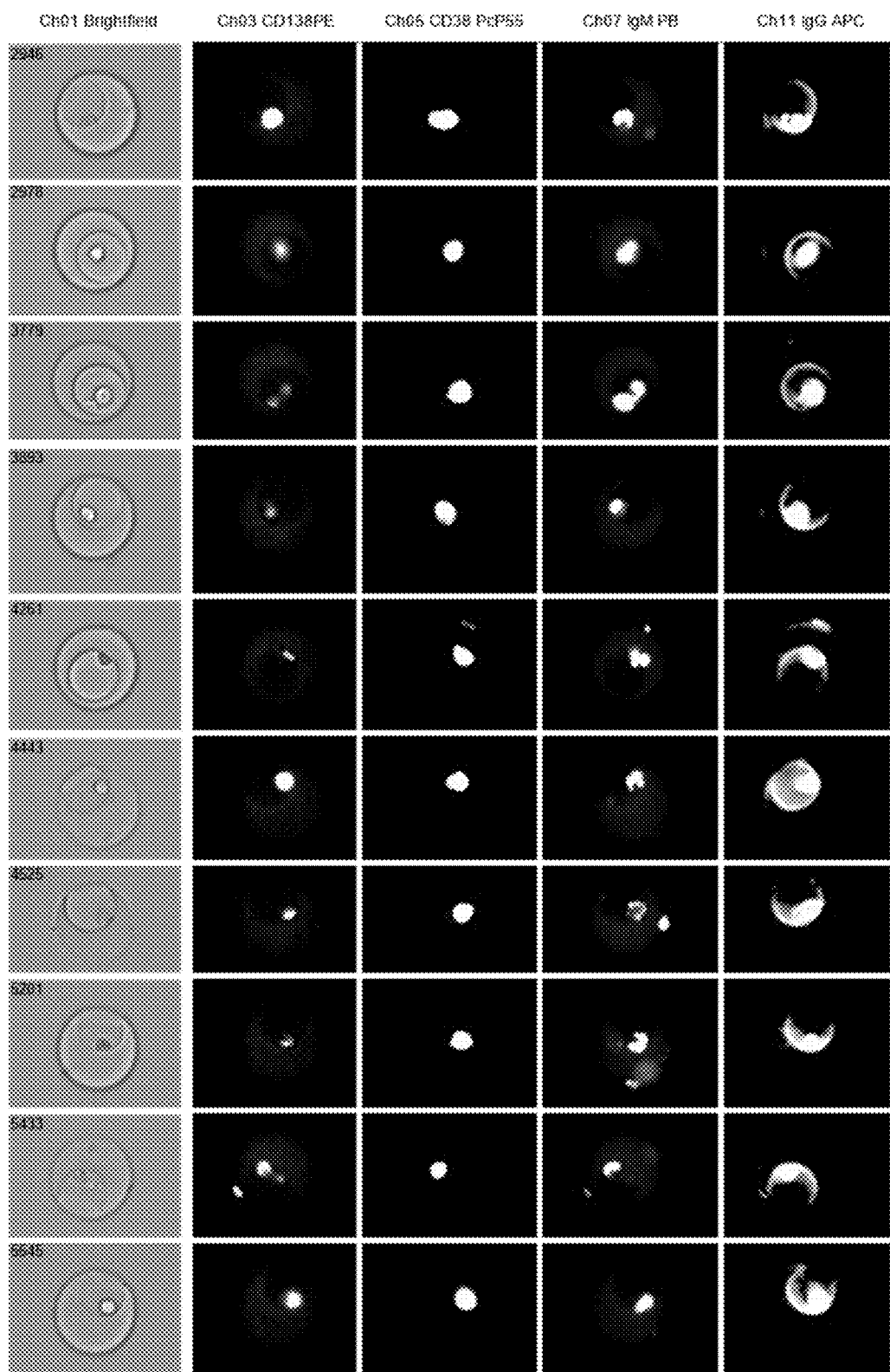

In a related example, a single-cell secretion assay is performed on nanovials using the ImageStreamX® MKII. In this experiment, B cells are isolated from human PBMCs and loaded onto nanovials functionalized with a B cell capture antibody and a IgG capture antibody. The B cells were allowed to secrete IgG over 1 hour which was captured on the nanovials and then stained with fluorescent antibodies against IgG (anti-IgG APC). B cell surface markers were also stained with fluorescent antibodies (anti-CD138 PE, anti-CD38 PerCP Cy5.5, anti IgM Pacific Blue). Nanovials were then loaded into the ImageStreamX® MKII, such that >7,000 objects were imaged and analyzed with 12 images per object. The following wavelength bands were analyzed (430-470 nm, brightfield), (595-660 PE), (660-745, PerCP Cy5.5), (745-785, Side Scatter), (430-505, Pacific Blue), (575-595, brightfield), (660-720, APC), using laser excitation with 405 nm, 488 nm, 642 nm, and 785 nm. Images showed cells within nanovial cavities with surface marker stains and nanovial cavities stained with anti-IgG APC when secreting cells were also present in the cavity (FIG. 20B). Single nanovials with cells were gated using aspect ratios between 0.6 and 1.0 and Area between 2$e$3 and 5$e$3. Imaged nanovials with cells are gated based on CD138, CD38 or a combination of both. These markers are then correlated to secretion of IgG. Secreted IgG on the nanovial around a cell could be analyzed by masking out the cell location in the nanovial using a threshold value on another fluorescence channel, e.g., CD38 channel to identify a masked area (FIG. 20C). Only the fluorescence intensity on the nanovial associated with IgG (APC channel) on the nanovial and outside of the masked area can then be quantified. The highest masked IgG secretion signal was found to be associated with high levels of CD38 and CD138 signal on cells associated with the nanovials in the collected images (FIG. 20D). Similar approaches to analyze and gate nanovial samples using imaging flow cytometry described herein can also be used with image activated cell sorters, such as the BD CellView™ image activated cell sorter.

Figure 21:
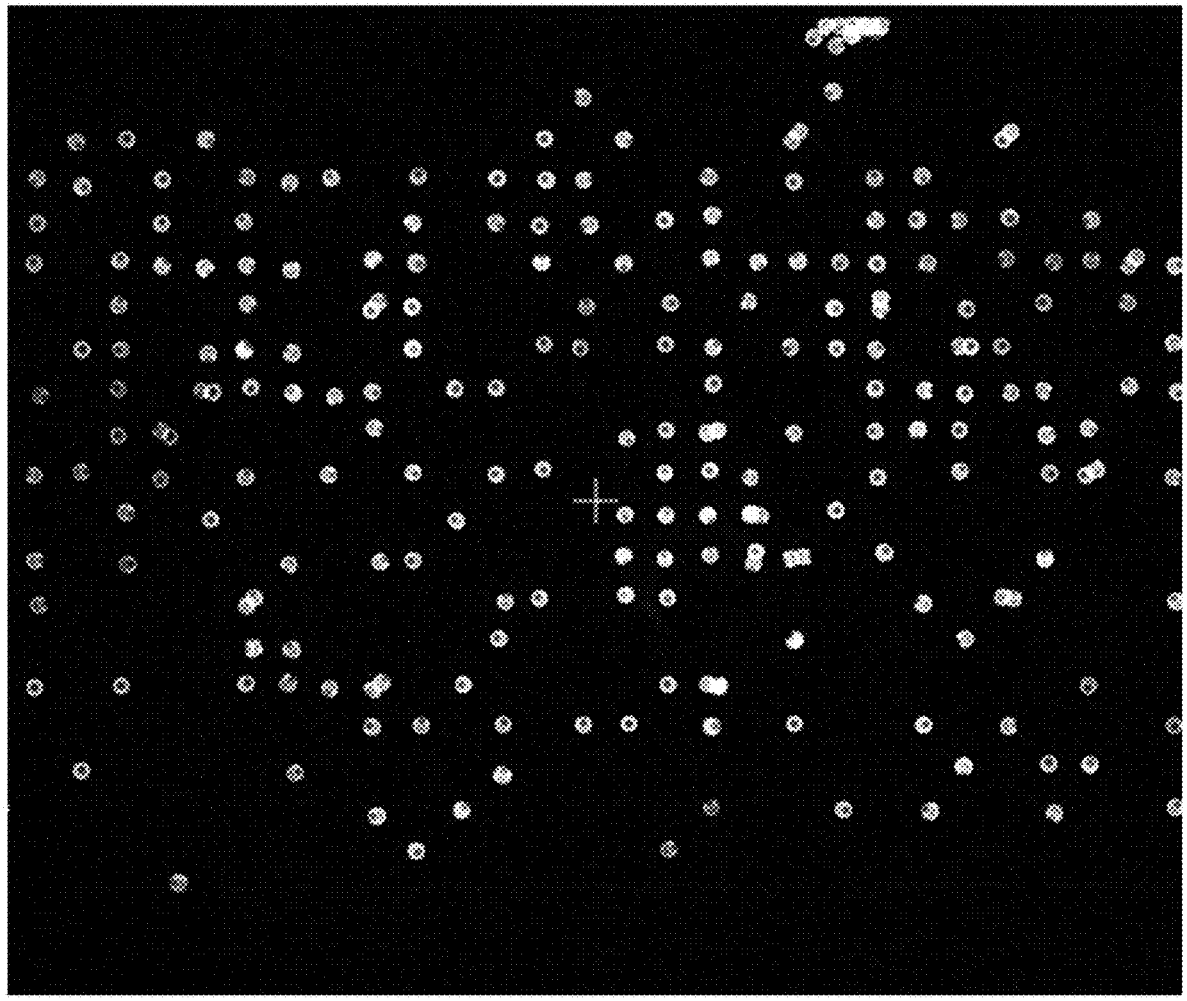
FIG. 21 depicts a non-limiting example of a fluorescent microscopy image of nanovials loaded into microwell array, according to various aspects of the disclosure.

In some cases, nanovials are introduced into microwell arrays such as for imaging-based analysis and sorting. Microwell arrays may comprise arrays of more than 5,000 or more than 20,000 50-100 micrometer diameter cylindrical wells. By tuning the size of the wells in the microwell array to be similar to the size of nanovials (e.g., 50 micrometer wells for 35 micrometer nanovials), single nanovials can be loaded into each well (FIG. 21). Nanovials or nanovials containing cells can be imaged within the microwell array and optionally sorted based on fluorescence and/or brightfield imaging information. Similar image analysis approaches as described for imaging flow cytometry herein are employed. Sorting is achieved for example using focused acoustic waves and acoustic forces to eject a target nanovial from the microwell and into a microchannel above the microwell array for recovery downstream.

In some cases, nanovials are analyzed with automated cell counters by introducing 35 micrometer nanovials or 35 micrometer nanovials with cells. In one exemplary embodiment, nanovial solutions are stained 1:1 with the viability dye trypan blue and introduced into a CytoSmart™ automated cell counter. Nanovials are found to uptake the trypan blue and therefore appear as a "dead cell" in the automated counting algorithm. The number or concentration of nanovials in a sample can be counted in an automated manner by the "dead cell count" number. In order to count nanovials accurately, the gate on cell size can be set to include a larger range, such as 4-33 micrometer diameter objects, or above 33 micrometers in diameter. Nanovials with cells can also be counted. Cells are counted as alive if they do not uptake trypan blue stain. Nanovials containing live cell counts can also be obtained by looking for overlapping positions of live and dead cell coordinates in the automated counting process. Hundreds to thousands of nanovials and cells loaded on nanovials are counted in an automated manner.

In some cases, nanovials are also flowed through microfluidic channels, capillaries, conduits, 3D printed channels, electrowetting on dielectric (e.g., digital microfluidic) devices or the like for encapsulation in droplets or other compartments. For example, nanovials are flowed as part of an aqueous sample fluid through a droplet generator microfluidic device, such as a flow focusing droplet generator, a T-junction droplet generator, a step emulsification droplet generator, a concentric capillary droplet generator, or the like, to encapsulate nanovials (and potential cells therein) in droplets of water, forming a water in oil emulsion. The droplets of the water in oil emulsion are substantially uniform in volume. The droplet volume is preferably <100 nL, and more preferably, <10 nL. The droplet volume is preferably also >1 pL, and more preferably, >50 pL. Nanovials are introduced at a concentration such that the majority of droplets containing nanovials comprise only a single nanovial, by following Poisson loading statistics, where the average lambda is <0.20 and preferably lambda is ~0.1. The devices that contain multiple inlets and inlet channels are used to introduce nanovials along with other reagents to form a droplet with nanovials and additional reagents or buffers. Nanovials (and potential cells therein) in droplets have other operations performed on them with these additional reagent streams such as cell lysis, enzymatic reactions, polymerization reactions, staining reactions and the like.

In some cases, nanovials are introduced into microwells embedded in a substrate, arrays of microwells, microchannels with valved chambers, or microchannels with chambers or reservoirs off of the microchannel that can hold cells, particles, and other micro-objects at lower flow velocities than the main channel or open fluid reservoir. Preferably the wells, chambers, or reservoirs provide a volume with 5-fold or greater reduction in flow velocity compared with the velocity at the entrance to the chamber, adjacent channels, or feeding channels. Nanovials (and potential cells therein) are incubated for a time in the chambers or reservoirs in a low flow velocity environment that minimizes convective transport. The chamber or microwell volume is preferably <100 nL and more preferably <10 nL. The chamber or microwell volume is preferably also >1 µL and more preferably >50 pL. Nanovials are introduced at a concentration such that the majority of chambers or microwells containing nanovials comprise only a single nanovial, by following Poisson loading statistics, where the average lambda is <0.20 and preferably lambda is ~0.1. In some embodiments, nanovials (and potential cells therein) are manipulated and moved within the channels, chambers, or reservoirs using dielectrophoretic or optically induced dielectric forces, and this can be used to ensure the presence of a single nanovial in a chamber. In some cases, nanovials (and potential cells therein) are moved using magnetic forces. The nanovials or cells therein comprise some magnetic materials, such as iron oxide micro- or nanoparticles. Nanovials (and potential cells therein) are also analyzed in the wells, chambers, or reservoirs through optical, electrical, or magnetic excitation. Preferably optical excitation is used where a light source, such as from a laser, LED, arc lamp or the like is used to image the nanovials by detecting emitted or scattered light from the nanovials (and potential cells therein) with a CCD, CMOS, or other 2D detector array. An analysis is performed following excitation to identify nanovials for sorting or selection. Nanovials (and potential cells therein) are then sorted, e.g., using dielectrophoretic or optically induced dielectrophoretic forces to move a nanovial out of a chamber into a free stream for collection. Alternatively, nanovials (and potential cells therein) are pushed using a high-powered laser pulse from the microwell in which it is situated into the free stream for collection. Alternatively, nanovials (and potential cells therein) are pushed using focused acoustic waves. Alternatively, nanovials (and potential cells therein) contained in microwells are picked with a micropipette or automated picker, or if the nanovials comprise magnetic material, a magnetic wand or tip is used to attract the nanovial for selection.

Example 2: Methods of Using Nanovials with Flow Cytometers

In a non-limiting example, it is desired to use flow cytometers and flow sorters to analyze and/or sort nanovials and associated cells and biomolecules in high throughput. To perform analysis and sorting with improved results (e.g., yield, purity, reduced clogging, enhanced singlets, improved limit detection, absolute quantification), considerations are taken in preparing the sample solutions (e.g., concentration of nanovials in sample vessel, choice of buffers) as well as settings on specific instruments and associated software. In this example, considerations and principles for running nanovial samples on flow cytometer and flow sorter instruments are described.

Optimal Concentrations of Nanovials for Use with FACS

When running nanovial samples on flow cytometers and flow sorters, the concentration of nanovials is adjusted for improved singlet events and reduced clogging, reduced abort events, improved yield, and improved purity. In many commercial FACS instruments, spacing between analysis events is dictated by Poisson statistics. Increasing sample concentration increases the probability of having multiple nanovials within the same event window. Decreasing concentration reduces the probability of doublet or multiplet events. The ideal concentration is dependent on the size of the nanovial as well as the instrument and size of the flow cytometry nozzle or chip that is being used. In general, a sweep of concentrations is performed for each configuration (e.g., any combination of instrument, nozzle/chip size, nanovial size) to identify the appropriate concentration range for the intended application. An exemplary workflow includes labeling a fraction of nanovials with a fluorescent or otherwise discernible label or stain, running the nanovials through the flow sorter, sorting based on the label signal, and measuring the downstream purity, recovery, and/or enrichment either through microscopy or re-running the sorted sample through the instrument. In general, as nanovial size is increased, the concentration (here defined as number of nanovials/volume) is decreased to allow more spacing in between events. As nanovial size is decreased, higher concentrations of nanovials are analyzed and sorted with high yield and purity. As the size of the sorting nozzle (e.g., cross-sectional dimension) is increased, the concentration of nanovials is decreased to reduce probability of doublet events.

Considerations for Different Applications

In an application where single cells or clonal colony formation is important (e.g., B cell monoclonal antibody discovery, monoclonal cell line development for Master Cell Banks and Working Cell Banks), nanovials are diluted further in the sample solutions to reduce doublet events, improving single cell purity. In applications where enrichment is a priority (e.g., increasing concentration of rare events) and lower purity is tolerable (e.g., enrichment of higher producing sub-populations of producer cells), concentrations are increased to increase throughput while sacrificing single-cell purity.

Scatter Based Singlet Selection

In some cases, it is desirable to differentiate subpopulations of nanovial samples using scatter signal readouts from flow cytometers. This includes, but not limited to, differentiation of empty nanovials from nanovials containing cells, nanovial events from unbound cell events, nanovials with single cells from nanovials with multiple cells. Scatter measurements include forward scatter (e.g., height, width, and/or area), side scatter (e.g., height, width, and/or area) or any combination of the previous measurements. In some cases, nanovials are manufactured as described herein to be larger and have higher forward scatter signal (e.g., forward scatter height) then cells and may have comparable or lower side scatter signal, being manufactured from a smooth hydrogel material. This unique feature enhances the ability to identify the different populations (e.g., cells, nanovials, and or nanovials containing cells) (FIGS. 4A-4C). Nanovials containing cells may have both high forward scatter signal and high side scatter signal and be distinguishable from cells or nanovials alone.

Cell Containing Nanovials from Empty Nanovials and Free Cells

Samples containing nanovials without cells, nanovials with cells, and cells without nanovials are analyzed with the instrument separately to identify scatter signal thresholds that are unique to each sample. Nanovials and cells are labeled with separate fluorescent labels to identify scatter signals associated with free-floating cells, empty nanovials, and nanovials containing cells. Nanovials with attached cells are differentiated from empty nanovials by gating on a single side scatter component (e.g., height, width, or area) or forward scatter component (e.g., height, width, or area), e.g., using a threshold on side scatter associated with the nanovials with attached cells and a threshold on forward scatter associated with the presence of a nanovial. Nanovials with attached cells are differentiated from empty nanovials by gating on a 2-D axis, e.g., thresholds or gates in the 2D plane of two scatter parameters, that includes a component of side scatter (e.g., height, width, or area) and component of forward scatter (e.g., height, width, or area). Higher dimensional scatter gating (e.g., 3D, 4D) or multiple combinations of 1D, 2D, and higher dimensional gates are used to select out the sub-population of cell-containing nanovials of interest.

In a non-limiting example, nanovials are engineered uniquely to have a lower forward scatter and/or lower side scatter than free cells. This unique feature allows users to distinguish nanovial populations with cells by an increase in FSC, SSC, or both, in comparison to empty nanovials and/or free cells. (FIGS. 4A-4C). Nanovial size is adjusted to make their scatter or fluorescence signal more discernable from cells. For example, nanovials larger than cells can have scatter or fluorescence width signals substantially larger than cells while having comparable scatter or fluorescence peak height. Exact gating parameters depend on the laser power and detector sensitivity of the particular instrument. The specific thresholds and gates described herein for the particular instrument are determined by running control samples as described above.

Doublet Discrimination

Nanovials containing a single cell are differentiated from nanovials containing two or more cells based on their scatter signal. Identification of specific gates are performed using a similar experimental strategy as outlined in the section above "Cell containing nanovials from empty nanovials and free cells". An additional strategy is employed where two subpopulations of cells are labeled with two unique fluorophores, or other labels that are identified with the flow cytometer or flow sorter instrument. Nanovials are overloaded with cells containing labels of one type and cells containing labels of a second type, such that a sizable fraction contains multiple cells with two label types. The samples are then analyzed with the flow cytometry instrument and a subpopulation containing multiple cells are identified by looking for events that contain both fluorescent signal types correlating with multiple cells. Once identified, the scatter signals corresponding to this sub population are compared to a scatter signal from a sample containing nanovials with single cells (based on low loading density). As with the section above, both simple and more complex 1-D, 2-D, 3-D, 4-D, etc., gating or combinations of scatter gating and threshold are employed to select the subpopulation of singlets of interest.

In some cases, nanovials are engineered to have a low side-scatter signal, such that the side-scatter of the cell is distinguishable. Cell doublets loaded on nanovials are identified by defining thresholds on the side scatter height (SSC-H) and side scatter area (SSC-A) of analysis events. Events above one or more of the thresholds are classified as cell doublets and excluded from further analysis. Exact conditions are further identified for each sample using the experimental procedure described above. The side scatter of the nanovials is reduced further such that only the signal from the cells and not the nanovials goes above the event threshold. This is facilitated by adjusting the composition of the nanovials themselves, for example, reducing the cross-linking density by using higher molecular weight precursors, or through the addition of additives in the sample buffers and or sheath solutions to match the index of refraction of the nanovials with the solution, for example, use of a solution of Optiprep (index=1.429 in stock solution) with water (index=1.33) to match the PEG nanovial index of refraction of ~1.35, and up to 1.40 depending on weight fraction. In this instance, the nanovial contains very little scattering signal since the index of refraction is the same as the surrounding solution, and gating strategies commonly employed for gating doublets and multiplets of free cells are employed. For example, gating based on side scatter width (SSC-W) and SSC-A, doublets/multiplets are expected to have a noticeably higher SSC-W signal. Gating based on SSC-H and SSC-A, doublets are expected to have slightly lower SSC-H for given SSC-A value. Gating based on SSC-W and SSC-H, the nanovials with doubles or multiplets are expected to have a higher SSC-W for given SSC-H signal. Similar strategies are also employed for discrimination based on the forward scatter signal.

In some cases, the scatter signal of the cells and or nanovials are adjusted through modification with light scattering nanoparticles or microparticles (e.g., polystyrene beads, magnetic beads) to increase the difference in detected signal. For example, cells are labeled with biotinylated antibodies specific to surface markers and then conjugated with avidin coated polystyrene nanoparticles to enhance their side scatter (Spherotech, Avidin Coated Polystyrene Particles).

Operation of the FACS Systems Tuned for Nanovials

Flow cytometry instruments are tuned to best operate to analyze and sort nanovials. For example, for droplet-in-air flow cytometers, such as the BD Aria II/III or Sony SH800, sorting masks are chosen for improving purity of sorts to obtain single nanovials, such as a "purity" mask or "single cell" mask. Improving the correct formation of droplets is achieved by tuning the drop delay value for the larger sized nanovials. The drop delay is tuned automatically using drop-delay calibration nanovials stained with fluorescent labels similar to calibration beads known in the art (SPHERO™ AccuCount Ultra Rainbow Fluorescent Drop Delay Calibration Particles). Also, the choice of microfluidic chip diameter with a larger size, e.g., 100 or 130 micrometer for the Sony SH800 system is chosen to accommodate the larger nanovial size compared to a normal mammalian cell. Because of the larger nanovial size, the nanovials also move more slowly downstream when focused by the hydrodynamic sheath flow and therefore timings for sorts are increased to account for the slower velocity of the nanovials and improve the fraction of correct sort events. To yield the highest purity and yield of sorting events at throughputs exceeding 500 events/second, 35-55 micrometer diameter nanovials are sorted using a Sony SH800 flow sorter and 130 micrometer microfluidic sorting chip, with no adjustment to the drop delay from default settings. Index sorting is then performed for individual nanovials to separate wells of a 96 well or 384 well plate yielding >60% occupancy with single nanovials across the individual wells. To yield high purity sorting events at throughputs exceeding 500 events/second, 35-45 micrometer diameter nanovials are sorted using a BD FACS Aria II flow sorter and 100 micrometer nozzle to yield high purity sorting events with drop delay calibrated with nanovials prior to the sort, yielding a value different than the default setting. To yield high purity sorting events at throughputs exceeding 300 events/second, 35-55 micrometer diameter nanovials are sorted using a BD FACS Aria II flow sorter and 130 micrometer nozzle to yield high purity sorting events with tuned drop delay calibrated with nanovials prior to the sort yielding a value different than the default setting. To yield high purity sorting events at throughputs exceeding 100 events/second, 35-85 micrometer diameter nanovials are sorted using an On-Chip Sort microfluidic flow sorter with a 150-micrometer diameter microfluidic chip. A density matching solution or viscous agent is added to reduce fast settling in the sample reservoir. In some cases, the sample is agitated immediately before sorting in the reservoir using a micropipette. In some instances, a 80 micrometer diameter microfluidic chip is used to sort nanovials less than 60 microns in diameter, and more preferably less than 40 microns in diameter at throughputs above 200 events per second and purities >80%. The 80-micron diameter chip is used to sort nanovials <40 microns in diameter at throughputs >1000 events per second and with a 4-fold enrichment compared to the starting population. Multiple enrichment cycles are used to achieve higher purities >95% for rare populations down to and less than 1% of the total population. Over 10,000 nanovials with outer diameters of 35 micrometers, 50 micrometers, or 60 micrometers are analyzed and sorted on the Nanocellect WOLF G2 Cell Sorter. This is a microfluidic chip-based cell sorter system using microchannel-based sorting. Nanovials with different diameters and free CHO or Jurkat cells are clearly separable in plots of forward scatter height vs. back scatter height. As nanovial size increases from 35 microns to 60 microns, the forward scatter height and back scatter height increases. For sorting, 35 micron and 50-micron nanovials are preferable to achieve high yield of sorted nanovials and sorted nanovials containing cells. With 35 micrometer diameter nanovials, sorting purity of 88% is achieved with a recovery of 85%. Over 18,000 nanovials are analyzed and sorted at a concentration of 120,000/mL using the Nodexus NX One. Fluorescently labeled nanovials at 10% concentration could be sorted from unlabeled nanovials achieving a sort purity of 86.4% and recovery of 75.6%.
Buffers for Use with Flow Cytometers to Prevent Settling When operating nanovials with flow cytometers, settling occurs which causes inconsistent event rates in the instrument. Agitation methods such as pulsed flow into the sample tube or mechanical agitation with a stirrer are used to prevent or reduce settling of nanovials. Addition of additives into the nanovial sample solution is also used to reduce or prevent settling to maintain a uniform concentration of nanovials during analysis. In general, this is achieved by controlling the viscosity of the sample solution to control the rate of settling, adjusting the density of the solution to tune the net buoyancy on nanovials, or a combination of both.

In some cases, the sample solution is supplemented with a cell-compatible viscous agent (e.g., polyethylene glycol, dextran, hyaluronic acid, alginate, etc.). The viscosity of the sample solution is changed by adjusting various properties of the additive such as concentration, molecular weight, chemical moieties, among others. Solutions of 5% dextran are used to increase the viscosity to 16.7 mPa sec. In general, the settling velocity is inversely proportional to the viscosity of the solution for a small sphere. In the limit that the settling velocity is sufficiently low in comparison to the run time of the sample, minimal fluctuation in event rate is expected. For example, if the expected run time for a sample is 1 hour, and the sample solution in the tube has a depth of 10 cm, viscosity is adjusted such that nanovials settle less than 10% of the solution depth during the run time. More settling is tolerated for example less than 50%, or 25% of the depth of the sample solution. Additional considerations on viscosity include added shear on the nanovials and cells in the nanovials due to the increasing viscosity. For some FACS instruments pressures are increased to compensate for the increase in viscous drag and fluidic resistance in the tubing or channels of the instrument. For aerosol based FACS instruments in some cases the drop actuation settings are adjusted to compensate for change in droplet breakup due to change in viscosity and interfacial tensions of the additives. Viscous agents to be used are optically transparent and are free of small particulates that scatter light.

In some cases, the sample solution is supplemented with additives to increase the density to reduce nanovial settling. Example density matching agents include Ficoll, Percoll, and Optiprep among others. In the case that nanovials are denser than the sample solution, increasing the density of the solution with additives will more closely balance gravitational and buoyancy forces to reduce settling. Ideally the density of the sample solution is matched or slightly less dense than the nanovials (e.g., nanovials may be ~1.034 g/ml in phosphate buffered saline (PBS)) such that nanovials do not float to the top of a vial or container. For 35-60-micron diameter polyethylene glycol nanovials a solution, comprising between 43-50% Ficoll-Paque™ PLUS Media in PBS is preferred to create neutrally buoyant nanovials. In some cases, a solution comprising 44-50% Optiprep in PBS is also used.

Example 3: Buffer Systems and Density Tuning for Selective Isolation of Cell-Containing Nanovials Differences in buoyancy of nanovials and cells are exploited to enrich or deplete particular subpopulations of a sample containing, but not limited to, nanovials, cells, and nanovials with bound cells prior to downstream processing. It is desired to enrich nanovials that contain cells, enrich nanovials containing multiple cells, enrich nanovials that contain only a single cell, and deplete cells not attached to nanovials.

In general, enrichment is achieved by adjusting sample solution density, nanovial density, cell density, or any combination such that differences in buoyancy causes the target population (e.g., cells bound to nanovials) to settle to the bottom of a vial or other vessel, while the unwanted subpopulation (e.g., empty nanovials) float to the top. The target population is pipetted or extracted from the bottom of the vessel and transferred to a new vessel, or the unwanted population is removed from the top of the vessel to enrich the target sample. In a related embodiment the target subpopulation instead floats to the top of a vial or other vessel and the unwanted subpopulation sinks to the bottom of the vial or other vessel. The target population is pipetted or extracted from the top of the vessel and transferred to a new vessel, or the unwanted population is removed from the bottom of the vessel to enrich the target population. Examples of these different scenarios is shown in FIG. 5. In a related embodiment the target population remains neutrally buoyant and unwanted subpopulations float to top and/or settle to the bottom of the vessel. The target population is pipetted or extracted from the middle of the vessel and transferred to a new vessel, or the unwanted populations are removed from the top and or bottom of the vessel to enrich the target sample.

In some cases, the density of the sample solution, nanovials, cells or combination is adjusted to control enrichment of target sub populations. For example, biocompatible water-soluble additives such as Ficoll, Percoll, Optiprep, glycerol, PEG, Dextran, hyaluronic acid, among others are used to adjust the density of the sample solution. The osmolarity of the solution is adjusted to affect the density of cells to enhance enrichment. For example, use of a hypotonic solution (compared to normal physiological phosphate buffered saline) swells cells to reduce their density. The density of nanovials is adjusted through a number of methods to enhance enrichment. For example, density is increased by increasing the concentration of PEG used in the precursor solution, increasing crosslinking density through use of lower molecular weight PEG molecules (e.g., 5 kD 4-arm PEG), embedding or attaching higher density microparticles or nanoparticles in the nanovial matrix or on the surface (e.g., $SiO_2$ microparticles/nanoparticles, iron oxide microparticles/nanoparticles). Likewise, the density of nanovials is reduced through reducing concentration of PEG precursor solution, increasing the molecular weight of precursor polymers, embedding or attaching lower density micro/nanoparticles, e.g., hollow glass particles for buoyancy activated cell sorting-BACS particles). Cells attached to nanovials are also be labeled with particles such as glass, iron oxide, or metallic particles (100 nm-~3 μm in diameter) comprising cell-specific affinity tags to modulate the effective density of nanovials containing cells compared to nanovials without cells. The effective density of nanovials relative to cells is adjusted by using higher (or lower) density additives that transport or diffuse into the matrix of the nanovials while they are impermeable to the cell membrane.

Bottom Enrichment of Nanovials with Cells

In one non-limiting exemplary embodiment high molecular weight biocompatible density-changing additives are added to a vessel (e.g., centrifuge tube) containing nanovials (fabricated using the processes described elsewhere herein) and nanovials with adhered cells 10. The solution has a density equal or slightly greater than the nanovial density (e.g., 1.034 g/ml) and contains density modulating molecules that are too large to transport into the nanovials to prevent a change in nanovial density through diffusion into the nanovial matrix. In these conditions, nanovials without cells attached are buoyant and float to the top of a vessel. Nanovials with attached cells (e.g., cells with sizes of 6-20 microns diameter and densities of 1.05-1.08 g/ml) are not buoyant, since the overall mass of the cell and nanovial is larger than the mass of the displaced solution. For example, 40% Ficoll-Paque™ PLUS Media solution is used as a density-changing additive to achieve a density slightly greater than 1.034 g/ml. Nanovials in the vessel with density-changing additives are incubated to allow nanovials with adhered cells to settle to the bottom of the vessel, or are centrifuged at 180 g to accelerate the transport of nanovials with adhered cells to the bottom of the vessel to yield an enriched fraction of nanovials with adhered cells at the bottom of the vessel. Nanovials from the bottom of the vessel are transferred out of the vessel, e.g., by pipette, to create a solution containing an enriched fraction of nanovials with adhered cells. Alternatively, nanovials without cells that are in the supernatant on the top of the vessel are transferred out of the vessel, e.g., by pipette, to create an enriched set of nanovials with adhered cells that remain in the vessel. The density-changing additives are then exchanged with buffer, media or other density-matching solutions as described above after this density-based enrichment for downstream flow cytometry.

Top Enrichment of Nanovials with Cells

In an alternative non-limiting example, low molecular weight biocompatible density-changing additives are added to a vessel (e.g., centrifuge tube) containing nanovials and nanovials with adhered cells. Here the additive has a small enough molecular weight such that it freely diffuses into the hydrogel matrix of the nanovial such that its effective density is increased. For example, molecular weight below 40 kD or below 10 kD. For example, nanovials fabricated using the methods described in the manufacturing example (Example 1) section have an approximate density of 1.03 g/ml in water or PBS. When Optiprep is added to the solution the density of the nanovials increases with increasing concentration. These nanovials are approximately neutrally buoyant in a solution composed of 44% Optiprep in PBS which has an approximate density of 1.14 g/ml. Above this concentration nanovials begin to float to the top of the vessel. To separate nanovials with attached cells from empty nanovials the solution density is adjusted to be just below neutral buoyancy density for empty nanovials. The sample solution is incubated to allow empty nanovials to settle to the bottom of the vessel, and nanovials with attached cells to float to the top of the vessel 12. In some cases, centrifugation is used to increase the rate of transport of empty nanovials to the bottom of the vessel and transport of nanovials with adhered cells to the top of the vessel to yield an enriched fraction of nanovials with adhered cells at the top of the vessel.

Bottom Enrichment of Cells Bound to Nanovials from Free Cells

In another non-limiting example, buoyancy differences are utilized to separate unbound cells from cells bound to nanovials 14. For example, when the density of cells is less than the sample solution and the effective density of nanovials with bound cells is greater than the sample solution, cells will float to the top and nanovials with cells will sink to the bottom. In one embodiment Optiprep is added to a vessel containing nanovials and cells such that the density of the solution is slightly above the neutral buoyancy density of the cells yet remains below the neutral buoyancy density of the nanovials. For example, a sample solution composed of 33% v/v of Optiprep in PBS or media has an approximate density of 1.1 g/ml. When incubated with cells and cells bound to nanovials, the free cells float to the top and are removed by pipetting or aspiration, nanovials with cells sink to the bottom of the vessel and can be transferred by pipetting. In some cases, centrifugation is used as mentioned above to speed up the process.

Top Enrichment of Cells Bound to Nanovials from Free Cells

In a non-limiting example, buoyancy differences are utilized to separate unbound cells from cells bound to nanovials 16. For example, when the density of cells is greater than the sample solution and the effective density of nanovials with bound cells is less than the sample solution, cells will sink to the bottom of the vessel and nanovials with cells will float to the top. In one exemplary embodiment Ficoll is added to a vessel containing nanovials and cells such that the density of solution is slightly below the neutral buoyancy density of the cells yet remains above the neutral buoyancy density of the nanovials. For example, a sample solution composed of 80% v/v of Ficoll-Paque™ PLUS Media in PBS or media has an approximate density of 1.06 g/ml. When incubated with cells and cells bound to nanovials, the free cells sink to the bottom of the vessel and are removed by pipetting or aspiration, nanovials with cells float to the top of the vessel and are transferred by pipetting to create an enriched fraction. In some cases, centrifugation is used as mentioned above to increase the rate of transport of cells and nanovials to the top or bottom.

Non-Limiting Example of Buoyancy-Based Separation of Nanovials

Figure 22:
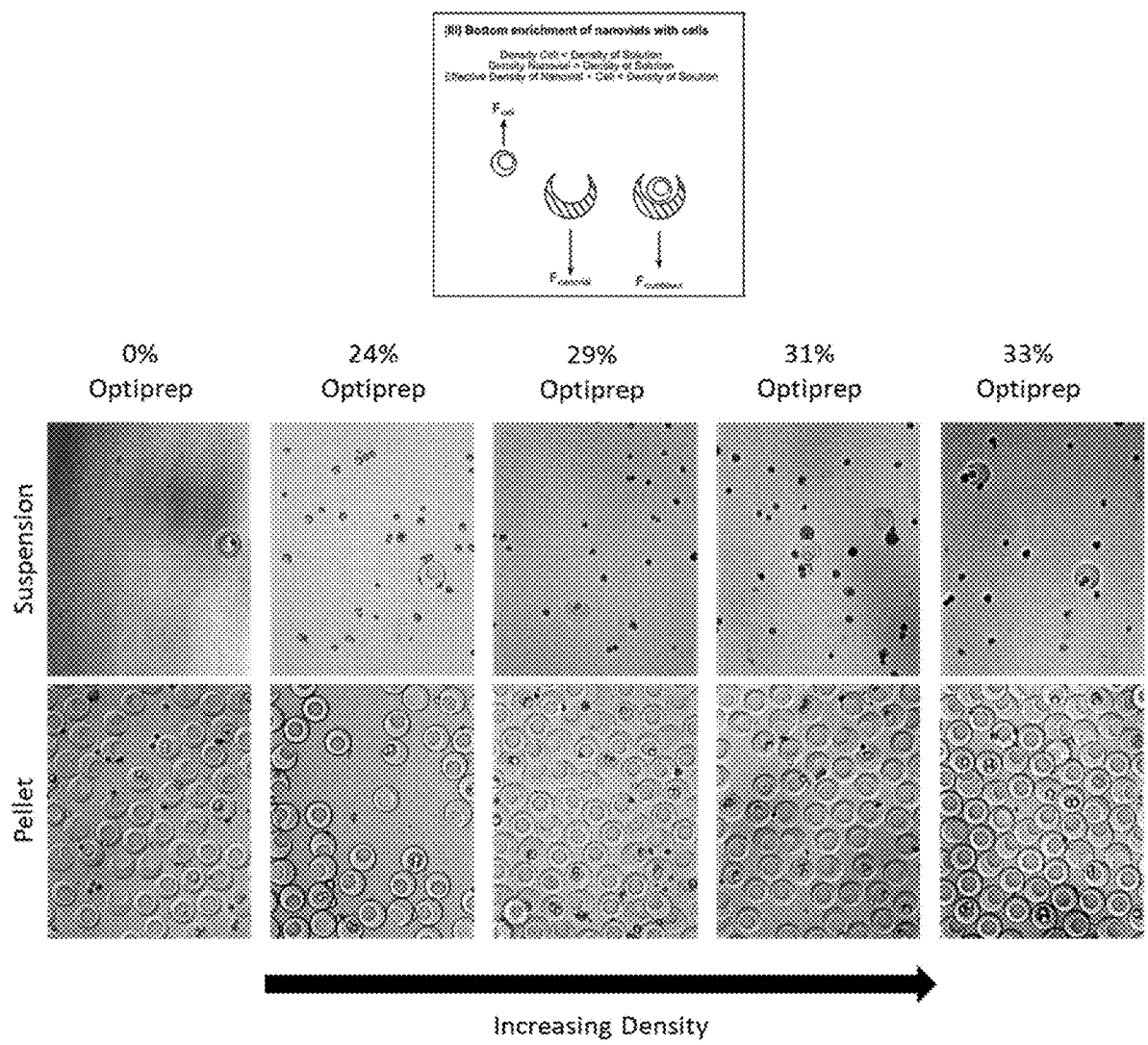
FIG. 22 depicts a non-limiting example of microscopy images of free cell, empty nanovials, and cell loaded nanovials being separated by adjusting the density of solution and centrifugation, according to various aspects of the disclosure.

In one embodiment, buoyancy-based separation of nanovials with attached cells from free cells is achieved by first coating PEG-norbornene 35 μm-diameter nanovials functionalized with biotin with streptavidin at a final concentration of 30 µg/mL. Streptavidin-conjugated nanovials are then washed three times with Washing Buffer using the Washing Procedure (described herein) and resuspended in Washing Buffer at a concentration of 4000 nanovials/µL. Anti-human CD45 antibody (biotinylated) is then bound to the nanovial by mixing 165 µL of 8 µg/mL anti-CD45 antibody with 165 µL of streptavidin-conjugated nanovial solution. The mixed solution is pipetted and incubated at room temperature for 30 minutes for the antibody to bind to the nanovial. The nanovial solution is washed three times using the Washing Procedure and resuspended at a final concentration of 330 µL. A 24 well plate is prepared with 1 mL of media per well. 3 µL of antibody-coated nanovials are introduced into each well and allowed to settle for 30 minutes. Jurkat cells are seeded into the wells at a concentration of 122,000 cells/well. Cells are left to settle for 20 minutes and then transferred to an incubator for 60 minutes to bind cells loaded into the cavities of nanovials. The samples are then pipetted into a tube, centrifuged at 300 g for 1 minute and resuspended in 24%, 29%, 31%, or 33% Opti-prep solution mixed with Washing Buffer or Washing Buffer control. Samples are vortexed for 10 seconds to resuspend and centrifuged at 600 g for 30 minutes with the break off. Supernatant and pellet are pipetted out and imaged. FIG. 22 shows that for 24%, 29%, 31%, or 33% Opti-prep solutions, free cells are largely removed from nanovials and nanovials with attached cells. This leads to an effective enrichment of nanovials with attached cells in the pellet and removal of free cells compared to the control Washing Buffer. Free cells can also be recovered in the supernatant.

Example 4: Methods of Performing Assays on Nanovials

Generally, nanovials act as a substrate for assays, in which released products from a cell of interest are part of the assay, in a similar manner to traditional workflows performed in multi-well plates. In a general workflow, a target cell or molecule is immobilized on the nanovial surface. Then a cell of interest is adhered to the nanovial surface. The cell of interest secretes or releases a product or molecule over an incubation time period that is evaluated with the nanovial assay. A readout signal of the assay (fluorescence, oligonucleotide encoded, magnetic) is then obtained on the nanovial surface and reports on the function of the cell of interest and/or the biological product from the cell of interest. In some cases, wash steps are performed between assay steps. A plurality of such nanovials with a number of cells of interest with different biological products are analyzed and/or sorted with the platform based on functional information of the cell of interest and/or the biological product.

Affinity Assay

In a non-limiting example, the method comprises analyzing the binding affinity of an antibody secreted from a cell of interest (e.g., a B cell, plasmablast, plasma cell, hybridoma, engineered producer cell, or the like) and characterizing the sequence information of this antibody associated with this binding affinity (FIG. 8). Antibody affinity is determined using nanovials comprising secreted antibody capture moieties and cell capture moieties. Secreted antibody capture moieties include anti-Fc antibodies, for example, to capture secreted antibodies such that the Fab region is free and available to bind antigen. Other antibody capture moieties include Protein A, Protein G, or antigens.

Cell capture moieties include anti-CD45, anti-CD19, anti-CD38, and/or anti-CD138 for B cells, plasmablasts, or plasma cells for example, as well as antibodies against other highly expressed surface proteins. In related embodiments cell capture moieties include biotin or streptavidin and cells/B cells are coated with biotinylated or streptavidin bound antibodies to cell surface proteins such as biotinylated anti-CD45, anti-CD19, anti-CD38, and/or anti-CD138. Cell capture moieties also include antigens which B cell receptors (BCRs) on B cells or plasmablasts can bind to on the nanovial. Similarly, antibody capture moieties comprise biotin or streptavidin coated on the nanovials, which is then bound to anti-Fc antibodies conjugated with biotin or streptavidin after or before cell capture on the nanovial. Accurate affinity measurements are achieved by being able to normalize/account for differences in secretion between cells of interest. This is achieved by (1) capturing the cell of interest on the nanovial, (2) optionally encapsulating the cell of interest and nanovial into an oil phase to form and emulsion, (3) incubating the cell of interest for a period of time (preferably 30 min to 3 hours, less preferably 3 to 24 hours) and capturing the accumulated secreted antibody on the nanovial surface such that all antibody capture sites are saturated (e.g., bound to secreted antibody), (4) adding a labeled antigen at one or more concentrations depending on the desired affinity (generally the concentration of antigen should be comparable to the dissociation constant $K_D$ cut-off desired for screening, e.g., antigen concentration is equal to $K_D$ or within 1 order of magnitude lower than $K_D$ or within 1 order of magnitude higher than $K_D$)—example concentrations include 1 µM, 100 nM, 10 nM, or 1 nM of antigen, (5) determining the amount of labeled antigen bound to the nanovial and associated with the secreting cell of interest, and then (6) identifying the sequence information for the secreted antibody from the cell of interest (FIG. 8). In the above embodiments, preferably cells of interest are loaded into >20,000 nanovials in the loading step to account for diversity of cells, more preferably cells of interest are seeded into >100,000 nanovials to capture greater diversity. Even more preferably cells of interest are seeded into >500,000 nanovials to capture the most diversity. In some cases, step 4 is performed concurrently with step 3. In some instances, steps 2 and 3 are performed concurrently with step 1.

In some cases, the labeled antigen is labeled with a fluorophore. Example fluorophores include AlexaFluor 488, Alexa 555, Alexa 594, Alexa 647, fluorescein, or the like. Fluorophores are conjugated to antigens using standard bioconjugation techniques known in the art (e.g., using Alexa Fluor™ 488 Protein Labeling Kit, Catalog number: A10235, Thermofisher Scientific). For these labeling kits, free lysine residues present on the antigen are used to bind to the Alexa Fluor, however, if such lysine groups are not present, or as an alternative approach, a recombinant version of the antigen is produced containing terminal lysine residues or fusions to other protein affinity tags (e.g., streptavidin, FLAG-tag, His tag, etc.). If the antigen is associated with a protein affinity tag, antigen is fluorescently or otherwise labeled with antibodies or other affinity reagents (aptamers, biotin, peptides) comprising a fluorophore, oligonucleotide barcode, or magnetic particle, and with affinity to the protein affinity tag prior to analysis or sorting. In this particular embodiment where the antigen is labeled with a fluorophore, determining the amount of labeled antigen bound to the nanovial comprises flowing the nanovial and bound cell of interest through a flow cytometer or fluorescence activated cell sorter (FACS) and analyzing one or more fluorescence signals from the nanovial and associated cell of interest to make a sort decision. For example, using a gate or threshold to sort any nanovials and associated cells with fluorescence signal above a background level (e.g., one standard deviation above a background level, two standard deviations above a background level, three standard deviations above a background level). The threshold is also defined to sort a top percentage of the population of cells analyzed, such as top 1% of the population of nanovials and associated cells of interest based on fluorescence signal or alternatively top 0.1%, 0.05%, 0.01%, top 5%, or top 10%. Many sorted nanovials and associated cells of interest above a threshold or within a gate are sorted into a pooled container or well of a well plate or single nanovials and associated cells of interest are sorted into individual wells of a well plate. An index sorting feature of the FACS system is used to connect the fluorescence signal of the bound antigen on a nanovial to the particular well it was sorted into in a multi-well plate. This allows linking the affinity information of the antibody to the particular cell of interest in a particular well. Individual nanovials and associated cells of interest in different wells of a well plate are then lysed and mRNA is reverse transcribed to create cDNA, including cDNA for the heavy and light chains of the antibody being secreted by the cell of interest, as is known in the art. For example, primer sets and operating conditions to perform reverse transcription from single cells are described in Ozawa, Tatsuhiko, et al. "Amplification and Analysis of CDNA Generated from a Single Cell by 5'-RACE: Application to Isolation of Antibody Heavy and Light Chain Variable Gene Sequences from Single B Cells." BioTechniques, vol. 40, no. 4, 2006, pp. 469-478., doi: 10.2144/000112123. The cDNA is isolated and heavy and light chain cDNA are amplified using PCR with other specific primer sets as described in Ozawa et al. and known by those skilled in the art. The amplified cDNA is sequenced using, for example, Sanger sequencing or next-generation sequencing for multiple individual cells of interest using barcode adapters during PCR. For example, xGen™ Stubby Adapter and UDI Primer Pairs, Index 1-96, catalog #10005921 from IDT technologies are used to index each cDNA pool from a 96 well plate for pooled next-generation sequencing. The DNA sequence information coding for the antibody associated with a specific binding or affinity ($1/K_D$) is then determined by linking the sequence information with a specific barcode adaptor index to the index for a cell in a specific sorted well yielding an association between the sequence information and a specific fluorescent signal.

In one exemplary non-limiting example, hybridoma cells or plasmablasts/plasma cells from mice spleens or bone marrow are analyzed and sorted based on secreted antibody binding to antigen using 35-micron diameter nanovials. A volume of Nanovial solution at a concentration of 4000 nanovials/microliter is prepared in a microcentrifuge tube. Nanovials with biotin functionalization are coated with streptavidin by incubating with streptavidin at 60 µg/mL in Washing Buffer at an equal volume to the Nanovial solution. Washing Buffer consists of 0.5% bovine serum albumin (GeminiBio, 700-102P), 1% penicillin-streptomycin, and 0.05% Pluronic F-127 in phosphate buffered saline (ThermoFisher, 14190250). Nanovials are then washed three times with washing buffer. The Washing Procedure consists of centrifuging at 300 g for 2-3 minutes, aspirating supernatant from above the nanovial pellet and diluting the sample back to either 10× of the original volume or the original volume (on the last wash). Biotinylated Antibody Solution equal to that of the Nanovial solution is also prepared. Cell Capture Antibody (aCD45-biotin, Clone 30-F11, ThermoFisher, Product #50-115-49) and biotinylated IgG Capture Antibody (Jackson ImmunoResearch, Product #115-065-071) are mixed in the Antibody Solution to reach a target of 8 µg/mL of biotinylated anti-CD45 and 12 µg/mL of biotinylated anti-IgG in Washing Buffer. Biotinylated anti-CD138 can be added instead of anti-CD45-biotin for plasma cell-specific capture. To ensure that the antibodies used are free of protein aggregates, antibody vials are spun down at 10,000 g for 10 minutes and taking solution from the top of the vial. The nanovial sample is mixed with the Antibody Solution and incubated at room temperature for at least 30 minutes to coat the nanovials with antibodies. Nanovials may be stored at 4 degrees Celsius overnight or used following coating. Nanovials are washed two times with Washing Buffer and then washed with fresh cell media and resuspended at the original volume.

Figure 23:
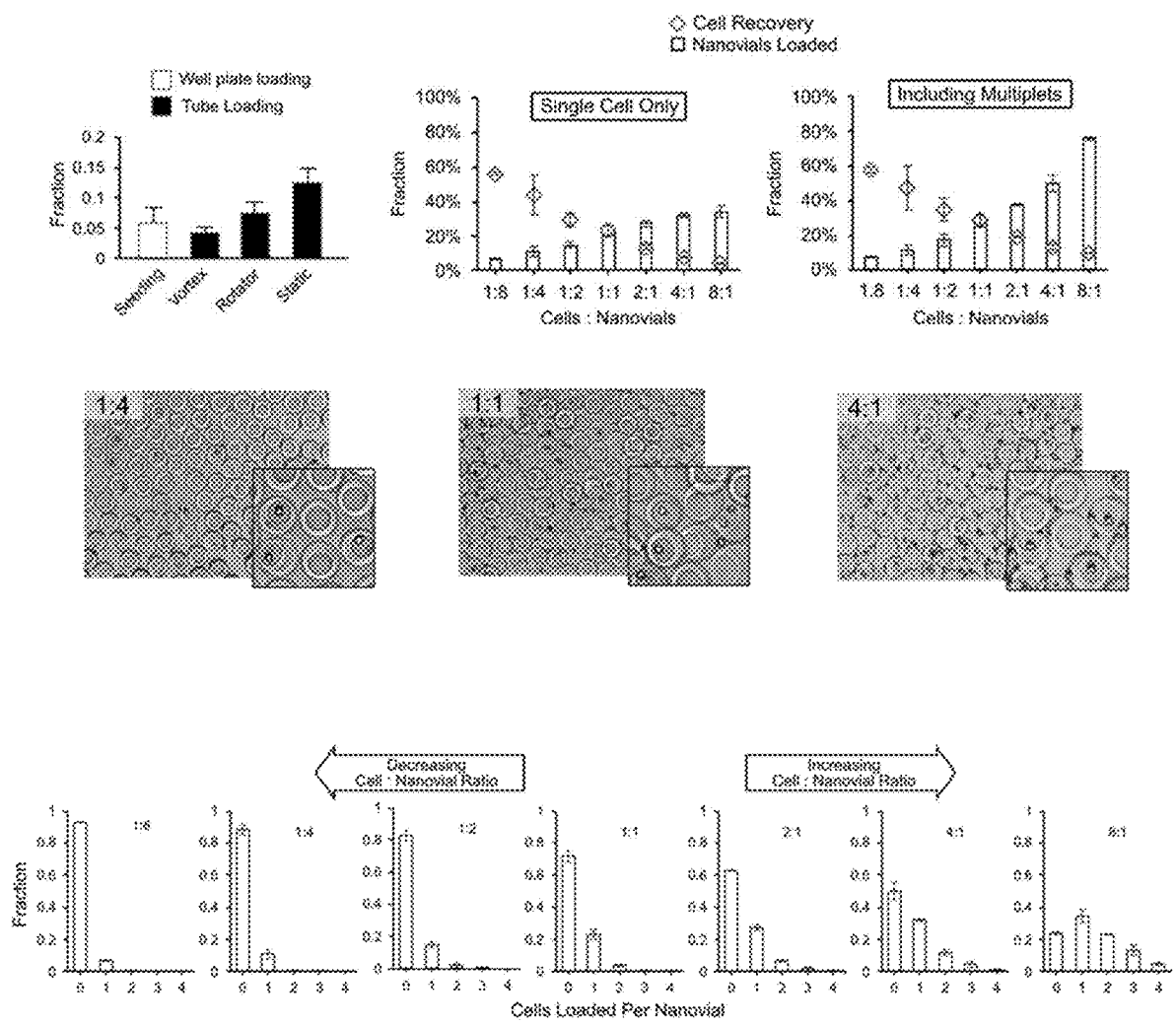
FIG. 23 depicts a non-limiting example of experimental data on different conditions for loading cells into nanovials including effects of mixing and ratio between number of cells and number of nanovials, according to various aspects of the disclosure.

Cell Loading into Nanovials. Hybridoma cells (e.g., HyHEL-5) are loaded onto nanovials by first preparing a cell solution at a density of 4000 cells/microliter and adding an appropriate volume of cells depending on High Recovery, Normal, or High-throughput cell loading mode and the nanovial volume. Loading is successful across a number of conditions are shown in FIG. 23. For High Recovery mode, cells are added at a volume ratio of 1:4 with nanovials, yielding 47% cell recovery and 12% of nanovials loaded with cells. For Normal mode, cells are added a volume ratio of 1:1 with nanovials, yielding 28% cell recovery and 28% of nanovials loaded with cells. For High-throughput mode, cells are loaded at a volume ratio of 4:1 with nanovials, yielding 12% cell recovery and 50% of nanovials loaded with cells. The highest fraction of single loaded cells is also achieved with the High Recovery mode. To load cells, the volume of cell suspension is taken up with a micropipette and slowly dispensed into the center of the nanovial pellet. Nanovials are mixed with cells by adjusting the volume of the micropipette to at least half of the total volume in the tube. Nanovials and cells are pipetted up and down smoothly for 30 seconds in circular motions to mix cells and nanovials evenly. The microcentrifuge tube containing nanovials and cells is incubated at 4 degrees Celsius for 60 minutes to allow cells to bind to nanovials.

Removing Background Cells. Background cells that are not attached to nanovials are removed using a 20 µm cell strainer (ThermoFisher, NC9699018). A 20 µm cell strainer is held with the small end pointing upwards above a waste 50 ml conical tube. Background cells are strained out by carefully pipetting the cell-loaded nanovial suspension from the microcentrifuge tube into the small end of the cell strainer. An additional ~1 ml of Washing Buffer is pipetted into the sample tube to recover additional nanovials and is pipetted into the cell strainer. The strainer is rinsed with an additional 2 ml of Washing Buffer to further remove background cells. By flipping the cell strainer over and pipetting Washing Buffer through the strainer nanovial particles are recovered into a precoated 15 mL conical tube. The 15 mL conical tube is precoated by adding 2 mL of Washing Buffer into the tube, rotating by hand to cover all surfaces and aspirating excess volume. The sample is washed by spinning down to pellet the nanovial particles, aspirating supernatant and resuspending in media at the original Nanovial solution volume.

Secretion Incubation. Filtered nanovials containing cells are incubated at 37 degrees Celsius for 1 hour to accumulate secretions on the nanovials. Secreting cells in nanovials can be incubated within a tube with nanovials packed together and blocking other nanovial cavities to prevent convective fluid flow and diffusion and concentrate secreted products to the nanovial cavity. Alternatively, incubation can be performed under continuous rocking using a laboratory rocker operating at e.g., 1 Hz. Alternatively, incubation can be performed in a well plate with nanovials pipetted and spread out over the well plate surface, e.g., such that there is a distance of on average >100 µm between neighboring nanovials.

Labeling Captured Secretions. After incubation, nanovials and cells are washed three times with PBS using the Washing Procedure and resuspended in PBS at the original nanovial volume. A solution of fluorescently labeled antigen (e.g., hen egg lysozyme, HEL, conjugated with AlexaFluor™ 647) is prepared in PBS at the desired concentration depending on the expected affinity as described herein. For HEL, a solution at 5 µg/mL is prepared. An equal volume of this labeling solution to the nanovial sample volume are mixed and gently pipetted together. Following mixing, nanovials with labeling solution are incubated for 30 minutes at 4 degrees Celsius. After potential binding to secreted antibodies, the nanovials are washed three times in PBS using the Washing Procedure and resuspended in Sorting Buffer for analysis and/or sorting. Sorting Buffer consists of 2% FBS, 1% Penicillin-Streptomycin, 0.05% Pluronic F-127 in PBS which is sterile filtered with a 0.22 µm stericup filter and stored at 4 degrees Celsius.

Figure 24A:
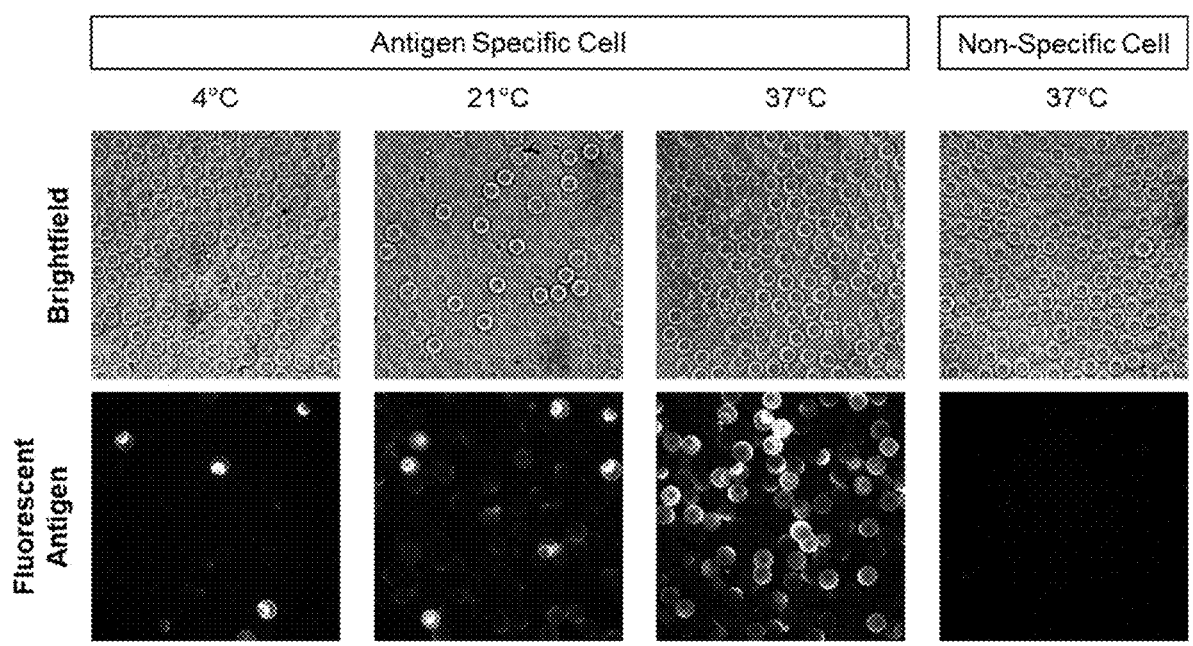
FIGS. 24A and 24B depict a non-limiting example of brightfield and fluorescent microscopy images of antigen specific signal from IgG secreting hybridomas loaded into nanovials at different temperatures and incubated to accumulate secretions in both an emulsified state and non-emulsified state, according to various aspects of the disclosure.
Figure 24B:
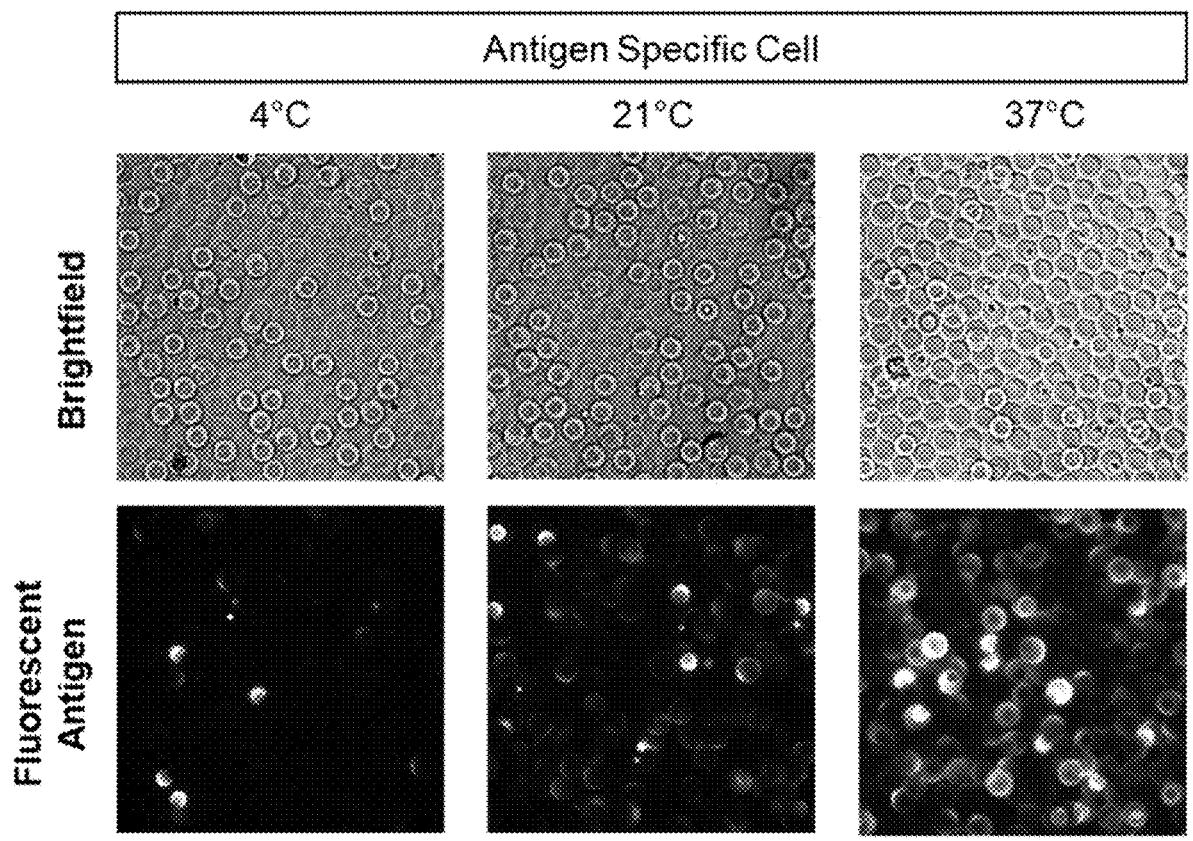

Images of stained nanovials reflecting secreting HyHEL-5 hybridoma cells are shown in FIG. 24A following this protocol. Cells secreting antibody against HEL (antigen-specific cells) are associated with strong nanovial staining for HEL after loading cells at 4 degrees Celsius, 21 degrees Celsius, and 37 degrees Celsius during the Cell Loading step. Reduced crosstalk to other nanovials (not containing antibody-secreting cells) is observed when loading at 4 degrees Celsius or 21 degrees Celsius without an emulsification step. For 9E10 hybridomas (non-specific cell) no appreciable signal is observed under the same conditions when stained with HEL-AF647. Results including an emulsification step after loading during Secretion Incubation appear comparable (FIG. 24B). Results show antigen binding is specific to HyHEL-5 hybridomas (antigen-specific cell) with punctate fluorescence signals associated with cell-loaded nanovials. Emulsification of nanovials was achieved by using 200 microliters of encapsulation oil and pipetting with the 100-microliter pipette at a rate of 1 Hz followed by adding 200 microliters of mineral oil on top and incubating at 37° C. for 1 hour. Emulsions are broken using 200 microliters of emulsion destabilizer (perfluoro-octanol) and gently tapping and rotating for 10 minutes. The nanovial samples are collected after slowly pipetting up and down to distribute nanovials avoiding any oil drops.

Figure 25:
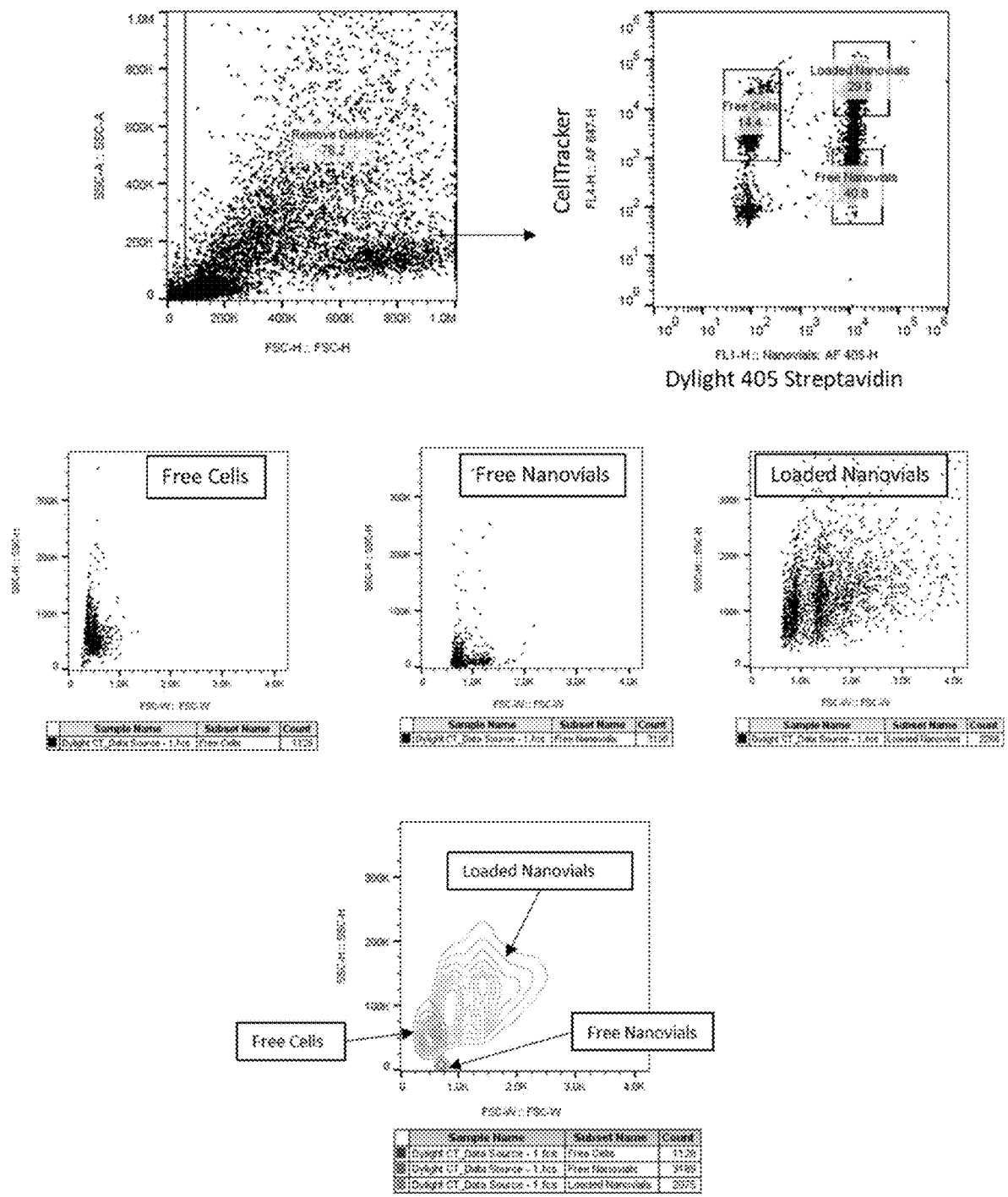
FIG. 25 depicts a non-limiting example of gating strategies to identify empty nanovials, free cells, and cell loaded nanovials using scatter signal, according to various aspects of the disclosure.
Figure 27:
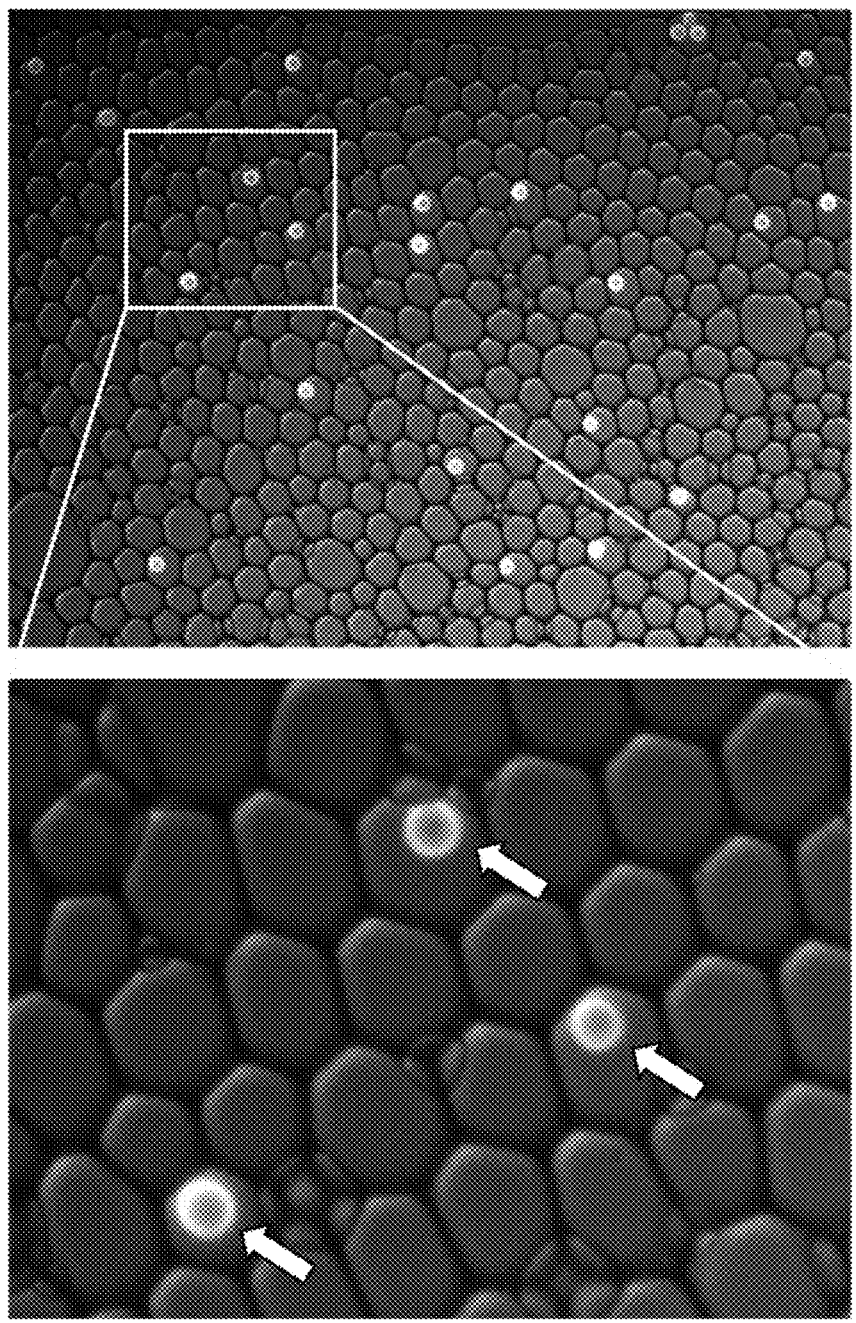
FIG. 27 depicts a non-limiting example of 35-micron nanovials labeled with oligobarcoded—PE streptavidin after loading into droplets with GEM beads using the 10× chromium instrument, according to various aspects of the disclosure.

FACS Analysis & Sorting. All FACS falcon tubes are pre-coated with Sorting Buffer. Collection tubes are filled with media to support the hybridoma or plasma B cells. The nanovial sample is diluted in the Sorting Buffer to a desired concentration to achieve a sorting throughput preferably between ~100 events/second to ~2,000 events/second. A small amount of control nanovial samples stained with fluorescent streptavidin are run to identify appropriate gates for forward scatter, side scatter, singlets, and to perform any fluorescence compensation as described herein. Using, for example, forward scatter width and side scatter height with a Sony SH800 flow cytometer, free cells, free nanovials, and cell-loaded nanovials can be distinguished (FIG. 25). Cell-loaded nanovials have higher forward scatter width and side scatter height and can be gated out based thresholds on forward scatter width and side scatter height, using free nanovials and free cells to define threshold values that contain <5% or <1% of these other events. Using a CellTracker dye and Dylight 405 labeled streptavidin conjugated to nanovials, also allows gating and selecting cell-loaded nanovials as events that are both high in CellTracker signal and Dylight 405 (seen in two fluorescence height channels). FIGS. 26A and 26B shows cell-loaded nanovial gates compared to free or empty nanovials and free cells for HEL-specific IgG secretion signal (AF647 channel fluorescence peak height (H) and peak area (A)). Gates are shown in FIG. 26A. Cell-loaded nanovials have significantly higher HEL-specific IgG secretion signal in both fluorescence peak height (AF647-IgG (H)) and fluorescence peak area (AF647-IgG (A)) (FIG. 26B). This corresponds to secretion of anti-HEL IgG by bound HyHEL-5 hybridoma cells. Sorted cells can be index sorted or pooled for downstream cDNA library preparation and sequencing to obtain antibody sequence information.

Figure 28A:
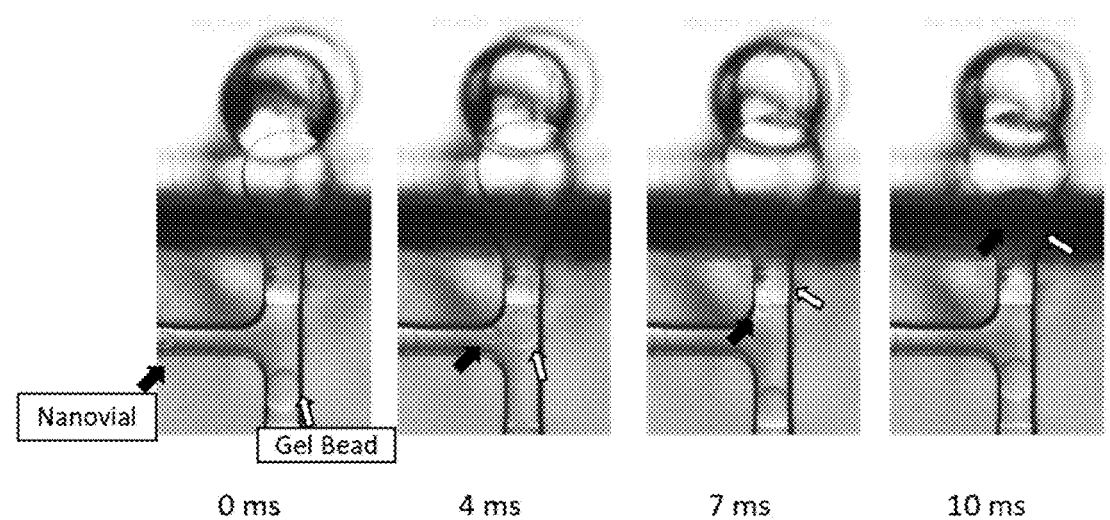
FIGS. 28A and 28B depict a non-limiting example of timelapse images showing encapsulation of both 35 micron and 60-micron nanovials with a spherical gel bead using the 10× Chomium chip G, according to various aspects of the disclosure.
Figure 28B:
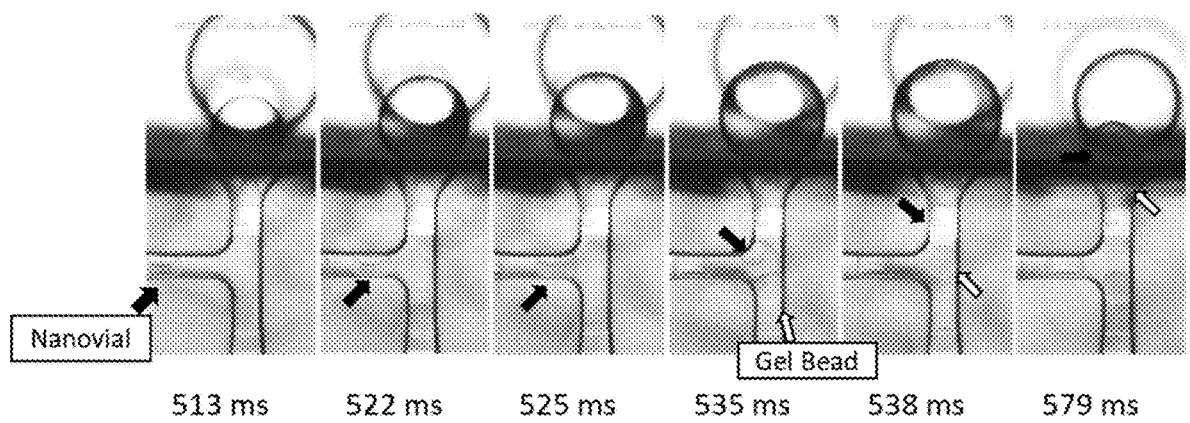

In another non-limiting example, the labeled antigen is labeled with an oligonucleotide barcode in addition or instead of a fluorophore (FIG. 9). In this embodiment the labeled antigen is labeled solely with an oligonucleotide sequence, using for example 5' Feature Barcode Antibody Conjugation Kit—Lightning-Link® from Abcam (ab270703), and following the manufacturer's instructions. For this approach, the amount of labeled antigen bound and associated with a secreting cell of interest (step 5) is characterized using single-cell RNA-sequencing for each nanovial and associated secreting cell of interest. Step 6 also is conducted simultaneously when performing single-cell RNA-seq. The entire nanovial, bound antigen with oligonucleotide barcode, and cell with heavy and light chain encoding mRNA are analyzed together using single-cell RNA-seq workflows, such as using the 10× Chromium system, drop-Seq, In-drop, Fluidigm C1, Rhapsody etc. The nanovials (preferably between 20-60 microns in diameter) are directly loaded in a similar way as one would load single cells in these systems for a standard single-cell RNA-seq run, and droplets are formed normally. For example, nanovials, loaded with cells and labeled are introduced in the sample inlet of the 10× Chromium-compatible microfluidic chips and form droplets normally (FIGS. 7A-7D and 27). For example, 35 micrometer diameter nanovials are compatible for use with the Chromium NextGEM Chip G, Chromium Chip Single Cell B, Chromium Chip Single Cell C, Chromium Chip Single Cell D (FIG. 28A). Less preferably, 60 micrometer diameter nanovials are compatible for use with the Chromium NextGEM Chips (FIG. 28B). In some cases, FACS is used to pre-enrich populations of nanovials containing cells (e.g., using scatter information as discussed above, fluorescent cell stains or fluorescent viability dyes). If labeled antigens also comprise a fluorescent label in addition to an oligonucleotide label, FACS is conducted to pre-enrich nanovials with fluorescent signal from antigen above a threshold. This corresponds to nanovials containing secreting cells of interest that produce antibodies that bind antigen with affinity above a threshold value, or nanovials with B cell receptors with affinity to labeled antigens. This sorted population of nanovials are then pooled and analyzed downstream by single cell sequencing as discussed above. Notably, in this case the linkage between affinity and heavy and light chain sequence information is directly made because of the cell-specific (here nanovial and cell specific) mRNA capture and barcoding step occurring during the single-cell sequencing workflow. An alternative approach for conducting the workflow is for the mRNA capture and barcoding oligonucleotides for the single-cell specific barcoding to be incorporated and directly linked to the nanovial using techniques described herein. Nanovials are then emulsified, cells lysed, mRNA captured without using downstream instruments like the 10× Chromium system. Reverse transcription is then performed following breaking the emulsion to create cell/nanovial specific cDNA that includes the nanovial-specific barcode. Then sequencing libraries are prepared from a number of the nanovial-specific cDNA that encodes both the antigen affinity to secreted antibodies and heavy and light chain sequences for each single secreting cell of interest.

In another non-limiting example, hybridoma cells or plasmablasts/plasma cells from mice spleens or bone marrow are analyzed based on secreted antibody levels or secreted antibody binding to antigen using 35-micron diameter nanovials with a single-cell sequencing workflow.

Nanovial Modification.

In some cases, 35-micron diameter PEG-norbornene biotinylated nanovials are labeled with oligonucleotide barcode conjugated streptavidin (SA) to form a nanovial label, NL. Examples include TotalSeq™-C0961 PE Streptavidin and TotalSeq™-C0971 Streptavidin. In an exemplary embodiment, the oligonucleotide conjugated streptavidin is mixed with non-modified streptavidin at a concentration of 20 micrograms/mL and 40 micrograms/mL, respectively. A 250-microliter solution of this mixed streptavidin is incubated with 250 microliters of biotinylated nanovials at a concentration of 4000 nanovials/microliter (~1,000,000 nanovials) and incubated on a rotator for 25 min at room temperature and then washed three times with Washing Buffer. In some embodiments, nanovials with a single streptavidin barcode sequence are used. In other embodiments, multiple groups of nanovials are labeled with unique streptavidin barcode sequences and then pooled at a later stage in the workflow to enable multiplexed analysis or tracking of multiple samples. The sequence can be used in workflows where the nanovial label, NL, is used to confirm the presence of a nanovial in a particular compartment with a separate bead barcode, e.g., gel bead barcode for the 10× Chromium Next GEM system. For example, in a 10× single-cell sequencing workflow, the streptavidin barcode labeled on the nanovial can be used to identify cell events that are associated with the nanovials versus events where the cell is not associated with the nanovial. A 250-microliter volume of streptavidin coated nanovials with oligonucleotide barcodes are conjugated with biotinylated anti-human CD45 (Biolegend, #304004) to capture Raji cells (a human leukemia line). 250 microliters of 8 micrograms/mL of anti-human CD45 antibody is added to 250 microliters of streptavidin coated nanovials at a concentration of 4000 nanovials/microliter. In parallel, streptavidin coated nanovials without barcodes are modified with anti-mouse CD45 capture antibody (R&D Systems, #AF114) to capture mouse hybridoma cells, and anti-mouse IgG (AffiniPure Goat Anti-Mouse IgG, Fcγ fragment specific Jackson Immuno Research, #115-065-071) to capture secreted IgG. 150 microliters of 8 micrograms/mL of anti-mouse CD45 antibody and 20 micrograms/mL of anti-mouse IgG antibody is added to 150 microliters of streptavidin coated nanovials at a concentration of 4000 nanovials/microliter (~600,000 nanovials). For both the barcoded and non-barcoded nanovials, the solutions are incubated on a rotator overnight at 4 degrees Celsius. Following incubation, nanovials are washed three times with Washing Buffer using the Washing Procedure described herein and resuspended to the original solution volume.

Cell Loading. A suspension of HyHEL-5 hybridoma cells (target hybridoma) and Raji cells (background cells to determine the specificity of the assay) are separately prepared at a concentration of 1,000,000 cells/mL. To the oligonucleotide barcoded SA nanovials, 2,820 microliters of Raji cell suspension is added. To the non-barcoded nanovials, 1,230 microliters of HyHEL-5 cell suspension is added. To load cells, the volume of cell suspension is taken up with a micropipette and slowly dispensed into the center of the nanovial pellet. Nanovials are mixed with cells by adjusting the volume of the micropipette to at least half of the total volume in the tube. Nanovials and cells are pipetted up and down smoothly for 30 seconds in circular motions to mix cells and nanovials evenly. The microcentrifuge tube containing nanovials and cells is incubated at 4 degrees Celsius for 60 minutes to allow cells to bind to nanovials.

Background Cell Removal. Background cells that are not attached to nanovials are removed using a 20 μm cell strainer (ThermoFisher, NC9699018). A 20 μm cell strainer is held with the small end pointing upwards above a waste 50 ml conical tube. Background cells are strained out by carefully pipetting the cell-loaded nanovial suspension from the microcentrifuge tube into the small end of the cell strainer. An additional ~1 ml of warm cell media is pipetted into the sample tube to recover additional nanovials and is pipetted into the cell strainer. The strainer is rinsed with an additional 2 ml of warm media to further remove background cells. By flipping the cell strainer over and pipetting warm media through the strainer nanovial particles are recovered into a precoated 15 mL conical tube. The 15 ml conical tube is precoated by adding 2 mL of Washing Buffer into the tube, rotating by hand to cover all surfaces and aspirating excess volume. The sample is washed by spinning down to pellet the nanovial particles, aspirating supernatant and resuspending in media at the original Nanovial solution volume.

Secretion Incubation. The two samples are incubated at 37 degrees Celsius in an incubator for 30 minutes to accumulate secretions. After 30 minutes, the two samples are washed with ice cold Washing Buffer and resuspended to a volume of 250 microliters for the Raji-loaded nanovials and 100 microliters for the HyHEL-5-loaded nanovials. All samples are kept on ice for the staining step.

Nanovial Secretion Staining. 100 microliters of 12 micrograms/mL of barcoded anti-IgG (TotalSeq™-C1167 anti-mouse IgG1 Antibody Biolegend, #406636) is added to the HyHEL-5-loaded nanovial sample. Following labeling the Raji-loaded nanovials and HyHEL-5-loaded nanovials are incubated on ice for 45 minutes and then washed three times in PBS with 0.04% BSA.

10× Chromium Single-cell Library Preparation. The Raji-loaded nanovial sample and the HyHEL-5-loaded nanovial sample are then mixed together at a 1:1 ratio by pipetting and then diluted to a final concentration of 1000 nanovials/microliter for introduction into the sample reservoir of the 10× Chromium Chip and run following the standard 10× protocol (See Chromium Next GEM Single Cell 5' Reagent Kits v2 (Dual Index) User Guide, support. 10×genomics.com/permalink/user-guide-chromium-single-cell-5-reagent-kits-user-guide-v2-chemistry-dual-index, which is incorporated herein by reference). Nanovial concentration can preferably range from between 500 nanovials/microliter to 2000 nanovials/microliter to obtain sufficient cell events while also preventing overloading and system clogging. Following formation of GEM emulsions, emulsions are incubated to achieve cell lysis and release of poly(dT) and feature barcode Gel Bead primers and mixing of reverse transcription reagents. Full-length cDNA is regenerated from poly-adenylated mRNA. Simultaneously, Gel Bead primers capture the Feature Barcode NL sequences and anti-IgG-specific Feature Barcode sequences. Incubation produces 10× Barcoded cDNA from these Feature Barcodes that is linked to the same 16 nucleotide 10× Barcode as the poly-adenylated mRNA-derived cDNA. The GEM emulsions are then broken and pooled after the reverse transcription reaction. Magnetic beads are used to purify 10× Barcoded first-strand cDNA from poly-adenylated mRNA and 10× Barcoded cDNA from Feature Barcodes associated with NLs and IgG secretion. All 10× Barcoded cDNA is then amplified to create multiple cDNA libraries from the same sample, i.e. gene expression libraries and feature barcode libraries associated with NLs and secreted IgG. These libraries are denatured, diluted, and sequenced using Illumina next-gen sequencers following standard protocols used for single-cell sequencing as described in the Chromium Next GEM Single Cell 5' Reagent Kits v2 (Dual Index) User Guide, to generate FASTQ files for further analysis.

Figure 29A:
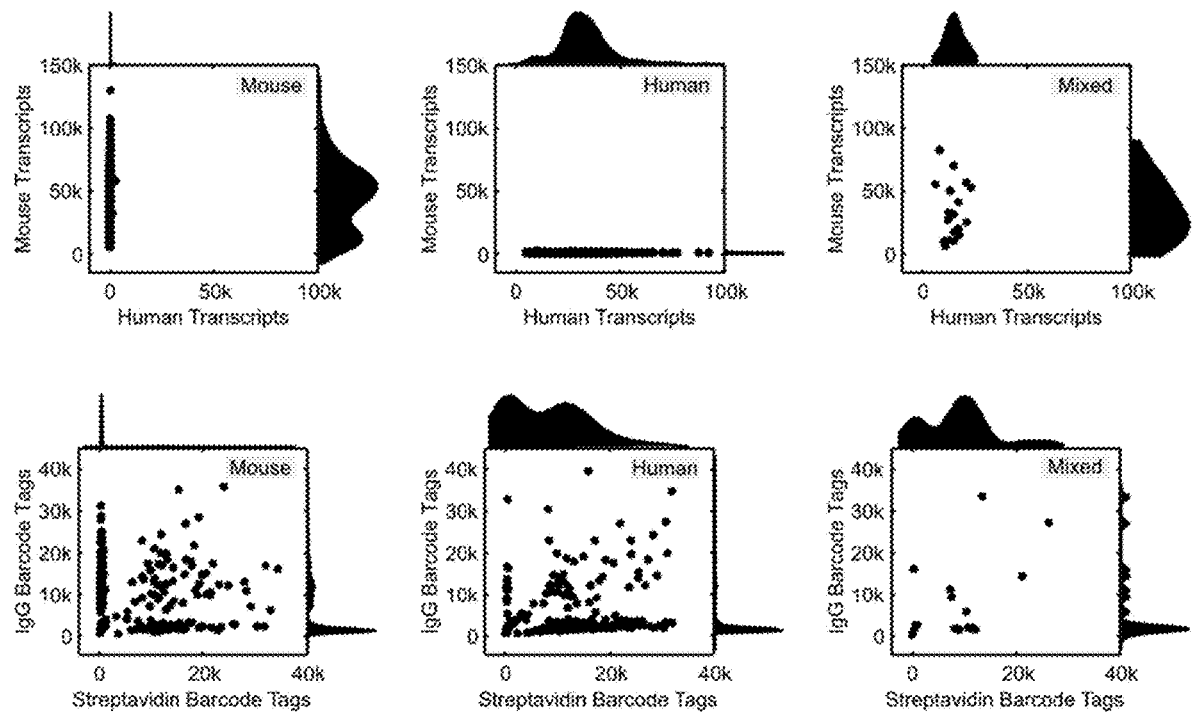

Data Analysis. Sequencing data is analyzed using CellRanger and Loupe software. Two separate populations appeared on tSNE plots associated with the HyHEL-5 hybridoma and Raji cell populations. Cells on different nanovials did not have appreciable cross-talk of mRNA transcripts, yielding well-defined and separable human (Raji) and mouse (HyHEL-5 hybridoma) transcript sets, except for some slight mixing expected for emulsion droplets with doublets (e.g. more than one nanovial loaded) (FIG. 29A). The number of transcript reads and gene counts associated with cells that also had NL streptavidin feature barcodes (cells loaded in nanovials) was not statistically different from the number of transcript reads and gene counts for cells that had no NL streptavidin feature barcodes (free cells) (FIG. 29B). This result indicates that the presence of a nanovial with a cell does not interfere with cell lysis or capture of mRNA by the oligonucleotides in the dissolved gel beads within the emulsion droplet, or other downstream chemistries of reverse transcription or cDNA amplification. The feature barcode associated with the anti-IgG antibody also correlated strongly with the secreting cell population of HyHEL-5 cells (FIG. 29B), indicating that measurement of transcriptomic and secreted proteins from the same cells was achievable with this workflow. The NL streptavidin feature barcodes associated strongly with the human Raji cells, which were initially loaded on the NL-labeled nanovials (FIG. 29B). This demonstrates the ability to barcode nanovials with oligonucleotide tags that are linked to loaded-cell transcriptomes. Sequence information for the secreted antibody heavy and light chain sequences present in the transcriptome was also linked to the secretion signal bound to the nanovial and reported out with the anti-IgG feature barcode. On average, a median of 547 reads for the expected light chain sequence per cell barcode and 197 for the expected heavy chain sequence per cell barcode for HyHEL-5 cells was found. This compared to only 6 and 2 reads, respectively, for light and heavy chain for the Raji cells, showing the reads were specific. These amount of reads from the antibody secreting cells, with 15 base pars per read, leads to 4-13× coverage of the sequence, sufficient to recover the full sequence information with statistical accuracy. This coverage can be improved through targeted amplification, e.g., using 10× V (D) J amplification kits (Product Codes 1000253, 1000255).

In some cases, a normalization process is performed to account for potential differences in secreted or bound antibody on the nanovial. The normalization process is especially useful if the capture sites for secreted antibodies on the nanovial are not saturated. In the normalization process, labeled normalization antibodies (e.g., anti-Fc or anti-H & L antibodies that are species-specific) are used to bind to the secreted antibodies. The normalization antibodies are labeled as discussed above using fluorophores and/or oligonucleotide barcodes. The signal from these labeled normalization antibodies provides a metric of the amount of secreted antibodies on the nanovial and is used to calculate a ratio of the amount or number of bound labeled antigen to secreted antibodies. The ratio is used to determine an affinity more precisely in the presence of different amounts of bound antibody compared to the absolute value of bound labeled antigen. For example, a higher ratio is more indicative of higher affinity compared to a higher absolute quantity of bound labeled antigen, which is seen for example if there is a faster secreting antibody-secreting cell.

Specificity Assay

In a non-limiting example, a related assay for antibody specificity and identification of B cells with heavy and light chain sequences with high or low specificity is performed using the aforementioned approaches with slight modifications (FIG. 10). A highly specific antibody is important as a diagnostic to avoid false positive readouts for example, or for a therapeutic to specifically target a protein but avoid binding to similar proteins in a protein family that lead to side effects or off target effects. A less specific antibody is important to develop, for example, to neutralize across a wide range of pathogens with different mutations/variations in a targeted binding epitope, such as spike protein of SARS-COV-2 and many mutants of the spike protein in circulating viruses. Specificity of the secreted antibody is evaluated by incubating antibody-secreting cells of interest (e.g., B cells, plasma cells, plasmablasts, hybridoma, engineered producer cells) in media or a solution containing a high concentration of related antigens during the secretion step (step 3) or the labeled antigen binding step (step 4). The related antigens act as a sink for non-specific antibodies such that the binding sites of these non-specific antibodies are occupied, and they do not bind with labeled target antigens. This leads to a decreased signal on the nanovial and the ability to sort out, either using FACS and a threshold on fluorescence intensity or computationally based on levels of oligonucleotide barcode reads below a threshold from single-cell RNA-seq data, the associated heavy and light chain sequences as coding for a non-specific antibody. Conversely, nanovials with fluorescent signal above a threshold or with oligonucleotide barcode reads above a threshold are linked to heavy and light chain sequences of antibody secreting cells with higher specificity. A diagnostic antibody that is specific to the target antigen in the presence of mammalian serum (e.g., human serum) is desired and the assay is performed in the presence of high concentrations of serum, for example 10% or 50% human serum, as a sink for non-specific antibodies that bind to other serum components. Labeled target antigen and separately labeled related antigens (e.g., each different related antigen is labeled with a different fluorophore that is spectrally distinguishable and/or a unique oligonucleotide barcode) are co-incubated (e.g., in step 4). In this way the relative binding affinity to the different antigens is determined based on the ratio between the different labeled antigens bound to antibodies attached to the nanovial, and antibody-secreting cells of interest and their antibody sequences can be sorted based on either high specificity (corresponding to a dominant labeled target antigen) vs. low specificity (corresponding to a diverse set of labeled related antigens bound). Epitope mapping is performed on an antibody secreted by an antibody secreting cell using this approach. For epitope mapping, a number of different pieces of an antigen (e.g., peptides) labeled with different fluorophores that are spectrally distinct, or preferably different oligonucleotide barcodes are used in the incubation step of step 4. Epitopes of the antigen that are most tightly bound will dominate the captured signal for a particular secreted and nanovial-bound antibody. This is done across a number of antibody secreting cells (e.g., B cells, plasma cells, plasmablasts, hybridoma, engineered producer cells) bound to different nanovials to link the antibody sequences (e.g., heavy and light chains) with specific epitope binding information of an antigen to obtain an antibody-secreting cell repertoire associated with an antigen along with epitope mapping of where the different antibodies in the repertoire bind. In some cases, epitope mapping uses, a whole antigen with different regions mutated or modified to create diversity (e.g., different amino acids mutated on the protein sequence of an antigen), instead of pieces of the antigen, wherein each mutant is labeled with a separate fluorescent or oligonucleotide barcode label.

Antigen Producing Cell Assay

Figure 13A:
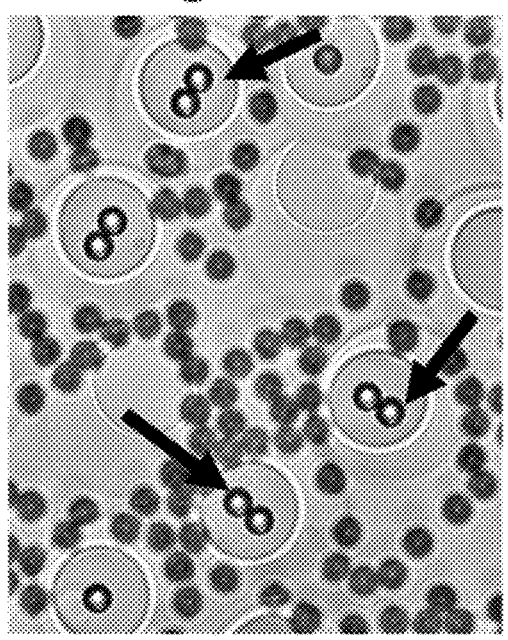
FIGS. 13A and 13B depict multi-object loading into nanovials, according to various aspects of the disclosure.
Figure 13B:
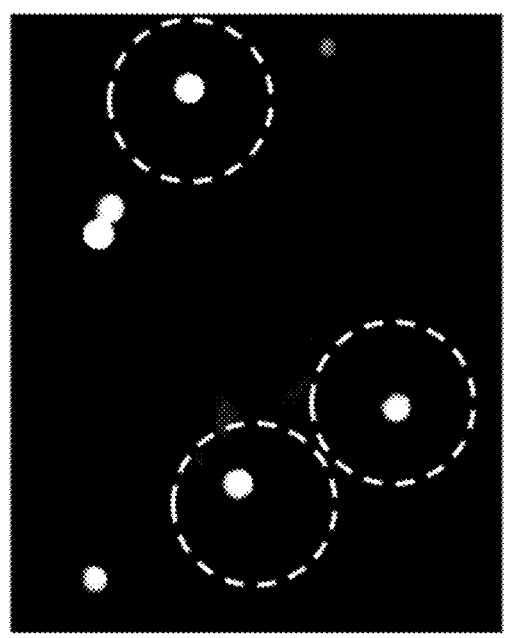
Figure 14A:
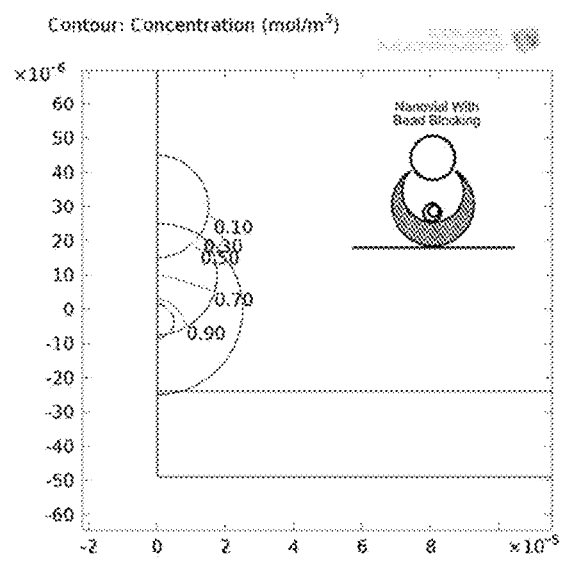
FIGS. 14A-14E depicts steady state diffusion simulation of molecules released from a cell on different shaped particles, according to various aspects of the disclosure.
Figure 14B:
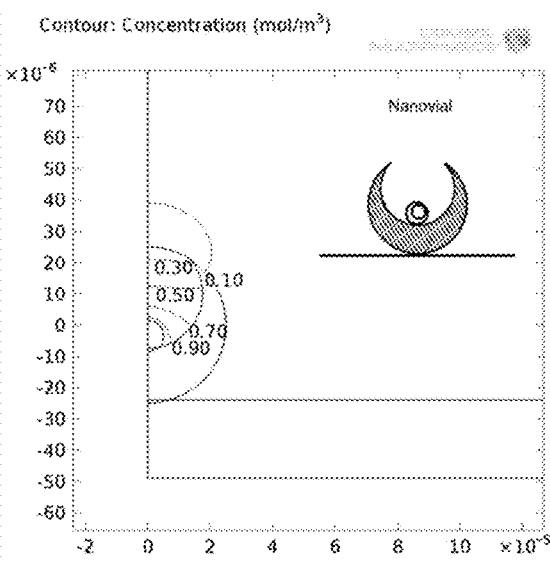
Figure 14C:
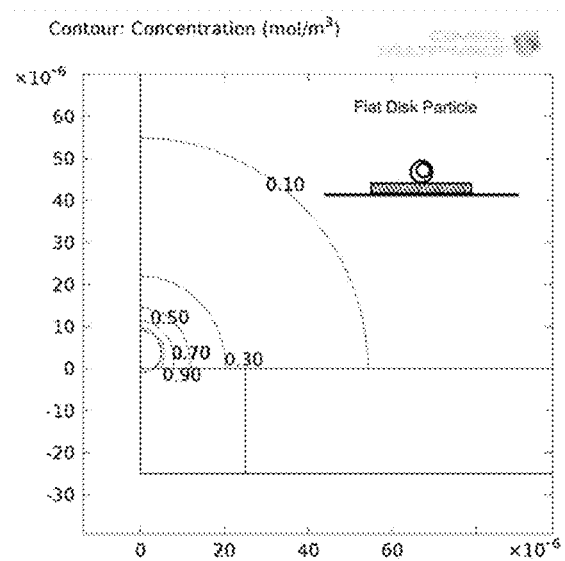
Figure 14D:
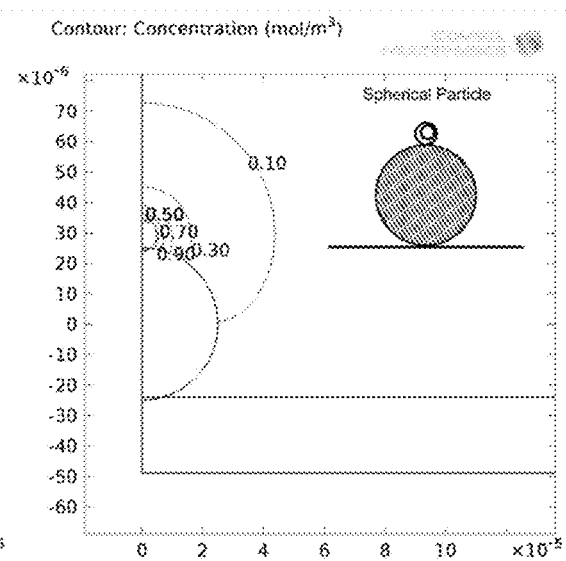
Figure 14E:
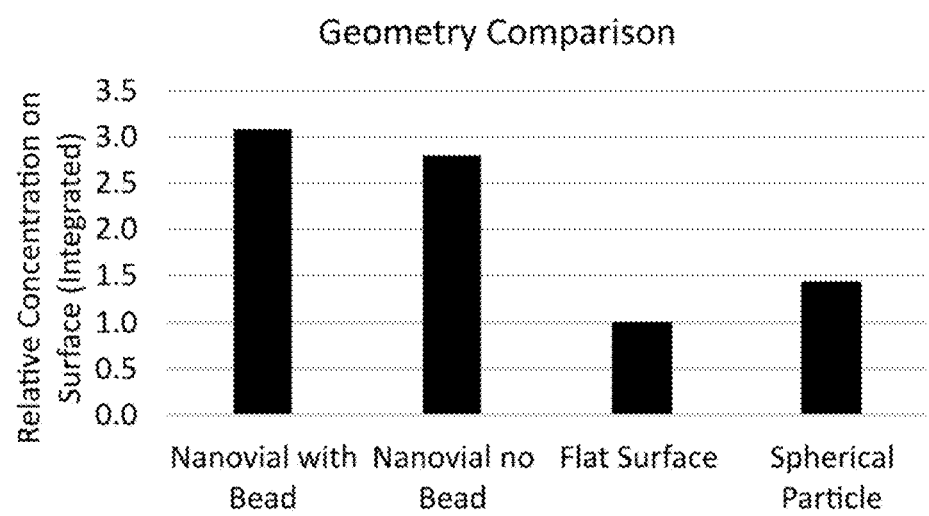
Figure 30:
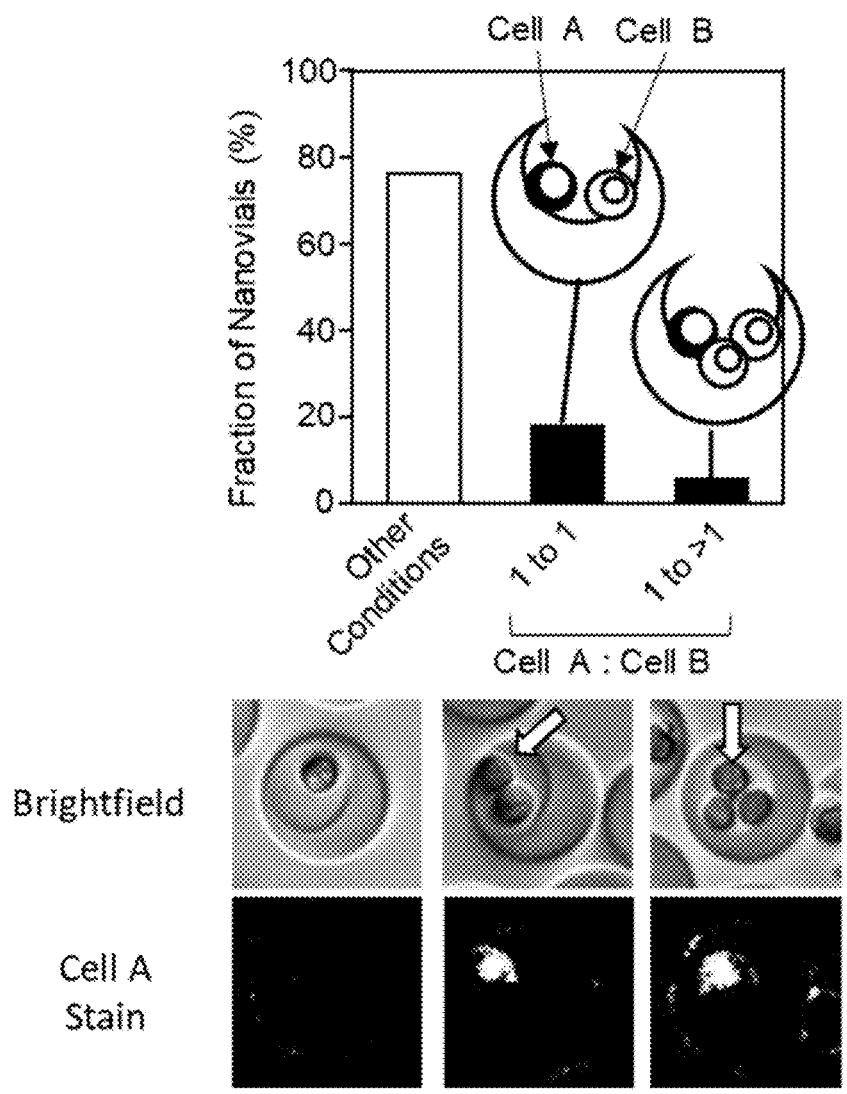
FIG. 30 depicts a non-limiting example of experimental data demonstrating loading of two different cell types, one with a fluorescent tag, and one without into the same nanovial, according to various aspects of the disclosure.
Figure 32:
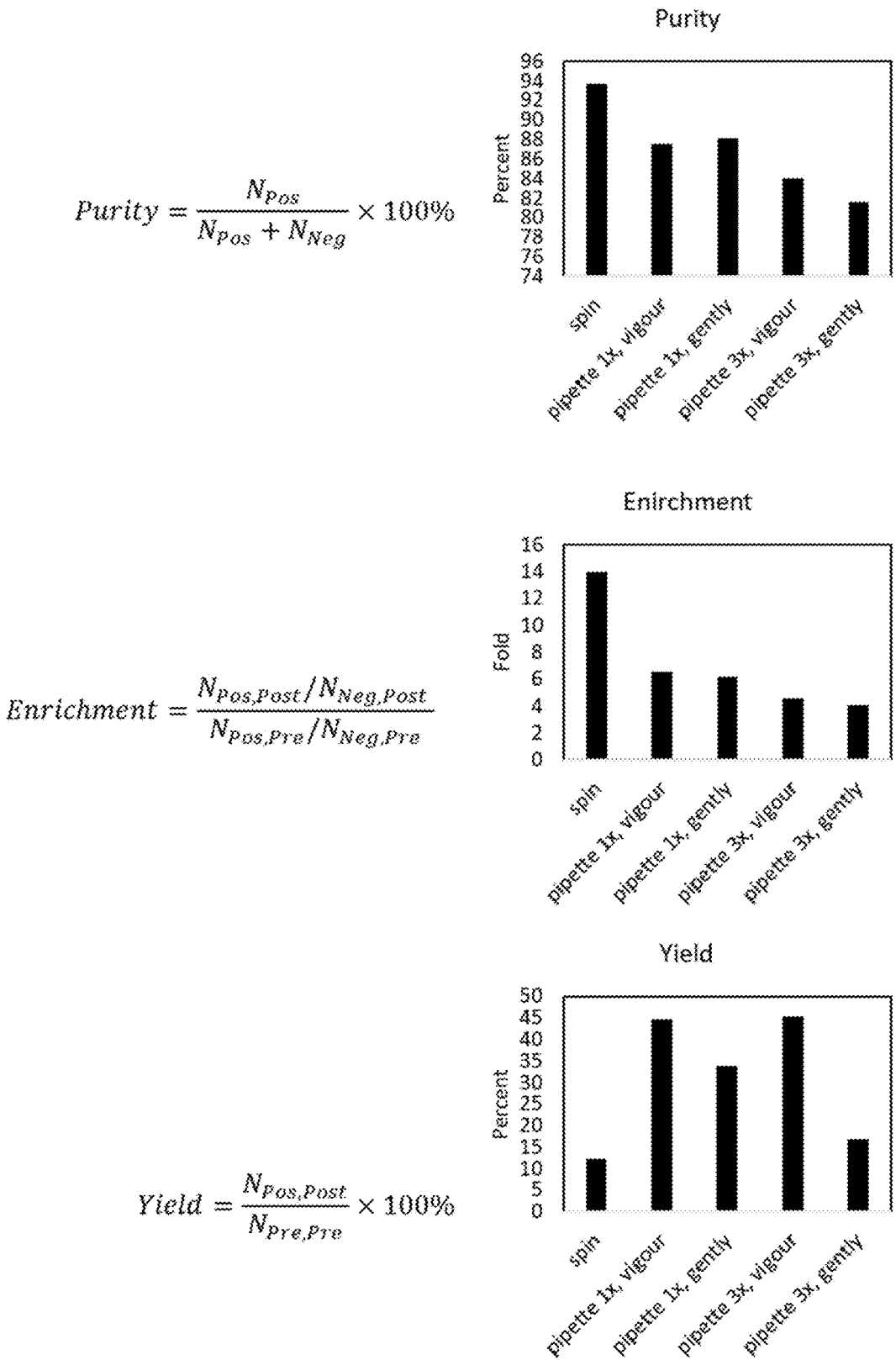
FIG. 32 depicts a non-limiting example of experimental results of nanovials enriched by labeling IgG specific nanovials with IgG specific magnetic particles under various mixing approaches and separation using magnetic forces, according to various aspects of the disclosure.

In a non-limiting example, the method described above is also applied to identify antibodies or other secretions that interact with antigens produced and accessible on the surface of a living or dead cell (FIG. 11). The antigen-producing or antigen-presenting cell is first loaded into the nanovials and adhered through antibody interactions with cell surface proteins or adhesion peptides (e.g., RGD) or extracellular matrix proteins prior to loading of the antibody-secreting cell. That is, prior to step 1 as listed above. However, in other embodiments the antigen-producing cells are loaded and captured into the nanovials after loading the antibody-secreting cells. Ideally, antigen-producing cells are loaded at a concentration such that one or more antigen-producing cells is bound to each nanovial. An example of multi-object loading is shown in FIGS. 13A-13B with polystyrene particles similar in size to cells. Two different types of particles are shown to be loaded in three of the nanovials that are outlined in dashed white circles in the fluorescence image, visible as one fluorescent particle, and one non-fluorescent particle in each nanovial. Another example shows loading of multiple cells (FIG. 30), 1F5 hybridoma cells which produce an antibody to human CD20 and Raji antigen-producing cells that contain human CD20 antigen on the cell membrane. Around 20% of nanovials were able to be loaded with one cell of a first type and at least one cell of a second type. The two different cell types are shown in the merged fluorescence and brightfield micrograph to be bound in the cavity of the nanovials and various combinations of Raji cells and hybridoma cells are marked with circles. Raji cells are tagged with a fluorescence label (cellTracker) while hybridoma cells are unlabeled. For loading of both cell types nanovials were linked with capture antibodies against human CD19 and mouse CD45. Alternatively, antibodies against a universal cell marker highly expressed on all nucleated cells can be used, such as beta-2-microglobulin (B2M). Antibodies for B2M that are species cross-reactive (ThermoFisher, Product #13511-1-AP) provide a single antibody for cell capture of multiple species (e.g., mouse and human cells). In some cases, the antigen-producing cells are prokaryotic or eukaryotic. For example, bacterial or yeast cells, or mammalian cells (e.g., a cancer cell, stem cell, or other adherent or suspension cell type). Antigen-producing cells are engineered to express antigen at higher levels than normal to maximize signal. Using adhered antigen-producing cells is described with the following steps. (0) Loading and adhering antigen-producing cells into the nanovials using a high lambda (e.g., lambda=1, 2 or greater), (1) capturing the secreting cell of interest on the nanovial, (2) optionally encapsulating the cell of interest and nanovial into an oil phase to form an emulsion, (3) incubating the cell of interest for a period of time (preferably 30 min to 3 hours, less preferably 3 to 24 hours) and capturing the accumulated secreted antibody on the antigen-producing cell, (4) incubating with a labeled secondary antibody specific to the secreted antibody (e.g., anti-mouse H & L or anti-mouse Fc for mouse B cells or other antibody-secreting cells), (5) determining the amount of labeled secondary antibody bound to the antigen-producing cells and associated with the secreting cell of interest, and then (6) identifying the sequence information for the secreted antibody from the secreting cell of interest. Here, the labeled secondary antibodies are labeled using a fluorophore, oligonucleotide barcode compatible with single-cell RNA-sequencing, magnetic particle, or any combination of the above. As discussed above the nanovial containing the secreting cell of interest and secreted antibody bound to the antigen-producing cell are sorted using FACS or MACS prior to downstream sequencing of the antibody (e.g., paired VH and VL sequences). Using a threshold on fluorescence intensity for the secondary antibody fluorophore and sorting nanovials (and associated antibody-secreting cells of interest) is used to select for antibody secreting cells specific to the antigen on the antigen-producing cell. Alternatively, if labeled with barcoded oligonucleotides the nanovial (and associated cells) are introduced into a single-cell RNA-sequencing workflow (e.g., 10× Genomics Chromium). In this workflow antibody binding is assayed and linked to the antibody sequences of antibody-secreting cells by looking for the number of sequencing reads of the oligonucleotide barcode that also are connected to the same single-cell or nanovial barcode (e.g., from a GEM bead or nanovial). Selecting antibody sequences with a number of the barcode oligonucleotides associated with the same single-cell (or single-nanovial) oligonucleotide barcode (e.g., GEM bead for 10× Chromium system) comprises identifying single-cell (or single-nanovial) barcodes containing oligonucleotide barcode reads above a threshold number. Then identifying antibody sequence (VH and VL) reads associated with the same single-cell (or single-nanovial) barcodes. Alternatively, if labeled with magnetic particles for MACS, magnetic particle labels may comprise e.g., dynabeads conjugated with anti-mouse IgG (ThermoFisher, #11033), which when bound to secreted IgG associated with nanovials imparts magnetic properties to the nanovials (FIG. 31). Nanovials with IgG secretion can then be enriched using a MACS column-free approach to pull down labeled nanovials for 5-10 minutes. Enrichment of nanovials containing bound IgG between 5-14-fold is achieved using this approach (FIG. 32). To demonstrate magnetic separation of target nanovials based on IgG bound, 180 microliters of target 55 micrometer PEG-norbornene nanovials are mixed with 180 microliters of 60 micrograms/mL streptavidin, incubated for 15 minutes on a tube rotator and washed three times using the Washing Procedure and resuspended into the original 180 microliter volume. Another 300 microliters of non-target 55 micrometer PEG-norbornene nanovials are mixed with 300 microliters of 60 micrograms/mL streptavidin AlexaFluor 488, incubated for 15 minutes on a tube rotator and washed three times using the Washing Procedure and resuspended into 300 microliters. The target nanovial solution is incubated with 180 microliters of 12 microgram/mL biotinylated anti-IgG (Jackson Immunoresearch, goat anti-mouse Fc) for 30 minutes at room temperature on a rotator and then washed three times using the Washing Procedure. The sample pellet (36 microliters) of target nanovials is then mixed with 3.2 mL of HyHEL-5 conditioned media and incubated for 1 hour at room temperature on the rotator. Conditioned media followed 4 days in culture at 1.5 million cells/mL when collected and filtered. Following incubation, nanovials are washed three times using the Washing Procedure. 180 microliters of fluorescent hen egg lysozyme (HEL) at a concentration of 10 micrograms/mL are added to the 180-microliter target nanovial sample and washed three times using the Washing Procedure. The target nanovial sample and non-target nanovial sample are mixed at varying ratios from 1:1 to 1:25. The mixed nanovial samples are incubated with dynabeads conjugated with anti-mouse IgG (ThermoFisher, #11033) at a ratio of 10 dynabeads per 1 nanovial (e.g., 510,000 dynabeads per 51,000 nanovials). Upon mixing, the sample is pipetted vigorously 10 times and let to sit for 30 minutes. The sample is transferred into a 15 mL tube with Washing Buffer and put into a magnet for 5 minutes. 5 mL of buffer is aspirated, the sample is mixed, and 5 mL of buffer is re-added while on the magnet and repeated three times. A sample is aliquoted for imaging and calculation of enrichment of target nanovials to non-target nanovials. Enriched nanovials using this process can also be inputted into a downstream single-cell sequencing workflow as described herein.

For evaluating antibody binding to cell surface antigens, antibody from a secreting cell of interest associated with a nanovial is first captured on the nanovial using the processes discussed herein. Then labeled antigen-producing cells are co-incubated and mixed with the nanovials to cause adhesion to the nanovials if the secreted antibody from the secreting cell of interest binds to the antigen on the antigen-producing cells. Antigen-producing cells are labeled with fluorophores, magnetic particles, or oligonucleotide barcodes, or the intrinsic different mRNA levels or combinations of mRNA levels present in the antigen-producing cells may be used as a label in a single-cell sequencing workflow as discussed herein. For example, mRNA for the expressed antigen is used as a barcode for the presence of the antigen-producing cell and its binding to the secreted antibodies on the nanovial. Nanovials with bound antigen-producing cells are sorted using e.g., FACS or MACS followed by downstream sequencing to identify antibody sequences of a secreting cell of interest associated with binding of antigen-producing cells. Alternatively, if antigen-producing cells are labeled with barcoded oligonucleotides or the intrinsic mRNA levels in the cells are used instead, the nanovial is introduced into a single-cell RNA-sequencing workflow (e.g., 10× Genomics Chromium). In this workflow antigen-producing cell binding to antibody is assayed and linked to the antibody sequences from the secreting cell of interest by looking for sequencing reads which show the barcode oligonucleotides or cDNA corresponding to mRNA from the antigen-producing cell associated with the same single-cell (or single-nanovial) barcode (e.g., from a GEM bead or nanovial), counting the amount of the cDNA reads from the antigen-producing cell or oligonucleotide barcode reads and based on a threshold identifying a set of high performing single-cell or nanovial barcodes. The antibody sequences are then identified that are linked to or associated with these high performing single-cell or nanovial barcodes. The alternative related embodiment described in this paragraph is especially useful in identifying affinity reagents or other antibodies that can facilitate antigen-producing cell binding to a surface based on the presence of an antigen, e.g., for capture on magnetic beads, glass slides, or nanovials. This is used then to separate out sub-populations of cells or facilitate some of the nanovial-based workflows described herein.

Using antigen-producing cells as targets of antibody binding, the downstream effects of antibody binding to the cell-surface antigen on cell signaling is also assayed in a nanovial-based assay (FIG. 12). In some cases, antigen-producing cells are genetically engineered to include a fluorescent reporter protein that is associated with the activation of a signaling pathway (e.g., through introducing a DNA sequence into the antigen-producing cell that includes a promoter region/transcription factor binding region that is associated with the signaling pathway and fusing this upstream of the gene for the fluorescent reporter protein gene, e.g., GFP, EGFP, RFP, or a fluorescent reporter protein that is sensitive to intracellular calcium concentration—e.g., GCaMP (or GCaMP co-expressed with a red fluorescent protein like mCherry to perform ratiometric measurements of calcium concentration). Binding of antibody secreted by the antibody-secreting cell in the nanovial to the antigen/target on the surface of the antigen-producing cell then either modulates (activates or inhibits) the signaling pathway or interferes with activation or inhibition by a separately introduced agonist or ligand that interacts with an antigen to modulate the downstream signaling pathway. The activity of the antibody on the downstream signaling pathway is then assessed by the production of fluorescent protein (e.g., green fluorescent protein, cyan fluorescent protein, red fluorescent protein, etc.) in the antigen-producing cell (i.e., reporter cell) or the fluorescence levels of the calcium-concentration-dependent fluorescent reporter protein in the reporter cell. Nanovials containing antigen-producing cells with specific fluorescence levels (e.g., above or below a cut-off) or ratios of fluorescence levels are then sorted using FACS and the corresponding antibody secreting cells (e.g., B cells, plasma cells, plasmablasts, engineered producing cells) analyzed to identify antibody sequences (e.g., heavy and light chains) that code for antibodies that modulate the particular signaling pathway through cell surface binding, or interaction with the agonist or ligand as discussed in many embodiments described herein. For example, these antibodies bind cell surface receptors and mimic a normal ligand (e.g., agonist), or interfere with the binding of a normal ligand with binding to a cell surface receptor (e.g., antagonist). In some cases, multiple signaling pathways are interrogated in this manner in a single assay by using antigen-producing cells that are genetically modified with multiple separate fluorescent reporter proteins, or a plurality of different antigen-producing cells each with a separate fluorescent reporter introduced specific to a different signaling pathway. Different transcription factors or promoter regions associated with different signaling pathways are incorporated upstream of the genes coding for each of the fluorescent proteins. Signaling pathways in these various embodiments include Akt/PKB signaling pathway, AMPK signaling pathway, cAMP-dependent pathway, Eph/ephrin signaling pathway, Hedgehog signaling pathway, Hippo signaling pathway, Insulin signal transduction pathway, JAK-STAT signaling pathway, MAPK/ERK signaling pathway, mTOR signaling pathway, Nodal signaling pathway, Notch signaling pathway or engineered synNotch signaling pathways, PI3K/AKT/mTOR signaling pathway, TGF beta signaling pathway, TLR signaling pathway, VEGF signaling pathway, Wnt signaling pathway, and others. The nanovials and associated cells are sorted using standard multi-color FACS to identify, for example, antibodies that activate one particular signaling pathway while not activating another or activating one or more signaling pathways while not activating another one or more signaling pathways (high fluorescence for fluorescent protein 1, low fluorescence for fluorescent protein 2, etc.). Antigen-producing cells of interest are also engineered to overexpress an antigen of interest on the cell surface to facilitate and focus discovery on antibodies that interact with this particular overexpressed cell surface antigen or receptor.

When including an antigen-producing cell and secreting cell of interest (e.g., antibody-secreting cell), the ability of the secreted product to act as an agonist/antagonist based on interacting with an antigen on the antigen-producing cell is directly measured using "single-cell" RNA-seq on the nanovial. The nanovial contains (i) one or more antigen-producing cells and (ii) a single secreting cell of interest. The following steps are performed: (0) Loading and adhering antigen-producing cells into the nanovials using a high lambda (e.g., lambda=1, 2 or greater), (1) capturing the antibody-secreting cell of interest on the nanovial, (2) optionally encapsulating the loaded cells and nanovial into an oil phase to form an emulsion, (3) incubating the cell of interest for a period of time (>30 minutes, preferably 3 to 24 hours to allow for significant gene expression changes in the antigen-producing cell, less preferably 30 min to 3 hours) to accumulate secreted antibody to interact with antigen of the antigen-producing cell and affect gene expression changes, (4) identifying the sequence information for the secreted antibody from the secreting cell of interest and the sequence information for mRNA expressed by the antigen-producing cell, (5) linking this sequence information with a unique oligonucleotide barcode (i.e., single-cell or nanovial barcode), (6) optionally identifying antibody sequences with significant effects on mRNA expressed by the antigen-producing cell compared to a non-antigen-producing control cell or compared to an antigen-producing cell without exposure to an antibody-secreting cell. Note that the order of Steps 0 and 1 are simultaneous or sequential or the order is inverted. Steps 4 and 5 are performed by using the 10× Genomics Chromium platform or other such single-cell RNA-sequencing platforms known in the art (e.g., Drop-seq, Seq-well, dropicle-based RNA-seq Rhapsody, Fluidigm C1, etc.). When single-cell sequencing is performed, the oligonucleotide barcodes on the e.g., GEMs is contiguously attached to both the cDNA derived from the mRNA of the secreting cell of interest, such as the mRNA encoding the secreted protein (e.g., heavy and light chain sequences) as well as the cDNA derived from the mRNA of the antigen-producing cell. Therefore, the mRNA profile of the antigen-producing cell and mRNA encoding for the secreted protein are linked through the presence of the same oligonucleotide barcode in their corresponding cDNA. The antigen-producing cell and secreting cell of interest are chosen to belong to different species such that the genes expressed by the cells are easily distinguished as coming from the different cell types. For example, the secreting cell of interest is a B cell or plasma cell from mice while the antigen-producing cell is a human cell (e.g., HEK293 cell). In a related embodiment the barcode oligonucleotides are present on the nanovial (nanovial barcodes) instead of a GEM bead in a single-cell RNA-seq workflow (single-cell barcodes). Step 6 is performed using standard bioinformatic analysis known in the art of the sequencing reads (e.g., fastq data files) following sequencing of the cDNA libraries with the linked barcode oligonucleotides. This approach is, for example, used to identify antibody sequences for antibodies that interact with antigen-producing cells to yield the activation or suppression of a signaling pathway by performing pathway analysis (e.g., Ingenuity Pathway Analysis) of the mRNA profile of the antigen-producing cell. This mRNA profile is used to infer agonism or antagonism of an antibody with a cell surface receptor or its interaction with a ligand/agonist. Importantly, this approach is performed with antigen-producing cells that are not engineered to overexpress antigen or engineered to have a reporter function (e.g., produce a fluorescent protein). The approach is also used to identify antibody sequences coding for antibodies that lead to activation or prevent the activation in the presence of an agonist, of apoptosis pathways, cell growth pathways, cell differentiation, immune cell activation, cell senescence, or maintenance of cell multipotency or pluripotency. The assay is conducted in the presence of normal media or media containing specific compounds, ligands, agonists, or proteins that elicit a change in cell activity or signaling. In some cases, normalizing for the amount of secreted antibody is performed by also exposing the nanovial to anti-mouse antibody with oligonucleotide barcodes attached as described herein in other sections. This normalization step is performed between step 3 and step 4 of the above method.

In a non-limiting example, antibodies are discovered that prevent signaling through a TNF-alpha receptor (e.g., TNFR1) on endothelial cells by either blocking the binding site on TNFR1 or binding to TNF-alpha. Such antibodies are used as drugs to treat auto-immune conditions such as psoriasis, Crohn's disease, ulcerative colitis, and arthritis. In this example, mice are immunized with TNF-alpha or TNFR1 or peptides therefrom, and the one or more antigen-producing cells comprise endothelial cells expressing TNFR1 and the single antibody secreting cell comprises a single B cell, plasma blast, or plasma cell secreting IgG antibodies isolated from the spleen or bone marrow of immunized mice. Endothelial cells and a B cell, plasma blast, or plasma cell are loaded into a nanovial (30-50 micrometer diameter) with streptavidin moieties by coating the surface of the endothelial cells and B cells with biotinylated antibodies (e.g., using biotinylated anti-CD31 for endothelial cells and anti-CD45 antibodies for B cells/plasma blasts/plasma cells) or coating the surfaces of the nanovials with anti-CD31 and anti-CD45 antibodies at equal molar ratio. Endothelial cells are seeded into nanovials with an average occupancy, lambda>2 and lambda<5, to ensure at least a single endothelial cell per nanovial. B cells are seeded into nanovials with an average occupancy, with lambda=0.1 preferably to ensure that the majority of nanovials containing B cells possess a single B cell. Cells are allowed to adhere over a >30 min period. TNF-alpha is added into the media containing the nanovials with adhered cells at a physiologically relevant concentration associated with disease, such as osteoarthritis or psoriasis (e.g., 2 pg/mL-10 pg/mL). Nanovials are optionally encapsulated in the oil phase to concentrate and accumulate the secreted antibody from the attached B cell in the nanovial cavity. Secreted antibody binds to TNF-alpha or TNFR1 on the attached endothelial cells. Nanovials are incubated for preferably 3-5 hours to evaluate time dependent biological effects of the secreted antibody on TNF-alpha signaling, specifically effects on mRNA expression of proteins/downstream proteins in the endothelial cells due to the secreted antibody. For example, binding of the secreted antibody to TNF-alpha prevents binding to TNFR1 and activation of NF-kappaB signaling leading to changes in mRNA transcripts of a number of downstream proteins. It prevents an increase in ICAM-1 and VCAM-1 mRNA associated with inflammation and immune cell recruitment. Other antibodies from other B cells in additional nanovials will not bind to TNF-alpha or TNFR1 or interfere with such signaling leading to higher levels of e.g., ICAM-1 and VCAM-1 mRNA expressed in endothelial cells associated with the additional nanovials. If emulsified the nanovial emulsion is broken to bring nanovials back into an aqueous phase using techniques described herein. A plurality of nanovials with loaded endothelial cells and single B cells/plasma blasts/plasma cells are then introduced into a single-cell RNA sequencing workflow (e.g., 10× Chromium, BD Rhapsody, Drop-seq, nanovial-based single-cell RNA-seq workflow) that uses barcoding to add a contiguous tag to cDNA from mRNA transcripts with the same single cell (or single nanovial) oligonucleotide barcode for all of the cells within a single nanovial (e.g., single secreting B cells and endothelial cells exposed to B cell secreted antibodies) using reverse transcription. These cDNA from the mRNA transcripts for the B cell/plasma blast/plasma cell and endothelial cells exposed to B cell secreted antibodies are then amplified using polymerase chain reaction and sequenced using next generation sequencing (e.g., Illumina NovaSeq SP 1×100 bp). The cDNA can be linked together in the analysis step using the single-cell (or single-nanovial) oligonucleotide barcode from e.g., the GEMbead or oligonucleotide barcodes incorporated into the nanovial itself. Antibody screening and discovery of antibodies acting as antagonists for TNF-alpha signaling is achieved by (1) identifying increased reads for mRNA transcripts from endothelial cells downstream of TNF-alpha signaling e.g., ICAM-1 and VCAM-1 relative to other housekeeping gene reads (e.g., GAPDH, ACTB) for a specific cell/nanovial oligonucleotide barcode, in comparison with control cells without the secreting B cell present, and (2) identifying the antibody gene sequence (matched heavy and light chain genes) associated with the same cell/nanovial oligonucleotide barcode. This approach is advantageous in that the function of an antibody in modulating cell signaling is screened at high throughput in the first discovery step, to find better antibodies faster, without first looking at other metrics like binding or affinity to targets, which are not as strongly correlated to function.

In a non-limiting example, secreting cells of interest are also from a library of cells transfected to secrete or produce other biologics or proteins including bi-specific antibodies, camelid antibodies, nanobodies, affibodies, DNA/peptide/RNA aptamers (e.g., a CRISPR-engineered library). Secreting cells of interest include engineered CHO cells, HEK293 cells, Baculovirus-Insect Cells, yeast cells, bacterial cells. Secreting cells of interest also include T cells, NK cells, mesenchymal stem cells, hematopoietic stem cells or other stem cells or progenitor cells. For example, an embodiment comprising T cells as the secreting cell of interest includes the use of antigen-presenting cells that present an antigen on the cell surface or as part of the MHC Class I or Class II complex and include the following steps: (0) Loading and adhering antigen-presenting cells into the nanovials using a high lambda (e.g., lambda=1, 2 or greater), (1) capturing the T cell of interest on the nanovial (using e.g., anti-CD45) or on the antigen-presenting cells adhered to the nanovial based on interaction with cell surface bound antigen or presented antigen, (2) optionally encapsulating the nanovial into an oil phase to form an emulsion, (3) incubating the nanovial for a period of time (>30 minutes, preferably 3 to 24 hours to allow for significant gene expression changes) to accumulate secretions (e.g., perforin, granzyme, IL-2, TNF-alpha, IFN-gamma), in which secretions may interact with the antigen-producing cell and affect gene expression changes, (4) identifying the sequence information for the T cell receptor (TCR) or chimeric antigen receptor (CAR) from the secreting T cell of interest and/or the sequence information for mRNA expressed by the secreting T cell of interest and/or the antigen-presenting cell, and/or the mRNA for the antigen expressed by the antigen-presenting cell (5) linking this sequence information with a unique oligonucleotide barcode, (6) optionally identifying TCR or CAR sequences with significant effects on mRNA expressed by the antigen-presenting cell compared to a non-antigen-presenting control cell or compared to an antigen-presenting cell without exposure to a secreting T cell of interest, (7) optionally identifying antigen sequences from the antigen-presenting cell with significant effects on mRNA expressed by the secreting T cell of interest compared a secreting T cell of interest without interaction with an antigen-presenting cell. A related embodiment using FACS to sort T cells activated to secrete upon interacting with adhered antigen-presenting cells is described with the following steps. (0) Loading and adhering antigen-presenting cells into the nanovials using a high lambda (e.g., lambda=1, 2 or greater), (1) capturing the secreting T cell of interest on the nanovial or on the antigen-presenting cell adhered to the nanovial, (2) optionally encapsulating the nanovial into an oil phase to form an emulsion, (3) incubating the T cell of interest for a period of time (preferably 30 min to 3 hours, less preferably 3 to 24 hours) and capturing accumulated secreted cytokines or other secretions on the nanovial, (4) incubating with a labeled secondary antibody specific to the secretions (e.g., anti-IL2, anti-TNF-alpha, anti-IFN-gamma), (5) determining the amount of labeled secondary antibody bound to the nanovial and associated with the secreting T cell of interest using a flow cytometer or FACS instrument, (6) FACS sorting based on a threshold or gate of one or more secondary antibody labels associated with secretions, and (7) optionally identifying the sequence information for the TCR or CAR expressed by the secreting T cell of interest. The labeled secondary antibody may include fluorescent labels as well as oligonucleotide barcode labels.

In the above non-limiting example, a plurality of antigen-presenting cells are used in the loading step 0, that all express a single antigen and a plurality of T cells that express different TCRs or CARs. This enables screening for TCRs or CARs that functionally interact with target antigen-presenting or antigen-producing cells, leading to high levels of secretions associated with a cell killing or an immune activation function. Alternatively, the plurality of antigen-presenting cells is used that express different antigens and are interacted with a plurality of T cells all expressing a single TCR or CAR. This enables performing de-orphanization of the antigens targeted by a TCR or CAR associated with e.g., tumor infiltrating lymphocytes (TILs) from a human or animal model. In this case, for step 0, the antigen-presenting cells are loaded at lower lambda, e.g., lambda=0.1-0.3 and T cells in step 1 are loaded at higher lambda>1. Alternatively, both the plurality of antigen-presenting cells express different antigens and the plurality of T cells express different TCRs or CARs, in order to perform functional repertoire analysis of TCRs or CARs and potential recognized antigens. In this case, for step 0, the antigen-presenting cells are loaded at lower lambda, e.g., lambda=0.1-0.3 and T cells in step 1 are loaded at lower lambda as well, lambda=0.1-0.3. Preferably cells are loaded into >20,000 nanovials in the loading step to account for diversity of cells, more preferably cells are seeded into >100,000 nanovials to capture greater diversity.

In a related non-limiting example, a plurality of nanovials modified with a single antigen or peptide-MHC antigens are used instead of antigen-presenting cells in the loading step 0, and a plurality of T cells that express different TCRs or CARs are introduced. This enables screening for TCRs or CARs that functionally interact with target antigen on the nanovials, leading to high levels of secretions associated with a cell killing or an immune activation function. Alternatively, the plurality of nanovials is modified with different antigens and a specific label, e.g., oligonucleotide barcode, associated with that antigen and nanovials are interacted with a plurality of T cells all expressing a single TCR or CAR. Downstream, the presence of a bound T cell secreting cytokines can be linked to the antigen-specific label. This enables performing de-orphanization of the antigens targeted by a TCR or CAR associated with e.g., tumor infiltrating lymphocytes (TILs) from a human or animal model. Alternatively, both the plurality of nanovials with different antigens (and associated labels) and the plurality of T cells expressing different TCRs or CARs, are mixed, in order to perform functional repertoire analysis of TCRs or CARs and potential recognized antigens. Preferably cells are loaded into >20,000 nanovials in the loading step to account for diversity of cells, more preferably cells are seeded into >100,000 nanovials to capture greater diversity.

Figure 33:
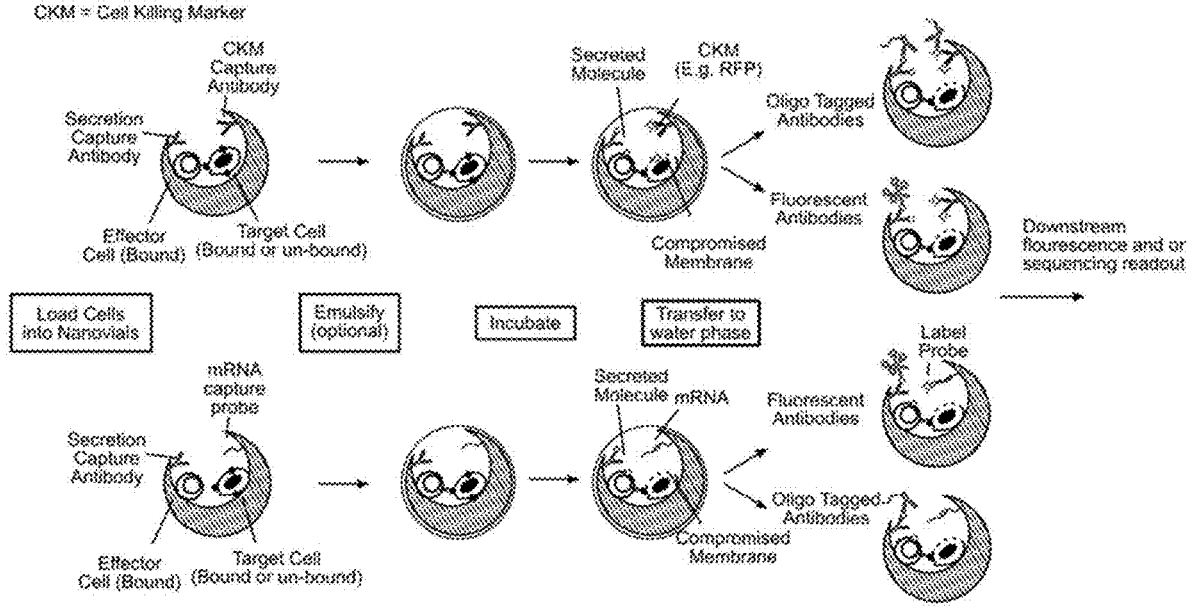
FIG. 33 depicts a non-limiting example of a cell killing assay workflow which can be used for screening functional CAR and TCR constructs, according to various aspects of the disclosure.

In another non-limiting example, CARs or TCRs are discovered based on functions such as cell killing and/or secretion as illustrated in FIG. 33. CAR-T cell therapy has been shown to provide benefits for patients with liquid cancers. Two CAR-T products against CD19 were approved by the FDA for acute lymphoblastic leukemia (ALL) and B cell lymphoma treatment. However, there are major challenges in the development of CAR-T therapy including: (1) a time-consuming process to screen a large number of different CAR constructs in designed CAR-T cells based on cell-killing ability (2) the inconsistency between in vitro and in vivo results which may result from a lack of transcriptome information from the activated CAR-T cell candidates. Nanovials provide an innovative way to evaluate, and sort based on the functionality of CAR-T cells in a high-throughput manner. A cell killing assay for single CAR-T cells associated with nanovials is conducted as follows. 50 µm diameter nanovials modified with cell capture antibody (anti-human CD45 antibody, BioLegend, cat #304004), lysate capture antibody (e.g. anti-RFP antibody, Thermo Fisher, cat #600-406-379) and secretion capture antibody (anti-TNF-α, Invitrogen, cat #13-7349-81/anti-IFNγ, Invitrogen, cat #M701B/anti-IL-2, BioLegend, cat #517605) antibodies were washed and suspended in modified RPMI medium (Gibco, cat #A1049101). Nanovials are resuspended and added to the well of a 24 well plate in 2 mL RPMI medium; or alternatively resuspended and added to a microfuge tube in 0.5 mL RPMI medium. T cells transduced with a library of CAR constructs (effector cells) are loaded in the nanovials at a ratio of 0.9 cells per nanovial and allowed to bind. The plate or tube are incubated at 4° C. for 30 minutes, and then nanovials containing cells are strained using a 20 µm strainer (Partec North America, cat #NC9699018) and washed to remove unloaded CAR-T cells. Nanovials are recovered in fresh and pre-warmed ATCC-modified RPMI medium, followed by addition of target cells expressing an antigen of interest at a ratio of effector cells: target cells (E:T) of 1:5. Alternatively, ratios of 1:10 or even 1:100 can be used to maximize the interactions between effector and target cells. Target cells also comprise a cell killing marker, which can include an intracellular biomolecule that is released upon cell death and is captured by the cell lysate capture antibody. Preferably the cell killing marker (or lysate molecule) is fluorescent, such as a fluorescent protein (e.g., RFP, GFP, PE, APC), but non-fluorescent cell killing markers may also be used and captured by the lysate capture antibody (e.g., and then stained with a second antibody specific to the cell killing marker that is conjugated to a label (fluorescent, magnetic, oligonucleotide). The co-culture mixture is incubated at 37 degrees Celsius for the collection of T cell activation and T cell-mediated target cell killing signals that accumulate locally on nanovials near cells containing constructs that lead to activation and functionally killing. The nanovials are optionally emulsified to prevent crosstalk during cell killing and secretion. As an example, T cells transduced with the CD19-BBz CAR and GFP were activated once encountering RFP-expressing CD19 positive Raji cells, leading to production of cytokines and initial target cell killing which caused the loss of target cell membrane integrity through perforin/granzyme production, leading to RFP leakage from target cells and capture by the cell lysate capture antibody on the nanovial (FIG. 33, FIG. 34). As discussed, alternatively or in addition to RFP signal from target cells which are lysed, other protein or intracellular released mRNA that is associated with cell death can be captured on the nanovial with appropriate antibodies or complementary oligonucleotides and analyzed. After 24 hours of incubation, nanovials and associated cells are optionally de-emulsified, and washed to remove background secretions. Half of the nanovials with the CAR-T cells and secretions are labeled with an oligo-tagged antibody targeting secreted cytokines and a separate oligo-tagged antibody targeting RFP or targeting cell apoptotic protein and mRNA and analyzed using a single-cell RNA-seq workflow as described herein to link CAR construct sequence to the presence of one or more cell killing markers and secreted markers. It should be noted that other incubation times, such as 6 hours or 12 hours (overnight) incubation can also be performed. The other half of nanovials with the CAR-T cells and captured secretions and cell killing markers are labeled with secondary fluorescent antibodies (e.g., BV 785 anti-human TNF-α antibody, BioLegend, cat #502947, BV 605 mouse anti-human IFN-γ antibody, BD Biosciences, cat #562974, BV 605 rat anti-human IL-2 antibody, BD Biosciences, cat #564165) targeting the secreted cytokines, then analyzed and sorted with a flow cytometer based on the amount of secreted product and the cell killing marker, e.g., RFP or staining with the secondary antibodies and fluorescent complementary oligos targeting cell killing marker proteins and/or mRNA, respectively. Events that contain a nanovial and T cell and are above a threshold of fluorescence height, fluorescence width, fluorescence area, or a combination of the above in the RFP/Brilliant Violet channels are identified as an active population and are sorted out for downstream sequencing of the associated CARs. Alternatively sorted populations are expanded in culture for downstream functional assessment of cell killing and/or CAR construct sequencing using methods described herein. It should be apparent to one skilled in the art that the same workflow can be applied for different cell types including but not limited to CAR-NK cells, CAR-macrophages, NK-T cells, and T cells with engineered TCRs.

T Cell Secretion Phenotype.

In one exemplary non-limiting example, T cells are analyzed and sorted based on secreted cytokines using 35-micron diameter nanovials. A volume of Nanovial solution at a concentration of 4000 nanovials/microliter is prepared in a microcentrifuge tube. Nanovials with biotin functionalization are coated with streptavidin by incubating with streptavidin at 60 µg/mL in Washing Buffer at an equal volume to the Nanovial solution. Washing Buffer consists of 0.5% bovine serum albumin (GeminiBio, 700-102P), 1% penicillin-streptomycin, and 0.05% Pluronic F-127 in phosphate buffered saline (ThermoFisher, 14190250). Nanovials are then washed three times with washing buffer. The Washing Procedure consists of centrifuging at 300 g for 2-3 minutes, aspirating supernatant from above the nanovial pellet and diluting the sample back to either 10× of the original volume or the original volume (on the last wash). Biotinylated Antibody Solution equal to that of the Nanovial solution is also prepared. Cell Capture Antibody (aCD45-biotin, Clone 30-F11, ThermoFisher, Product #50-115-49) and biotinylated anti-IFN-gamma Antibody (R&D Systems, Product #BAF285) and/or biotinylated anti-TNF-alpha antibody (R&D Systems, #BAF210) and/or biotinylated anti-IL-2 antibody (Biolegend, Product #517605) are mixed in the Antibody Solution to reach a target of 8 µg/mL of biotinylated anti-CD45 and 12 µg/mL of each biotinylated cytokine capture antibody. Biotinylated antigen or peptide-MHC complex at 10-20 µg/mL can be used instead of anti-CD45 for antigen-specific T cell or CAR-T cell capture. It is ensured that the antibodies used are free of protein aggregates by spinning down antibody vials at 10,000 g for 10 minutes and taking solution from the top of the vial. The Nanovial sample mixed with the Antibody Solution is incubated at room temperature for at least 30 minutes to coat the nanovials with antibodies. Nanovials may be stored at 4 degrees Celsius overnight or used following coating. Nanovials are washed two times with Washing Buffer and then washed with fresh cell media and resuspended at the original volume.

Cell Loading into Nanovials. T cells (or CAR-T cells) are loaded onto nanovials by first preparing a cell solution at a density of 4000 cells/microliter and adding an appropriate volume of cells depending on High Recovery, Normal, or High-throughput cell loading mode and the nanovial volume. For High Recovery mode, cells are added at a volume ratio of 1:4 with nanovials, yielding 47% cell recovery and 12% of nanovials loaded with cells. For Normal mode, cells are added a volume ratio of 1:1 with nanovials, yielding 28% cell recovery and 28% of nanovials loaded with cells. For High-throughput mode, cells are loaded at a volume ratio of 4:1 with nanovials, yielding 12% cell recovery and 50% of nanovials loaded with cells. The highest fraction of single loaded cells is also achieved with the High Recovery mode. To load cells, the volume of cell suspension is taken up with a micropipette and slowly dispensed into the center of the nanovial pellet. Nanovials are mixed with cells by adjusting the volume of the micropipette to at least half of the total volume in the tube. Nanovials and cells are pipetted up and down smoothly for 30 seconds in circular motions to mix cells and nanovials evenly. The microcentrifuge tube containing nanovials and cells is incubated at 4 degrees Celsius for 60 minutes to allow cells to bind to nanovials.

Removing Background Cells. Background cells that are not attached to nanovials are removed using a 20 µm cell strainer (ThermoFisher, NC9699018). A 20 µm cell strainer is held with the small end pointing upwards above a waste 50 mL conical tube. Background cells are strained out by carefully pipetting the cell-loaded nanovial suspension from the microcentrifuge tube into the small end of the cell strainer. An additional ~1 ml of Washing Buffer is pipetted into the sample tube to recover additional nanovials and is pipetted into the cell strainer. The strainer is rinsed with an additional 2 ml of Washing Buffer to further remove background cells. By flipping the cell strainer over and pipetting Washing Buffer through the strainer nanovial particles are recovered into a precoated 15 ml conical tube. The 15 mL conical tube is precoated by adding 2 mL of Washing Buffer into the tube, rotating by hand to cover all surfaces and aspirating excess volume. The sample is washed by spinning down to pellet the nanovial particles, aspirating supernatant and resuspending in media at the original Nanovial solution volume.

Secretion Incubation. Filtered nanovials containing cells are incubated at 37 degrees Celsius for 3 hours to accumulate cytokine secretions on the nanovials. Secreting cells in nanovials can be incubated within a tube with nanovials packed together and blocking other nanovial cavities to prevent convective fluid flow and diffusion and concentrate secreted products to the nanovial cavity. Alternatively, incubation can be performed under continuous rocking using a laboratory rocker operating at e.g., 1 Hz. Alternatively, incubation can be performed in a well plate with nanovials pipetted and spread out over the well plate surface such that there is a distance of on average >100 µm between neighboring nanovials.

Labeling Captured Secretions. After incubation, nanovials and cells are washed three times with PBS using the Washing Procedure and resuspended in PBS at the original nanovial volume. A solution of fluorescently labeled Cytokine Reporter Antibody is prepared in PBS at 5 µg/mL is prepared. An equal volume of this labeling solution to the nanovial sample volume are mixed and gently pipetted together. Following mixing, nanovials with labeling solution is incubated for 30 minutes at 4 degrees Celsius. After potential binding to secreted cytokines, the nanovials are washed three times in PBS using the Washing Procedure and resuspended in Sorting Buffer for analysis and/or sorting. Sorting Buffer consists of 2% FBS, 1% Penicillin-Streptomycin, 0.05% Pluronic F-127 in PBS which is sterile filtered with a 0.22 µm stericup filter and stored at 4 degrees Celsius.

FACS Analysis & Sorting. All FACS falcon tubes are pre-coated with Sorting Buffer. Collection tubes are filled with media to support the T cells. The nanovial sample is diluted in the Sorting Buffer to a desired concentration to achieve a sorting throughput preferably between ~100 events/second to ~2,000 events/second. A small amount of control nanovial samples stained with fluorescent streptavidin are run to identify appropriate gates for forward scatter, side scatter, singlets, and to perform any fluorescence compensation as described herein. Sorted cells can be index sorted or pooled for downstream cDNA library preparation and sequencing to obtain TCR or CAR sequence information. It should be apparent to one skilled in the art that the same workflow can be applied for different cell types that secrete cytokines or secrete cytokines upon antigen specific activation including but not limited to CAR-NK cells, CAR-macrophages, NK-T cells, and T cells with engineered TCRs.

In a non-limiting example for characterizing the secretion phenotype for T cells, the method comprises activating T cells and analyzing the binding of one or more cytokines and/or other secreted products from the T cells using the nanovial system. Cytokine secretion is determined using nanovials comprising secreted cytokine capture moieties and cell capture moieties. Secreted cytokine capture moieties include anti-cytokine antibodies for example, anti-IL2, anti-TNF-alpha, anti-IFN-gamma, that are commercially available, and also include aptamers or non-specific capture surfaces for proteins, e.g., poly-lysine, extracellular matrix proteins, etc. Cell capture moieties include anti-CD45 or anti-CD4 or anti-CD8, or anti-CD3/anti-CD28, as well as peptide-MHC molecules, which are used to effect T cell activation, for example, as well as antibodies against other highly expressed surface proteins or biotin/streptavidin if the T cells are pre-incubated with antibodies against cell-surface proteins that are biotinylated or bound to streptavidin. A workflow for characterizing secretion phenotypes of a plurality of T cells, using a plurality of nanovials comprises: (1) capturing the T cell of interest on the nanovial, (2) optionally encapsulating the T cell of interest and nanovial into an oil phase to form and emulsion, (3) incubating the T cell of interest for a period of time (preferably 30 min to 3 hours, less preferably 3 to 24 hours) and capturing the accumulated secretions on the nanovial surface, (4) adding labeled secondary antibodies specific to the accumulated secretions on the nanovial surface, (5) determining the amount of secretions bound to the nanovial and associated with the T cell of interest, and then (6) optionally performing single-cell RNA sequencing to determine the mRNA profile of the T cell of interest linked to the accumulated secretions. Here, the labeled secondary antibody is labeled using a fluorophore, oligonucleotide barcode compatible with single-cell RNA-sequencing, magnetic particle, or any combination of the above. The labeled secondary antibody with an oligonucleotide barcode is labeled with an oligonucleotide sequence, using for example the 5' Feature Barcode Antibody Conjugation Kit-Lightning-Link® from Abcam (ab270703). For this approach, the amount of secretions bound and associated with a T cell of interest (step 5) are characterized using single-cell RNA-sequencing for each nanovial and associated T cell of interest. Step 5 and step 6 is conducted simultaneously when performing single-cell RNA-seq. The entire nanovial, bound secretions and secondary antibodies with oligonucleotide barcodes, and T cell mRNA is analyzed together using single-cell RNA-seq workflows, such as using the 10× Chromium system, drop-Seq, In-drop, Fluidigm C1, Rhapsody etc. The nanovials (preferably between 20-60 microns in diameter) are directly loaded in a similar way as one would load single cells in these systems for a standard single-cell RNA-seq run. FACS is used to pre-enrich populations of nanovials containing cells (e.g., using scatter information as discussed elsewhere herein, fluorescent cell stains or fluorescent viability dyes). If labeled secondary antibodies also comprise a fluorescent label in addition to an oligonucleotide label, FACS is conducted to pre-enrich nanovials with fluorescent signal from secondary antibodies above a threshold. This corresponds to nanovials containing T cells of interest that produce secreted products at levels above a threshold value. This sorted population of nanovials is then be pooled and analyzed downstream by single cell sequencing as discussed above. Notably, in this case the linkage between secretion and T cell mRNA is directly made because of the single-cell barcode (here single nanovial barcode) that captures mRNA and oligonucleotide label on the antibodies and when reverse transcribed contiguously attached the single-cell (single nanovial) barcode information to the cDNA. Therefore, the cDNA from the T cell mRNA is linked to the cDNA associated with the oligonucleotide barcode of the secondary antibody and can be associated following sequencing and analysis. An alternative approach for conducting the workflow is for the mRNA capture and barcoding oligonucleotides for the single-cell specific barcoding to be incorporated and directly linked to the nanovial using techniques described herein. Nanovials are then emulsified, cells lysed, mRNA captured without using downstream instruments like the 10× Chromium system. Reverse transcription is performed following breaking the emulsion to create cell/nanovial specific cDNA that includes the nanovial/cell specific barcode. Then sequencing libraries are prepared from a number of the nanovial/cell specific cDNA that encodes both the T cell secretions and T cell mRNA for each single secreting T cell of interest. In the above embodiments, preferably T cells are loaded into >20,000 nanovials in the loading step to account for diversity of cells, more preferably T cells are seeded into >100,000 nanovials to capture greater diversity.

Example 5: Methods for Single-Cell or Clonal Population Sequencing after Affinity Binding to Nanovials In a non-limiting example, methods of using nanovials for discovery of nucleic acid and/or peptide sequences associated with binding to a biomolecule, e.g., an antigen or MHC-presented antigen, are presented. For purposes of this example, the nanovial (i) comprises a unique oligonucleotide barcode which comprise a poly-A region (e.g., 30 mer) and/or poly-T region (e.g., 30 mer) and (ii) an antigen or antigen fragment, MHC-presented antigen fragment, or cell with a surface-bound antigen or antigen fragment. Optionally, a plurality of nanovials are disclosed where at least some of the nanovials comprise different biomolecules wherein each different nanovial comprising a unique biomolecule also comprises a separate oligonucleotide barcode specific to the unique biomolecule. The plurality of nanovials with different biomolecules are manufactured using split and pool peptide synthesis approaches known in the art (Bead-based screening in chemical biology and drug discovery-Chemical Communications (RSC Publishing) DOI: 10.1039/C8CC02486C). For this example, nanovials are first incubated with cells presenting an affinity motif on their surface (B cells, T cells, yeast, or phage engineered for phage display) to bind a sub-population of cells to the nanovials based on an affinity interaction between the cell or phage and the biomolecule on the nanovial. The following steps are performed: (1) Binding cells of interest into the nanovials using a high lambda (e.g., lambda=5, 10 or greater), (2) optionally incubating the nanovial for a period of time (>30 minutes, preferably 3 to 24 hours) to allow for significant gene expression changes in the cell with a surface-bound antigen or antigen fragment, (3) optionally sorting the nanovials with attached cells based on a scatter or fluorescence signal by using a flow cytometer or FACS instrument, (4) identifying the sequence information from the unique oligonucleotide barcode associated with the biomolecule (e.g., antigen or antigen fragment) and optionally the sequence information for mRNA expressed by the cell with a surface-bound antigen or antigen fragment, (5) optionally identifying biomolecules with significant effects on mRNA expressed by the cell with a surface-bound antigen or antigen fragment upon binding to the biomolecule compared to a control cell not bound to a nanovial/biomolecule. Step 3 is performed using various commercial instruments and methods described herein to analyze and sort nanovials. Step 4 is performed by using the 10× Genomics Chromium platform or other such single-cell RNA-sequencing platforms known in the art (e.g., Drop-seq, Seq-well, dropicle-based RNA-seq following emulsification, etc.) followed by reverse transcription, nucleic acid amplification, and next-generation sequencing. When single-cell sequencing is performed, the separate oligonucleotide barcodes on the e.g., GEMs are contiguously added to the cDNA associated with the mRNA from the cell with a surface-bound antigen or antigen fragment as well as the cDNA for the unique oligonucleotide barcode with a poly-A region from the nanovial associated with the biomolecule. Therefore, the mRNA profile of the cell with a surface-bound antigen or antigen fragment and oligonucleotide barcode encoding for the biomolecule are linked through the presence of the same distinct oligonucleotide barcode sequence in the cDNA formed. cDNA is amplified using PCR and sequenced using next generation sequencing. The unique oligonucleotide barcodes comprising poly-T capture sites are only present on the nanovial instead of a GEM bead in a single-cell RNA-seq workflow that does not use GEM or other single-cell RNA-sequencing beads. Step 5 is performed using standard bioinformatic analysis known in the art of the sequencing reads following sequencing of the cDNA libraries with the linked oligonucleotide barcodes. This approach, for example, is used to identify target biomolecules that interact with BCRs or TCRs of interest to yield the activation of the B cell or T cell signaling pathway by performing pathway analysis (e.g., Ingenuity Pathway Analysis) of the mRNA profile of the cell of interest. In some embodiments, enrichment of cells binding to nanovials through attachment to biomolecules is performed first using FACS to reduce the number of nanovials and cells assayed for downstream single cell sequencing.

Example 6: Methods of Drug Discovery for DNA-Encoded Libraries

In a non-limiting example, methods of using nanovials for discovery of drugs that modulate a target signaling pathway or expression level of a target protein in a target cell of interest are presented, as illustrated in FIG. 19A. For purposes of this example, the nanovial (i) comprises a unique oligonucleotide barcode 124, (ii) a drug or compound that is associated with the oligonucleotide barcode 124, (iii) and a cell of interest in the nanovial cavity 124. The unique oligonucleotide barcode contains a poly-A region (e.g., 30 mer poly-A), e.g., to enable capture by poly-T capture regions on a separate bead. Alternatively, the unique oligonucleotide barcode contains a poly-T capture region to capture mRNA from the cell of interest. The method comprises the following: (1) Loading and adhering cells of interest into the nanovials using a high lambda (e.g., lambda=1, 2 or greater), (2) optionally encapsulating the cell of interest and nanovial into an oil phase to form an emulsion 126, (3) exposing the nanovial to a stimulus (e.g., light, pH change, temperature change) to release the drug or compound into the fluid volume within the nanovial cavity so that the drug or compound can interact with the cell of interest 128, (4) incubating the cell of interest for a period of time (>30 minutes, preferably 3 to 24 hours) to allow for significant signaling pathway or gene expression changes 130 or secretion from the cell of interest 132, (5) identifying the sequence information from the unique oligonucleotide barcode associated with the drug or compound and the sequence information for mRNA expressed by the cell of interest 136, (6) linking this sequence information using the unique oligonucleotide barcode with a poly-T capture site or a separate unique oligonucleotide barcode with a poly-T capture site as described in FIG. 19B, (7) optionally identifying drugs or compounds with significant effects on mRNA expressed by the cell of interest compared to a control cell or compared to a cell of interest without exposure to a drug or compound as described in FIG. 19B. Step 3 is performed by first linking compounds to nanovials using methods described in the art Off-DNA DNA-Encoded Library Affinity Screening, Amber L. Hackler, Forrest G. FitzGerald, Vuong Q. Dang, Alexander L. Satz, and Brian M. Paegel, ACS Combinatorial Science 2020 22 (1), 25-34. DOI: 10.1021/acscombsci.9b00153, which is incorporated by reference in its entirety, wherein the compounds are linked through a photocleavable linker. The photocleavable linker is then exposed to light, e.g., UV light as described in the art hvSABR (Photochemical Dose-Response Bead Screening in Droplets. Alexander K. Price, Andrew B. MacConnell, and Brian M. Paegel. Analytical Chemistry 2016 88 (5), 2904-2911 DOI: 10.1021/acs.analchem.5b04811) e.g., with a dose of 0.95 J cm$^{-2}$ to cleave the photocleavable linker. Steps 5 and 6 are performed by using the 10× Genomics Chromium platform or other such single-cell RNA-sequencing platforms known in the art (e.g., Drop-seq, Seq-well, Fluidigm C1, Rhapsody, dropicle-based RNA-seq, etc.) followed by reverse transcription, nucleic acid amplification e.g., using PCR, and next-generation sequencing. When single-cell sequencing is performed, the separate oligonucleotide barcodes on the e.g., GEMs labels are contiguously incorporated into the cDNA complementary to the mRNA from the cell of interest as well as the cDNA complementary to the unique oligonucleotide barcode (drug barcode sequence, DBC) with a poly-A region from the nanovial associated with the drug or compound. Therefore, the mRNA profile of the cell of interest and oligonucleotide barcode encoding for the drug or compound are linked through the presence of the same separate oligonucleotide barcode sequence in the cDNA formed (FIG. 19B). The unique oligonucleotide barcodes (drug barcode sequence) containing poly-T capture sites are only present on the nanovial instead of using a GEM bead in a single-cell RNA-seq workflow (FIG. 19B). Step 7 is performed using standard bioinformatic analysis known in the art of the sequencing reads following sequencing of the cDNA libraries with the linked oligonucleotide barcodes. This approach, for example, is used to identify drugs or compounds that interact with cells of interest to yield the activation or suppression of a signaling pathway by e.g., performing pathway analysis (e.g., Ingenuity Pathway Analysis) of the mRNA profile of the cell of interest. Pathway analysis also enables identifying drugs that target a specific pathway without interfering with other pathways which are deleterious to cell health or usefulness of the compound or drug as a safe therapeutic. Importantly, this approach is performed with cells of interest that are not engineered to overexpress a target or engineered to have a reporter function (e.g., produce a fluorescent protein). The approach also is used to identify drugs or compounds that lead to activation, or prevent the activation, in the presence of an agonist or without the presence of agonist, of apoptosis pathways, cell growth pathways, cell differentiation, immune cell activation, cell senescence, or maintenance of cell multipotency or pluripotency. In some cases, the assay is conducted in the presence of normal media or media containing specific compounds, agonists, or proteins that elicit a change in cell activity or signaling in the cell of interest. In some cases, the drugs or compounds comprise CRISPR guide RNA, short hairpin RNA, or siRNA, and the media used in the assay comprises components required for the function of the guide RNA, short hairpin RNA, or siRNA to modulate cells, such as Cas9 enzyme and transfection reagents.

Example 7: Methods for Enhanced Capture of Biomolecules in Cavities

Figure 15A:
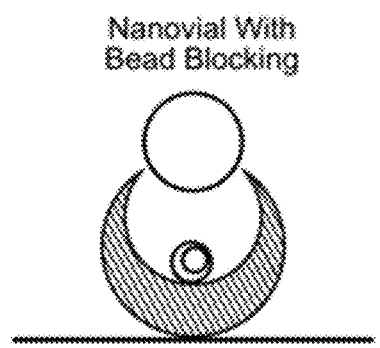
FIGS. 15A-15F depicts steady state diffusion simulation of molecules released from a cell on nanovials with a bead or blocking particle positioned at different distances from the cavity opening, according to various aspects of the disclosure.
Figure 15B:
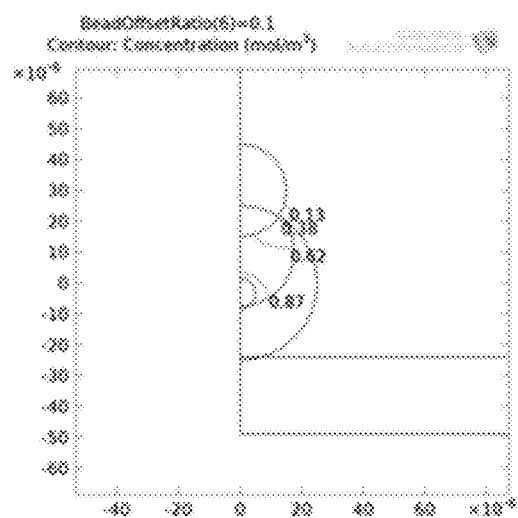
Figure 15C:
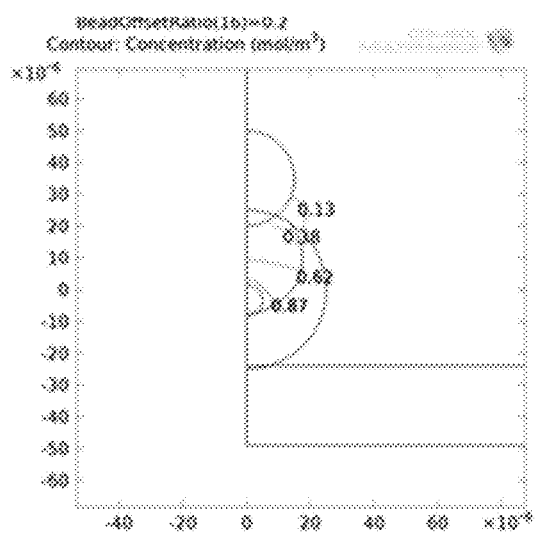
Figure 15D:
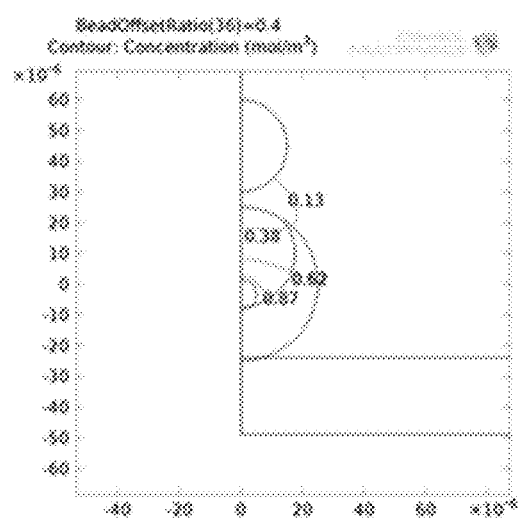
Figure 15E:
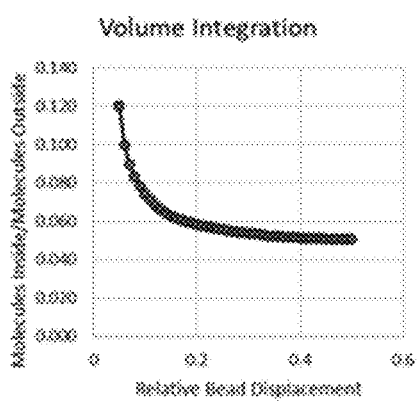
Figure 15F:
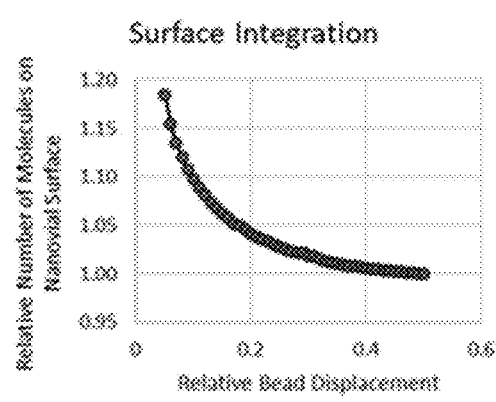
Figure 16A:
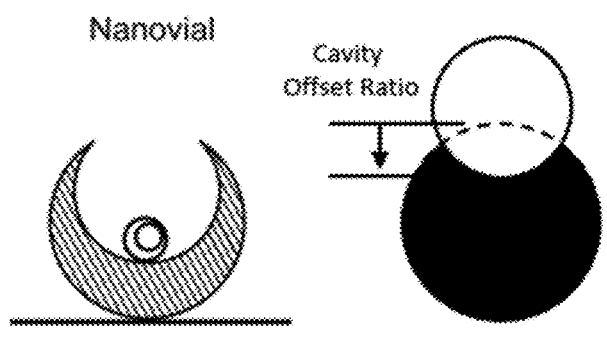
FIGS. 16A-16F depict steady state diffusion simulation of molecules released from a cell on nanovials with different cavity morphologies, according to various aspects of the disclosure.
Figure 16B:
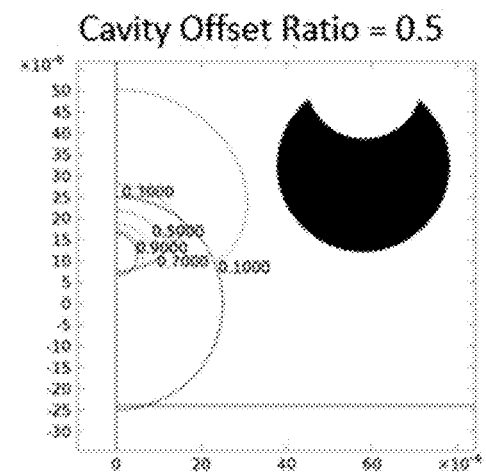
Figure 16C:
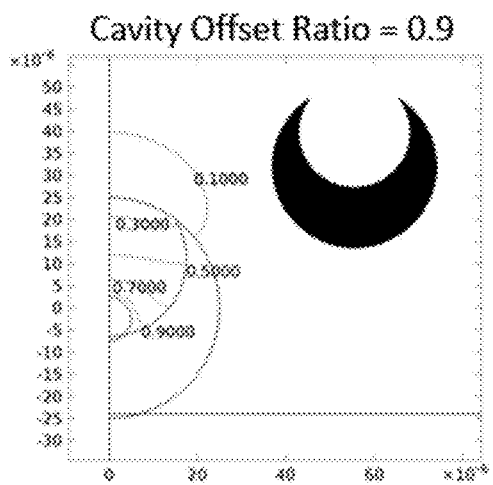
Figure 16D:
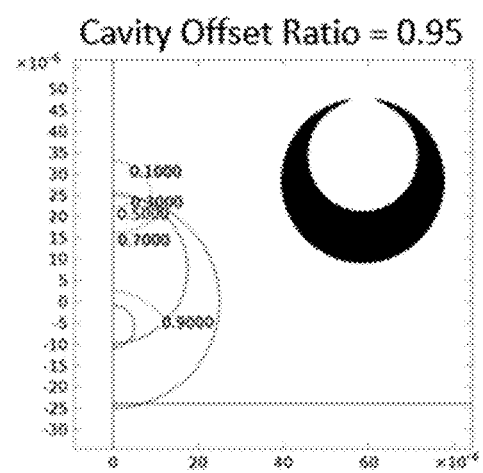
Figure 16E:
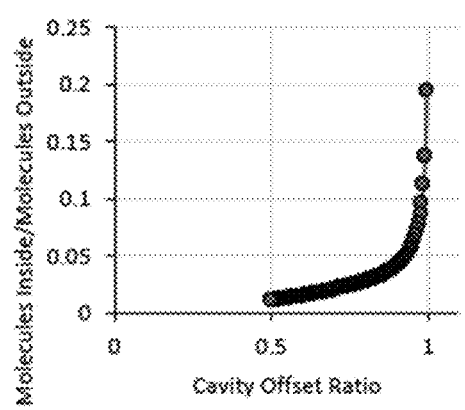
Figure 16F:
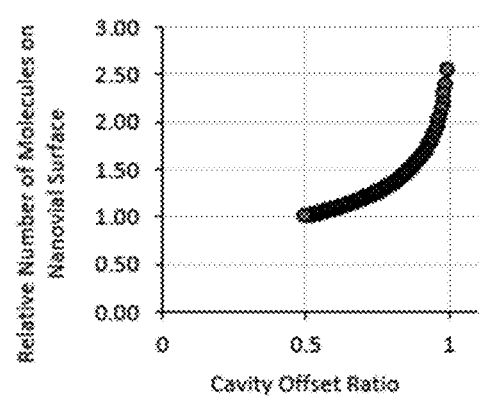
Figure 18:
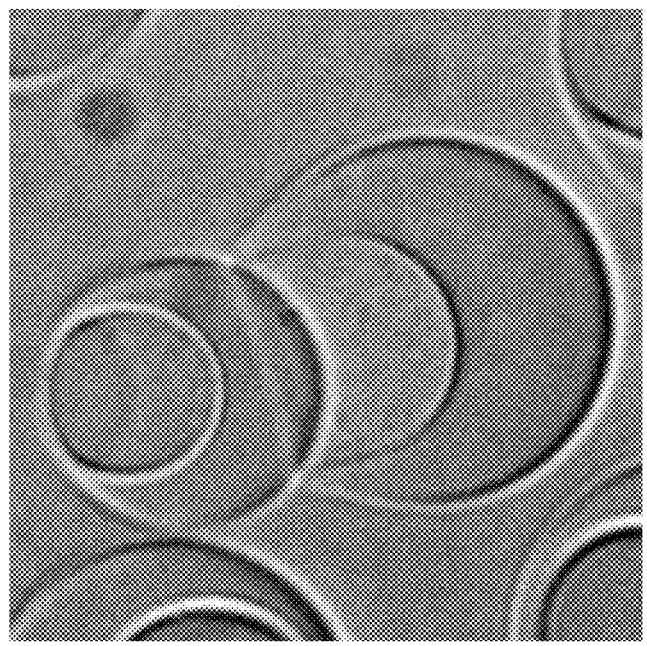
FIG. 18 depicts a microscopy image of a smaller nanovial blocking the cavity of a larger nanovial, according to various aspects of the disclosure.

In a non-limiting example, methods for enhancing capture of biomolecules in nanovials are described, which is compatible with various other embodiments described herein. In particular the alternative method of enhancing capture replaces an emulsification or encapsulation in oil step to limit transport out of a nanovial. In this alternative approach, following seeding, attachment, or binding of cells in nanovials, other blocking particles are introduced around nanovials, on top of nanovials, or associated with the nanovial cavity opening, effectively reducing the transport of materials from cells associated with nanovials by blocking the fluid convective and diffusive transport of species away from the nanovial (FIG. 15A). The blocking particle size is tuned such that the blocking particle maximum diameter is larger than the opening diameter of the nanovial and such that the blocking particle when interacting with the nanovial reduces the effective nanovial opening size or completely seals the nanovial opening (FIG. 18). The blocking particle is preferably adhesive to the nanovial so that upon binding to the nanovial cavity, it is stably maintained during washing steps. In this embodiment an enclosed or partially enclosed cavity is maintained in the nanovial as the blocking particle does not occupy the entire volume of the nanovial. The blocking particle is sized to maintain >50% of the original nanovial cavity volume after it is disposed in contact with the nanovial opening. For example, blocking particles have diameters in the range of 15-100 micrometers depending on the size of the opening of the nanovial cavity. In some cases, blocking particles have diameters of 20-50 micrometers. The blocking particles are spherical and manufactured from a polymer, such as polyethylene glycol (PEG), to prevent adhesion of materials. Alternatively, the blocking particles have binding moieties for biomolecules released from cells contained within nanovials to capture molecules and prevent crosstalk to neighboring nanovials situated in a well or vessel (FIG. 17). For example, blocking particles are coated with antibody capture moieties (e.g., anti-Fc, anti-H & L antibodies, Protein A or Protein G, etc.). In some cases, blocking particles are also coated with antigens, nucleic acids and the like. In some cases, blocking particles are coated with oligonucleotides with poly T capture regions and/or unique barcode sequences. Functionalization of blocking particles with biotin assists with conjugation of the binding moieties onto blocking particles, through streptavidin, neutravidin, avidin non-covalent linkages. Blocking particles are loaded onto nanovials with high efficiency using vortex mixing. This is achieved by performing the following steps: (0) Mixing an aliquot of nanovials with blocking particles at a desired ratio (e.g., 10 to 1, 1 to 1, 1 to 10, etc), (1) diluting the sample to a desired concentration (e.g., concentrations of 1000, 10000, 100000, 1 million nanovials per mL), (2) vortex mixing at 1000-3000 rpm for 1-3 minutes to allow for maximal capture of blocking particles into or at the entrance of the nanovial cavities, (4) optionally performing a density separation, magnetic separation, or buoyancy enrichment to remove unbound blocking particles, (5) optionally performing an additional vortex mixing to reduce the population of blocking particles bound to the outer surface of the nanovial. In some cases, the blocking particles are fully localized in the cavity. In other cases, the blocking particles may adhere to the outer rim of the nanovial cavity. In some instances, step 0 is performed concurrently with step 1. In some instances, steps 4 and 5 and performed concurrently. In some cases, the nanovial size is selected to allow for size exclusion effects to prevent doublet loading. By selecting the blocking particle with diameter closest to the nanovial cavity diameter, the population of nanovials with only one blocking particle captured can be enhanced e.g., 85-micron nanovials loaded with 35 micron blocking particles. In above embodiments, the nanovials used can have average diameters between 30-85 microns, e.g., 30 microns in diameter, 35 microns in diameter, 40 microns in diameter, 45 microns in diameter, 50 microns in diameter, 55 microns in diameter, or 85 microns in diameter while the blocking particles can have average diameters between 15-35 microns, e.g., 15 microns in diameter, 20 microns in diameter, 25 microns in diameter, 30 microns in diameter, or 35 microns in diameter. Blocking particles are structured, e.g., out of hydrogel materials such that the hydrogel mesh pore size is tuned to allow only smaller molecules e.g., proteins and other biomolecules <50 kD or proteins and other biomolecules <10 kD to diffuse through, to prevent loss of signal from secreted or released biomolecules from cells within the cavity of nanovials. The hydrogel mesh pore size of the blocking particles or nanovials is also tuned to allow transport of fluids and reagents into the nanovial cavity through the blocking particles or hydrogel mesh of the nanovial. For example, reagents comprise staining agents, surfactants, detergents or lysis buffers, drugs, cytokines, chemokines, media, conditioned media or other buffers (FIG. 17). Generally, methods of manufacturing PEG based hydrogel particles are described herein and are be applied to blocking particles as well. Commercially available polystyrene, polymethylmethacrylate and other thermoplastic spherical beads are also used as blocking particles. In some cases, instead of a single blocking particle reducing transport out of a nanovial cavity, a plurality of blocking particles is loaded in and around the nanovial, including in the cavity of the nanovial. These blocking particles reduce convective transport of fluid and increase the diffusive time scales of molecules to be transported away from the nanovials that are released by cells or reactions performed therein. The plurality of smaller blocking particles are sized in the range of 2-20 micrometers, such that a number of smaller blocking particles settle into a nanovial cavity, and comprise a density larger than saline at room temperature ($>\sim 1.01$ g cm$^{-3}$), preferably density is $>1.05$ g cm$^{-3}$ such that the smaller blocking particles can settle into the nanovial in a reasonable time period (<30 minutes). In some cases, the number ratio of smaller blocking particles to nanovials exceeds 100:1 in order to sufficiently cover nanovials and fill nanovial cavities with smaller blocking particles. The smaller blocking particles have other properties, surface functionalization, and porosity as described for blocking particles that are larger in size. Smaller blocking particles are comprised of polymers like PEG, polystyrene, poly-methylmethacrylate, or other higher density materials like glass or metals.

Simulations of blocking particles sealing a nanovial cavity are shown in FIG. 15A-15F and indicate that concentrations of secreted or released molecules from a cell within the nanovial are increased compared to nanovials without an associated blocking particle as well as other particle geometries (FIG. 14A-14E). Here the diffusion constant of the secreted molecule is assumed to be $1e^{-9}$ [m$^2$/s], the length scale of a nanovial is 30 micrometers, and boundary conditions are set as a fixed concentration on the cell surface of diameter 10 micrometers within the nanovial, no flux through the cell, nanovial, blocking particles surfaces, or bottom domain boundary and concentration=0 at the top and side domain boundaries. Axial symmetry is used to model the 3D problem, with no convective flow, by solving equations of transport of diluted species:

$$\nabla \cdot (-D_i \nabla c_i) + u \cdot \nabla c_i = R_i$$

$$N_i = D_i \nabla c_i + u c_i$$

Where D is diffusion constant for the secreted molecule, C is concentration of the secreted molecule, u is the mass averaged velocity vector, and R is reaction rate expression for the secreted molecule.

An increased local concentration in the nanovial is expected to be associated with a higher amount of captured secreted molecules, such as antibodies or released nucleic acids, when binding to capture moieties on the nanovial surface or blocking particle surfaces. Following labeling, a stronger signal is expected for nanovials capped with blocking particles compared to un-capped nanovials, even without forming an emulsion. This has advantages in reducing the number of steps to perform an assay compared to use of emulsification.

In an example assay using blocking particles, 50 micrometer diameter nanovials loaded with hybridoma cells (Hy-HEL-5) are blocked by other 50 micrometer diameter nanovials during a secretion incubation step to localize captured IgG secretions at higher levels with less crosstalk. To a 200-microliter aliquot of 50 micrometer diameter nanovials, 24 microliters of 1 mg/mL streptavidin (Invitrogen, 434301) and 176 microliters of Washing Buffer are added and incubated for 15 minutes, followed by washing three times with the Washing Procedure. Then 26.9 microliters of biotinylated goat anti-mouse CD45 (37.3 micrograms/mL stock, R&D Systems) and 6.6 microliters biotinylated goat anti-mouse IgG (1 mg/mL stock, Jackson Labs, 115-065-071) are added to 167 microliters of Washing Buffer and mixed with the nanovial pellet and incubated for 30 minutes. The antibody labeled nanovials are washed 3 times with the Washing Procedure and returned to the initial volume of 200 microliters. To load cells, a 200-microliter volume of cell suspension at 4000 cell/microliter is taken up with a micropipette and slowly dispensed into the center of the nanovial pellet. Nanovials are mixed with cells by adjusting the volume of the micropipette to at least half of the total volume in the tube. Nanovials and cells are pipetted up and down smoothly for 30 seconds in circular motions to mix cells and nanovials evenly. The microcentrifuge tube containing nanovials and cells is incubated at 4 degrees Celsius for 60 minutes to allow cells to bind to nanovials. Using a 20-micrometer strainer, unbound background cells are removed as described elsewhere herein. Following straining, the nanovials (and nanovials containing bound cells) are reintroduced into media and allowed to settle or centrifuged for 1-2 minutes at 100 g to create a pellet and block other nearby cavity openings of neighboring nanovials in the microcentrifuge tube. To achieve more effective blocking, nanovials are preferably concentrated to a density of greater than 106 nanovials/mL in the microcentrifuge tube or other container. Nanovials (and nanovials containing bound cells) are then incubated for 1 hour at 37 degrees Celsius to accumulate secreted IgG. After incubation the nanovials are washed three times with Washing Buffer and stained with 5 micrograms/microliter final concentration of hen egg lysozyme (HEL) labeled with AlexaFluor™ 647 in PBS for 30 minutes at 4° C. Samples are washed three times and diluted to a final volume of 200 microliters to image samples. Images of hybridoma cells and the stained nanovials, showing antigen-specific staining localized to secreting cells, are seen in FIG. 24A, showing low crosstalk due to blocking of cavity openings by neighboring nanovial particles.

In another example assay using blocking particles, (1) cells are loaded into nanovials optionally comprising barcoded oligonucleotide capture molecules containing poly-T regions (e.g., 30 mer) forming a solution containing cell-loaded nanovials, (2) blocking particles optionally comprising barcoded oligonucleotide capture molecules are seeded into the solution to cap and seal nanovials and reduce transport of cell-released molecules, (3) a lysis buffer is added to the solution that can diffuse through the hydrogel matrix of nanovials and lyse cells within. (4) cell-loaded nanovials are incubated to release molecules such as mRNA from the lysed cells and capture the released molecules on the nanovial and/or blocking particle. Note that at least one of the nanovials or blocking particles comprise barcoded oligonucleotide capture molecules in this embodiment. In some cases, blocking particles comprise GEM beads, Rhapsody beads, drop-seq beads or other commercially available barcoded beads used for single-cell sequencing applications. (5) Optionally, reverse transcription is performed on the captured mRNA to form cDNA comprising the barcode sequence from the nanovial and/or blocking particle, followed by amplification and sequencing of the amplified cDNA.

Nanovials are also manufactured with deeper cavities to reduce the transport of cell-secreted or cell released products out of the nanovials 116, as seen in FIG. 17. When cells are contained within nanovial cavities, a deeper cavity maximizes the concentration of released molecules from the cell that remain within the nanovial and reduces the amount of released molecules that are diffusively transported away (FIG. 16A-16F). Convection within the deeper cavity of the nanovial is also reduced.

Example 8: Methods for Linking Functional Single Cell Properties with Downstream Genomic and Transcriptomic Information Using Nanovials In a non-limiting example, methods of linking functional single cell properties (such as secretions) with genomic, proteomic, and transcriptomic properties of cells, using the nanovial as a carrier of information (FIG. 6) are discussed herein. The nanovial of the present disclosure comprises varying types of barcodes to independently address and link information between different analysis modalities. For example, the nanovial comprises a unique nucleic acid barcode or oligonucleotide barcode, or a unique peptide barcode. Alternatively, nanovials in addition comprise optical barcodes, such as a set of dyes or fluorophores at varying intensities or varying unique scatter signatures as observable by flow cytometry forward and side scatter. In some cases, nanovials comprise unique shapes or sizes which can be recognized through image cytometry or image-activated cell sorting approaches. In some instances, nanovials comprise isotope or mass barcodes that are readable by CyTOF or mass cytometry techniques. Nanovials are also tagged or barcoded following imaging by using an optical source to fluorescently bleach or activate fluorophores embedded within the nanovial. Notably, in order to transfer and link information between two or more analysis modes, specific barcodes of one type are linked to specific barcodes of another type. For example, nanovials with oligonucleotide barcodes comprising a specific nucleotide sequence, such as GACTTCC in addition comprise a specific level of fluorophore intensity, for example AlexaFluor 488 with intensity 1000-fold above background. While another nanovial with oligonucleotide barcode comprising a second distinguishable sequence, such as GCTAACC in addition comprise a different level of fluorophore intensity, such as AlexaFluor 488 at 100-fold background intensity. Of course, a variety of different types of barcodes are linked or more than two barcodes could be linked in some instances.

In some cases, the information on cell function is linked to genomic and/or transcriptomic information through the use of Index Sorting using FACS or other single-cell analysis and dispensing technologies (e.g., WOLF Cell Sorter, Namocell, Nodexus, etc.). In some cases, nanovials containing cells therein are analyzed and sorted based on a fluorescent signal on the cell and/or nanovial associated with a secreted or released product from the cell. The sort is performed based on a sort gate on parameters which may include parameters from the set of fluorescence intensity peak height, fluorescence intensity width, fluorescence color, scatter intensity peak height, scatter intensity width, and gated nanovials containing cells are sorted to separate wells of a 96 well plate (or 384 well plate) using a flow cytometer such as the BD FACS Aria II, III, Sony SH800, or other index sorting compatible FACS system. The information concerning fluorescence intensity associated with a nanovial (that represent the amount of secreted or released molecules from the cell) is linked to a particular well in the well plate that it was sorted to and is then linked to downstream information from sequencing steps. Messenger RNA from the sorted cell is reverse transcribed into cDNA and amplified. Sequencing is performed using Sanger sequencing, or if introducing an oligo barcode into each well using e.g., an index kit (TG Nextera® XT Index Kit v2 Set A (96 Indices)), hash tag, or the like (bdbiosciences.com/ds/pm/others/23-21318.pdf), then amplified DNA from each well of the well plate comprises a unique barcode from the barcoded index kit and is be pooled to perform next generation sequencing where the unique oligo barcode provides a link to the particular well of the well plate. In some cases, the barcoding oligo provided in solution binds to nanovials (or cells therein) and nanovials with added index barcodes are pooled and sequenced using 10x Chromium or other single-cell sequencing platforms. In some instances, the barcoding oligo provided in solution is contiguously linked to cDNA complementary to mRNA from the cell during the reverse transcription step or cDNA amplification step in each well of the well plate and the amplified cDNA is pooled for next generation sequencing. The use of indexing oligos for pooling sequencing from amplified DNA from multiple wells of a well plate are known in the art.

In the above embodiments, data from a single nanovial/single-cell is linked in a single data structure that includes these linked data sets as rows or entries linked to the same single nanovial or single-cell identifier.

Example 9: Methods/Devices for Storing/Packaging Nanovial Products

In a non-limiting example, a container or vessel for holding or shipping and storing nanovials comprises a barcode or QR code on its surface that when scanned by a barcode or QR code reader (e.g., including cell phone-based readers) provides data on product specifications, such as nanovial size, lot number, functionalization. In some cases, data provided by scanning the QR code also includes optimized workflows and protocols for using nanovials for one or more assays as described herein. Scanning the QR code or barcode is also used to automatically update the settings on a flow cytometry or FACS instrument to perform optimal analysis or sorting of nanovials, for example, adjusting drop delay values, sheath flow and sample flow pressures, and the like. Scanning the barcode or QR code is used to activate or initiate the ability to access cloud or local software to analyze nanovial data obtained from flow cytometry .fcs files or FASTQ files from sequencing, or the like.

Nanovials stored in the vessel are stored as a suspension in a buffer at refrigerated temperatures (e.g., 4° C.) at concentrations of 1%-10% dry weight/volume. In some cases, in which nanovials are pre-functionalized with antibodies or other biomolecules, nanovials are stored in the vessel with antimicrobial solutions for example comprising sodium azide. In some instances, nanovials are stored in a vessel and shipped as a lyophilized powder that is measured out and re-hydrated by the user upon use. In this case, the nanovials are lyophilized or dried from an oil phase after polymerization to enhance successful rehydration without clumping, for example using the techniques described in Sheikhi et al. "Microengineered emulsion-to-powder technology for the high-fidelity preservation of molecular, colloidal, and bulk properties of hydrogel suspensions" ACS Applied Polymer Materials 1 (8) 1935-1941, 2020, which is incorporated herein by reference.

In some instances, a kit for performing assays with nanovials comprises a container or vessel containing nanovials therein, a second vessel containing an oil and surfactant mixture therein, a third vessel containing an emulsion breaking solution (e.g., perfluoro-octanol). The kit further comprises a hand operated bulb pipettor or other mixing element with a minimum inner lumen dimension greater than 3 times a nanovial diameter, which is optimized for generating dropicle emulsions. The kit further comprises a filter with pore sizes tuned to retain nanovials but pass unbound cells not bound to nanovials after a cell loading step, such as a filter or cell strainer containing pore sizes of 20 microns average diameter. In some cases, the kit further comprises density-controlled buffers, e.g., comprising Ficoll, Percoll or Optiprep as described herein for modulating the density of a nanovial solution for operation with FACS or separate of cell-containing nanovials from nanovials without cells contained therein. In some instances, the kit includes, spiked in the nanovial solutions, other positive and negative control or calibration nanovials with defined fluorescence intensities and/or scatter signals to be used to calibrate nanovial-based assay measurements. In some cases, the spiked concentration of calibration nanovials is <1% of nanovials. In other instances, the kit for performing assays with nanovials comprises a container or vessel containing nanovials therein and a second vessel containing a solution of blocking particles.

In some cases, the kit comprises multiple vessels containing nanovials and/or other assay components aliquoted to have concentrations suitable for single assays. For example, multiple (e.g., 3-4 or 6-10) vessels containing approximately 100,000 nanovials per vessel suitable for individual experiments. In other related embodiments each nanovial-containing vessel in the kit comprise approximately 300,000, 500,000 or 1,000,000 nanovials, usually of smaller size (e.g., 35 microns in diameter). Note that a kit comprises features of all of these related embodiments or a subset of the embodiments depending on the application.

Example 10: Integrated Systems and Software for Nanovial Analysis and Sorting

In a non-limiting example, integrated instruments (e.g., flow cytometers or fluorescence activated cell sorters), including a barcode or QR code reader connectivity, and software to analyze nanovials are disclosed that are optimized or tuned for operation with these hydrogel particles instead of normal cells. As discussed in previous examples, nanovial reagents of a specific average size larger than cells require tuned settings on an instrument to operate with maximum yield or purity. Generally, nanovials will have an average diameter between 30-85 microns, e.g., 30 microns in diameter, 35 microns in diameter, 40 microns in diameter, 45 microns in diameter, 50 microns in diameter, or 55 microns in diameter. In some cases, 35-micron diameter nanovials are tuned for use with B cells or T cells. In some instances, 55-micron diameter nanovials are tuned for use with producer cells such as CHO, HEK293, or the like, and stem cells such as mesenchymal stem cells. The integrated instrument comprises a flow cytometry or cell sorting instrument in communication with a barcode or QR code reader that is configured to read the barcode or QR code on a vessel containing nanovials, and through software adjust the settings on the flow cytometry or cell sorting instrument based on the information provided by the barcode or QR code reader that reflects the size of the nanovials. The barcode/QR code reader comprises a smartphone configured with an app that communicates with the software of the flow cytometry or cell sorter instrument.

The software of the flow cytometry or cell sorter instrument adjusts various settings to maximize the throughput, yield, and/or purity of the sorted nanovials based on their size characteristics or expected fluorescence intensities. Settings to include laser power, PMT gains and/or voltages, the type of sort masks: phase, yield, purity, single cell, etc. Hydrodynamic sheath flow ratio to sample flow/ratio of sheath flow pressure to sample pressure, droplet generation frequency, sort amplitudes: voltage on deflection electrode, drop delay, pressure for microfluidic sorting, etc. In some cases, a user input into the software is used to identify a preferred metric to optimize, such as throughput over yield, or purity over yield. Example implementations of settings that maximize purity include adjusting software to set a single cell mask or purity mask. Example implementations of settings that maximize yield include increasing sort amplitudes (e.g., deflection voltage or pressure for microfluidic sorting). Example implementations of settings that maximize throughput include decreased sheath flow pressure to sample flow pressure ratio, or increased droplet generation frequency.

The software of the flow cytometry or cell sorter instrument, or separate analysis software is also configured to perform an analysis specific to the nanovial assay based on reading of a barcode or QR code by a barcode or QR code reader, or smartphone enabled app configured to read barcode or QR codes. The analysis software performs automatic gating of nanovial events based on known scatter or fluorescence signatures associated with nanovials loaded in the vessel with the specific barcode or QR code. The software also performs automatic gating of nanovials containing cells based on scatter and/or fluorescence intensity data. For example, based on in part a side scatter intensity value above a threshold. The software also performs automatic gating of nanovials with high vs. low signal in one or more fluorescence channels. This automatic gating is aided by spiked calibration nanovials with known fluorescence levels in the one or more channels. In some cases, the calibration nanovials are used to calibrate the intensity levels for setting thresholds and gating nanovials with high vs. low signal, or re-scaling the intensity to be within a range of a high calibration nanovial vs. a low calibration nanovial. The software also generates histograms and/or dimensionally reduced plots of multidimensional data (e.g., visualization of t-distributed stochastic neighbor embedding-ViSNE plots) containing data from nanovials with cells for downstream analysis and identification of cell sub-populations. In some instances, data from the flow cytometry or cell sorting instrument is uploaded to a server and analyses described herein are performed in cloud software and a result is returned back to the user.

Upon scanning the barcode or QR code, the software also provides on screen instructions for best use of a specific nanovial reagent loaded in the vessel. For example, the software displays through a graphics user interface an experimental workflow protocol for an assay using the specific nanovial reagent. Specific steps of the workflow are displayed that are unique to the specific nanovial reagent. For example, based on the size of the nanovial which is encoded in the barcode or QR information, the software automatically displays a protocol including a preferred cell concentration for loading, nanovial concentration for analysis by flow cytometry or another downstream instrument, or the like. In some cases, the user inputs a loading fraction or percent doublets or multiplets permissible and the software calculates a preferred nanovial and cell concentration that is updated into the protocol and displayed to the user. Again, using the user-entered information on percent doublets or multiplets permissible, the software also adjusts the gate on a scatter threshold to minimize the amount of doublet loaded nanovials sorted to a collection outlet on the flow sorter. The QR code on the nanovial reagent package is also scanned by a smartphone that contains an app and software code to open up specific experimental protocols and best operating conditions for the specific nanovial reagent on the smartphone screen. In some cases, the software code also opens up QC/certificate of analysis information for the nanovials upon a user request.

In some cases, the software is internet-connected to connect to a server and update settings on the fly as improved operational settings for the flow cytometer, flow sorter, and analysis approaches become available. The internet-connected software also reports a geo-position or other location based on network information where a barcode or QR code is being scanned and store this information in a de-identified manner on the server.

What is claimed is:

1. A method for generating released nucleic acid molecules, the method comprising:
   (a) providing or obtaining a plurality of nanovials, each nanovial of the plurality of nanovials comprising a cavity having an opening to a surface of the nanovial;
   (b) combining a plurality of cells with the plurality of nanovials such that each nanovial of at least a subset of the plurality of nanovials is loaded with at least one cell of the plurality of cells into the cavity of the nanovial to generate a plurality of loaded nanovials;
   (c) combining a plurality of blocking particles with the plurality of loaded nanovials such that a blocking particle of the plurality of blocking particles interacts with the opening of a loaded nanovial of the plurality of loaded nanovials such that a size of the opening of the loaded nanovial is blocked or reduced, thereby generating a blocked or reduced nanovial; and
   (d) releasing nucleic acid molecules from the at least one cell loaded within the cavity of the blocked or reduced nanovial, thereby generating the released nucleic acid molecules.

2. The method of claim 1, wherein the plurality of nanovials is disposed in a fluid.

3. The method of claim 2, wherein the blocking particle of the plurality of blocking particles inhibits the released nucleic acid molecules from transporting out of the blocked or reduced nanovial.

4. The method of claim 1, wherein a maximum diameter of each blocking particle of the plurality of blocking particles is larger than a diameter of the opening of each nanovial of the plurality of nanovials.

5. The method of claim 1, wherein the blocking particle of the plurality of blocking particles is in contact with or covers the opening of the blocked or reduced nanovial.

6. The method of claim 1, wherein each blocking particle of the plurality of blocking particles is sized to maintain greater than 50% of a total volume of the cavity of each nanovial of the plurality of nanovials.

7. The method of claim 1, wherein each blocking particle of the plurality of blocking particles has an average diameter from about 20 micrometers to about 50 micrometers.

8. The method of claim 1, wherein each blocking particle of the plurality of blocking particles is spherical in shape.

9. The method of claim 1, wherein each blocking particle of the plurality of blocking particles comprises a polymer hydrogel.

10. The method of claim 9, wherein the polymer hydrogel comprises polyethylene glycol (PEG).

11. The method of claim 1, wherein each blocking particle of the plurality of blocking particles is coated with one or more affinity agents.

12. The method of claim 11, wherein the one or more affinity agents comprises a nucleic acid.

13. The method of claim 12, wherein the nucleic acid comprises an oligonucleotide tag or oligonucleotide barcode.

14. The method of claim 12, wherein the nucleic acid comprises an oligo-dT sequence.

15. The method of claim 14, wherein the released nucleic acid molecules are RNA molecules.

16. The method of claim 15, further comprising sequencing the RNA molecules.

17. The method of claim 11, wherein the one or more affinity agents comprises an antibody capture moiety or an antigen.

18. The method of claim 17, wherein the antibody capture moiety is selected from the group consisting of: an anti-IgG antibody or a fragment thereof, an anti-Fc antibody or fragment thereof, Protein A, and Protein G.

19. The method of claim 1, wherein each nanovial of the at least the subset of the plurality of nanovials is loaded with no more than a single cell.

20. The method of claim 1, wherein each nanovial of the at least the subset of the plurality of nanovials is loaded with at least two cells.

* * * * *